US012500803B2

(12) United States Patent
Liang et al.

(10) Patent No.: US 12,500,803 B2
(45) Date of Patent: *Dec. 16, 2025

(54) PHYSICAL LAYER PROTOCOL DATA UNIT TRANSMISSION METHOD AND APPARATUS

(71) Applicant: HUAWEI TECHNOLOGIES CO., LTD., Guangdong (CN)

(72) Inventors: Dandan Liang, Shenzhen (CN); Yang Yang, Chengdu (CN); Xun Yang, Shenzhen (CN); Xianfu Lei, Chengdu (CN); Ming Gan, Shenzhen (CN); Xiaohu Tang, Chengdu (CN); Wei Lin, Shenzhen (CN); Lanping Li, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 385 days.

This patent is subject to a terminal disclaimer.

(21) Appl. No.: 18/105,383

(22) Filed: Feb. 3, 2023

(65) Prior Publication Data

US 2023/0179461 A1 Jun. 8, 2023

Related U.S. Application Data

(63) Continuation of application No. PCT/CN2021/110082, filed on Aug. 2, 2021.

(30) Foreign Application Priority Data

Aug. 5, 2020 (CN) ........................ 202010780252.6

(51) Int. Cl.
*H04L 27/26* (2006.01)

(52) U.S. Cl.
CPC ...... *H04L 27/2613* (2013.01); *H04L 27/2614* (2013.01)

(58) Field of Classification Search
CPC ........................ H04L 27/2613; H04L 27/2614
See application file for complete search history.

(56) References Cited

U.S. PATENT DOCUMENTS 12,231,363 B2 * 2/2025 Liu ........................ H04L 27/262
2023/0370126 A1 * 11/2023 Chun .................. H04L 27/2613

FOREIGN PATENT DOCUMENTS

CN 110138421 A 8/2019
CN 110324268 A 10/2019
(Continued)

OTHER PUBLICATIONS

IEEE P802.11ax™/D6.0, "Draft Standard for Information technology—Telecommunications and information exchange between systems Local and metropolitan area network-specific requirements; Part 11: Wireless LAN Medium Access Control(MAC) and Physical Layer (PHY) Specifications,Amendment 1: Enhancements for High Efficiency WLAN," Nov. 2019, 780 pages.
(Continued)

*Primary Examiner* — Asad M Nawaz
*Assistant Examiner* — Natali Pascual Peguero
(74) *Attorney, Agent, or Firm* — Fish & Richardson P.C.

(57) ABSTRACT

An example physical layer protocol data unit (PPDU) transmission method includes generating, by a first communication device, a PPDU, where the PPDU includes a long training field (LTF) sequence. The first communication device can send the PPDU. A second communication device can receive the PPDU. The second communication device can parse the received PPDU to obtain the LTF sequence included in the PPDU.

15 Claims, 6 Drawing Sheets

(56) References Cited

FOREIGN PATENT DOCUMENTS

| | | | |
|---|---|---|---|
| CN | 110545165 | A | 12/2019 |
| CN | 112491768 | A | 3/2021 |
| CN | 112821998 | A | 5/2021 |

OTHER PUBLICATIONS

IEEE P802.11be™/D0.01, "Draft Standard for Information technology—Telecommunications and information exhange between systems Local and metropolitan area networks-specific requirements; Part 11: Wireless LAN Medium Access Control (MAC) and Physical Layer (PHY) Specifications, Amendment 7: Enhancements for extremely high throughput (EHT)," Jul. 2020, 33 pages.

International Search Report and Written Opinion in International Appln. No. PCT/CN2021/110082, mailed on Oct. 20, 2021, 17 pages (with English translation).

Lin, "Research on Sequence Ambiguity Function Based on Deep Reinforcement Learning," Thesis for the degree of Master, Southwest Jiaotong University, May 21, 2021, 80 pages (with English abstract).

* cited by examiner

PHYSICAL LAYER PROTOCOL DATA UNIT TRANSMISSION METHOD AND APPARATUS

CROSS-REFERENCE TO RELATED APPLICATIONS

This application is a continuation of International Application No. PCT/CN2021/110082, filed on Aug. 2, 2021, which claims priority to Chinese Patent Application No. 202010780252.6, filed on Aug. 5, 2020. The disclosures of the aforementioned applications are hereby incorporated by reference in their entireties.

TECHNICAL FIELD

Embodiments of this application relate to the field of wireless communication technologies, and in particular, to a physical layer protocol data unit transmission method and apparatus.

BACKGROUND

Because performance of a wireless communication system is greatly affected by a wireless channel, such as shadow fading and frequency-selective fading, a propagation path between a transmitter and a receiver is very complex. Therefore, channel estimation needs to be performed in coherent detection of an orthogonal frequency division multiplexing (orthogonal frequency division multiplexing, OFDM) system. Channel estimation is a process of estimating, according to a criterion, a parameter of a channel through which a radio signal passes. Precision of channel estimation directly affects performance of the entire system.

Therefore, in wireless local area network (wireless local area network, WLAN) standards that use OFDM as a core technology, such as the Institute of Electrical and Electronics Engineers (institute of electrical and electronics engineers, IEEE) 802.11g/a, 802.11n, and 802.11ac, a common point is that a long training field (long training field, LTF) sequence that can be used for channel estimation is specified at a physical layer. To improve a system throughput rate, an orthogonal frequency division multiple access (frequency division multiple access, OFDMA) technology is introduced in the 802.11ax standard, and the LTF sequence used for channel estimation is also specified in the 802.11ax standard. However, with development of the mobile Internet and popularization of intelligent terminals, data traffic increases rapidly, and a user has increasingly high requirements for communication service quality. It is difficult for the 802.11ax standard to meet user requirements in terms of a large throughput, low jitter, low latency, and the like. Therefore, it is urgent to develop a next-generation WLAN technology, for example, the IEEE 802.11be standard, the extremely high throughput (extremely high throughput, EHT) standard, or the Wi-Fi 7 standard.

For different channel bandwidths (such as an 80 MHz, a 160 MHz, a 240 MHz, or a 320 MHz), how to design an LTF sequence that is included in a physical layer protocol data unit ((Physical Layer) PHY protocol data unit. PPDU) and that has a relatively low peak to average power ratio (peak to average power ratio, PAPR) in an entire bandwidth, in a single resource unit, in a combined resource unit, and in a multi-stream scenario is an urgent problem to be resolved.

SUMMARY

Embodiments of this application provide a physical layer protocol data unit transmission method and apparatus, to provide a sequence with a relatively low PAPR in an entire bandwidth, in a single resource unit, in a combined resource unit, and in a multi-stream scenario.

According to a first aspect, a physical layer protocol data unit transmission method is provided. The method includes: generating a physical layer protocol data unit PPDU, where the PPDU includes a long training field LTF sequence; and sending the PPDU.

According to a second aspect, a physical layer protocol data unit transmission method is provided. The method includes: receiving a PPDU; and parsing the received PPDU to obtain a long training field LTF sequence included in the PPDU.

With reference to the first aspect and the second aspect, in some implementations, a 2×LTF sequence in an 80 MHz is: a sequence 1 in a specific implementation of the specification; a sequence 5 in a specific implementation of the specification; a sequence 6 in a specific implementation of the specification; or a sequence 7 in a specific implementation of the specification.

With reference to the first aspect and the second aspect, in some implementations, a 2×LTF sequence in a 160 MHz is:

a sequence 2 in a specific implementation of the specification; or

2×EHT_LTF_160 M=

$\{0_{12}$, LTF2×80 M_part1, LTF2×80 M_part2, LTF2×80 M_part3, LTF2×80 M_part4, LTF2×80 M_part5, $0_{23}$, LTF2×80 M_part1, (−1)*LTF2×80 M_part2, (−1)*LTF2×80 M_part3, (−1)*LTF2×80 M_part4, LTF2×80 M_part5, $0_{11}\}$, where LTF2×80 M_part1=LTF2×80 M_1(1:242);

LTF2×80 M_part2=LTF2×80 M_1(243:484);

LTF2×80 M_part3=LTF2×80 M_1(485:517);

LTF2×80 M_part4=LTF2×80 M_1(518:759);

LTF2×80 M_part5=LTF2×80 M_1(760:1001); and

LTF2×80 M_1 is a sequence obtained after the 12 leftmost 0s and the 11 rightmost 0s are removed from a sequence 6 in a specific implementation of the specification.

With reference to the first aspect and the second aspect, in some implementations, a 2×LTF sequence in a 240 MHz is: a sequence 3 in a specific implementation of the specification.

With reference to the first aspect and the second aspect, in some implementations, a 2×LTF sequence in a 320 MHz is:

a sequence 4 in a specific implementation of the specification; or

2×EHT_LTF_320 M=

$\{0_{12}$. LTF2×80 M_part1, LTF2×80 M_part2, LTF2×80 M_part3, LTF2×80 M_part4, LTF2×80 M_part5, $0_{23}$, (−1)*LTF2×80 M_part1, LTF2×80 M_part2, LTF2×80 M_part3, LTF2×80 M_part4, (−1)*LTF2×80 M_part5, $0_{23}$, LTF2×80 M_part1, LTF2×80 M_part2, LTF2×80 M_part3, LTF2×80 M_part4, (−1)*LTF2×80 M_part5, $0_{23}$, LTF2×80 M_part1, (−1)*LTF2×80 M_part2, (−1)*LTF2×80 M_part3, (−1)*LTF2×80 M_part4, (−1)*LTF2×80 M_part5, $0_{11}\}$, where LTF2×80 M_part1=LTF2×80 M_2(1:242);

LTF2×80 M_part2=LTF2×80 M_2(243:484);

LTF2×80 M_part3=LTF2×80 M_2(485:517);

LTF2×80 M_part4=LTF2×80 M_2(518:759);

LTF2×80 M_part5=LTF2×80 M_2(760:1001); and

LTF2×80 M_2 is a sequence obtained after the 12 leftmost 0s and the 11 rightmost 0s are removed from a sequence 7 in a specific implementation of the specification.

With reference to the first aspect and the second aspect, in some implementations, a 4×LTF sequence in an 80 MHz is: a sequence 8 in a specific implementation of the specification.

A PAPR in a multi-stream scenario is considered for the sequence provided in this embodiment of this application. A PAPR value in a single resource unit (resource unit, RU) is relatively low, a PAPR value in a combined RU is relatively low, and a PAPR value in an entire bandwidth is also relatively low.

According to a third aspect, a physical layer protocol data unit transmission apparatus is provided. The apparatus is configured to perform the method provided in any one of the first aspect and the possible implementations of the first aspect. Specifically, the apparatus includes a unit configured to perform the method according to any one of the first aspect and the possible implementations of the first aspect.

For example, the apparatus includes: a processing unit, configured to generate a physical layer protocol data unit PPDU, where the PPDU includes a long training field LTF sequence; and a transceiver unit, configured to send the PPDU.

According to a fourth aspect, a physical layer protocol data unit transmission apparatus is provided. The apparatus is configured to perform the method provided in any one of the second aspect and the possible implementations of the second aspect. Specifically, the apparatus may include a unit configured to perform the method according to any one of the second aspect and the possible implementations of the second aspect.

For example, a transceiver unit is configured to receive a PPDU; and a processing unit is configured to parse the received PPDU to obtain a long training field LTF sequence included in the PPDU.

With reference to the third aspect and the fourth aspect, in some implementations, a 2×LTF sequence in an 80 MHz is: a sequence 1 in a specific implementation of the specification; a sequence 5 in a specific implementation of the specification; a sequence 6 in a specific implementation of the specification; or a sequence 7 in a specific implementation of the specification.

With reference to the third aspect and the fourth aspect, in some implementations, a 2×LTF sequence in a 160 MHz is:

a sequence 2 in a specific implementation of the specification; or

2×EHT_LTF_160 M=

{$0_{12}$, LTF2×80 M_part1, LTF2×80 M_part2, LTF2×80 M_part3, LTF2×80 M_part4, LTF2×80 M_part5, $0_{23}$, LTF2×80 M_part1, (−1)*LTF2×80 M_part2, (−1)*LTF2×80 M_part3, (−1)*LTF2×80 M_part4, LTF2×80 M_part5, $0_{11}$}, where LTF2×80 M_part1=LTF2×80 M_1(1:242);

LTF2×80 M_part2=LTF2×80 M_1(243:484);

LTF2×80 M_part3=LTF2×80 M_1(485:517);

LTF2×80 M_part4=LTF2×80 M_1(518:759);

LTF2×80 M_part5=LTF2×80 M_1(760:1001); and

LTF2×80 M_1 a sequence obtained after the 12 leftmost 0s and the 11 rightmost 0s are removed from a sequence 6 in a specific implementation of the specification.

With reference to the third aspect and the fourth aspect, in some implementations, a 2×LTF sequence in a 240 MHz is: a sequence 3 in a specific implementation of the specification.

With reference to the third aspect and the fourth aspect, in some implementations, a 2×LTF sequence in a 320 MHz is:

a sequence 4 in a specific implementation of the specification; or

2×EHT_LTF_320 M=

{$0_{12}$, LTF2×80 M_part1, LTF2×80 M_part2, LTF2×80 M_part3, LTF2×80 M_part4, LTF2×80 M_part5, $0_{23}$, (−1)*LTF2×80 M_part1, LTF2×80 M_part2, LTF2×80 M_part3, LTF2×80 M_part4, (−1)*LTF2×80 M_part5, $0_{23}$, LTF2×80 M_part1. LTF2×80 M_part2. LTF2×80 M_part3, LTF2×80 M_part4, (−1)*LTF2×80 M_part5, $0_{23}$, LTF2×80 M_part1, (−1)*LTF2×80 M_part2, (−1)*LTF2×80 M_part3, (−1)*LTF2×80 M_part4, (−1)*LTF2×80 M_part5, $0_{11}$}, where LTF2×80 M_part1=LTF2×80 M_2(1:242);

LTF2×80 M_part2=LTF2×80 M_2(243:484);

LTF2×80 M_part3=LTF2×80 M_2(485:517);

LTF2×80 M_part4=LTF2×80 M_2(518:759);

LTF2×80 M_part5=LTF2×80 M_2(760:1001); and

LTF2×80 M_2 is a sequence obtained after the 12 leftmost 0s and the 11 rightmost 0s are removed from a sequence 7 in a specific implementation of the specification.

With reference to the third aspect and the fourth aspect, in some implementations, a 4×LTF sequence in an 80 MHz is: a sequence 8 in a specific implementation of the specification.

According to a fifth aspect, an embodiment of this application provides a physical layer protocol data unit transmission apparatus. The apparatus includes a processor and a transceiver that is internally connected to and communicates with the processor. The processor is configured to generate a physical layer protocol data unit PPDU, where the PPDU includes a long training field LTF sequence. The transceiver is configured to send the PPDU.

The physical layer protocol data unit transmission apparatus provided in the fifth aspect is configured to perform the method according to any one of the first aspect and the possible implementations of the first aspect. For specific details, refer to any one of the first aspect and the possible implementations of the first aspect. Details are not described herein again.

According to a sixth aspect, an embodiment of this application provides a physical layer protocol data unit transmission apparatus. The apparatus includes a processor and a transceiver that is internally connected to and communicates with the processor. The transceiver is configured to receive a PPDU. The processor is configured to parse the received PPDU to obtain a long training field LTF sequence included in the PPDU.

The physical layer protocol data unit transmission apparatus provided in the sixth aspect is configured to perform the method according to any one of the second aspect and the possible implementations of the second aspect. For specific details, refer to any one of the second aspect and the possible implementations of the second aspect. Details are not described herein again.

According to a seventh aspect, an embodiment of this application provides a physical layer protocol data unit transmission apparatus. The apparatus includes a processing circuit and an output interface that is internally connected to and communicates with the processing circuit. The processing circuit is configured to generate a physical layer protocol data unit PPDU, and the PPDU includes a long training field LTF sequence. The output interface is configured to send the PPDU.

The physical layer protocol data unit transmission apparatus provided in the seventh aspect is configured to perform the method according to any one of the first aspect and the possible implementations of the first aspect. For specific details, refer to any one of the first aspect and the possible implementations of the first aspect. Details are not described herein again.

According to an eighth aspect, an embodiment of this application provides a physical layer protocol data unit transmission apparatus. The apparatus includes a processing circuit and an input interface that is internally connected to and communicates with the processing circuit. The input interface is configured to receive a PPDU. The processing circuit is configured to parse the received PPDU to obtain a long training field LTF sequence included in the PPDU.

The physical layer protocol data unit transmission apparatus provided in the eighth aspect is configured to perform the method according to any one of the second aspect and the possible implementations of the second aspect. For specific details, refer to any one of the second aspect and the possible implementations of the second aspect. Details are not described herein again.

According to a ninth aspect, an embodiment of this application provides a computer-readable storage medium, configured to store a computer program. The computer program includes instructions used for performing the method according to any one of the first aspect and the possible implementations of the first aspect.

According to a tenth aspect, an embodiment of this application provides a computer-readable storage medium, configured to store a computer program. The computer program includes instructions used for performing the method according to any one of the second aspect and the possible implementations of the second aspect.

According to an eleventh aspect, an embodiment of this application provides a computer program. The computer program includes instructions used for performing the method according to any one of the first aspect and the possible implementations of the first aspect.

According to a twelfth aspect, an embodiment of this application provides a computer program. The computer program includes instructions used for performing the method according to any one of the second aspect and the possible implementations of the second aspect.

DESCRIPTION OF EMBODIMENTS

Figure 1:
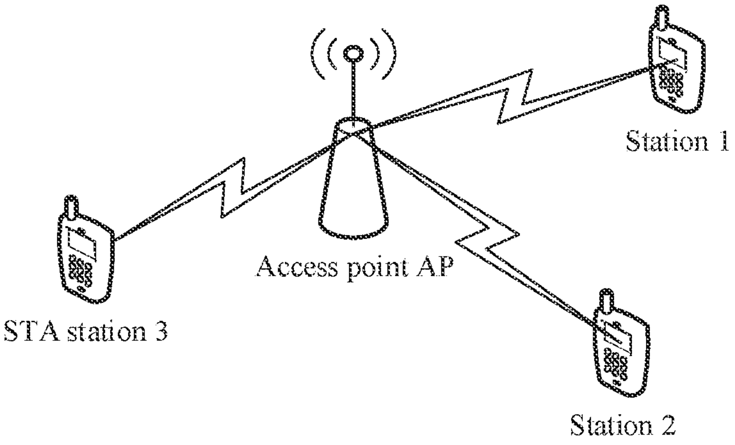
FIG. 1 is a schematic diagram of a communication system applicable to a method according to an embodiment of this application.

The following describes in detail embodiments of this application with reference to the accompanying drawings.

To greatly improve a service transmission rate of a WLAN system, the IEEE 802.11ax standard further uses an orthogonal frequency division multiple access (orthogonal frequency division multiple access, OFDMA) technology based on an existing orthogonal frequency division multiplexing (orthogonal frequency division multiplexing, OFDM) technology. The OFDMA technology is a combination of the OFDM technology and the FDMA technology, and is applicable to multi-user access. The OFDM technology is generally applied to a unidirectional broadcast channel, and most actual communication systems support concurrent communication of a plurality of users. Based on the OFDM technology, the new multiple access technology OFDMA is obtained by allocating one or more groups of subcarriers to each user. The OFDMA divides a physical channel into a plurality of resource units. Each resource unit includes a plurality of subcarriers (subchannels). Each user can occupy one resource unit for transmission. Therefore, the plurality of users may perform concurrent transmission, thereby reducing time overheads and a conflict probability of multi-user contention access. In addition, in the OFDMA technology, because subcarriers overlap each other, spectrum utilization is greatly improved, multipath interference and inter-carrier interference can be effectively resisted, and equalization at a receive end is simple. The OFDMA technology supports simultaneous data transmission and reception by a plurality of nodes, thereby achieving multi-site diversity gains.

In recent years, wireless traffic increases rapidly, and the users have increasingly high requirements on communication service quality, such as low latency and ultra-reliability. As a key technology for carrying wireless traffic services, a wireless local area network is continuously developed and evolved to meet people's increasingly high requirements on wireless transmission. The existing IEEE 802.11ax is already difficult to meet the user requirements in terms of a large throughput, low jitter, and low latency. Therefore, it is urgent to develop a next-generation WLAN technology, such as the IEEE 802.11be standard, the extremely high throughput (extremely high throughput, EHT) standard, or the Wi-Fi 7 standard, to meet the foregoing ultimate performance requirements. The following uses the 802.11be standard as an example for description.

The IEEE 802.11be continues to use an OFDMA transmission manner used in the 802.11ax. The 802.11ax uses a maximum bandwidth of 160 MHz. Different from the 802.11ax, the 802.11be uses ultra-large bandwidths of 240 MHz and 320 MHz, to achieve ultra-high transmission rates and support an ultra-dense user scenario.

It is well known that the OFDM uses a frequency domain equalization technology. Therefore, accuracy of channel estimation greatly affects communication performance. However, an OFDM system has a disadvantage of a high PAPR, especially in a large bandwidth. More subcarriers cause a higher PAPR; and a high PAPR will cause nonlinear distortion of a signal and degrade system performance.

Because the OFDMA technology evolves from the OFDM technology, the OFDMA technology inevitably inherits a feature of the OFDM technology that a PAPR is relatively high. Therefore, in the OFDMA system, a PAPR is still considered as an important factor in LTF sequence design.

A tone plan (tone plan) and pilot locations in the 802.11be standard are different from a tone plan (tone plan) and pilot locations in the 802.11ax standard. If an 80 MHz LTF in the 802.11ax is directly applied to the 802.11be standard, PAPR values of the LTF sequence on some resource units are relatively high, and PAPR values of the LTF sequence on some resource units are already greater than an average value of PAPRs of a data (Data) part. On the other hand, because a combined RU is introduced in the 802.11be, even if PAPR values of some sequences in a single RU are relatively low, PAPR values of the some sequences in the combined RU may be relatively high. It may be understood that the combined RU means allocating a combination of a plurality of RUs to one STA. A location of each RU includes a data subcarrier location and a pilot subcarrier location of the RU. Therefore, to make channel estimation more accurate, in the IEEE 802.11be, a channel estimation sequence LTF with a low PAPR needs to be redesigned.

In view of this, embodiments of this application provide an LTF sequence design method and a physical layer protocol data unit PPDU transmission method. In the LTF sequence in embodiments of this application, PAPR values of a plurality of LTF sequences in a multi-stream scenario, in a single RU, in a combined RU, and in an entire bandwidth are considered.

It should be noted that both multiple streams herein and multiple streams mentioned below are generated due to phase rotation caused by a matrix P.

The following briefly describes a system architecture of a PPDU transmission method provided in embodiments of this application. It may be understood that the system architecture described in embodiments of this application is intended to describe the technical solutions in embodiments of this application more clearly, and do not constitute any limitation on the technical solutions provided in embodiments of this application.

The technical solutions of embodiments of this application may be applied to various communication systems, such as a wireless local area network (wireless local area network, WLAN) communication system, a global system for mobile communication (global system for mobile communication, GSM) system, a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, LTE time division duplex (time division duplex, TDD), a universal mobile telecommunication system (universal mobile telecommunication system, UMTS), a worldwide interoperability for microwave access (worldwide interoperability for microwave access, WiMAX) communication system, a $6^{th}$ generation ($6^{th}$ generation, 6G) system in the future, or new radio (new radio, NR).

As an example for description, the following describes an application scenario of embodiments of this application and the method in embodiments of this application by using only the wireless local area network (wireless local area network, WLAN) system as an example.

Specifically, embodiments of this application may be applied to the wireless local area network WLAN, and embodiments of this application may be applied to any protocol in the Institute of Electrical and Electronics Engineers (institute of electrical and electronics engineers, IEEE) 802.11 series protocols currently used by the WLAN. The WLAN may include one or more basic service sets (basic service set, BSS), and network nodes in the basic service set include an access point (access point, AP) and a station (station, STA).

For ease of understanding embodiments of this application, a communication system shown in FIG. 1 is first used as an example to describe in detail a communication system applicable to embodiments of this application. A scenario system shown in FIG. 1 may be a WLAN system. The WLAN system in FIG. 1 may include one or more APs and one or more STAs. In FIG. 1, one AP and three STAs are used as examples. Wireless communication may be performed between the AP and the STA according to various standards. For example, wireless communication may be performed between the AP and the STA by using a single-user multiple-input multiple-output (single-user multiple-input multiple-output, SU-MIMO) technology or a multi-user multiple-input multiple-output (multi-user multiple-input multiple-output, MU-MIMO) technology.

Optionally, FIG. 1 is merely a schematic diagram. In addition to being applied to a scenario in which an AP communicates with one or more STAs, the PPDU transmission method provided in embodiments of this application may be further applied to a scenario in which an AP communicates with another AP, and is also applied to a scenario in which a STA communicates with another STA.

The PPDU transmission method in this application may be implemented by a communication device in a wireless communication system, or a chip or a processor in a communication device. The communication device may be an access point (access point, AP) device or a station (station, STA) device. Alternatively, the communication device may be a wireless communication device that supports concurrent transmission of a plurality of links. For example, the communication device may be referred to as a multi-link device or a multi-band device (multi-band device). Compared with a communication device that supports only single-link transmission, the multi-link device has higher transmission efficiency and a larger throughput rate.

The access point (AP) is an apparatus having a wireless communication function, supports communication according to a WLAN protocol, and has a function of communicating with another device (for example, a station or another access point) in a WLAN network. Certainly, the access point may further have a function of communicating with another device. In the WLAN system, the access point may be referred to as an access point station (AP STA). The apparatus having a wireless communication function may be an entire device, or may be a chip or a processing system installed in an entire device. A device in which the chip or the processing system is installed may implement the method and the function in embodiments of this application under control of the chip or the processing system. The AP in embodiments of this application is an apparatus that provides a service for a STA, and may support the 802.11 series protocols. For example, the AP may be a communication entity, for example, a communication server, a router, a switch, or a bridge. The AP may include a macro base station, a micro base station, a relay station, and the like in various forms. Certainly, the AP may alternatively be a chip or a processing system in these devices in various forms, to implement the method and the function in embodiments of this application. The AP is also referred to as a wireless access point, a hotspot, a bridge chip, or the like. The AP can connect to a server or a wireless network. The AP is an access point for a mobile user to access a wired network, and is mainly deployed in a home, a building, and a campus, or is deployed outdoors. The AP is equivalent to a bridge that connects the wired network and a wireless network. A main function of the AP is to connect wireless network clients together, and then connect the wireless network to the Ethernet. Specifically, the AP may be a terminal device or a network device with a wireless fidelity (wireless fidelity, Wi-Fi) chip. Optionally, the AP may be a device that supports a plurality of WLAN standards such as the 802.11.

Figure 2A:
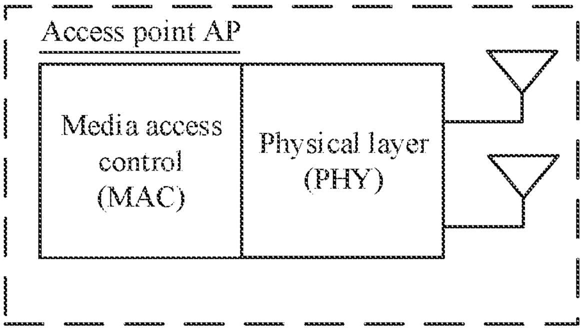
FIG. 2*a* is a diagram of an internal structure of an access point applicable to an embodiment of this application.

FIG. 2*a* is a diagram of an internal structure of an AP product. The AP may have a plurality of antennas, or may have a single antenna. As shown in FIG. 2*a*, the AP includes a physical layer (physical layer, PHY) processing circuit and a media access control (media access control, MAC) processing circuit. The physical layer processing circuit may be configured to process a physical layer signal, and the MAC layer processing circuit may be configured to process a MAC layer signal.

A station (for example, the STA in FIG. 1) is an apparatus having a wireless communication function, supports communication according to a WLAN protocol, and has a capability of communicating with another station or an access point in a WLAN network. In a WLAN system, the station may be referred to as a non-access point station (non-access point station, non-AP STA). For example, the STA is any user communication device that allows a user to communicate with an AP and further communicate with a WLAN. The apparatus having a wireless communication function may be an entire device, or may be a chip or a processing system installed in an entire device. A device in which the chip or the processing system is installed may implement the method and the function in embodiments of this application under control of the chip or the processing system. For example, the STA may be user equipment that can connect to the Internet, for example, a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), or a mobile phone. Alternatively, the STA may be an Internet of things node in the Internet of things, an in-vehicle communication apparatus in the Internet of vehicles, an entertainment device, a game device or system, a global positioning system device, or the like. The STA may alternatively be a chip and a processing system in the foregoing terminals. The station may also be referred to as a system, a subscriber unit, an access terminal, a mobile station, a remote station, a remote terminal, a mobile device, a user terminal, a terminal, a wireless communication device, a user agent, a user apparatus, or user equipment (user equipment, UE). The STA may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless local area network (for example, Wi-Fi) communication function, a wearable device, a computing device, or another processing device connected to a wireless modem.

Figure 2B:
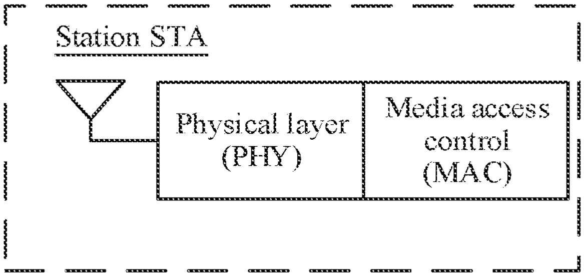
FIG. 2*b* is a diagram of an internal structure of a station applicable to an embodiment of this application.
Figure 3:
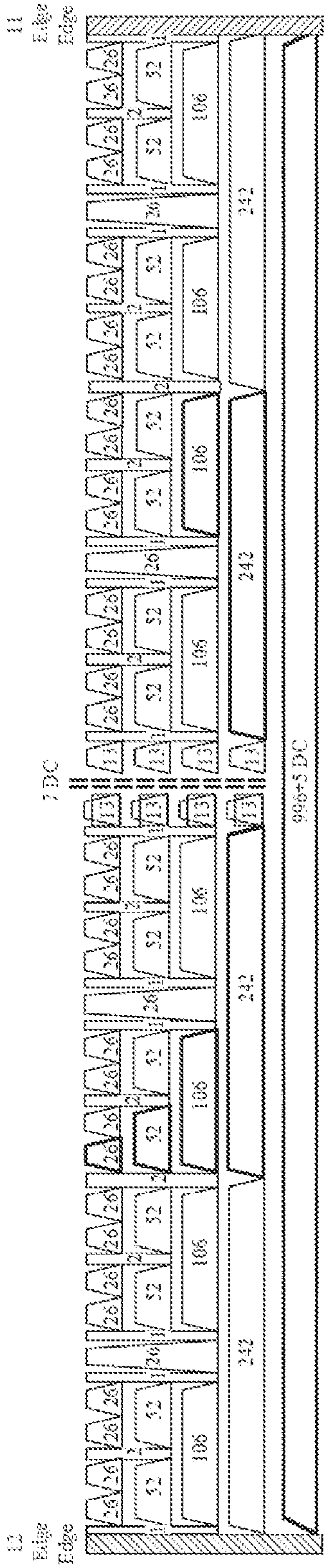
FIG. 3 is a schematic diagram of an 80 MHz tone plan (tone plan) in the 802.11ax applicable to an embodiment of this application.

FIG. 2*b* is a diagram of a structure of a STA with a single antenna. In an actual scenario, the STA may also have a plurality of antennas, and may be a device with more than two antennas. In FIG. 3, the STA may include a physical layer (physical layer, PHY) processing circuit and a media access control (media access control, MAC) processing circuit. The physical layer processing circuit may be configured to process a physical layer signal, and the MAC layer processing circuit may be configured to process a MAC layer signal.

The foregoing content briefly describes the system architecture in embodiments of this application. For ease of understanding embodiments of this application, the following first briefly describes several nouns or terms in this application.

(1) Subcarrier

Bandwidths of wireless communication signals are limited. A bandwidth may be divided, based on the OFDM technology, into a plurality of frequency components within a channel bandwidth at a specific frequency spacing. These components are referred to as subcarriers. Subscripts of subcarriers are consecutive integers. A subcarrier whose subscript is 0 corresponds to a direct current component, a subcarrier whose subscript is a negative number corresponds to a frequency component lower than the direct current component, and a subcarrier whose subscript is a positive number corresponds to a frequency component higher than the direct current component.

(2) 802.11Ax Tone Plan (Tone Plan)/Resource Unit Distribution

The resource unit distribution may also be understood as distribution of subcarriers carrying data, and different channel bandwidths may correspond to different tone plans. When the OFDMA technology and the multi-user multiple-input multiple-output (multiple-user multiple-input multiple-output, MU-MIMO) technology are applied, an AP divides a spectrum bandwidth into several resource units (resource unit, RU). The IEEE 802.11ax protocol stipulates that spectrum bandwidths of 20 MHz, 40 MHz, 80 MHz, and 160 MHz are divided into a plurality of types of resource units. FIG. 3 is a schematic diagram of an 80 MHz tone plan (tone plan) in the 802.11ax according to an embodiment of this application. The 80 MHz bandwidth includes 36 resource units (resource unit, RU) 26, or includes 16 RU52, or includes eight RU106, or includes four RU242, or includes two RU484, or includes one RU996 and five direct current subcarriers. There is no gap between the first RU242 and the second RU242. There are seven direct current subcarriers/null subcarriers between the second RU242 and the third RU242. There is also no gap between the third RU242 and the fourth RU242. It should be noted that different total bandwidths can support different types and quantities of RUs. However, in a same bandwidth, hybrid-type resource units may be supported.

(3) 802.11 be Tone Plan (Tone Plan)/Resource Unit Distribution

To meet users' requirements for an ultra-large bandwidth, an ultra-high transmission rate, and an extremely high throughput, the 802.11be expands a bandwidth from 160 MHz to 240 MHz and 320 MHz. 240 MHz may be obtained by directly combining subcarriers of three 802.11be 80 MHz; and 320 MHz may be obtained by directly combining subcarriers of four 802.11 be 80 MHz.

Figure 4:
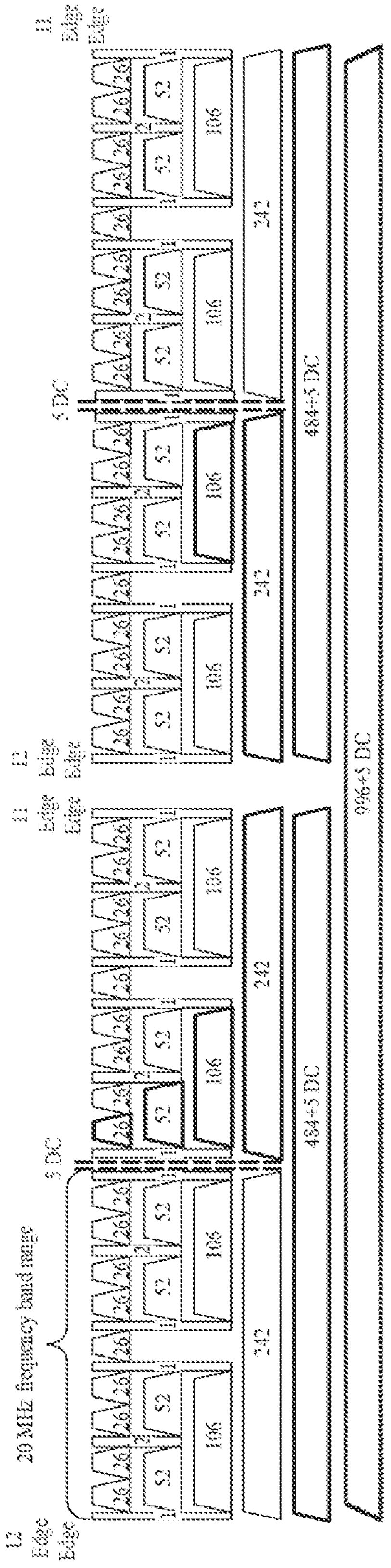
FIG. 4 is a schematic diagram of an 80 MHz tone plan (tone plan) in the 802.11be applicable to an embodiment of this application.

FIG. 4 is a schematic diagram of an 80 MHz tone plan (tone plan) in the 802.11be according to an embodiment of this application. An 80 MHz bandwidth in the 802.11be includes 36 RU26, or includes 16 RU52, or includes eight RU106, or includes four RU242, or includes two RU484 and five direct current subcarriers/null subcarriers (in other words, includes two RU489, where each RU489 includes one RU484 and five direct current subcarriers/null subcarriers), or includes one RU996 and five direct current subcarriers. There are five direct current subcarriers between the first RU242 and the second RU242, and there are also five direct current subcarriers between the third RU242 and the fourth RU242.

(a) In 80 MHz subcarrier design in FIG. 4, indices of data subcarriers and pilot subcarriers of an RU26 are shown in the following Table 1.

TABLE 1

Indices of data subcarriers and pilot subcarriers of an RU26

| | Locations of a 1st RU26 to an 18th RU26 | Locations of a 19th RU26 to a 36th RU26 | Pilot location |
|---|---|---|---|
| 26-tone RU | [−499 −474] | [13 38] | {−494, −480}, {−468, −454}, |
| | [−473 −448] | [39 64] | {−440, −426}, {−414, −400}, |
| | [−445 −420] | [67 92] | {−386, −372}, {−360, −346}, |
| | [−419 −394] | [93 118] | {−334, −320}, {−306, −292}, |
| | [−392 −367] | [120 145] | {−280, −266}, {−246, −232}, |
| | [−365 −340] | [147 172] | {−220, −206}, {−192, −178}, |
| | [−339 −314] | [173 198] | {−166, −152}, {−140, −126}, |
| | [−311 −286] | [201 226] | {−112, −98}, {−86, −72}, |
| | [−285 −260] | [227 252] | {−58,−44}, {−32,−18}, |
| | [−252 −227] | [260 285] | {18, 32}, {44, 58}, |
| | [−226 −201] | [286 311] | {72, 86}, {98, 112}, |
| | [−198 −173] | [314 339] | {126, 140}, {152, 166}, |
| | [−172 −147] | [340 365] | {178, 192}, {206, 220}, |
| | [−145 −120] | [367 392] | {232, 246}, 5 DC, |
| | [−118 −93] | [394 419] | {266, 280}, {292, 306}, |
| | [−92 −67] | [420 445] | {320, 334}, {346, 360}, |
| | [−64 −39] | [448 473] | {372, 386}, {400, 414}, |
| | [−38 −13] | [474 499] | {426, 440}, {454, 468}, |
| | | | {480, 494} |

It may be understood that an RU26 may be a resource unit including 26 subcarriers. It may be further understood that the 26 subcarriers may be consecutive or inconsecutive. Similarly, an RU52 may be a resource unit including 52 subcarriers, an RU106 may be a resource unit including 106 subcarriers, an RU242 may be a resource unit including 242 subcarriers, and the like.

Pilot distribution of the tone plan shown in FIG. 3 is also different from that of the tone plan shown in FIG. 4. Subsequently, Table 1 to Table 6 describe pilot distribution of the tone plan shown in FIG. 4. For pilot distribution of the tone plan shown in FIG. 3, refer to the conventional technology. Details are not described again.

In an OFDMA system, a multi-user data packet is a combination of RUs of a plurality of sizes. An RU may be allocated to each user. Optional RUs that may be allocated to the user are as follows:

(1) an RU including 26 consecutive subcarriers: 24 data subcarriers and two pilot (pilot) subcarriers;

(2) an RU including 52 consecutive subcarriers: 48 data subcarriers and four pilot (pilot) subcarriers;

(3) an RU including 106 consecutive subcarriers: 102 data subcarriers and four pilot (pilot) subcarriers;

(4) an RU including 242 consecutive subcarriers: 234 data subcarriers and eight pilot (pilot) subcarriers;

(5) an RU including 484 consecutive subcarriers: 468 data subcarriers and 16 pilot (pilot) subcarriers; and (6) an RU including 996 consecutive subcarriers: 980 data subcarriers and 16 pilot (pilot) subcarriers.

A 484-tone RU is used in multi-user transmission of 40 MHz, and a 996-tone RU is used in multi-user transmission of 80 MHz or 160 MHz. It should be understood that a 160 MHz tone plan may be considered as including two 80 MHz tone plans, a 240 MHz tone plan may be considered as including three 80 MHz tone plans, and a 320 MHz tone plan may be considered as including four 80 MHz tone plans. Details are not described herein again.

The following separately describes locations of different RUs and locations of pilots in each RU in the 80 MHz bandwidth of the 802.11be.

Each row in a second column and a third column in Table 1 indicates one RU26. For example, a last row in the second column indicates the 18th RU26 [−38 −13], and locations of the 18th RU26 are subcarriers numbered −38 to −13. For another example, a fifth row in the third column indicates a 23rd RU26 [120 145], and locations of the 23rd RU26 are subcarriers numbered 120 to 145. A fourth column in Table 1 sequentially indicates pilot subcarrier indices for corresponding 26-tone RUs. For example, the 1st 26-tone RU includes subcarriers numbered −499 to −474, where pilot subcarriers are a subcarrier numbered −494 and a subcarrier numbered −480. For another example, a 2nd 26-tone RU includes subcarriers numbered −473 to −448, where pilot subcarriers are a subcarrier numbered −468 and a subcarrier numbered −454. For still another example, the 36th 26-tone RU includes subcarriers numbered 474 to 499, where pilot subcarriers are a subcarrier numbered 480 and a subcarrier numbered 494. It may be understood that a 26-tone RU and an RU26 may be used interchangeably.

(b) In the 80 MHz subcarrier design in FIG. 4, indices of data subcarriers and pilot subcarriers of an RU52 are shown in the following Table 2. One RU52 includes 48 data subcarriers and four pilot subcarriers.

TABLE 2

Indices of data subcarriers and pilot subcarriers of an RU52

| | Locations of a 1st RU52 to a 16th RU52 | Pilot location |
|---|---|---|
| 52-tone RU | [−499 −448] | {494, −480, −468, −454}, |
| | [−445 −394] | {−440, −426, −414, −400}, |
| | [−365 −314] | {−360, −346, −334, −320}, |
| | [−311 −260] | {−306, −292, −280, −266}, |
| | [−252 −201] | {−246, −232, −220, −206}, |
| | [−198 −147] | {−192, −178, −166, −152}, |
| | [−118 −67] | {−112, −98, −86, −72}, |
| | [−64 −13] | {−58, −44, −32, −18}, |
| | [13 64] | {18, 32, 44, 58}, |
| | [67 118] | {72, 86, 98, 112}, |
| | [147 198] | {152, 166, 178, 192}, |

TABLE 2-continued

| Indices of data subcarriers and pilot subcarriers of an RU52 | |
|---|---|
| Locations of a 1st RU52 to a 16th RU52 | Pilot location |
| [201 252] | {206, 220, 232, 246}, |
| [260 311] | {266, 280, 292, 306}, |
| [314 365] | {320, 334, 346, 360}, |
| [394 445] | {400, 414, 426, 440}, |
| [448 499] | {454, 468, 480, 494}, |

Each row in a second column in Table 2 indicates one RU. For example, a first row in the second column indicates the 1st RU52 [−38 −13], and locations of the 1st RU52 are subcarriers numbered −499 to −448. A third column in Table 2 sequentially indicates pilot subcarrier indices for corresponding 52-tone RUs. For example, a 2nd 52-tone RU includes subcarriers numbered −445 to −394, where pilot subcarriers are subcarriers numbered −440, −426, −414, and −400). It may be understood that a 52-tone RU and an RU52 may be used interchangeably.

It should be understood that, the following table describes same meanings, which are not repeated below.

(c) In the 80 MHz subcarrier design in FIG. 4, indices of data subcarriers and pilot subcarriers of an RU106 are shown in the following Table 3. One RU106 includes 102 data subcarriers and four pilot subcarriers. It may be understood that a 106-tone RU and an RU106 may be used interchangeably.

TABLE 3

| Indices of data subcarriers and pilot subcarriers of an RU106 | | |
|---|---|---|
| | Locations of a 1st RU106 to an 8th RU106 | Pilot location |
| 106-tone RU | [−499 −394] | {−494 −468, −426, −400}, |
| | [−365 −260] | {−360, −334, −292, −266}, |
| | [−252 −147] | {−246, −220, −178, −152}, |
| | [−118 −13] | {−112, −86, −44, −18}, |
| | [13 118] | {18, 44, 86, 112}, |
| | [147 252] | {152, 178, 220, 246}, |
| | [260 365] | {266, 292, 334, 360}, |
| | [394 499] | {400, 426, 468, 494} |

(d) In the 80 MHz subcarrier design in FIG. 4, indices of data subcarriers and pilot subcarriers of an RU242 are shown in the following Table 4. One RU242 includes 234 data subcarriers and eight pilot subcarriers. It may be understood that a 242-tone RU and an RU242 may be used interchangeably.

TABLE 4

| Indices of data subcarriers and pilot subcarriers of an RU242 | | |
|---|---|---|
| | Locations of a 1st RU242 to a 4th RU242 | Pilot location |
| 242-tone RU | [−500 −259] | (−494, −468, −426, −400, −360, −334, −292, −266}, |
| | [−253 −12] | {−246, −220, −178, −152, −112, −86, −44, −18}, |
| | [12 253] | {18, 44, 86, 112, 152, 178, 220, 246}, |
| | [259 500] | {266, 292, 334, 360, 400, 426, 468, 494} |

(e) In the 80 MHz subcarrier design in FIG. 4, indices of data subcarriers and pilot subcarriers of an RU484 are shown in the following Table 5. A 484-tone RU and an RU484 may be used interchangeably. It may be understood that an 80 MHz 484-tone RU in the 802.11ax is an RU composed of 484 consecutive subcarriers. An 80 MHz 484-tone RU in the 802.11be is composed of 468 data subcarriers and 16 pilot subcarriers, and there are 5 direct current subcarriers or null subcarriers in the middle. For example, in a 1st 484-tone RU, subcarriers are numbered from −500 to −12. The 5 direct current subcarriers are numbered −258, −257, −256, −255, and −254. The 16 pilot subcarriers are numbered −494, −468, −426, −400, −360, −334, −292, −266, −246, −220, −178, −152, −112, −86, −44, and −18.

TABLE 5

| Indices of data subcarriers and pilot subcarriers of an RU484 | |
|---|---|
| Locations of a 1st RU484 and a 2nd RU484 | Pilot location |
| [−500 −259 −253 −12] | {−494, −468, −426, −400, 360, −334, −292, −266, −246, −220, −178, −152, −112, −86, −44, −18}, |
| [12 253 259 500] | {18, 44, 86, 112, 152, 178, 220, 246, 266, 292, 334, 360, 400, 426, 468, 494} |

(f) In the 80 MHz subcarrier design in FIG. 4, indices of data subcarriers and pilot subcarriers of an RU996 are shown in the following Table 6. A 996-tone RU and an RU996 can be used interchangeably. An 80 MHz 996-tone RU in the 802.11 be is composed of 980 data subcarriers and 16 pilot subcarriers, and there are 5 direct current subcarriers in the middle. For example, in a 1st 996-tone RU, subcarriers are numbered −500 to 500, and the 5 direct current subcarriers are numbered −2, −1, 0, 1, and 2. The 16 pilot subcarriers are numbered −468, −400, −334, −266, −220, −152, −86, −18, +18, +86, +152, +220, +266, +334, +400, and +468.

TABLE 6

| Indices of data subcarriers and pilot subcarriers of an RU996 | | |
|---|---|---|
| | Location of an RU996 | Pilot location |
| 996-tone RU | [−500 −3 3 500] | {−468, −400, −334, −266, −220, −152, −86, −18, +18, +86, +152, +220, +266, +334, +400, +468} |

Optionally, an LTF sequence included in a PPDU provided in embodiments of this application is used in a 240 MHz bandwidth and a 320 MHz bandwidth. The 240 MHz bandwidth and the 320 MHz bandwidth may be constructed by using the 80 MHz tone plan shown in FIG. 4. Subcarrier design of the 160 MHz bandwidth is based on two 80 MHz, where 80 MHz [RU subcarrier indices and pilot location subcarrier indices] −521:80 MHz [RU subcarrier indices and pilot location subcarrier indices] +521. Similarly, subcarrier design of the 240 MHz bandwidth is based on three 80 MHz. Subcarrier design of the 320 MHz bandwidth is based on two 160 MHz, where [pilot indices in 160 MHz/160 MHz pilot indices]−1024: [pilot indices in 160 MHz/160 MHz pilot indices] +1024.

(4) Peak-to-Average Power Ratio

An amplitude of a radio signal changes continuously in time domain. Therefore, a transmit power of the radio signal is not constant. The peak-to-average power ratio (peak-to-average power ratio, PAPR) is referred to a PAPR for short. The peak-to-average power ratio may be a ratio, in a symbol, of an instantaneous power peak value of continuous signals to an average value of signal power. The peak-to-average power ratio may be represented by using the following formula:

$$PAPR = 10 \cdot \log_{10}\left(\frac{\max(X_i^2)}{\text{mean}(X_i^2)}\right).$$

Xi indicates time domain discrete values of a group of sequences, max(Xi2) indicates the largest value of squares of the time domain discrete values, and mean(Xi2) indicates an average value of the squares of the time domain discrete values.

An OFDM symbol is formed by superposing a plurality of independently modulated subcarrier signals. Therefore, when phases of subcarriers are the same or similar, the superposed signals are modulated by signals with a same initial phase, to generate a large instantaneous power peak value. As a result, a high PAPR is generated. The OFDM system has a disadvantage of a high PAPR especially in a large bandwidth, and more subcarriers cause a higher PAPR. Because a common power amplifier has a limited dynamic range, MIMO-OFDM signals with a large peak-to-average ratio are likely to enter a non-linear area of the power amplifier. A high PAPR causes non-linear distortion of the signals, obvious spectrum spreading interference and in-band signal distortion, and deterioration of entire system performance. Therefore, when a sequence is designed, a smaller PAPR of the sequence is better.

(5) 4×, 2×, and 1× Modes of a Long Training Sequence

Figure 5:
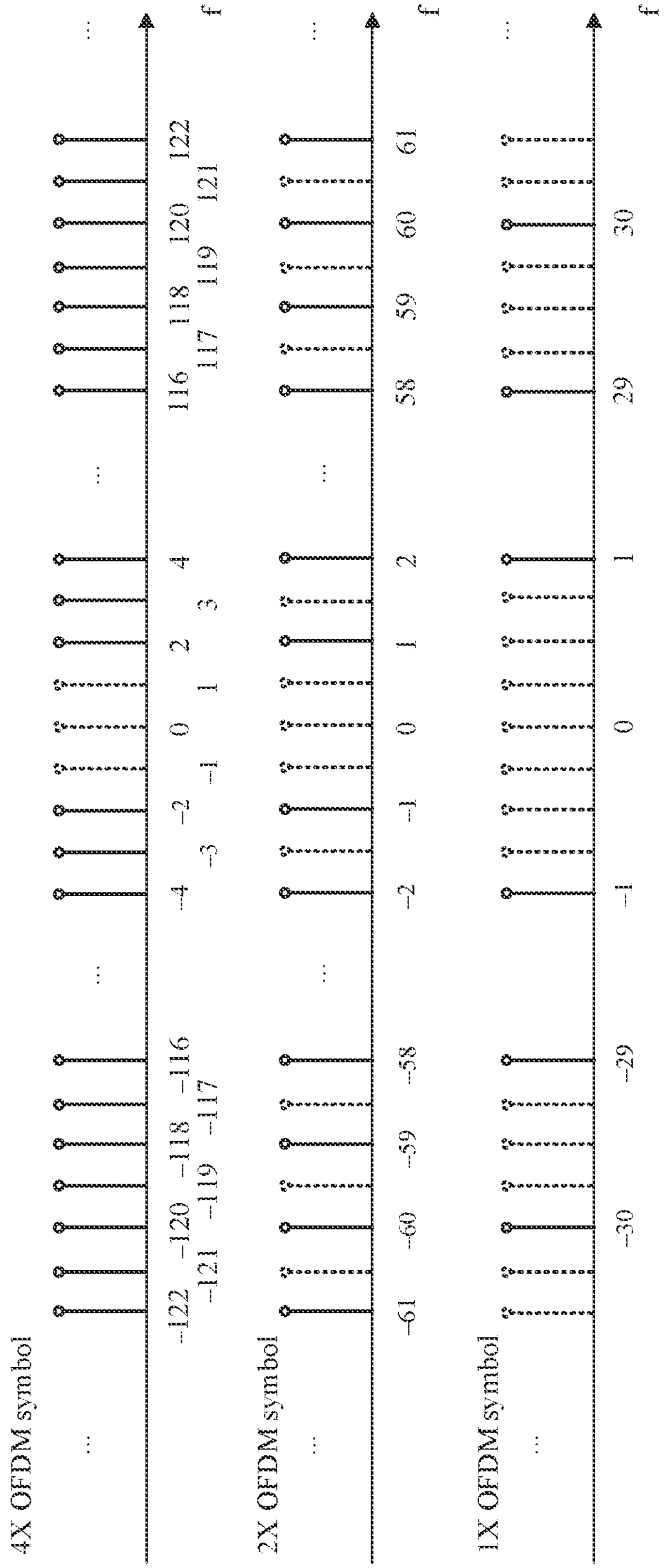
FIG. 5 is a schematic diagram of sequences of 1×, 2×, and 4× modes applicable to an embodiment of this application.

To further improve system efficiency in different scenarios, the LTF field needs to support the 4×, 2×, and 1× modes. FIG. 5 is a schematic diagram of 4×, 2×, and 1× modes applicable to an embodiment of this application. A 20 MHz bandwidth is used as an example. When subcarrier locations are marked as −128, −127, . . . , −2, −1, 0, 1, 2, . . . and 127, subcarriers in an HE-LTF element in a 4× mode that carry a long training sequence are located in −122, −121, . . . , −3, −2, 2, 3, . . . , 121, and 122, remaining subcarriers are null subcarriers, and a subcarrier spacing is $\Delta_F^{4\times}$=20 MHz/256=78.125 kHz. Subcarriers in an HE-LTF element in a 2× mode that carry a long training sequence are located in −122, −120, . . . , −4, −2, 2, 4, . . . , 120, and 122, and remaining subcarriers are null subcarriers. Equivalently, subcarrier locations may be marked as −64, −6, . . . , −2, −1, 0, 1, 2, . . . , and 63. In this case, the subcarriers in the HE-LTF element in the 2× mode that carry a long training sequence are located in −61, −60, . . . , −2, −1, 1, 2, . . . 60, and 61, remaining subcarriers are null subcarriers, and a subcarrier spacing is $\Delta_F^{2\times}$=20 MHz/128=156.25 kHz. Similarly, subcarriers in an HE-LTF element in a 1× mode that carry a long training sequence are located in −120. −116, . . . , −8, −4, 4, 8, . . . , 116, and 120, and remaining subcarriers are null subcarriers. Equivalently, subcarrier locations may be marked as −32, −31, . . . , −2, −1, 0, 1, 2, . . . , and 31. In this case, the subcarriers in the HE-LTF element in the 1× mode that carry a long training sequence are located in −30, −29, . . . , −2, −1, 1, 2, . . . , 29, and 30, remaining subcarriers are null subcarriers, and a subcarrier spacing is $\Delta_F^{1\times}$=20 MHz/64=312.5 kHz.

That is, four adjacent elements in the sequence form a group. If only one element in the group is not 0, the 1× mode is used. If two elements in the group are not 0, the 2× mode is used. If none of the four elements in the group is 0, the 4× mode is used.

(6) Generative Adversarial Network (Generative Adversarial Network, GAN)

Figure 6:
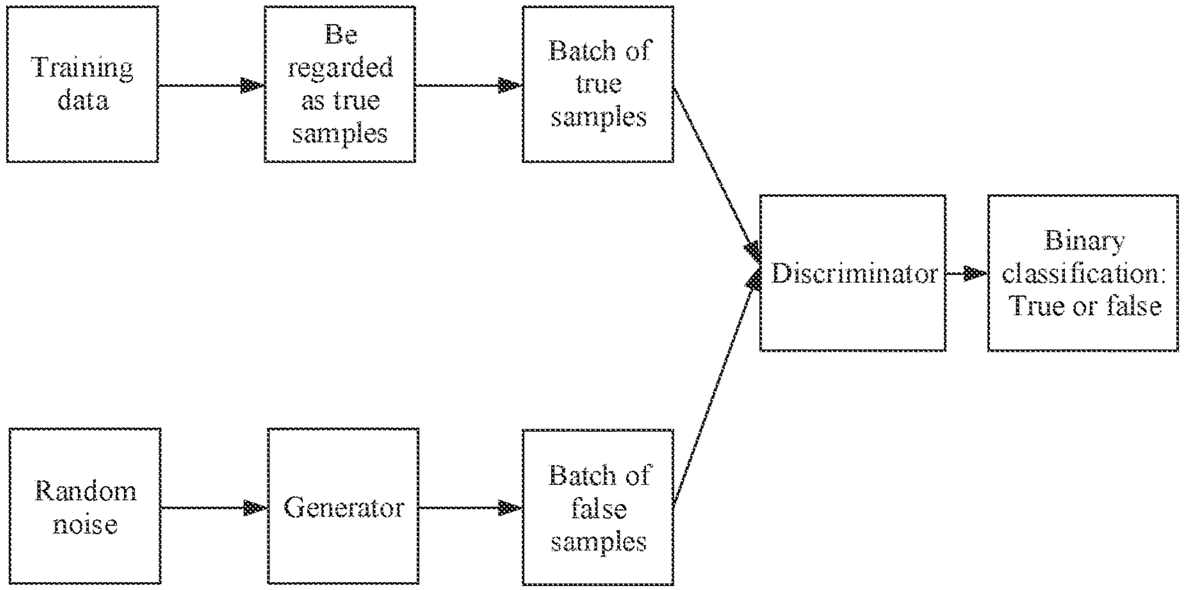
FIG. 6 is a schematic diagram of a generative adversarial network GAN applicable to an embodiment of this application.

As shown in FIG. 6, the GAN includes a generator (Generator, G) and a discriminator (Discriminator, D), and the generator and the discriminator are against each other.

The generator obtains data distribution of true samples, generates new samples, and generates new samples close to true samples as much as possible, to deceive the discriminator. Input of the generator is random noise z with uniform or Gaussian distribution, and an input data dimension is (batch_size, dim_noise).

The discriminator is usually a two-class classifier. There are two types of input data. One type of input is output data (false samples) of the generator, and the other type of input is training set data (true samples). The training set data is generated according to an algorithm. The discriminator is used to determine whether a sample generated by the generator is a false sample or a true sample.

It may be understood that, in a training process, the discriminator D receives true sample data and false sample data that is generated by the generator G, and a task of the discriminator is to determine whether data generated by the generator is true sample data or false sample data. For a final output result, parameters of the two parties are optimized at the same time. If the discriminator D determines correctly, the parameters of the generator G need to be adjusted, so that the generated false sample data is more true. If the discriminator D determines incorrectly, the parameters of the discriminator D need to be adjusted, to avoid a similar determining error next time. Training continues until the two parties enter a state of equilibrium and harmony.

A product obtained through training is an automatic generator with high quality and a discriminator with a strong determining ability. The former can be used for machine creation (for example, automatically drawing of "a cat" and "a dog"), and the latter can be used for machine classification (for example, automatically determining of "a cat" and "a dog").

Figure 7:
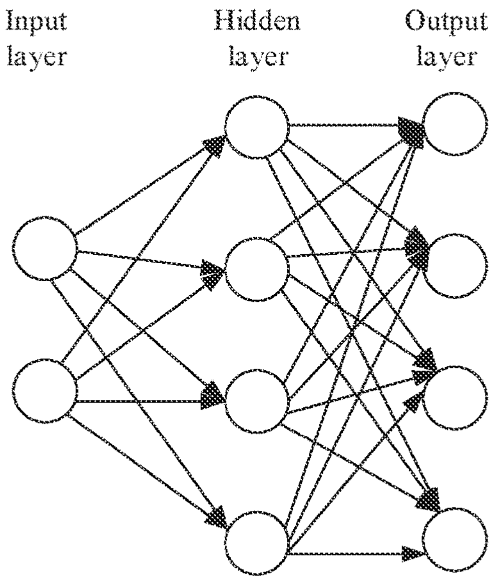
FIG. 7 is a schematic diagram of a DNN applicable to an embodiment of this application.

As shown in FIG. 7, both the generator network and the discriminator network may use a three-layer deep neural network (DNN), and the deep neural network specifically includes an input layer, a hidden layer, and an output layer. A quantity of neurons at each layer of the generator network is adjustable. For example, quantities of neuron data may be dim_noise, dim_hidden, and n_data, where batch_size, dim_noise, and dim_hidden are all adjustable parameters, and n_data is related to a bandwidth and an upsampling multiple. When a frequency is 80 MHz, n_data=496. The output layer uses an activation function tanh, and the other layers use an activation function ReLU. A quantity of neurons at each layer of the discriminator network is n_data, dim_hidden, and 1. The output layer uses an activation function sigmoid, and the other layers use the activation function ReLU.

(7) When a Wi-Fi signal is sent by using a single-stream pilot mode, a pilot subcarrier and a data subcarrier that are on each LTF symbol of an LTF field corresponding to the Wi-Fi signal are multiplied by different values, thereby changing a structure of an original LTF sequence. As a result, when some coefficients are multiplied, a PAPR value of a signal of the LTF field may be relatively high.

In the OFDM technology, a plurality of LTF fields are used to help a station estimate channels of a plurality of spatial streams (spatial stream). To accurately estimate the channels of the spatial streams and keep LTFs of the streams orthogonal, it is proposed in a Wi-Fi standard that elements of a matrix P are multiplied by the LTFs. Specifically, a data subcarrier of an $n^{th}$ LTF symbol sent by a $m^{th}$ spatial stream is multiplied by an element in a $m^{th}$ row and an $n^{th}$ column of the matrix P, and a pilot subcarrier is multiplied by an element in a $m^{th}$ row and an $n^{th}$ column of a matrix R. Each row of the matrix R is equal to the first row of the matrix P. When a data subcarrier and a pilot subcarrier are multiplied by a same value, a PAPR of an obtained new sequence does not change. When the data subcarrier and the pilot subcarrier are multiplied by different values, the PAPR of the obtained new sequence may change.

A size of the matrix P is 2×2, 4×4, 6×6, 8×8, 10×10, 12×12, 14×14, 16×16, and so on. For example, when four LTFs need to be sent in one spatial stream, orthogonality may be implemented by using a matrix P with a size of 4×4.

For example, the matrix P mainly includes the following types:

$$P_{4\times4}=\begin{bmatrix}1 & -1 & 1 & 1\\ 1 & 1 & -1 & 1\\ 1 & 1 & 1 & -1\\ -1 & 1 & 1 & 1\end{bmatrix}$$

$$P_{8\times8}=\begin{bmatrix}P_{4\times4} & P_{4\times4}\\ P_{4\times4} & -P_{4\times4}\end{bmatrix}$$

$$P_{6\times6}=\begin{bmatrix}w^{0*0} & -w^{0*1} & w^{0*2} & w^{0*3} & w^{0*4} & -w^{0*5}\\ w^{1*0} & -w^{1*1} & w^{1*2} & w^{1*3} & w^{1*4} & -w^{1*5}\\ w^{2*0} & -w^{2*1} & w^{2*2} & w^{2*3} & w^{2*4} & -w^{2*5}\\ w^{3*0} & -w^{3*1} & w^{3*2} & w^{3*3} & w^{3*4} & -w^{3*5}\\ w^{4*0} & -w^{4*1} & w^{4*2} & w^{4*3} & w^{4*4} & -w^{4*5}\\ w^{5*0} & -w^{5*1} & w^{5*2} & w^{5*3} & w^{5*4} & -w^{5*5}\end{bmatrix}\quad w=\exp(-j2\pi/6)$$

Elements in matrices P of different sizes are different, and may represent different rotated phases. For example, elements of matrices P with sizes of 4×4, 8×8, and 16×16 are all 1 and −1, and correspond to a same rotated phase, for example, a pilot location x 1 and a non-pilot location x 1; or a pilot location x 1 and a non-pilot location x−1; or a pilot location x−1 and a non-pilot location x 1; or a pilot location x−1 and a non-pilot location x−1. When the pilot location and the non-pilot location are multiplied by a same value, a PAPR of a sequence obtained after phase rotation does not change in a single RU, in a combined RU, or in an entire bandwidth relative to a PAPR of a previous sequence. When the pilot location and the non-pilot location are multiplied by different values, the PAPR of the sequence obtained after phase rotation changes in the single RU, in the combined RU, and in the entire bandwidth relative to the PAPR of the previous sequence. Generally, four sequences with different PAPRs may be obtained after phase rotation is performed on a sequence.

Phase rotation is considered for the LTF sequence in this application, and PAPRs of an obtained rotated sequence in a single RU, in a combined RU, and in an entire bandwidth are relatively low. Therefore, PAPRs of sequences in a multi-stream (namely, spatial streams) scenario are relatively low.

The foregoing describes content related to embodiments of this application. The following describes in detail a PPDU transmission method provided in embodiments of this application with reference to more accompanying drawings. Embodiments of this application may be applied to a plurality of different scenarios, including the scenario shown in FIG. 1; but embodiments of this application are not limited to the scenario. For example, for uplink transmission, a STA may be used as a transmit end, and an AP may be used as a receive end. For downlink transmission, the AP may be used as a transmit end, and the STA may be used as a receive end. For another transmission scenario, for example, data transmission between APs, one AP may be used as a transmit end, and the other AP may be used as a receive end. For another example, for uplink transmission between STAs, one STA may be used as a transmit end, and the other STA may be used as a receive end. In embodiments of this application, the method is described by using a first communication device and a second communication device. It may be understood that the first communication device may be an AP or a STA (for example, the AP or the STA shown in FIG. 1), or the second communication device may be an AP or a STA (for example, the AP or the STA shown in FIG. 1).

Embodiments of this application provides a plurality of possible LTF sequences. PAPR values of these LTF sequences in a single RU are relatively low, PAPR values of these LTF sequences in a combined RU are relatively low, and PAPR values of these LTF sequences in an entire bandwidth are also relatively low. In addition, a multi-stream scenario is further considered. Rotated sequence obtained after phase rotation is performed on these sequences have a relatively low PAPR value in a single RU, a relatively low PAPR value in a combined RU, and a relatively low PAPR value in an entire bandwidth. It may be understood that a smaller PAPR value indicates a lower requirement for a linear power amplifier and better performance.

Figure 8:
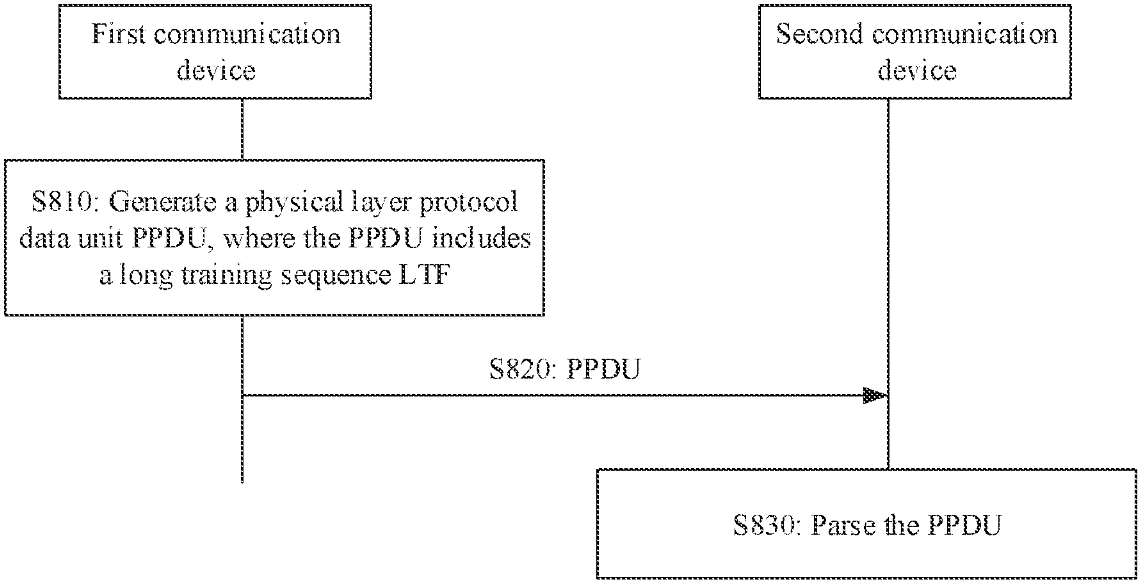
FIG. 8 is a schematic flowchart of transmitting a PPDU according to an embodiment of this application.

FIG. 8 is a flowchart of a PPDU transmission method according to an embodiment of this application. The method shown in FIG. 8 may include but is not limited to the following steps.

S810: A first communication device generates a physical layer protocol data unit PPDU, where the PPDU includes a long training field LTF, and the long training field LTF carries an LTF sequence.

Specifically, a method for generating the LTF sequence by the first communication device is described subsequently.

S820: The first communication device sends the PPDU. Correspondingly, the second communication device receives the PPDU.

S830: The second communication device parses the PPDU, to obtain the LTF sequence in the PPDU. For a specific parsing manner, refer to existing descriptions. This is not limited herein.

It may be understood that the "LTF sequence" mentioned in this application may be a frequency domain sequence of an LTF, or may be referred to as a frequency domain sequence of a long training field.

The following describes the method for generating the LTF sequence in S810.

Specifically, the following steps are included.

First, a training set is determined, where the training set includes a plurality of pieces of training data, and each piece of training data is a sample LTF. PAPRs of a plurality of LTF sequences in a multi-stream scenario are considered for each piece of training data. A PAPR value in a single RU is relatively low, a PAPR value in a combined RU is relatively low, and a PAPR value in an entire bandwidth is also relatively low.

Second, a generative adversarial network GAN is trained based on the training data in the training set.

Third, a plurality of possible LTF sequences provided in this application are generated by using a generation model in the trained generative adversarial network GAN. The LTF sequences generated by the generation model and the sample LTF sequence have a same feature. To be specific, the LTF sequences generated by the generation model have relatively low PAPR values in a single RU, relatively low PAPR values in a combined RU, and relatively low PAPR values in an entire bandwidth. In addition, the multi-stream scenario is further considered. A plurality of rotated sequences obtained after phase rotation is performed on these sequences have relatively low PAPR values in the single RU, relatively low PAPR values in the combined RU, and relatively low PAPR values in the entire bandwidth.

The determining the training set includes:

Step 1: Obtain a basic sequence, where the basic sequence is a long training sequence LTF.

With reference to an application scenario and an application requirement of the LTF sequence, a base sequence with an appropriate length and a low PAPR is selected.

For example, when a sequence applicable to the 80 MHz tone plan (tone plan) in the 802.11ax shown in FIG. 3 is generated, an 80 MHz LTF sequence in the 802.11ax standard may be selected as the basic sequence.

For example, when a sequence applicable to the 80 MHz tone plan (tone plan) in the 802.11be shown in FIG. 4 is generated, an 80 MHz LTF sequence in the 802.11be standard may be selected as the basic sequence.

Alternatively, a sequence is constructed in a specific manner, and a length and a structure of the sequence comply with a tone plan structure.

For example, if a generator needs to generate a 2× sequence, the 2× sequence may be selected as the base sequence. If the generator needs to generate a 1× sequence, the 1× sequence may be selected as the base sequence. If the generator needs to generate a 4× sequence, the 4× sequence may be selected as the base sequence. If the generator needs to generate an 80 MHz sequence, the 80 MHz sequence may be selected as the base sequence. If the generator needs to generate a 160 MHz sequence, the 160 MHz sequence may be selected as the base sequence.

Generally, a length of the 80 MHz base sequence is nifft=1024 bits, and the sequence whose length is 1024 bits includes 12 leftmost 0s (corresponding to 12 left subcarriers), 11 rightmost 0s (corresponding to 11 right subcarriers), and five middle 0s (corresponding to five middle direct current subcarriers). To simplify training, a base sequence whose length is 1001 bits may also be used. To be specific, the base sequence does not include the 12 leftmost 0s, the 11 rightmost 0s, and the five middle 0s.

Step 2: Perform negation on one or more non-zero elements in the base sequence, to obtain a new sequence.

For example, 1 is negated to −1, and −1 is negated to 1. Because 1024 is excessively long, for ease of understanding, a base sequence 0 1 0 1 1 whose length is 5 bits is used as an example for description. The sequence 0 1 0 1 1 is merely an example, and should not constitute any limitation on this application. For example, a new sequence obtained based on the base sequence 0 1 0 1 1 may be any one of the following seven sequences, and the seven sequences are 0−1 0 1 1; 0 1 0−1 1; 0 1 0 1−1; 0−1 0−1 1; 0−1 0 1−1; 0 1 0−1−1; and 0−1 0−1−1.

Step 3: Perform phase rotation on elements at non-pilot locations in the new sequence in step 2, to obtain a plurality of sequences, where the plurality of sequences are denoted as rotated sequences.

As described above, after phase rotation, the plurality of rotated sequences may be obtained based on the new sequence. PAPRs of all the rotated sequences that may be in this application include a PAPR of the original sequence.

For example, in the base sequence 0 1 0 1 1, a second bit and a fourth bit are specified, and the two non-zero bits are locations of data subcarriers, namely, non-pilot locations. The new sequence 0−1 0 1 1 is used as an example. Phase rotation may be performed on elements in the second bit and the fourth bit in the new sequence.

For example, if pilot locations are multiplied by 1, and non-pilot locations are multiplied by 1, a rotated sequence corresponding to the new sequence 0−1 0 1 1 is 0 1 0−1 1.

When a 16×16 matrix P is used for phase rotation, the 16×16 matrix P is applicable to 16 streams. Elements included in the 16×16 matrix P are not limited in this application.

Step 4: Determine a PAPR of each rotated sequence corresponding to the new sequence in step 3 in an entire bandwidth in a tone plan, a PAPR of each rotated sequence corresponding to the new sequence in a single RU, and a PAPR of each rotated sequence corresponding to the new sequence in a combined RU.

The single RU may be an RU26 or an RU106. The combined RU may be an RU26+RU52, an RU106+RU26, or an RU484+RU242. In addition, it should be noted that the combined RU may also include a combination of RUs in a puncturing scenario. For example, an RU484+RU242 is equivalent to an RU484+RU242 in a puncturing form in a NON-OFDMA scenario.

If four rotated sequences with different PAPRs can be obtained by rotating one new sequence, x*4 PAPRs can be correspondingly calculated for one new sequence. Herein, x is a total quantity of PAPRs of a single RU, a combined RU, and an entire bandwidth.

Step 5: Set a threshold. When all these PAPRs in step 4 are less than or equal to the specified threshold, the new sequence in step 3 may be added to a training set $p_{data}(x)$ as a piece of training data. For example, the largest PAPR may be selected from these PAPRs in step 4, and the largest PAPR is compared with the threshold. If the largest PAPR is less than or equal to the specified threshold, the new sequence may be added to the training set. On a premise that it is ensured that a PAPR value of the sequence in the entire bandwidth is relatively low, it is also ensured that a PAPR value of the sequence in a single RU is relatively low, and a PAPR value of the sequence in a combined RU is relatively low. In addition, the multi-stream scenario is further considered. The rotated sequences obtained after phase rotation is performed on these sequences have relatively low PAPR values in the single RU, relatively low PAPR values in the combined RU, and relatively low PAPR values in the entire bandwidth.

Alternatively, if a specific proportion of PAPRs in these PAPRs in step 4 is less than or equal to the specified threshold, the new sequence in step 3 may be added to the training set $p_{data}(x)$ as a piece of training data. For example, the proportion is 99%, 98%, or the like. For example, x*4 PAPRs may be correspondingly calculated for the new sequence, and 99% of these PAPRs are less than or equal to the specified threshold. In this case, the new sequence in step 3 may be added to the training set $p_{data}(x)$ as a piece of training data.

Alternatively, when PAPRs of a specific proportion of rotated sequences in the plurality of rotated sequences in step 4 are all less than or equal to the specified threshold, the new sequence in step 3 may be added to the training set $p_{data}(x)$ as a piece of training data. For example, the proportion is greater than or equal to ¾. For example, in four rotated sequences with different PAPRs obtained based on the new sequence, x PAPRs calculated based on three rotated sequences are all less than the specified threshold, and some PAPRs in x PAPRs of one rotated sequence are greater than the specified threshold. In this case, the new sequence may be added to the training set $p_{data}(x)$ as a piece of training data.

The specified threshold may be, for example, 6.3 db or 6.5 db. For example, for the threshold, refer to an average PAPR value, a medium PAPR value, and the like of a data part of the RU.

Generally, the training set may include at least 500 sequences, in other words, n_sample=500. Certainly, more sequences may also be included.

When transmission bandwidths are 160 MHz, 240 MHz, and 320 MHz, corresponding training sets are obtained by using the same method. A difference is that a length of the base sequence is changed from 1024 to 2048, 3072, or 4096.

It should be noted that, in this application, an exhaustive method may be used to perform a process of step 2 to step 5, so that a plurality of LTFs that meet a relatively low PAPR requirement can be obtained. To quickly obtain the plurality of LTFs that meet the relatively low PAPR requirement, training data in the training set may also be used to train the generative adversarial network GAN. After training of the GAN network is completed, the plurality of LTFs that meet the relatively low PAPR requirement may be generated by using the generation model in the GAN network, so that the LTFs that meet the relatively low PAPR requirement can be obtained more easily and quickly.

The training the generative adversarial network GAN based on training data in a training set includes the following steps.

As described in FIG. 6, the GAN includes the generation model G and the discriminative model D. The generation model may also be referred to as a generator or a generation network, and the discriminative model may also be referred to as a discriminator or a discriminative network.

Step 1: Initialize a parameter $\theta_D$ of the discriminative model D, and generate a parameter $\theta_G$ of the generation model G.

Step 2: Train the discriminator, in other words, train the parameter $\theta_D$.

A batch size is set to batch_size=50. The batch size can be manually adjusted.

batch_size pieces of training data, namely, LTFs, are extracted from the training set $p_{data}(x)$, and labels of the batch_size LTFs are marked as true samples.

A group of values is randomly generated. The group of values meets a preset feature. The preset feature may be Gaussian distribution, normal distribution, uniform distribution, or the like. The group of values may be a matrix with batch_size rows and dim_noise columns. Each element in the matrix conforms with the preset feature, and this is random noise z~p(z). The random noise z~p(z) is sent to the generator of the GAN network. The generator may generate batch_size LTFs, and labels of the LTFs generated by the generator are marked as false samples.

dim_noise is related to a bandwidth, and dim_noise may be a length of an LTF sequence in the bandwidth. For example, when an LTF in an 80 HMz is generated, dim_noise is generally 1024 or 1001. When an LTF in a 160 MHz is generated, dim_noise is generally 2048.

The LTF sequences whose labels are false samples and the LTF sequences whose labels are true samples are input into the discriminative model that has not been completely trained; results that are of the sequences whose labels are false samples and that are output by the discriminative model that has not been completely trained are obtained, where the results are true samples or false samples; and the discriminative model that has not been completely trained is trained based on the plurality of results.

It may be understood that, to update the network, the batch_size samples are selected from the training data set $p_{data}(x)$ each time, and the batch_size samples are sent to the discriminator of the GAN network as true data. A training objective of the discriminator is to determine that the generator generates false samples, and the samples in the training set are true samples. For distribution of x from the generator G, D(x) is close to 0. For true distribution of x, D(x) is close to 1. Therefore, a loss function of the discriminator is $L(D)=E_{z\sim p(z)}\log(1-D(G(z)))+E_{x\sim p_{data}(x)}\log(D(x))$, and an optimization objective of the discriminator is $\max_D L(D)$. An Adam optimization algorithm is used to optimize the loss function L(D) of the discriminator, and an updated network parameter $\theta_D$ is obtained.

Step 3: Train the generator, in other words, train the parameter $\theta_G$.

batch_size pieces of training data, namely, LTFs, are extracted from the training set $p_{data}(x)$.

A group of values is randomly generated. The group of values meets a preset feature. The preset feature may be Gaussian distribution, normal distribution, uniform distribution, or the like. The group of values may be a matrix with batch_size rows and dim_noise columns. Each element in the matrix conforms with the preset feature, and this is random noise z~p(z). The random noise z~p(z) is sent to the generator, and the generator may generate batch_size LTFs.

dim_noise is related to a bandwidth, and dim_noise may be a length of an LTF sequence in the bandwidth. For example, when an LTF in an 80 HMz is generated, dim_noise is generally 1024 or 1001. When an LTF in a 160 MHz is generated, dim_noise is generally 2048.

The LTF sequences generated by the generator and the LTF sequences in the training set are input into the trained discriminative model in step 2; results that are of the LTF sequences generated by the generator and that are output by the trained discriminative model are obtained, where the results are true samples or false samples; and the generation model that has not been completely trained is trained based on the plurality of results.

It may be understood that the random noise z~p(z) is sent to the generator of the GAN network, and a new sequence set is obtained by using the generator. A generated batch sample is G(z), and a size is (batch_size, n_data). A training objective of the generator is to generate distribution through optimization, and make the discriminator mistakenly consider that the generated false samples are true. Therefore, a loss function of the generator is $L(G)=E_{z\sim p(z)}\log(1-D(G(z)))$, and an optimization objective of the generator is $\min_G L(G)$. An Adam optimization algorithm is used to optimize the loss function L(G) of the discriminator, and an updated network parameter $\theta_G$ is obtained.

Step 4: Repeat step 2 and step 3. In a training process, the generator and the discriminator of the GAN are optimized alternately to continuously update the parameters $\theta_D$ and $\theta_G$ of the two networks.

Step 5: After $\theta_D$ and $\theta_G$ are updated for a specific quantity of times, check a PAPR indicator (phase rotation and a resource unit are considered) of the LTF sequence generated by the generator G. If the PAPR indicator is less than a specified threshold, fill the PAPR indicator in the training set $p_{data}(x)$. If a quantity of pieces of data in the training set exceeds a specific range, only a part of the training set with smaller PAPRs is retained. Then, in a process of continuously updating the network parameters, the training set is continuously updated, in other words, step 3, step 4, and step 5 continue to be performed. In this way, the PAPR of the training data becomes smaller.

The generating an LTF sequence by using the trained generation model in the generative adversarial network GAN includes:

generating a group of values, where the group of values meets a preset feature, and the preset feature may be Gaussian distribution, normal distribution, uniform distribution, or the like. If the group of values is input into the trained generation model, one or more LTF sequences output by the trained generation model may be obtained. The one or more LTF sequences have a relatively low PAPR value in a single RU a relatively low PAPR value in a combined RU, and a relatively low PAPR value in an entire bandwidth. In addition, the multi-stream scenario is further considered. The rotated sequences obtained after phase rotation is performed on these sequences have a relatively low PAPR value in the single RU, a relatively low PAPR value in the combined RU, and a relatively low PAPR value in the entire bandwidth.

Further, the one or more sequences generated by the generation model may be used as sequences in the training set, and the generation model and the discriminative model are trained again based on these sequences.

The following describes an LTF sequence in a 2× mode in a bandwidth of 80 MHz, a bandwidth of 160 MHz, a bandwidth of 240 MHz, and a bandwidth of 320 MHz.

(1) A possible 2×LTF sequence in the 80 MHz bandwidth, including 1024 elements and denoted as a sequence 1.

Sequence 1=
{0 0 0 0 0 0 0 0 0 0 0 0 1 0 1 0 −1 0
1 0 1 0 1 0 −1 0 1 0 1 0 1 0 1 0 −1 0 −1 0
−1 0 1 0 −1 0 −1 0 1 0 1 0 −1 0 1 0 1 0 1 0
−1 0 −1 0 −1 0 −1 0 1 0 1 0 1 0 1 0 −1 0 1 0
1 0 1 0 −1 0 1 0 −1 0 −1 0 1 0 −1 0 −1 0 −1 0
1 0 1 0 −1 0 −1 0 −1 0 1 0 −1 0 −1 0 1 0 −1 0
1 0 1 0 −1 0 1 0 1 0 −1 0 1 0 −1 0 −1 0 −1 0
1 0 −1 0 −1 0 −1 0 −1 0 1 0 −1 0 −1 0 1 0 1 0
−1 0 1 0 1 0 1 0 −1 0 −1 0 −1 0 −1 0 1 0 −1 0
1 0 1 0 1 0 −1 0 1 0 1 0 1 0 1 0 −1 0 −1 0
−1 0 1 0 1 0 1 0 −1 0 −1 0 1 0 1 0 1 0 −1 0
1 0 1 0 −1 0 1 0 −1 0 −1 0 −1 0 −1 0 1 0 −1 0
−1 0 −1 0 1 0 −1 0 1 0 1 0 −1 0 1 0 1 0 −1 0
−1 0 −1 0 1 0 −1 0 −1 0 −1 0 1 0 −1 0 1 0 1 0
−1 0 1 0 1 0 1 0 −1 0 −1 0 1 0 1 0 1 0 −1 0
1 0 1 0 −1 0 1 0 −1 0 −1 0 1 0 −1 0 1 0 1 0
1 0 −1 0 1 0 1 0 1 0 1 0 −1 0 −1 0 −1 0 1 0
−1 0 −1 0 1 0 1 0 −1 0 1 0 1 0 1 0 −1 0 −1 0
−1 0 −1 0 1 0 1 0 1 0 −1 0 −1 0 −1 0 −1 0 1 0
−1 0 −1 0 −1 0 1 0 −1 0 1 0 1 0 1 0 −1 0 −1 0
1 0 1 0 1 0 1 0 1 0 1 0 −1 0 1 0 −1 0 −1 0
−1 0 −1 0 1 0 −1 0 −1 0 −1 0 1 0 −1 0 −1 0 1 0
−1 0 1 0 1 0 −1 0 1 0 1 0 −1 0 −1 0 1 0 −1 0
−1 0 −1 0 1 0 1 0 1 0 1 0 −1 0 1 0 −1 0 −1 0
−1 0 1 0 −1 0 −1 0 −1 0 −1 0 1 0 1 0 1 0 1 0
−1 0 −1 0 −1 0 1 0 1 0 1 0 0 0 0 0 0 0 1 0
−1 0 −1 0 1 0 1 0 −1 0 1 0 −1 0 −1 0 −1 0 1 0
1 0 1 0 1 0 −1 0 1 0 1 0 1 0 −1 0 1 0 −1 0
−1 0 −1 0 −1 0 1 0 1 0 1 0 −1 0 1 0 1 0 −1 0
−1 0 1 0 −1 0 −1 0 1 0 −1 0 −1 0 1 0 −1 0 1 0
1 0 1 0 −1 0 1 0 1 0 1 0 1 0 −1 0 1 0 −1 0
−1 0 1 0 −1 0 −1 0 −1 0 1 0 1 0 −1 0 −1 0 1 0
1 0 −1 0 1 0 1 0 1 0 −1 0 1 0 1 0 1 0 1 0
−1 0 −1 0 −1 0 1 0 1 0 1 0 1 0 −1 0 −1 0 1 0
1 0 −1 0 −1 0 1 0 1 0 −1 0 1 0 1 0 1 0 −1 0
−1 0 −1 0 −1 0 1 0 −1 0 −1 0 −1 0 1 0 −1 0 1 0
1 0 −1 0 1 0 −1 0 −1 0 1 0 −1 0 −1 0 −1 0 1 0
1 0 −1 0 −1 0 −1 0 1 0 −1 0 −1 0 1 0 −1 0 1 0
1 0 1 0 −1 0 1 0 1 0 1 0 −1 0 1 0 −1 0 1 0
1 0 −1 0 1 0 −1 0 −1 0 −1 0 1 0 −1 0 −1 0 −1 0
−1 0 1 0 −1 0 1 0 1 0 −1 0 1 0 1 0 1 0 −1 0
−1 0 1 0 1 0 1 0 −1 0 −1 0 −1 0 1 0 1 0 1 0
1 0 −1 0 1 0 1 0 1 0 −1 0 1 0 −1 0 −1 0 −1 0
−1 0 1 0 1 0 1 0 −1 0 1 0 1 0 −1 0 −1 0 1 0
−1 0 −1 0 1 0 −1 0 1 0 −1 0 −1 0 −1 0 1 0 −1 0
1 0 1 0 −1 0 1 0 1 0 −1 0 1 0 −1 0 −1 0 1 0
−1 0 −1 0 −1 0 1 0 1 0 −1 0 −1 0 −1 0 1 0 −1 0
−1 0 1 0 −1 0 1 0 1 0 1 0 −1 0 1 0 1 0 1 0
1 0 −1 0 −1 0 −1 0 −1 0 1 0 1 0 1 0 −1 0 1 0
1 0 −1 0 −1 0 1 0 −1 0 −1 0 −1 0 1 0 1 0 1 0
1 0 −1 0 1 0 1 0 1 0 −1 0 1 0 1 0 0 0 0 0
0 0 0 0 0 0}

(2) A possible 2 LTF sequence in the 160 MHz bandwidth, including 2048 elements and denoted as a sequence 2.

Sequence 2=

| | | | | | | | | | | | | | | | | | | | |
|---|---|---|---|---|---|---|---|---|---|---|---|---|---|---|---|---|---|---|---|
| | | {0 | 0 | 0 | 0 | 0 | 0 | 0 | 0 | 0 | 0 | 0 | 0 | 1 | 0 | 1 | 0 | −1 | 0 |
| 1 | 0 | 1 | 0 | 1 | 0 | −1 | 0 | 1 | 0 | 1 | 0 | 1 | 0 | 1 | 0 | −1 | 0 | −1 | 0 |
| −1 | 0 | 1 | 0 | −1 | 0 | −1 | 0 | 1 | 0 | 1 | 0 | −1 | 0 | 1 | 0 | 1 | 0 | 1 | 0 |
| −1 | 0 | −1 | 0 | −1 | 0 | −1 | 0 | 1 | 0 | 1 | 0 | 1 | 0 | 1 | 0 | −1 | 0 | 1 | 0 |
| 1 | 0 | 1 | 0 | −1 | 0 | 1 | 0 | −1 | 0 | −1 | 0 | 1 | 0 | −1 | 0 | −1 | 0 | −1 | 0 |
| 1 | 0 | 1 | 0 | −1 | 0 | −1 | 0 | −1 | 0 | 1 | 0 | −1 | 0 | −1 | 0 | 1 | 0 | −1 | 0 |
| 1 | 0 | 1 | 0 | −1 | 0 | 1 | 0 | 1 | 0 | −1 | 0 | 1 | 0 | −1 | 0 | −1 | 0 | −1 | 0 |
| 1 | 0 | −1 | 0 | −1 | 0 | −1 | 0 | −1 | 0 | 1 | 0 | −1 | 0 | −1 | 0 | 1 | 0 | 1 | 0 |
| −1 | 0 | 1 | 0 | 1 | 0 | 1 | 0 | −1 | 0 | −1 | 0 | −1 | 0 | −1 | 0 | 1 | 0 | −1 | 0 |
| 1 | 0 | 1 | 0 | 1 | 0 | −1 | 0 | 1 | 0 | 1 | 0 | 1 | 0 | 1 | 0 | −1 | 0 | −1 | 0 |
| −1 | 0 | 1 | 0 | 1 | 0 | 1 | 0 | −1 | 0 | −1 | 0 | 1 | 0 | 1 | 0 | 1 | 0 | −1 | 0 |
| 1 | 0 | 1 | 0 | −1 | 0 | 1 | 0 | −1 | 0 | −1 | 0 | −1 | 0 | −1 | 0 | 1 | 0 | −1 | 0 |
| −1 | 0 | −1 | 0 | 1 | 0 | −1 | 0 | 1 | 0 | 1 | 0 | −1 | 0 | 1 | 0 | 1 | 0 | −1 | 0 |
| −1 | 0 | −1 | 0 | 1 | 0 | −1 | 0 | −1 | 0 | −1 | 0 | 1 | 0 | −1 | 0 | 1 | 0 | 1 | 0 |
| −1 | 0 | 1 | 0 | 1 | 0 | 1 | 0 | −1 | 0 | −1 | 0 | 1 | 0 | 1 | 0 | 1 | 0 | −1 | 0 |
| 1 | 0 | 1 | 0 | −1 | 0 | 1 | 0 | −1 | 0 | −1 | 0 | 1 | 0 | −1 | 0 | 1 | 0 | 1 | 0 |
| 1 | 0 | −1 | 0 | 1 | 0 | 1 | 0 | 1 | 0 | 1 | 0 | −1 | 0 | −1 | 0 | −1 | 0 | 1 | 0 |
| −1 | 0 | −1 | 0 | 1 | 0 | 1 | 0 | −1 | 0 | 1 | 0 | 1 | 0 | 1 | 0 | −1 | 0 | −1 | 0 |
| −1 | 0 | −1 | 0 | 1 | 0 | 1 | 0 | 1 | 0 | −1 | 0 | −1 | 0 | −1 | 0 | −1 | 0 | 1 | 0 |
| −1 | 0 | −1 | 0 | −1 | 0 | 1 | 0 | −1 | 0 | 1 | 0 | 1 | 0 | 1 | 0 | −1 | 0 | −1 | 0 |
| 1 | 0 | 1 | 0 | 1 | 0 | −1 | 0 | 1 | 0 | 1 | 0 | −1 | 0 | 1 | 0 | −1 | 0 | −1 | 0 |
| −1 | 0 | −1 | 0 | 1 | 0 | −1 | 0 | −1 | 0 | −1 | 0 | 1 | 0 | −1 | 0 | 1 | 0 | 1 | 0 |
| −1 | 0 | 1 | 0 | 1 | 0 | −1 | 0 | 1 | 0 | 1 | 0 | −1 | 0 | −1 | 0 | 1 | 0 | −1 | 0 |
| −1 | 0 | −1 | 0 | 1 | 0 | 1 | 0 | 1 | 0 | 1 | 0 | −1 | 0 | 1 | 0 | −1 | 0 | −1 | 0 |
| −1 | 0 | 1 | 0 | −1 | 0 | −1 | 0 | −1 | 0 | −1 | 0 | 1 | 0 | 1 | 0 | 1 | 0 | 1 | 0 |
| −1 | 0 | −1 | 0 | −1 | 0 | 1 | 0 | 1 | 0 | 1 | 0 | 0 | 0 | 0 | 0 | 0 | 0 | 1 | 0 |
| −1 | 0 | −1 | 0 | 1 | 0 | 1 | 0 | −1 | 0 | 1 | 0 | 1 | 0 | 1 | 0 | 1 | 0 | −1 | 0 |
| −1 | 0 | −1 | 0 | −1 | 0 | 1 | 0 | −1 | 0 | −1 | 0 | −1 | 0 | 1 | 0 | −1 | 0 | 1 | 0 |
| 1 | 0 | 1 | 0 | 1 | 0 | −1 | 0 | −1 | 0 | −1 | 0 | 1 | 0 | −1 | 0 | −1 | 0 | 1 | 0 |
| 1 | 0 | −1 | 0 | 1 | 0 | 1 | 0 | −1 | 0 | 1 | 0 | 1 | 0 | −1 | 0 | 1 | 0 | −1 | 0 |
| −1 | 0 | −1 | 0 | 1 | 0 | −1 | 0 | −1 | 0 | −1 | 0 | −1 | 0 | 1 | 0 | −1 | 0 | 1 | 0 |
| 1 | 0 | −1 | 0 | 1 | 0 | 1 | 0 | 1 | 0 | −1 | 0 | −1 | 0 | 1 | 0 | 1 | 0 | 1 | 0 |
| −1 | 0 | 1 | 0 | −1 | 0 | −1 | 0 | −1 | 0 | 1 | 0 | −1 | 0 | −1 | 0 | −1 | 0 | −1 | 0 |
| 1 | 0 | 1 | 0 | 1 | 0 | −1 | 0 | −1 | 0 | −1 | 0 | −1 | 0 | 1 | 0 | 1 | 0 | 1 | 0 |
| −1 | 0 | 1 | 0 | 1 | 0 | −1 | 0 | −1 | 0 | 1 | 0 | −1 | 0 | −1 | 0 | −1 | 0 | 1 | 0 |
| 1 | 0 | 1 | 0 | 1 | 0 | −1 | 0 | 1 | 0 | 1 | 0 | 1 | 0 | −1 | 0 | 1 | 0 | −1 | 0 |
| −1 | 0 | 1 | 0 | −1 | 0 | 1 | 0 | 1 | 0 | −1 | 0 | 1 | 0 | 1 | 0 | 1 | 0 | −1 | 0 |
| −1 | 0 | 1 | 0 | 1 | 0 | 1 | 0 | −1 | 0 | 1 | 0 | 1 | 0 | −1 | 0 | 1 | 0 | −1 | 0 |
| −1 | 0 | −1 | 0 | 1 | 0 | −1 | 0 | −1 | 0 | −1 | 0 | 1 | 0 | −1 | 0 | 1 | 0 | −1 | 0 |
| −1 | 0 | 1 | 0 | −1 | 0 | 1 | 0 | 1 | 0 | 1 | 0 | −1 | 0 | 1 | 0 | 1 | 0 | 1 | 0 |
| 1 | 0 | 1 | 0 | 1 | 0 | −1 | 0 | −1 | 0 | 1 | 0 | −1 | 0 | −1 | 0 | −1 | 0 | 1 | 0 |
| 1 | 0 | −1 | 0 | −1 | 0 | −1 | 0 | 1 | 0 | 1 | 0 | 1 | 0 | −1 | 0 | −1 | 0 | −1 | 0 |
| −1 | 0 | 1 | 0 | −1 | 0 | −1 | 0 | −1 | 0 | 1 | 0 | −1 | 0 | 1 | 0 | 1 | 0 | 1 | 0 |
| 1 | 0 | −1 | 0 | −1 | 0 | −1 | 0 | 1 | 0 | −1 | 0 | −1 | 0 | 1 | 0 | 1 | 0 | −1 | 0 |
| 1 | 0 | 1 | 0 | 1 | 0 | 1 | 0 | −1 | 0 | 1 | 0 | 1 | 0 | 1 | 0 | −1 | 0 | 1 | 0 |
| −1 | 0 | −1 | 0 | −1 | 0 | −1 | 0 | −1 | 0 | 1 | 0 | −1 | 0 | 1 | 0 | 1 | 0 | −1 | 0 |
| 1 | 0 | 1 | 0 | 1 | 0 | −1 | 0 | −1 | 0 | 1 | 0 | 1 | 0 | 1 | 0 | −1 | 0 | 1 | 0 |
| 1 | 0 | −1 | 0 | 1 | 0 | −1 | 0 | −1 | 0 | −1 | 0 | 1 | 0 | −1 | 0 | −1 | 0 | −1 | 0 |
| −1 | 0 | 1 | 0 | 1 | 0 | 1 | 0 | 1 | 0 | −1 | 0 | −1 | 0 | −1 | 0 | 1 | 0 | −1 | 0 |
| −1 | 0 | 1 | 0 | 1 | 0 | −1 | 0 | 1 | 0 | 1 | 0 | 1 | 0 | −1 | 0 | −1 | 0 | −1 | 0 |
| −1 | 0 | 1 | 0 | −1 | 0 | −1 | 0 | −1 | 0 | 1 | 0 | −1 | 0 | −1 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 1 | 0 |
| 1 | 0 | −1 | 0 | 1 | 0 | 1 | 0 | 1 | 0 | −1 | 0 | 1 | 0 | 1 | 0 | 1 | 0 | 1 | 0 |
| −1 | 0 | −1 | 0 | −1 | 0 | 1 | 0 | −1 | 0 | – | 0 | 1 | 0 | 1 | 0 | −1 | 0 | 1 | 0 |
| 1 | 0 | 1 | 0 | −1 | 0 | −1 | 0 | −1 | 0 | −1 | 0 | 1 | 0 | 1 | 0 | 1 | 0 | 1 | 0 |
| −1 | 0 | 1 | 0 | 1 | 0 | 1 | 0 | −1 | 0 | 1 | 0 | −1 | 0 | −1 | 0 | 1 | 0 | −1 | 0 |
| −1 | 0 | −1 | 0 | 1 | 0 | 1 | 0 | −1 | 0 | −1 | 0 | −1 | 0 | 1 | 0 | −1 | 0 | −1 | 0 |
| 1 | 0 | −1 | 0 | 1 | 0 | 1 | 0 | −1 | 0 | 1 | 0 | 1 | 0 | −1 | 0 | 1 | 0 | −1 | 0 |
| −1 | 0 | −1 | 0 | 1 | 0 | −1 | 0 | −1 | 0 | −1 | 0 | −1 | 0 | 1 | 0 | −1 | 0 | −1 | 0 |
| 1 | 0 | 1 | 0 | −1 | 0 | 1 | 0 | 1 | 0 | 1 | 0 | −1 | 0 | −1 | 0 | −1 | 0 | −1 | 0 |
| 1 | 0 | −1 | 0 | 1 | 0 | 1 | 0 | 1 | 0 | −1 | 0 | 1 | 0 | 1 | 0 | 1 | 0 | 1 | 0 |
| −1 | 0 | −1 | 0 | −1 | 0 | 1 | 0 | 1 | 0 | 1 | 0 | −1 | 0 | −1 | 0 | 1 | 0 | 1 | 0 |
| 1 | 0 | −1 | 0 | 1 | 0 | 1 | 0 | −1 | 0 | 1 | 0 | −1 | 0 | −1 | 0 | −1 | 0 | −1 | 0 |
| 1 | 0 | −1 | 0 | −1 | 0 | −1 | 0 | 1 | 0 | −1 | 0 | 1 | 0 | 1 | 0 | −1 | 0 | 1 | 0 |
| −1 | 0 | 1 | 0 | 1 | 0 | 1 | 0 | −1 | 0 | 1 | 0 | 1 | 0 | 1 | 0 | −1 | 0 | 1 | 0 |
| −1 | 0 | −1 | 0 | 1 | 0 | −1 | 0 | −1 | 0 | −1 | 0 | 1 | 0 | 1 | 0 | −1 | 0 | −1 | 0 |
| −1 | 0 | 1 | 0 | −1 | 0 | −1 | 0 | 1 | 0 | −1 | 0 | 1 | 0 | 1 | 0 | −1 | 0 | 1 | 0 |
| −1 | 0 | −1 | 0 | −1 | 0 | 1 | 0 | −1 | 0 | −1 | 0 | −1 | 0 | −1 | 0 | 1 | 0 | 1 | 0 |
| 1 | 0 | −1 | 0 | 1 | 0 | 1 | 0 | −1 | 0 | −1 | 0 | 1 | 0 | −1 | 0 | −1 | 0 | −1 | 0 |
| 1 | 0 | 1 | 0 | 1 | 0 | 1 | 0 | −1 | 0 | −1 | 0 | −1 | 0 | 1 | 0 | 1 | 0 | 1 | 0 |
| 1 | 0 | −1 | 0 | 1 | 0 | 1 | 0 | 1 | 0 | −1 | 0 | 1 | 0 | −1 | 0 | −1 | 0 | −1 | 0 |
| 1 | 0 | 1 | 0 | −1 | 0 | −1 | 0 | −1 | 0 | 1 | 0 | −1 | 0 | −1 | 0 | 1 | 0 | −1 | 0 |
| 1 | 0 | 1 | 0 | 1 | 0 | 1 | 0 | −1 | 0 | 1 | 0 | 1 | 0 | 1 | 0 | −1 | 0 | 1 | 0 |
| −1 | 0 | −1 | 0 | 1 | 0 | −1 | 0 | −1 | 0 | 1 | 0 | −1 | 0 | −1 | 0 | 1 | 0 | 1 | 0 |
| −1 | 0 | 1 | 0 | 1 | 0 | 1 | 0 | −1 | 0 | −1 | 0 | −1 | 0 | −1 | 0 | 1 | 0 | −1 | 0 |
| 1 | 0 | 1 | 0 | 1 | 0 | −1 | 0 | 1 | 0 | 1 | 0 | 1 | 0 | 1 | 0 | −1 | 0 | −1 | 0 |
| −1 | 0 | −1 | 0 | 1 | 0 | 1 | 0 | 1 | 0 | −1 | 0 | −1 | 0 | −1 | 0 | 0 | 0 | 0 | 0 |

-continued

| | | | | | | | | | | | | | | | | | | | |
|---|---|---|---|---|---|---|---|---|---|---|---|---|---|---|---|---|---|---|---|
| 0 | 0 | −1 | 0 | 1 | 0 | 1 | 0 | −1 | 0 | −1 | 0 | 1 | 0 | −1 | 0 | 1 | 0 | 1 | 0 |
| 1 | 0 | −1 | 0 | −1 | 0 | −1 | 0 | −1 | 0 | 1 | 0 | −1 | 0 | −1 | 0 | −1 | 0 | 1 | 0 |
| −1 | 0 | 1 | 0 | 1 | 0 | 1 | 0 | 1 | 0 | −1 | 0 | −1 | 0 | −1 | 0 | 1 | 0 | −1 | 0 |
| −1 | 0 | 1 | 0 | 1 | 0 | −1 | 0 | 1 | 0 | 1 | 0 | −1 | 0 | 1 | 0 | 1 | 0 | −1 | 0 |
| 1 | 0 | −1 | 0 | −1 | 0 | −1 | 0 | 1 | 0 | −1 | 0 | −1 | 0 | −1 | 0 | −1 | 0 | 1 | 0 |
| −1 | 0 | 1 | 0 | 1 | 0 | −1 | 0 | 1 | 0 | 1 | 0 | 1 | 0 | −1 | 0 | −1 | 0 | 1 | 0 |
| 1 | 0 | 1 | 0 | −1 | 0 | 1 | 0 | −1 | 0 | −1 | 0 | −1 | 0 | 1 | 0 | −1 | 0 | −1 | 0 |
| −1 | 0 | −1 | 0 | 1 | 0 | 1 | 0 | 1 | 0 | −1 | 0 | −1 | 0 | −1 | 0 | −1 | 0 | 1 | 0 |
| 1 | 0 | 1 | 0 | −1 | 0 | 1 | 0 | 1 | 0 | −1 | 0 | −1 | 0 | 1 | 0 | −1 | 0 | −1 | 0 |
| −1 | 0 | 1 | 0 | 1 | 0 | 1 | 0 | 1 | 0 | −1 | 0 | 1 | 0 | 1 | 0 | 1 | 0 | −1 | 0 |
| 1 | 0 | −1 | 0 | −1 | 0 | 1 | 0 | −1 | 0 | 1 | 0 | 1 | 0 | −1 | 0 | 1 | 0 | 1 | 0 |
| 1 | 0 | −1 | 0 | −1 | 0 | 1 | 0 | 1 | 0 | 1 | 0 | −1 | 0 | 1 | 0 | 1 | 0 | −1 | 0 |
| 1 | 0 | −1 | 0 | −1 | 0 | −1 | 0 | 1 | 0 | −1 | 0 | −1 | 0 | −1 | 0 | 1 | 0 | 1 | 0 |
| −1 | 0 | 1 | 0 | 1 | 0 | −1 | 0 | 1 | 0 | −1 | 0 | −1 | 0 | −1 | 0 | 1 | 0 | −1 | 0 |
| −1 | 0 | −1 | 0 | −1 | 0 | 1 | 0 | −1 | 0 | 1 | 0 | 1 | 0 | −1 | 0 | 1 | 0 | 1 | 0 |
| 1 | 0 | −1 | 0 | −1 | 0 | 1 | 0 | 1 | 0 | 1 | 0 | −1 | 0 | −1 | 0 | −1 | 0 | 1 | 0 |
| 1 | 0 | 1 | 0 | 1 | 0 | −1 | 0 | 1 | 0 | 1 | 0 | 1 | 0 | −1 | 0 | 1 | 0 | −1 | 0 |
| −1 | 0 | −1 | 0 | −1 | 0 | 1 | 0 | 1 | 0 | 1 | 0 | −1 | 0 | 1 | 0 | 1 | 0 | −1 | 0 |
| −1 | 0 | 1 | 0 | −1 | 0 | −1 | 0 | −1 | 0 | −1 | 0 | 1 | 0 | −1 | 0 | −1 | 0 | −1 | 0 |
| 1 | 0 | −1 | 0 | 1 | 0 | 1 | 0 | −1 | 0 | 1 | 0 | 1 | 0 | −1 | 0 | 1 | 0 | −1 | 0 |
| −1 | 0 | 1 | 0 | −1 | 0 | −1 | 0 | −1 | 0 | 1 | 0 | 1 | 0 | −1 | 0 | −1 | 0 | −1 | 0 |
| 1 | 0 | −1 | 0 | −1 | 0 | 1 | 0 | −1 | 0 | 1 | 0 | 1 | 0 | 1 | 0 | −1 | 0 | 1 | 0 |
| 1 | 0 | 1 | 0 | 1 | 0 | −1 | 0 | −1 | 0 | −1 | 0 | −1 | 0 | 1 | 0 | 1 | 0 | 1 | 0 |
| −1 | 0 | 1 | 0 | 1 | 0 | −1 | 0 | −1 | 0 | 1 | 0 | −1 | 0 | −1 | 0 | −1 | 0 | 1 | 0 |
| 1 | 0 | 1 | 0 | 1 | 0 | −1 | 0 | 1 | 0 | 1 | 0 | 1 | 0 | −1 | 0 | 1 | 0 | 1 | 0 |
| 0 | 0 | 0 | 0 | 0 | 0 | 0 | 0 | 0 | 0} | | | | | | | | | | |

(3) A possible 2×LTF sequence in the 240 MHz bandwidth, including 3072 elements and denoted as a sequence 3.

| | | | | | | | | | | | | | | | | | | | |
|---|---|---|---|---|---|---|---|---|---|---|---|---|---|---|---|---|---|---|---|
| | | Sequence 3= | | | | | | | | | | | | | | | | | |
| | | {0 | 0 | 0 | 0 | 0 | 0 | 0 | 0 | 0 | 0 | 0 | 0 | 1 | 0 | −1 | 0 | 1 | 0 |
| 1 | 0 | −1 | 0 | −1 | 0 | −1 | 0 | −1 | 0 | 1 | 0 | −1 | 0 | 1 | 0 | 1 | 0 | 1 | 0 |
| −1 | 0 | −1 | 0 | −1 | 0 | 1 | 0 | 1 | 0 | 1 | 0 | −1 | 0 | 1 | 0 | 1 | 0 | −1 | 0 |
| 1 | 0 | −1 | 0 | −1 | 0 | −1 | 0 | 1 | 0 | −1 | 0 | −1 | 0 | 1 | 0 | −1 | 0 | −1 | 0 |
| 1 | 0 | −1 | 0 | −1 | 0 | 1 | 0 | −1 | 0 | −1 | 0 | −1 | 0 | −1 | 0 | 1 | 0 | −1 | 0 |
| −1 | 0 | 1 | 0 | −1 | 0 | −1 | 0 | −1 | 0 | −1 | 0 | −1 | 0 | −1 | 0 | 1 | 0 | 1 | 0 |
| 1 | 0 | −1 | 0 | 1 | 0 | 1 | 0 | 1 | 0 | 1 | 0 | −1 | 0 | −1 | 0 | −1 | 0 | 1 | 0 |
| −1 | 0 | −1 | 0 | 1 | 0 | −1 | 0 | −1 | 0 | −1 | 0 | 1 | 0 | 1 | 0 | 1 | 0 | 1 | 0 |
| −1 | 0 | 1 | 0 | 1 | 0 | 1 | 0 | −1 | 0 | −1 | 0 | −1 | 0 | −1 | 0 | −1 | 0 | −1 | 0 |
| 1 | 0 | −1 | 0 | −1 | 0 | 1 | 0 | −1 | 0 | −1 | 0 | −1 | 0 | −1 | 0 | 1 | 0 | −1 | 0 |
| −1 | 0 | 1 | 0 | −1 | 0 | 1 | 0 | −1 | 0 | 1 | 0 | 1 | 0 | −1 | 0 | 1 | 0 | 1 | 0 |
| 1 | 0 | −1 | 0 | 1 | 0 | −1 | 0 | −1 | 0 | 1 | 0 | −1 | 0 | −1 | 0 | −1 | 0 | 1 | 0 |
| 1 | 0 | 1 | 0 | −1 | 0 | −1 | 0 | −1 | 0 | 1 | 0 | −1 | 0 | 1 | 0 | −1 | 0 | 1 | 0 |
| −1 | 0 | −1 | 0 | −1 | 0 | 1 | 0 | 1 | 0 | 1 | 0 | −1 | 0 | 1 | 0 | −1 | 0 | −1 | 0 |
| −1 | 0 | 1 | 0 | 1 | 0 | 1 | 0 | −1 | 0 | −1 | 0 | −1 | 0 | 1 | 0 | −1 | 0 | −1 | 0 |
| 1 | 0 | −1 | 0 | 1 | 0 | 1 | 0 | 1 | 0 | −1 | 0 | 1 | 0 | 1 | 0 | −1 | 0 | 1 | 0 |
| 1 | 0 | −1 | 0 | 1 | 0 | 1 | 0 | −1 | 0 | 1 | 0 | 1 | 0 | 1 | 0 | 1 | 0 | −1 | 0 |
| 1 | 0 | 1 | 0 | −1 | 0 | 1 | 0 | 1 | 0 | 1 | 0 | 1 | 0 | 1 | 0 | 1 | 0 | −1 | 0 |
| −1 | 0 | −1 | 0 | 1 | 0 | −1 | 0 | −1 | 0 | −1 | 0 | −1 | 0 | 1 | 0 | 1 | 0 | 1 | 0 |
| −1 | 0 | 1 | 0 | −1 | 0 | 1 | 0 | −1 | 0 | −1 | 0 | −1 | 0 | 1 | 0 | 1 | 0 | 1 | 0 |
| 1 | 0 | −1 | 0 | 1 | 0 | 1 | 0 | 1 | 0 | −1 | 0 | −1 | 0 | −1 | 0 | −1 | 0 | −1 | 0 |
| −1 | 0 | 1 | 0 | −1 | 0 | −1 | 0 | 1 | 0 | −1 | 0 | −1 | 0 | −1 | 0 | −1 | 0 | 1 | 0 |
| −1 | 0 | −1 | 0 | 1 | 0 | −1 | 0 | 1 | 0 | −1 | 0 | 1 | 0 | 1 | 0 | −1 | 0 | 1 | 0 |
| 1 | 0 | 1 | 0 | −1 | 0 | 1 | 0 | −1 | 0 | −1 | 0 | 1 | 0 | −1 | 0 | −1 | 0 | −1 | 0 |
| 1 | 0 | 1 | 0 | 1 | 0 | −1 | 0 | −1 | 0 | −1 | 0 | 1 | 0 | −1 | 0 | 1 | 0 | 1 | 0 |
| −1 | 0 | −1 | 0 | −1 | 0 | 1 | 0 | 1 | 0 | 1 | 0 | 0 | 0 | 0 | 0 | 0 | 0 | −1 | 0 |
| 1 | 0 | 1 | 0 | −1 | 0 | −1 | 0 | 1 | 0 | −1 | 0 | −1 | 0 | 1 | 0 | −1 | 0 | −1 | 0 |
| −1 | 0 | 1 | 0 | 1 | 0 | 1 | 0 | −1 | 0 | 1 | 0 | −1 | 0 | −1 | 0 | −1 | 0 | 1 | 0 |
| 1 | 0 | 1 | 0 | −1 | 0 | −1 | 0 | −1 | 0 | 1 | 0 | −1 | 0 | −1 | 0 | 1 | 0 | −1 | 0 |
| 1 | 0 | 1 | 0 | 1 | 0 | −1 | 0 | 1 | 0 | 1 | 0 | −1 | 0 | 1 | 0 | 1 | 0 | −1 | 0 |
| −1 | 0 | 1 | 0 | 1 | 0 | 1 | 0 | 1 | 0 | 1 | 0 | 1 | 0 | −1 | 0 | −1 | 0 | −1 | 0 |
| 1 | 0 | −1 | 0 | −1 | 0 | −1 | 0 | −1 | 0 | 1 | 0 | 1 | 0 | 1 | 0 | −1 | 0 | 1 | 0 |
| 1 | 0 | −1 | 0 | 1 | 0 | 1 | 0 | 1 | 0 | −1 | 0 | −1 | 0 | −1 | 0 | −1 | 0 | 1 | 0 |
| −1 | 0 | −1 | 0 | −1 | 0 | 1 | 0 | 1 | 0 | 1 | 0 | 1 | 0 | 1 | 0 | 1 | 0 | −1 | 0 |
| 1 | 0 | 1 | 0 | −1 | 0 | 1 | 0 | 1 | 0 | 1 | 0 | 1 | 0 | −1 | 0 | 1 | 0 | 1 | 0 |
| −1 | 0 | 1 | 0 | −1 | 0 | 1 | 0 | 1 | 0 | −1 | 0 | 1 | 0 | −1 | 0 | −1 | 0 | −1 | 0 |
| 1 | 0 | −1 | 0 | 1 | 0 | 1 | 0 | −1 | 0 | 1 | 0 | 1 | 0 | 1 | 0 | −1 | 0 | −1 | 0 |
| −1 | 0 | 1 | 0 | 1 | 0 | 1 | 0 | −1 | 0 | 1 | 0 | −1 | 0 | −1 | 0 | 1 | 0 | −1 | 0 |
| −1 | 0 | −1 | 0 | 1 | 0 | 1 | 0 | 1 | 0 | −1 | 0 | 1 | 0 | −1 | 0 | −1 | 0 | −1 | 0 |
| 1 | 0 | 1 | 0 | 1 | 0 | −1 | 0 | −1 | 0 | −1 | 0 | 1 | 0 | −1 | 0 | −1 | 0 | 1 | 0 |
| −1 | 0 | 1 | 0 | 1 | 0 | 1 | 0 | −1 | 0 | 1 | 0 | 1 | 0 | −1 | 0 | 1 | 0 | 1 | 0 |
| −1 | 0 | 1 | 0 | 1 | 0 | −1 | 0 | 1 | 0 | 1 | 0 | 1 | 0 | 1 | 0 | −1 | 0 | 1 | 0 |
| 1 | 0 | −1 | 0 | 1 | 0 | 1 | 0 | 1 | 0 | 1 | 0 | 1 | 0 | 1 | 0 | −1 | 0 | −1 | 0 |
| −1 | 0 | 1 | 0 | −1 | 0 | −1 | 0 | −1 | 0 | −1 | 0 | 1 | 0 | 1 | 0 | 1 | 0 | −1 | 0 |

-continued

| | | | | | | | | | | | | | | | | | | | |
|---|---|---|---|---|---|---|---|---|---|---|---|---|---|---|---|---|---|---|---|
| 1 | 0 | −1 | 0 | 1 | 0 | −1 | 0 | −1 | 0 | −1 | 0 | 1 | 0 | 1 | 0 | 1 | 0 | 1 | 0 |
| −1 | 0 | 1 | 0 | 1 | 0 | 1 | 0 | −1 | 0 | −1 | 0 | −1 | 0 | −1 | 0 | −1 | 0 | −1 | 0 |
| 1 | 0 | −1 | 0 | −1 | 0 | 1 | 0 | −1 | 0 | −1 | 0 | −1 | 0 | −1 | 0 | 1 | 0 | −1 | 0 |
| −1 | 0 | 1 | 0 | −1 | 0 | 1 | 0 | −1 | 0 | 1 | 0 | 1 | 0 | −1 | 0 | 1 | 0 | 1 | 0 |
| 1 | 0 | −1 | 0 | 1 | 0 | −1 | 0 | −1 | 0 | 1 | 0 | −1 | 0 | −1 | 0 | −1 | 0 | 1 | 0 |
| 1 | 0 | 1 | 0 | −1 | 0 | −1 | 0 | −1 | 0 | 1 | 0 | −1 | 0 | 1 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 1 | 0 |
| −1 | 0 | 1 | 0 | 1 | 0 | 1 | 0 | −1 | 0 | −1 | 0 | −1 | 0 | 1 | 0 | −1 | 0 | 1 | 0 |
| 1 | 0 | 1 | 0 | −1 | 0 | −1 | 0 | −1 | 0 | 1 | 0 | 1 | 0 | 1 | 0 | −1 | 0 | 1 | 0 |
| 1 | 0 | −1 | 0 | 1 | 0 | −1 | 0 | −1 | 0 | −1 | 0 | 1 | 0 | −1 | 0 | −1 | 0 | 1 | 0 |
| −1 | 0 | −1 | 0 | 1 | 0 | −1 | 0 | −1 | 0 | 1 | 0 | −1 | 0 | −1 | 0 | −1 | 0 | −1 | 0 |
| 1 | 0 | −1 | 0 | −1 | 0 | 1 | 0 | −1 | 0 | −1 | 0 | −1 | 0 | −1 | 0 | −1 | 0 | −1 | 0 |
| 1 | 0 | 1 | 0 | 1 | 0 | −1 | 0 | 1 | 0 | 1 | 0 | 1 | 0 | 1 | 0 | −1 | 0 | −1 | 0 |
| −1 | 0 | 1 | 0 | −1 | 0 | −1 | 0 | 1 | 0 | −1 | 0 | −1 | 0 | −1 | 0 | 1 | 0 | 1 | 0 |
| 1 | 0 | 1 | 0 | −1 | 0 | 1 | 0 | 1 | 0 | 1 | 0 | −1 | 0 | −1 | 0 | −1 | 0 | −1 | 0 |
| −1 | 0 | −1 | 0 | 1 | 0 | −1 | 0 | −1 | 0 | 1 | 0 | −1 | 0 | −1 | 0 | −1 | 0 | −1 | 0 |
| 1 | 0 | −1 | 0 | −1 | 0 | 1 | 0 | −1 | 0 | 1 | 0 | −1 | 0 | 1 | 0 | 1 | 0 | −1 | 0 |
| 1 | 0 | 1 | 0 | 1 | 0 | −1 | 0 | 1 | 0 | −1 | 0 | −1 | 0 | 1 | 0 | −1 | 0 | −1 | 0 |
| −1 | 0 | 1 | 0 | 1 | 0 | 1 | 0 | −1 | 0 | −1 | 0 | −1 | 0 | 1 | 0 | −1 | 0 | 1 | 0 |
| −1 | 0 | 1 | 0 | −1 | 0 | −1 | 0 | −1 | 0 | 1 | 0 | 1 | 0 | 1 | 0 | −1 | 0 | 1 | 0 |
| −1 | 0 | −1 | 0 | −1 | 0 | 1 | 0 | 1 | 0 | 1 | 0 | −1 | 0 | −1 | 0 | −1 | 0 | 1 | 0 |
| −1 | 0 | −1 | 0 | 1 | 0 | −1 | 0 | 1 | 0 | 1 | 0 | 1 | 0 | −1 | 0 | 1 | 0 | 1 | 0 |
| −1 | 0 | 1 | 0 | 1 | 0 | −1 | 0 | 1 | 0 | 1 | 0 | −1 | 0 | 1 | 0 | 1 | 0 | 1 | 0 |
| 1 | 0 | −1 | 0 | 1 | 0 | 1 | 0 | −1 | 0 | 1 | 0 | 1 | 0 | 1 | 0 | 1 | 0 | 1 | 0 |
| 1 | 0 | −1 | 0 | −1 | 0 | −1 | 0 | 1 | 0 | −1 | 0 | −1 | 0 | −1 | 0 | −1 | 0 | 1 | 0 |
| 1 | 0 | 1 | 0 | −1 | 0 | 1 | 0 | −1 | 0 | 1 | 0 | −1 | 0 | −1 | 0 | −1 | 0 | 1 | 0 |
| 1 | 0 | 1 | 0 | 1 | 0 | −1 | 0 | 1 | 0 | 1 | 0 | 1 | 0 | −1 | 0 | −1 | 0 | −1 | 0 |
| −1 | 0 | −1 | 0 | −1 | 0 | 1 | 0 | −1 | 0 | −1 | 0 | 1 | 0 | −1 | 0 | −1 | 0 | −1 | 0 |
| −1 | 0 | 1 | 0 | −1 | 0 | −1 | 0 | 1 | 0 | −1 | 0 | 1 | 0 | −1 | 0 | 1 | 0 | 1 | 0 |
| −1 | 0 | 1 | 0 | 1 | 0 | 1 | 0 | −1 | 0 | 1 | 0 | −1 | 0 | −1 | 0 | 1 | 0 | −1 | 0 |
| −1 | 0 | −1 | 0 | 1 | 0 | 1 | 0 | 1 | 0 | −1 | 0 | −1 | 0 | −1 | 0 | 1 | 0 | −1 | 0 |
| 1 | 0 | 1 | 0 | −1 | 0 | −1 | 0 | −1 | 0 | 1 | 0 | 1 | 0 | 1 | 0 | 0 | 0 | 0 | 0 |
| 0 | 0 | 1 | 0 | −1 | 0 | −1 | 0 | 1 | 0 | 1 | 0 | −1 | 0 | 1 | 0 | 1 | 0 | −1 | 0 |
| 1 | 0 | 1 | 0 | 1 | 0 | −1 | 0 | −1 | 0 | −1 | 0 | 1 | 0 | −1 | 0 | 1 | 0 | 1 | 0 |
| 1 | 0 | −1 | 0 | −1 | 0 | −1 | 0 | 1 | 0 | 1 | 0 | 1 | 0 | −1 | 0 | 1 | 0 | 1 | 0 |
| −1 | 0 | 1 | 0 | −1 | 0 | −1 | 0 | −1 | 0 | 1 | 0 | −1 | 0 | −1 | 0 | 1 | 0 | −1 | 0 |
| −1 | 0 | 1 | 0 | −1 | 0 | −1 | 0 | 1 | 0 | −1 | 0 | −1 | 0 | −1 | 0 | −1 | 0 | 1 | 0 |
| −1 | 0 | −1 | 0 | 1 | 0 | −1 | 0 | −1 | 0 | −1 | 0 | −1 | 0 | −1 | 0 | −1 | 0 | 1 | 0 |
| 1 | 0 | 1 | 0 | −1 | 0 | 1 | 0 | 1 | 0 | 1 | 0 | 1 | 0 | −1 | 0 | −1 | 0 | −1 | 0 |
| 1 | 0 | −1 | 0 | −1 | 0 | 1 | 0 | −1 | 0 | −1 | 0 | −1 | 0 | 1 | 0 | 1 | 0 | 1 | 0 |
| 1 | 0 | −1 | 0 | 1 | 0 | 1 | 0 | 1 | 0 | −1 | 0 | −1 | 0 | −1 | 0 | −1 | 0 | −1 | 0 |
| −1 | 0 | 1 | 0 | −1 | 0 | −1 | 0 | 1 | 0 | −1 | 0 | −1 | 0 | −1 | 0 | −1 | 0 | 1 | 0 |
| −1 | 0 | −1 | 0 | 1 | 0 | −1 | 0 | 1 | 0 | −1 | 0 | 1 | 0 | 1 | 0 | −1 | 0 | 1 | 0 |
| 1 | 0 | 1 | 0 | −1 | 0 | 1 | 0 | −1 | 0 | −1 | 0 | 1 | 0 | −1 | 0 | −1 | 0 | −1 | 0 |
| 1 | 0 | 1 | 0 | 1 | 0 | −1 | 0 | −1 | 0 | −1 | 0 | 1 | 0 | −1 | 0 | 1 | 0 | 1 | 0 |
| −1 | 0 | 1 | 0 | 1 | 0 | 1 | 0 | −1 | 0 | −1 | 0 | −1 | 0 | 1 | 0 | −1 | 0 | 1 | 0 |
| 1 | 0 | 1 | 0 | −1 | 0 | −1 | 0 | −1 | 0 | 1 | 0 | 1 | 0 | 1 | 0 | −1 | 0 | 1 | 0 |
| 1 | 0 | −1 | 0 | 1 | 0 | −1 | 0 | −1 | 0 | −1 | 0 | 1 | 0 | −1 | 0 | −1 | 0 | 1 | 0 |
| −1 | 0 | −1 | 0 | 1 | 0 | −1 | 0 | −1 | 0 | 1 | 0 | −1 | 0 | −1 | 0 | −1 | 0 | −1 | 0 |
| 1 | 0 | −1 | 0 | −1 | 0 | 1 | 0 | −1 | 0 | −1 | 0 | −1 | 0 | −1 | 0 | −1 | 0 | −1 | 0 |
| 1 | 0 | 1 | 0 | 1 | 0 | −1 | 0 | 1 | 0 | 1 | 0 | 1 | 0 | 1 | 0 | −1 | 0 | −1 | 0 |
| −1 | 0 | 1 | 0 | −1 | 0 | 1 | 0 | −1 | 0 | 1 | 0 | 1 | 0 | 1 | 0 | −1 | 0 | −1 | 0 |
| −1 | 0 | −1 | 0 | 1 | 0 | −1 | 0 | −1 | 0 | −1 | 0 | 1 | 0 | 1 | 0 | 1 | 0 | 1 | 0 |
| 1 | 0 | 1 | 0 | −1 | 0 | 1 | 0 | 1 | 0 | −1 | 0 | 1 | 0 | 1 | 0 | 1 | 0 | 1 | 0 |
| −1 | 0 | 1 | 0 | 1 | 0 | −1 | 0 | 1 | 0 | −1 | 0 | 1 | 0 | −1 | 0 | −1 | 0 | 1 | 0 |
| −1 | 0 | −1 | 0 | −1 | 0 | 1 | 0 | −1 | 0 | 1 | 0 | 1 | 0 | −1 | 0 | 1 | 0 | 1 | 0 |
| 1 | 0 | −1 | 0 | −1 | 0 | −1 | 0 | 1 | 0 | 1 | 0 | 1 | 0 | −1 | 0 | 1 | 0 | −1 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | −1 | 0 | 1 | 0 | −1 | 0 | −1 | 0 | −1 | 0 | 1 | 0 | 1 | 0 | 1 | 0 | −1 | 0 |
| 1 | 0 | −1 | 0 | −1 | 0 | −1 | 0 | 1 | 0 | 1 | 0 | 1 | 0 | −1 | 0 | −1 | 0 | −1 | 0 |
| 1 | 0 | −1 | 0 | −1 | 0 | 1 | 0 | −1 | 0 | 1 | 0 | 1 | 0 | 1 | 0 | −1 | 0 | 1 | 0 |
| 1 | 0 | −1 | 0 | 1 | 0 | 1 | 0 | −1 | 0 | 1 | 0 | 1 | 0 | −1 | 0 | 1 | 0 | 1 | 0 |
| 1 | 0 | 1 | 0 | −1 | 0 | 1 | 0 | 1 | 0 | −1 | 0 | 1 | 0 | 1 | 0 | 1 | 0 | 1 | 0 |
| 1 | 0 | 1 | 0 | −1 | 0 | −1 | 0 | −1 | 0 | 1 | 0 | −1 | 0 | −1 | 0 | −1 | 0 | −1 | 0 |
| 1 | 0 | 1 | 0 | 1 | 0 | −1 | 0 | 1 | 0 | 1 | 0 | −1 | 0 | 1 | 0 | 1 | 0 | 1 | 0 |
| −1 | 0 | −1 | 0 | −1 | 0 | −1 | 0 | 1 | 0 | −1 | 0 | −1 | 0 | −1 | 0 | 1 | 0 | 1 | 0 |
| 1 | 0 | 1 | 0 | 1 | 0 | 1 | 0 | −1 | 0 | 1 | 0 | 1 | 0 | −1 | 0 | 1 | 0 | 1 | 0 |
| 1 | 0 | 1 | 0 | −1 | 0 | 1 | 0 | 1 | 0 | −1 | 0 | 1 | 0 | −1 | 0 | 1 | 0 | −1 | 0 |
| −1 | 0 | 1 | 0 | −1 | 0 | −1 | 0 | −1 | 0 | 1 | 0 | −1 | 0 | 1 | 0 | 1 | 0 | −1 | 0 |
| 1 | 0 | 1 | 0 | 1 | 0 | −1 | 0 | −1 | 0 | −1 | 0 | 1 | 0 | 1 | 0 | 1 | 0 | −1 | 0 |
| 1 | 0 | −1 | 0 | 1 | 0 | −1 | 0 | 1 | 0 | 1 | 0 | 1 | 0 | −1 | 0 | −1 | 0 | −1 | 0 |
| 1 | 0 | −1 | 0 | 1 | 0 | 1 | 0 | 1 | 0 | −1 | 0 | −1 | 0 | −1 | 0 | 1 | 0 | 1 | 0 |
| 1 | 0 | −1 | 0 | 1 | 0 | 1 | 0 | −1 | 0 | 1 | 0 | −1 | 0 | −1 | 0 | −1 | 0 | 1 | 0 |
| −1 | 0 | −1 | 0 | 1 | 0 | −1 | 0 | −1 | 0 | 1 | 0 | −1 | 0 | −1 | 0 | 1 | 0 | −1 | 0 |
| −1 | 0 | −1 | 0 | −1 | 0 | 1 | 0 | −1 | 0 | −1 | 0 | 1 | 0 | −1 | 0 | −1 | 0 | −1 | 0 |
| −1 | 0 | −1 | 0 | −1 | 0 | 1 | 0 | 1 | 0 | 1 | 0 | −1 | 0 | 1 | 0 | 1 | 0 | 1 | 0 |
| 1 | 0 | −1 | 0 | −1 | 0 | −1 | 0 | 1 | 0 | −1 | 0 | 1 | 0 | −1 | 0 | 1 | 0 | 1 | 0 |
| 1 | 0 | −1 | 0 | −1 | 0 | −1 | 0 | −1 | 0 | 1 | 0 | −1 | 0 | −1 | 0 | −1 | 0 | 1 | 0 |
| 1 | 0 | 1 | 0 | 1 | 0 | 1 | 0 | 1 | 0 | −1 | 0 | 1 | 0 | 1 | 0 | −1 | 0 | 1 | 0 |

-continued

| | | | | | | | | | | | | | | | | | | | |
|---|---|---|---|---|---|---|---|---|---|---|---|---|---|---|---|---|---|---|---|
| 1 | 0 | 1 | 0 | 1 | 0 | -1 | 0 | 1 | 0 | 1 | 0 | -1 | 0 | 1 | 0 | -1 | 0 | 1 | 0 |
| -1 | 0 | -1 | 0 | 1 | 0 | -1 | 0 | -1 | 0 | -1 | 0 | 1 | 0 | -1 | 0 | 1 | 0 | 1 | 0 |
| -1 | 0 | 1 | 0 | 1 | 0 | 1 | 0 | -1 | 0 | -1 | 0 | -1 | 0 | 1 | 0 | 1 | 0 | 1 | 0 |
| -1 | 0 | 1 | 0 | -1 | 0 | -1 | 0 | 1 | 0 | 1 | 0 | 1 | 0 | -1 | 0 | -1 | 0 | -1 | 0 |
| 0 | 0 | 0 | 0 | 0 | 0 | 1 | 0 | -1 | 0 | -1 | 0 | 1 | 0 | 1 | 0 | -1 | 0 | 1 | 0 |
| 1 | 0 | -1 | 0 | 1 | 0 | 1 | 0 | 1 | 0 | -1 | 0 | -1 | 0 | -1 | 0 | 1 | 0 | -1 | 0 |
| 1 | 0 | 1 | 0 | 1 | 0 | -1 | 0 | -1 | 0 | -1 | 0 | 1 | 0 | 1 | 0 | 1 | 0 | -1 | 0 |
| 1 | 0 | 1 | 0 | -1 | 0 | 1 | 0 | -1 | 0 | -1 | 0 | -1 | 0 | 1 | 0 | -1 | 0 | -1 | 0 |
| 1 | 0 | -1 | 0 | -1 | 0 | 1 | 0 | -1 | 0 | -1 | 0 | 1 | 0 | -1 | 0 | -1 | 0 | -1 | 0 |
| -1 | 0 | 1 | 0 | -1 | 0 | -1 | 0 | 1 | 0 | -1 | 0 | -1 | 0 | -1 | 0 | -1 | 0 | -1 | 0 |
| -1 | 0 | 1 | 0 | 1 | 0 | 1 | 0 | -1 | 0 | 1 | 0 | 1 | 0 | 1 | 0 | 1 | 0 | -1 | 0 |
| -1 | 0 | -1 | 0 | 1 | 0 | -1 | 0 | -1 | 0 | 1 | 0 | -1 | 0 | -1 | 0 | -1 | 0 | 1 | 0 |
| 1 | 0 | 1 | 0 | 1 | 0 | -1 | 0 | 1 | 0 | 1 | 0 | 1 | 0 | -1 | 0 | -1 | 0 | -1 | 0 |
| -1 | 0 | -1 | 0 | -1 | 0 | 1 | 0 | -1 | 0 | -1 | 0 | 1 | 0 | -1 | 0 | -1 | 0 | -1 | 0 |
| -1 | 0 | 1 | 0 | -1 | 0 | -1 | 0 | 1 | 0 | -1 | 0 | 1 | 0 | -1 | 0 | 1 | 0 | 1 | 0 |
| -1 | 0 | 1 | 0 | 1 | 0 | 1 | 0 | -1 | 0 | 1 | 0 | -1 | 0 | -1 | 0 | 1 | 0 | -1 | 0 |
| -1 | 0 | -1 | 0 | 1 | 0 | 1 | 0 | 1 | 0 | -1 | 0 | -1 | 0 | -1 | 0 | 1 | 0 | -1 | 0 |
| 1 | 0 | 1 | 0 | -1 | 0 | 1 | 0 | 1 | 0 | 1 | 0 | -1 | 0 | -1 | 0 | -1 | 0 | 1 | 0 |
| -1 | 0 | 1 | 0 | 1 | 0 | 1 | 0 | -1 | 0 | -1 | 0 | -1 | 0 | 1 | 0 | 1 | 0 | 1 | 0 |
| -1 | 0 | 1 | 0 | 1 | 0 | -1 | 0 | 1 | 0 | -1 | 0 | -1 | 0 | -1 | 0 | 1 | 0 | -1 | 0 |
| -1 | 0 | 1 | 0 | -1 | 0 | -1 | 0 | 1 | 0 | -1 | 0 | -1 | 0 | 1 | 0 | -1 | 0 | -1 | 0 |
| -1 | 0 | -1 | 0 | 1 | 0 | -1 | 0 | -1 | 0 | 1 | 0 | -1 | 0 | -1 | 0 | -1 | 0 | -1 | 0 |
| -1 | 0 | -1 | 0 | 1 | 0 | 1 | 0 | 1 | 0 | -1 | 0 | 1 | 0 | 1 | 0 | 1 | 0 | 1 | 0 |
| -1 | 0 | -1 | 0 | -1 | 0 | 1 | 0 | -1 | 0 | 1 | 0 | -1 | 0 | 1 | 0 | 1 | 0 | 1 | 0 |
| -1 | 0 | -1 | 0 | -1 | 0 | -1 | 0 | 1 | 0 | -1 | 0 | -1 | 0 | -1 | 0 | 1 | 0 | 1 | 0 |
| 1 | 0 | 1 | 0 | 1 | 0 | 1 | 0 | -1 | 0 | 1 | 0 | 1 | 0 | -1 | 0 | 1 | 0 | 1 | 0 |
| 1 | 0 | 1 | 0 | -1 | 0 | 1 | 0 | 1 | 0 | -1 | 0 | 1 | 0 | -1 | 0 | 1 | 0 | -1 | 0 |
| -1 | 0 | 1 | 0 | -1 | 0 | -1 | 0 | -1 | 0 | 1 | 0 | -1 | 0 | 1 | 0 | 1 | 0 | -1 | 0 |
| 1 | 0 | 1 | 0 | 1 | 0 | -1 | 0 | -1 | 0 | -1 | 0 | 1 | 0 | 1 | 0 | 1 | 0 | -1 | 0 |
| 1 | 0 | -1 | 0 | 0 | 0 | 0 | 0 | 0 | 0 | 0 | 0 | 0 | 0} | | | | | | |

(4) A possible 2×LTF sequence in the 320 MHz bandwidth, including 4096 elements and denoted as a sequence 4.

| | | | | | | | | | | | | | | | | | | | |
|---|---|---|---|---|---|---|---|---|---|---|---|---|---|---|---|---|---|---|---|
| | | Sequence 4= | | | | | | | | | | | | | | | | | |
| | | {0 | 0 | 0 | 0 | 0 | 0 | 0 | 0 | 0 | 0 | 0 | 0 | 1 | 0 | 1 | 0 | -1 | 0 |
| 1 | 0 | 1 | 0 | 1 | 0 | -1 | 0 | 1 | 0 | 1 | 0 | 1 | 0 | 1 | 0 | -1 | 0 | -1 | 0 |
| -1 | 0 | 1 | 0 | -1 | 0 | -1 | 0 | 1 | 0 | 1 | 0 | -1 | 0 | 1 | 0 | 1 | 0 | 1 | 0 |
| 1 | 0 | -1 | 0 | -1 | 0 | -1 | 0 | 1 | 0 | 1 | 0 | 1 | 0 | 1 | 0 | -1 | 0 | 1 | 0 |
| 1 | 0 | 1 | 0 | -1 | 0 | 1 | 0 | -1 | 0 | -1 | 0 | 1 | 0 | -1 | 0 | -1 | 0 | -1 | 0 |
| 1 | 0 | 1 | 0 | -1 | 0 | 1 | 0 | -1 | 0 | 1 | 0 | -1 | 0 | -1 | 0 | 1 | 0 | -1 | 0 |
| 1 | 0 | 1 | 0 | -1 | 0 | 1 | 0 | 1 | 0 | -1 | 0 | 1 | 0 | -1 | 0 | -1 | 0 | -1 | 0 |
| 1 | 0 | -1 | 0 | -1 | 0 | -1 | 0 | -1 | 0 | 1 | 0 | -1 | 0 | -1 | 0 | 1 | 0 | 1 | 0 |
| -1 | 0 | 1 | 0 | -1 | 0 | 1 | 0 | -1 | 0 | -1 | 0 | -1 | 0 | -1 | 0 | 1 | 0 | -1 | 0 |
| 1 | 0 | 1 | 0 | 1 | 0 | -1 | 0 | 1 | 0 | 1 | 0 | 1 | 0 | 1 | 0 | -1 | 0 | -1 | 0 |
| -1 | 0 | 1 | 0 | 1 | 0 | 1 | 0 | -1 | 0 | -1 | 0 | 1 | 0 | 1 | 0 | 1 | 0 | -1 | 0 |
| 1 | 0 | 1 | 0 | -1 | 0 | 1 | 0 | -1 | 0 | -1 | 0 | -1 | 0 | -1 | 0 | 1 | 0 | -1 | 0 |
| -1 | 0 | -1 | 0 | 1 | 0 | -1 | 0 | 1 | 0 | 1 | 0 | -1 | 0 | 1 | 0 | 1 | 0 | -1 | 0 |
| -1 | 0 | -1 | 0 | 1 | 0 | -1 | 0 | -1 | 0 | -1 | 0 | 1 | 0 | -1 | 0 | 1 | 0 | 1 | 0 |
| -1 | 0 | 1 | 0 | 1 | 0 | 1 | 0 | -1 | 0 | -1 | 0 | 1 | 0 | 1 | 0 | 1 | 0 | -1 | 0 |
| 1 | 0 | 1 | 0 | -1 | 0 | 1 | 0 | -1 | 0 | -1 | 0 | 1 | 0 | -1 | 0 | 1 | 0 | 1 | 0 |
| 1 | 0 | -1 | 0 | 1 | 0 | 1 | 0 | 1 | 0 | 1 | 0 | -1 | 0 | -1 | 0 | -1 | 0 | 1 | 0 |
| -1 | 0 | -1 | 0 | 1 | 0 | 1 | 0 | -1 | 0 | 1 | 0 | 1 | 0 | 1 | 0 | -1 | 0 | -1 | 0 |
| -1 | 0 | -1 | 0 | 1 | 0 | 1 | 0 | 1 | 0 | -1 | 0 | -1 | 0 | -1 | 0 | -1 | 0 | 1 | 0 |
| 1 | 0 | -1 | 0 | -1 | 0 | 1 | 0 | -1 | 0 | 1 | 0 | 1 | 0 | 1 | 0 | -1 | 0 | -1 | 0 |
| 1 | 0 | 1 | 0 | 1 | 0 | -1 | 0 | 1 | 0 | 1 | 0 | -1 | 0 | 1 | 0 | -1 | 0 | -1 | 0 |
| -1 | 0 | -1 | 0 | 1 | 0 | -1 | 0 | -1 | 0 | -1 | 0 | 1 | 0 | -1 | 0 | 1 | 0 | 1 | 0 |
| -1 | 0 | 1 | 0 | 1 | 0 | -1 | 0 | 1 | 0 | 1 | 0 | -1 | 0 | -1 | 0 | 1 | 0 | -1 | 0 |
| -1 | 0 | -1 | 0 | 1 | 0 | 1 | 0 | 1 | 0 | 1 | 0 | -1 | 0 | 1 | 0 | -1 | 0 | -1 | 0 |
| -1 | 0 | 1 | 0 | -1 | 0 | -1 | 0 | -1 | 0 | -1 | 0 | 1 | 0 | 1 | 0 | 1 | 0 | 1 | 0 |
| -1 | 0 | -1 | 0 | -1 | 0 | 1 | 0 | 1 | 0 | 1 | 0 | 0 | 0 | 0 | 0 | 0 | 0 | 1 | 0 |
| -1 | 0 | -1 | 0 | 1 | 0 | 1 | 0 | -1 | 0 | 1 | 0 | -1 | 0 | -1 | 0 | -1 | 0 | 1 | 0 |
| 1 | 0 | 1 | 0 | 1 | 0 | -1 | 0 | 1 | 0 | 1 | 0 | 1 | 0 | -1 | 0 | 1 | 0 | -1 | 0 |
| -1 | 0 | -1 | 0 | -1 | 0 | 1 | 0 | 1 | 0 | 1 | 0 | -1 | 0 | 1 | 0 | 1 | 0 | -1 | 0 |
| -1 | 0 | 1 | 0 | -1 | 0 | -1 | 0 | 1 | 0 | -1 | 0 | -1 | 0 | 1 | 0 | -1 | 0 | 1 | 0 |
| 1 | 0 | 1 | 0 | -1 | 0 | 1 | 0 | 1 | 0 | 1 | 0 | 1 | 0 | -1 | 0 | 1 | 0 | -1 | 0 |
| -1 | 0 | 1 | 0 | -1 | 0 | -1 | 0 | -1 | 0 | 1 | 0 | 1 | 0 | -1 | 0 | -1 | 0 | -1 | 0 |
| 1 | 0 | -1 | 0 | 1 | 0 | 1 | 0 | 1 | 0 | -1 | 0 | 1 | 0 | 1 | 0 | 1 | 0 | 1 | 0 |
| -1 | 0 | -1 | 0 | -1 | 0 | 1 | 0 | 1 | 0 | 1 | 0 | 1 | 0 | -1 | 0 | -1 | 0 | -1 | 0 |
| 1 | 0 | -1 | 0 | -1 | 0 | 1 | 0 | 1 | 0 | -1 | 0 | 1 | 0 | 1 | 0 | 1 | 0 | -1 | 0 |
| -1 | 0 | -1 | 0 | -1 | 0 | 1 | 0 | -1 | 0 | -1 | 0 | -1 | 0 | 1 | 0 | -1 | 0 | 1 | 0 |
| 1 | 0 | -1 | 0 | 1 | 0 | -1 | 0 | -1 | 0 | 1 | 0 | -1 | 0 | -1 | 0 | -1 | 0 | 1 | 0 |
| 1 | 0 | -1 | 0 | -1 | 0 | -1 | 0 | 1 | 0 | -1 | 0 | -1 | 0 | 1 | 0 | -1 | 0 | 1 | 0 |
| 1 | 0 | 1 | 0 | -1 | 0 | 1 | 0 | 1 | 0 | 1 | 0 | -1 | 0 | 1 | 0 | -1 | 0 | 1 | 0 |
| 1 | 0 | -1 | 0 | 1 | 0 | -1 | 0 | -1 | 0 | -1 | 0 | 1 | 0 | -1 | 0 | -1 | 0 | -1 | 0 |

-continued

| | | | | | | | | | | | | | | | | | | | |
|---|---|---|---|---|---|---|---|---|---|---|---|---|---|---|---|---|---|---|---|
| −1 | 0 | 1 | 0 | −1 | 0 | 1 | 0 | 1 | 0 | −1 | 0 | 1 | 0 | 1 | 0 | 1 | 0 | −1 | 0 |
| −1 | 0 | 1 | 0 | 1 | 0 | 1 | 0 | −1 | 0 | −1 | 0 | −1 | 0 | 1 | 0 | 1 | 0 | 1 | 0 |
| 1 | 0 | −1 | 0 | 1 | 0 | 1 | 0 | 1 | 0 | −1 | 0 | 1 | 0 | −1 | 0 | −1 | 0 | −1 | 0 |
| −1 | 0 | 1 | 0 | 1 | 0 | 1 | 0 | −1 | 0 | 1 | 0 | 1 | 0 | −1 | 0 | −1 | 0 | 1 | 0 |
| −1 | 0 | −1 | 0 | −1 | 0 | −1 | 0 | 1 | 0 | −1 | 0 | −1 | 0 | −1 | 0 | 1 | 0 | −1 | 0 |
| 1 | 0 | −1 | 0 | −1 | 0 | 1 | 0 | 1 | 0 | −1 | 0 | 1 | 0 | −1 | 0 | −1 | 0 | 1 | 0 |
| −1 | 0 | −1 | 0 | −1 | 0 | 1 | 0 | 1 | 0 | −1 | 0 | −1 | 0 | −1 | 0 | 1 | 0 | −1 | 0 |
| −1 | 0 | 1 | 0 | −1 | 0 | 1 | 0 | 1 | 0 | 1 | 0 | −1 | 0 | 1 | 0 | 1 | 0 | 1 | 0 |
| 1 | 0 | −1 | 0 | −1 | 0 | – | 0 | −1 | 0 | 1 | 0 | 1 | 0 | 1 | 0 | −1 | 0 | 1 | 0 |
| 1 | 0 | −1 | 0 | −1 | 0 | 1 | 0 | −1 | 0 | −1 | 0 | −1 | 0 | 1 | 0 | 1 | 0 | 1 | 0 |
| 1 | 0 | −1 | 0 | 1 | 0 | 1 | 0 | 1 | 0 | −1 | 0 | 1 | 0 | 1 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 1 | 0 |
| 1 | 0 | −1 | 0 | 1 | 0 | 1 | 0 | 1 | 0 | −1 | 0 | 1 | 0 | 1 | 0 | 1 | 0 | 1 | 0 |
| −1 | 0 | −1 | 0 | −1 | 0 | 1 | 0 | −1 | 0 | −1 | 0 | 1 | 0 | 1 | 0 | −1 | 0 | 1 | 0 |
| 1 | 0 | 1 | 0 | −1 | 0 | −1 | 0 | −1 | 0 | −1 | 0 | 1 | 0 | 1 | 0 | 1 | 0 | 1 | 0 |
| −1 | 0 | 1 | 0 | 1 | 0 | 1 | 0 | −1 | 0 | 1 | 0 | −1 | 0 | −1 | 0 | 1 | 0 | −1 | 0 |
| −1 | 0 | −1 | 0 | 1 | 0 | 1 | 0 | −1 | 0 | −1 | 0 | −1 | 0 | 1 | 0 | −1 | 0 | −1 | 0 |
| 1 | 0 | −1 | 0 | 1 | 0 | 1 | 0 | −1 | 0 | 1 | 0 | 1 | 0 | −1 | 0 | 1 | 0 | −1 | 0 |
| −1 | 0 | −1 | 0 | 1 | 0 | −1 | 0 | −1 | 0 | −1 | 0 | −1 | 0 | 1 | 0 | −1 | 0 | −1 | 0 |
| 1 | 0 | 1 | 0 | −1 | 0 | 1 | 0 | 1 | 0 | 1 | 0 | −1 | 0 | −1 | 0 | −1 | 0 | −1 | 0 |
| 1 | 0 | −1 | 0 | 1 | 0 | 1 | 0 | 1 | 0 | −1 | 0 | 1 | 0 | 1 | 0 | 1 | 0 | 1 | 0 |
| −1 | 0 | −1 | 0 | −1 | 0 | 1 | 0 | 1 | 0 | 1 | 0 | −1 | 0 | 1 | 0 | 1 | 0 | 1 | 0 |
| 1 | 0 | −1 | 0 | 1 | 0 | 1 | 0 | −1 | 0 | 1 | 0 | −1 | 0 | −1 | 0 | −1 | 0 | −1 | 0 |
| 1 | 0 | −1 | 0 | −1 | 0 | −1 | 0 | 1 | 0 | −1 | 0 | 1 | 0 | 1 | 0 | −1 | 0 | 1 | 0 |
| 1 | 0 | −1 | 0 | −1 | 0 | −1 | 0 | −1 | 0 | −1 | 0 | −1 | 0 | −1 | 0 | 1 | 0 | −1 | 0 |
| 1 | 0 | 1 | 0 | −1 | 0 | 1 | 0 | 1 | 0 | 1 | 0 | −1 | 0 | −1 | 0 | 1 | 0 | 1 | 0 |
| 1 | 0 | −1 | 0 | 1 | 0 | 1 | 0 | −1 | 0 | 1 | 0 | −1 | 0 | −1 | 0 | 1 | 0 | −1 | 0 |
| 1 | 0 | 1 | 0 | 1 | 0 | −1 | 0 | 1 | 0 | 1 | 0 | 1 | 0 | 1 | 0 | −1 | 0 | −1 | 0 |
| −1 | 0 | 1 | 0 | −1 | 0 | −1 | 0 | 1 | 0 | 1 | 0 | −1 | 0 | 1 | 0 | 1 | 0 | 1 | 0 |
| −1 | 0 | −1 | 0 | −1 | 0 | −1 | 0 | 1 | 0 | 1 | 0 | 1 | 0 | −1 | 0 | −1 | 0 | −1 | 0 |
| −1 | 0 | 1 | 0 | −1 | 0 | −1 | 0 | −1 | 0 | 1 | 0 | −1 | 0 | 1 | 0 | 1 | 0 | 1 | 0 |
| −1 | 0 | −1 | 0 | 1 | 0 | 1 | 0 | 1 | 0 | −1 | 0 | 1 | 0 | 1 | 0 | −1 | 0 | 1 | 0 |
| −1 | 0 | −1 | 0 | −1 | 0 | −1 | 0 | 1 | 0 | −1 | 0 | −1 | 0 | −1 | 0 | 1 | 0 | −1 | 0 |
| 1 | 0 | 1 | 0 | −1 | 0 | 1 | 0 | 1 | 0 | −1 | 0 | 1 | 0 | 1 | 0 | −1 | 0 | −1 | 0 |
| 1 | 0 | −1 | 0 | −1 | 0 | −1 | 0 | 1 | 0 | 1 | 0 | 1 | 0 | 1 | 0 | −1 | 0 | 1 | 0 |
| −1 | 0 | −1 | 0 | −1 | 0 | 1 | 0 | −1 | 0 | −1 | 0 | −1 | 0 | −1 | 0 | 1 | 0 | 1 | 0 |
| 1 | 0 | −1 | 0 | 1 | 0 | 1 | 0 | 1 | 0 | −1 | 0 | −1 | 0 | −1 | 0 | 0 | 0 | 0 | 0 |
| 0 | 0 | −1 | 0 | 1 | 0 | 1 | 0 | −1 | 0 | −1 | 0 | 1 | 0 | −1 | 0 | 1 | 0 | 1 | 0 |
| 1 | 0 | −1 | 0 | −1 | 0 | −1 | 0 | −1 | 0 | 1 | 0 | −1 | 0 | −1 | 0 | −1 | 0 | 1 | 0 |
| −1 | 0 | 1 | 0 | 1 | 0 | 1 | 0 | 1 | 0 | −1 | 0 | −1 | 0 | −1 | 0 | 1 | 0 | −1 | 0 |
| −1 | 0 | 1 | 0 | 1 | 0 | −1 | 0 | 1 | 0 | 1 | 0 | −1 | 0 | 1 | 0 | 1 | 0 | −1 | 0 |
| 1 | 0 | −1 | 0 | −1 | 0 | −1 | 0 | 1 | 0 | −1 | 0 | −1 | 0 | −1 | 0 | −1 | 0 | 1 | 0 |
| −1 | 0 | 1 | 0 | 1 | 0 | −1 | 0 | 1 | 0 | 1 | 0 | 1 | 0 | −1 | 0 | −1 | 0 | 1 | 0 |
| 1 | 0 | 1 | 0 | −1 | 0 | 1 | 0 | −1 | 0 | −1 | 0 | −1 | 0 | 1 | 0 | −1 | 0 | −1 | 0 |
| −1 | 0 | −1 | 0 | 1 | 0 | 1 | 0 | 1 | 0 | −1 | 0 | −1 | 0 | −1 | 0 | −1 | 0 | 1 | 0 |
| 1 | 0 | 1 | 0 | −1 | 0 | 1 | 0 | 1 | 0 | −1 | 0 | −1 | 0 | 1 | 0 | −1 | 0 | −1 | 0 |
| −1 | 0 | 1 | 0 | 1 | 0 | 1 | 0 | 1 | 0 | −1 | 0 | 1 | 0 | 1 | 0 | 1 | 0 | −1 | 0 |
| 1 | 0 | −1 | 0 | −1 | 0 | 1 | 0 | −1 | 0 | 1 | 0 | 1 | 0 | −1 | 0 | 1 | 0 | 1 | 0 |
| 1 | 0 | −1 | 0 | −1 | 0 | 1 | 0 | 1 | 0 | 1 | 0 | −1 | 0 | 1 | 0 | 1 | 0 | −1 | 0 |
| 1 | 0 | −1 | 0 | −1 | 0 | −1 | 0 | 1 | 0 | −1 | 0 | −1 | 0 | −1 | 0 | 1 | 0 | −1 | 0 |
| 1 | 0 | −1 | 0 | −1 | 0 | 1 | 0 | −1 | 0 | 1 | 0 | 1 | 0 | 1 | 0 | −1 | 0 | 1 | 0 |
| 1 | 0 | 1 | 0 | 1 | 0 | −1 | 0 | 1 | 0 | −1 | 0 | −1 | 0 | 1 | 0 | −1 | 0 | −1 | 0 |
| −1 | 0 | 1 | 0 | 1 | 0 | −1 | 0 | −1 | 0 | −1 | 0 | 1 | 0 | 1 | 0 | 1 | 0 | −1 | 0 |
| −1 | 0 | −1 | 0 | −1 | 0 | 1 | 0 | −1 | 0 | −1 | 0 | −1 | 0 | 1 | 0 | −1 | 0 | 1 | 0 |
| 1 | 0 | 1 | 0 | 1 | 0 | −1 | 0 | −1 | 0 | −1 | 0 | 1 | 0 | −1 | 0 | −1 | 0 | 1 | 0 |
| 1 | 0 | −1 | 0 | 1 | 0 | 1 | 0 | 1 | 0 | 1 | 0 | −1 | 0 | 1 | 0 | 1 | 0 | 1 | 0 |
| −1 | 0 | 1 | 0 | −1 | 0 | −1 | 0 | 1 | 0 | −1 | 0 | −1 | 0 | 1 | 0 | −1 | 0 | 1 | 0 |
| 1 | 0 | −1 | 0 | 1 | 0 | 1 | 0 | 1 | 0 | −1 | 0 | −1 | 0 | 1 | 0 | 1 | 0 | 1 | 0 |
| −1 | 0 | 1 | 0 | 1 | 0 | −1 | 0 | 1 | 0 | −1 | 0 | −1 | 0 | −1 | 0 | 1 | 0 | −1 | 0 |
| −1 | 0 | −1 | 0 | −1 | 0 | 1 | 0 | 1 | 0 | 1 | 0 | 1 | 0 | −1 | 0 | −1 | 0 | −1 | 0 |
| 1 | 0 | −1 | 0 | −1 | 0 | 1 | 0 | 1 | 0 | −1 | 0 | 1 | 0 | 1 | 0 | 1 | 0 | −1 | 0 |
| −1 | 0 | −1 | 0 | −1 | 0 | 1 | 0 | −1 | 0 | −1 | 0 | −1 | 0 | 1 | 0 | −1 | 0 | −1 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | −1 | 0 | −1 | 0 | 1 | 0 | −1 | 0 | −1 | 0 | −1 | 0 | 1 | 0 | −1 | 0 | −1 | 0 |
| −1 | 0 | −1 | 0 | 1 | 0 | 1 | 0 | 1 | 0 | −1 | 0 | 1 | 0 | 1 | 0 | −1 | 0 | −1 | 0 |
| 1 | 0 | −1 | 0 | −1 | 0 | −1 | 0 | 1 | 0 | 1 | 0 | 1 | 0 | 1 | 0 | −1 | 0 | −1 | 0 |
| −1 | 0 | −1 | 0 | 1 | 0 | −1 | 0 | −1 | 0 | −1 | 0 | 1 | 0 | −1 | 0 | 1 | 0 | 1 | 0 |
| −1 | 0 | 1 | 0 | 1 | 0 | 1 | 0 | −1 | 0 | −1 | 0 | 1 | 0 | 1 | 0 | 1 | 0 | −1 | 0 |
| 1 | 0 | 1 | 0 | −1 | 0 | 1 | 0 | −1 | 0 | −1 | 0 | 1 | 0 | −1 | 0 | −1 | 0 | 1 | 0 |
| −1 | 0 | 1 | 0 | 1 | 0 | 1 | 0 | −1 | 0 | 1 | 0 | 1 | 0 | 1 | 0 | 1 | 0 | −1 | 0 |
| 1 | 0 | 1 | 0 | −1 | 0 | −1 | 0 | 1 | 0 | −1 | 0 | −1 | 0 | −1 | 0 | 1 | 0 | 1 | 0 |
| 1 | 0 | 1 | 0 | −1 | 0 | 1 | 0 | −1 | 0 | −1 | 0 | −1 | 0 | 1 | 0 | −1 | 0 | −1 | 0 |
| −1 | 0 | −1 | 0 | 1 | 0 | 1 | 0 | 1 | 0 | −1 | 0 | −1 | 0 | −1 | 0 | 1 | 0 | 1 | 0 |
| −1 | 0 | −1 | 0 | −1 | 0 | 1 | 0 | −1 | 0 | −1 | 0 | 1 | 0 | −1 | 0 | 1 | 0 | 1 | 0 |
| 1 | 0 | 1 | 0 | −1 | 0 | 1 | 0 | 1 | 0 | 1 | 0 | −1 | 0 | 1 | 0 | −1 | 0 | −1 | 0 |
| 1 | 0 | −1 | 0 | 1 | 0 | −1 | 0 | −1 | 0 | −1 | 0 | 1 | 0 | −1 | 0 | −1 | 0 | −1 | 0 |
| 1 | 0 | −1 | 0 | 1 | 0 | 1 | 0 | −1 | 0 | 1 | 0 | 1 | 0 | 1 | 0 | −1 | 0 | −1 | 0 |
| 1 | 0 | 1 | 0 | 1 | 0 | −1 | 0 | 1 | 0 | 1 | 0 | −1 | 0 | 1 | 0 | −1 | 0 | −1 | 0 |
| 1 | 0 | −1 | 0 | 1 | 0 | 1 | 0 | 1 | 0 | −1 | 0 | 1 | 0 | 1 | 0 | 1 | 0 | 1 | 0 |

-continued

| | | | | | | | | | | | | | | | | | | | |
|---|---|---|---|---|---|---|---|---|---|---|---|---|---|---|---|---|---|---|---|
| −1 | 0 | −1 | 0 | −1 | 0 | 1 | 0 | −1 | 0 | −1 | 0 | 1 | 0 | 1 | 0 | −1 | 0 | 1 | 0 |
| 1 | 0 | 1 | 0 | −1 | 0 | −1 | 0 | −1 | 0 | −1 | 0 | 1 | 0 | 1 | 0 | 1 | 0 | −1 | 0 |
| −1 | 0 | −1 | 0 | −1 | 0 | 1 | 0 | −1 | 0 | −1 | 0 | −1 | 0 | 1 | 0 | −1 | 0 | 1 | 0 |
| 1 | 0 | 1 | 0 | −1 | 0 | −1 | 0 | 1 | 0 | 1 | 0 | 1 | 0 | −1 | 0 | 1 | 0 | 1 | 0 |
| −1 | 0 | 1 | 0 | −1 | 0 | −1 | 0 | −1 | 0 | −1 | 0 | 1 | 0 | −1 | 0 | −1 | 0 | −1 | 0 |
| 1 | 0 | −1 | 0 | 1 | 0 | 1 | 0 | −1 | 0 | 1 | 0 | 1 | 0 | −1 | 0 | 1 | 0 | 1 | 0 |
| −1 | 0 | −1 | 0 | 1 | 0 | −1 | 0 | −1 | 0 | −1 | 0 | 1 | 0 | 1 | 0 | 1 | 0 | 1 | 0 |
| −1 | 0 | 1 | 0 | −1 | 0 | −1 | 0 | −1 | 0 | 1 | 0 | −1 | 0 | −1 | 0 | −1 | 0 | −1 | 0 |
| 1 | 0 | 1 | 0 | 1 | 0 | −1 | 0 | 1 | 0 | 1 | 0 | 1 | 0 | −1 | 0 | −1 | 0 | −1 | 0 |
| 0 | 0 | 0 | 0 | 0 | 0 | −1 | 0 | 1 | 0 | 1 | 0 | −1 | 0 | −1 | 0 | 1 | 0 | −1 | 0 |
| −1 | 0 | −1 | 0 | −1 | 0 | 1 | 0 | 1 | 0 | 1 | 0 | 1 | 0 | −1 | 0 | 1 | 0 | 1 | 0 |
| 1 | 0 | −1 | 0 | 1 | 0 | −1 | 0 | −1 | 0 | −1 | 0 | −1 | 0 | 1 | 0 | 1 | 0 | 1 | 0 |
| −1 | 0 | 1 | 0 | 1 | 0 | −1 | 0 | −1 | 0 | 1 | 0 | −1 | 0 | −1 | 0 | 1 | 0 | −1 | 0 |
| −1 | 0 | 1 | 0 | −1 | 0 | 1 | 0 | 1 | 0 | 1 | 0 | −1 | 0 | 1 | 0 | 1 | 0 | 1 | 0 |
| 1 | 0 | −1 | 0 | 1 | 0 | −1 | 0 | −1 | 0 | 1 | 0 | −1 | 0 | −1 | 0 | −1 | 0 | 1 | 0 |
| 1 | 0 | −1 | 0 | −1 | 0 | −1 | 0 | 1 | 0 | −1 | 0 | 1 | 0 | 1 | 0 | 1 | 0 | −1 | 0 |
| 1 | 0 | 1 | 0 | 1 | 0 | 1 | 0 | −1 | 0 | −1 | 0 | −1 | 0 | 1 | 0 | 1 | 0 | 1 | 0 |
| 1 | 0 | −1 | 0 | −1 | 0 | −1 | 0 | 1 | 0 | −1 | 0 | −1 | 0 | 1 | 0 | 1 | 0 | −1 | 0 |
| 1 | 0 | 1 | 0 | 1 | 0 | −1 | 0 | −1 | 0 | −1 | 0 | −1 | 0 | 1 | 0 | −1 | 0 | −1 | 0 |
| −1 | 0 | 1 | 0 | −1 | 0 | 1 | 0 | 1 | 0 | −1 | 0 | 1 | 0 | −1 | 0 | −1 | 0 | 1 | 0 |
| −1 | 0 | −1 | 0 | −1 | 0 | 1 | 0 | 1 | 0 | −1 | 0 | −1 | 0 | −1 | 0 | 1 | 0 | −1 | 0 |
| −1 | 0 | 1 | 0 | −1 | 0 | 1 | 0 | 1 | 0 | 1 | 0 | −1 | 0 | 1 | 0 | 1 | 0 | 1 | 0 |
| −1 | 0 | −1 | 0 | 1 | 0 | −1 | 0 | −1 | 0 | 1 | 0 | −1 | 0 | 1 | 0 | 1 | 0 | 1 | 0 |
| −1 | 0 | 1 | 0 | 1 | 0 | 1 | 0 | 1 | 0 | −1 | 0 | 1 | 0 | −1 | 0 | −1 | 0 | 1 | 0 |
| −1 | 0 | −1 | 0 | −1 | 0 | 1 | 0 | 1 | 0 | −1 | 0 | −1 | 0 | −1 | 0 | 1 | 0 | 1 | 0 |
| 1 | 0 | −1 | 0 | −1 | 0 | −1 | 0 | −1 | 0 | 1 | 0 | −1 | 0 | −1 | 0 | −1 | 0 | −1 | 0 |
| −1 | 0 | 1 | 0 | 1 | 0 | 1 | 0 | 1 | 0 | −1 | 0 | −1 | 0 | −1 | 0 | 1 | 0 | −1 | 0 |
| −1 | 0 | 1 | 0 | 1 | 0 | −1 | 0 | 1 | 0 | 1 | 0 | 1 | 0 | 1 | 0 | −1 | 0 | 1 | 0 |
| 1 | 0 | 1 | 0 | −1 | 0 | 1 | 0 | −1 | 0 | −1 | 0 | 1 | 0 | −1 | 0 | −1 | 0 | 1 | 0 |
| −1 | 0 | 1 | 0 | 1 | 0 | −1 | 0 | 1 | 0 | 1 | 0 | 1 | 0 | −1 | 0 | −1 | 0 | 1 | 0 |
| 1 | 0 | 1 | 0 | −1 | 0 | 1 | 0 | 1 | 0 | −1 | 0 | 1 | 0 | −1 | 0 | −1 | 0 | −1 | 0 |
| 1 | 0 | −1 | 0 | −1 | 0 | −1 | 0 | −1 | 0 | 1 | 0 | −1 | 0 | 1 | 0 | 1 | 0 | −1 | 0 |
| −1 | 0 | −1 | 0 | 1 | 0 | −1 | 0 | −1 | 0 | 1 | 0 | 1 | 0 | −1 | 0 | 1 | 0 | 1 | 0 |
| 1 | 0 | −1 | 0 | −1 | 0 | −1 | 0 | −1 | 0 | 1 | 0 | −1 | 0 | −1 | 0 | −1 | 0 | 1 | 0 |
| −1 | 0 | −1 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | −1 | 0 | −1 | 0 | 1 | 0 | −1 | 0 | −1 | 0 | −1 | 0 | 1 | 0 |
| −1 | 0 | −1 | 0 | −1 | 0 | −1 | 0 | 1 | 0 | 1 | 0 | 1 | 0 | −1 | 0 | 1 | 0 | 1 | 0 |
| −1 | 0 | −1 | 0 | 1 | 0 | −1 | 0 | −1 | 0 | −1 | 0 | 1 | 0 | 1 | 0 | 1 | 0 | 1 | 0 |
| −1 | 0 | −1 | 0 | −1 | 0 | −1 | 0 | 1 | 0 | −1 | 0 | −1 | 0 | −1 | 0 | 1 | 0 | −1 | 0 |
| 1 | 0 | 1 | 0 | −1 | 0 | 1 | 0 | 1 | 0 | 1 | 0 | −1 | 0 | −1 | 0 | 1 | 0 | 1 | 0 |
| 1 | 0 | −1 | 0 | 1 | 0 | 1 | 0 | −1 | 0 | 1 | 0 | −1 | 0 | −1 | 0 | 1 | 0 | −1 | 0 |
| −1 | 0 | 1 | 0 | −1 | 0 | 1 | 0 | 1 | 0 | 1 | 0 | −1 | 0 | 1 | 0 | 1 | 0 | 1 | 0 |
| 1 | 0 | −1 | 0 | 1 | 0 | 1 | 0 | −1 | 0 | −1 | 0 | 1 | 0 | −1 | 0 | −1 | 0 | −1 | 0 |
| 1 | 0 | 1 | 0 | 1 | 0 | 1 | 0 | −1 | 0 | 1 | 0 | −1 | 0 | −1 | 0 | −1 | 0 | 1 | 0 |
| −1 | 0 | −1 | 0 | −1 | 0 | −1 | 0 | 1 | 0 | 1 | 0 | 1 | 0 | −1 | 0 | −1 | 0 | −1 | 0 |
| 1 | 0 | 1 | 0 | −1 | 0 | −1 | 0 | −1 | 0 | 1 | 0 | −1 | 0 | −1 | 0 | 1 | 0 | −1 | 0 |
| 1 | 0 | 1 | 0 | 1 | 0 | 1 | 0 | −1 | 0 | 1 | 0 | 1 | 0 | 1 | 0 | −1 | 0 | 1 | 0 |
| −1 | 0 | −1 | 0 | 1 | 0 | −1 | 0 | 1 | 0 | −1 | 0 | −1 | 0 | −1 | 0 | 1 | 0 | −1 | 0 |
| −1 | 0 | −1 | 0 | 1 | 0 | −1 | 0 | 1 | 0 | 1 | 0 | −1 | 0 | 1 | 0 | 1 | 0 | 1 | 0 |
| −1 | 0 | −1 | 0 | 1 | 0 | 1 | 0 | 1 | 0 | −1 | 0 | 1 | 0 | 1 | 0 | −1 | 0 | 1 | 0 |
| −1 | 0 | −1 | 0 | 1 | 0 | −1 | 0 | 1 | 0 | 1 | 0 | 1 | 0 | −1 | 0 | 1 | 0 | 1 | 0 |
| 1 | 0 | 1 | 0 | −1 | 0 | −1 | 0 | −1 | 0 | 1 | 0 | −1 | 0 | −1 | 0 | 1 | 0 | 1 | 0 |
| −1 | 0 | 1 | 0 | 1 | 0 | 1 | 0 | −1 | 0 | −1 | 0 | −1 | 0 | −1 | 0 | 1 | 0 | 1 | 0 |
| 1 | 0 | −1 | 0 | −1 | 0 | −1 | 0 | −1 | 0 | 1 | 0 | −1 | 0 | −1 | 0 | −1 | 0 | 1 | 0 |
| −1 | 0 | 1 | 0 | 1 | 0 | 1 | 0 | −1 | 0 | −1 | 0 | 1 | 0 | 1 | 0 | 1 | 0 | −1 | 0 |
| 1 | 0 | 1 | 0 | −1 | 0 | 1 | 0 | −1 | 0 | −1 | 0 | −1 | 0 | −1 | 0 | 1 | 0 | −1 | 0 |
| −1 | 0 | −1 | 0 | 1 | 0 | −1 | 0 | 1 | 0 | 1 | 0 | −1 | 0 | 1 | 0 | 1 | 0 | −1 | 0 |
| 1 | 0 | 1 | 0 | −1 | 0 | −1 | 0 | 1 | 0 | −1 | 0 | −1 | 0 | −1 | 0 | 1 | 0 | 1 | 0 |
| 1 | 0 | 1 | 0 | −1 | 0 | 1 | 0 | −1 | 0 | −1 | 0 | −1 | 0 | 1 | 0 | −1 | 0 | −1 | 0 |
| −1 | 0 | −1 | 0 | 1 | 0 | 1 | 0 | 1 | 0 | 1 | 0 | −1 | 0 | −1 | 0 | −1 | 0 | 1 | 0 |
| 1 | 0 | 1 | 0 | 0 | 0 | 0 | 0 | 0 | 0 | 1 | 0 | −1 | 0 | −1 | 0 | 1 | 0 | 1 | 0 |
| −1 | 0 | 1 | 0 | 1 | 0 | 1 | 0 | 1 | 0 | −1 | 0 | −1 | 0 | −1 | 0 | −1 | 0 | 1 | 0 |
| −1 | 0 | −1 | 0 | −1 | 0 | 1 | 0 | −1 | 0 | 1 | 0 | 1 | 0 | 1 | 0 | 1 | 0 | −1 | 0 |
| −1 | 0 | −1 | 0 | 1 | 0 | −1 | 0 | −1 | 0 | 1 | 0 | 1 | 0 | −1 | 0 | 1 | 0 | 1 | 0 |
| −1 | 0 | 1 | 0 | 1 | 0 | −1 | 0 | 1 | 0 | −1 | 0 | −1 | 0 | −1 | 0 | 1 | 0 | −1 | 0 |
| −1 | 0 | −1 | 0 | −1 | 0 | 1 | 0 | −1 | 0 | 1 | 0 | 1 | 0 | −1 | 0 | 1 | 0 | 1 | 0 |
| 1 | 0 | −1 | 0 | −1 | 0 | 1 | 0 | 1 | 0 | 1 | 0 | −1 | 0 | 1 | 0 | −1 | 0 | −1 | 0 |
| −1 | 0 | 1 | 0 | −1 | 0 | −1 | 0 | −1 | 0 | −1 | 0 | 1 | 0 | 1 | 0 | 1 | 0 | −1 | 0 |
| −1 | 0 | −1 | 0 | −1 | 0 | 1 | 0 | 1 | 0 | 1 | 0 | −1 | 0 | 1 | 0 | 1 | 0 | −1 | 0 |
| −1 | 0 | 1 | 0 | −1 | 0 | −1 | 0 | −1 | 0 | 1 | 0 | 1 | 0 | 1 | 0 | 1 | 0 | −1 | 0 |
| 1 | 0 | 1 | 0 | 1 | 0 | −1 | 0 | 1 | 0 | −1 | 0 | −1 | 0 | 1 | 0 | −1 | 0 | 1 | 0 |
| 1 | 0 | −1 | 0 | 1 | 0 | 1 | 0 | 1 | 0 | −1 | 0 | −1 | 0 | 1 | 0 | 1 | 0 | 1 | 0 |
| −1 | 0 | 1 | 0 | 1 | 0 | −1 | 0 | 1 | 0 | −1 | 0 | −1 | 0 | −1 | 0 | 1 | 0 | −1 | 0 |
| −1 | 0 | −1 | 0 | 1 | 0 | 1 | 0 | −1 | 0 | 1 | 0 | 1 | 0 | −1 | 0 | 1 | 0 | −1 | 0 |
| −1 | 0 | −1 | 0 | 1 | 0 | −1 | 0 | −1 | 0 | 1 | 0 | −1 | 0 | 1 | 0 | −1 | 0 | 1 | 0 |
| 1 | 0 | −1 | 0 | 1 | 0 | 1 | 0 | 1 | 0 | −1 | 0 | −1 | 0 | 1 | 0 | 1 | 0 | 1 | 0 |
| −1 | 0 | −1 | 0 | −1 | 0 | 1 | 0 | 1 | 0 | 1 | 0 | 1 | 0 | −1 | 0 | 1 | 0 | 1 | 0 |
| 1 | 0 | −1 | 0 | 1 | 0 | −1 | 0 | −1 | 0 | −1 | 0 | −1 | 0 | 1 | 0 | 1 | 0 | 1 | 0 |
| −1 | 0 | 1 | 0 | 1 | 0 | −1 | 0 | −1 | 0 | 1 | 0 | −1 | 0 | −1 | 0 | −1 | 0 | −1 | 0 |

-continued

| | | | | | | | | | | | | | | | | | | | |
|---|---|---|---|---|---|---|---|---|---|---|---|---|---|---|---|---|---|---|---|
| 1 | 0 | −1 | 0 | −1 | 0 | −1 | 0 | 1 | 0 | −1 | 0 | 1 | 0 | 1 | 0 | −1 | 0 | 1 | 0 |
| 1 | 0 | −1 | 0 | 1 | 0 | −1 | 0 | −1 | 0 | 1 | 0 | −1 | 0 | −1 | 0 | −1 | 0 | 1 | 0 |
| 1 | 0 | −1 | 0 | −1 | 0 | −1 | 0 | 1 | 0 | −1 | 0 | −1 | 0 | 1 | 0 | −1 | 0 | 1 | 0 |
| 1 | 0 | 1 | 0 | −1 | 0 | 1 | 0 | 1 | 0 | 1 | 0 | 1 | 0 | −1 | 0 | −1 | 0 | −1 | 0 |
| −1 | 0 | 1 | 0 | 1 | 0 | 1 | 0 | −1 | 0 | 1 | 0 | 1 | 0 | −1 | 0 | −1 | 0 | 1 | 0 |
| −1 | 0 | −1 | 0 | −1 | 0 | 1 | 0 | 1 | 0 | −1 | 0 | 1 | 0 | −1 | 0 | 1 | 0 | 1 | 0 |
| 1 | 0 | −1 | 0 | 1 | 0 | 1 | 0 | 0 | 0 | 0 | 0 | 0 | 0 | 0 | 0 | 0 | 0} | | |

All the foregoing sequence 1 to sequence 4 may be generated by using the generator of the GAN network.

Next, refer to Table 7. The fourth row describes the largest PAPR in a plurality of PAPRs of the sequence 1 and a rotated sequence corresponding to the sequence 1; the sequence 2 and a rotated sequence corresponding to the sequence 2; the sequence 3 and a rotated sequence corresponding to the sequence 3: the sequence 4 and a rotated sequence corresponding to the sequence 4 in an entire bandwidth, in a single RU, and in a combined RU.

To be specific, the largest value in a plurality of PAPRs of the sequence 1 and the corresponding rotated sequence described above in the entire bandwidth, in the single RU, and in the combined RU of 80 MHz is 5.9927 dB. The largest value in a plurality of PAPRs of the sequence 2 and the corresponding rotated sequence in the entire bandwidth, in the single RU, and in the combined RU of 160 MHz is 6.2554 dB. The largest value in a plurality of PAPRs of the sequence 3 and the corresponding rotated sequence in the entire bandwidth, in the single RU, and in the combined RU of 240 MHz is 6.8042 dB. The largest value in a plurality of PAPRs of the sequence 4 and the corresponding rotated sequence in the entire bandwidth, in the single RU, and in the combined RU of 320 MHz is 7.2206 dB.

It is assumed that the GAN network generates x1 2×LTF sequences in an 80 MHz. For the 2×LTF sequence in an 80 MHz and a rotated sequence corresponding to the 2×LTF sequence in an 80 MHz, the largest PAPR is selected from a plurality of PAPRs in an entire bandwidth, in a single RU, and in a combined RU. In this case, a total of x1 PAPRs may be selected, in other words, x1 largest PAPR values are selected. Each largest PAPR value corresponds to a 2×LTF sequence in an 80 MHz generated by the GAN network.

For example, the GAN network generates 10 2×LTF sequences in an 80 MHz. Each 2×LTF sequence in an 80 MHz may correspond to three rotated sequences. For the first 2×LTF sequence in an 80 MHz and three rotated sequences corresponding to the first 2×LTF sequence in an 80 MHz, the largest PAPR is selected from a plurality of PAPRs in an entire bandwidth, in a single RU, and in a combined RU. For the second 2×LTF sequence in an 80 MHz and three rotated sequences corresponding to the second 2×LTF sequence in an 80 MHz, the largest PAPR is selected from a plurality of PAPRs in an entire bandwidth, in a single RU, and in a combined RU. For the tenth 2×LTF sequence in an 80 MHz and three rotated sequences corresponding to the tenth 2×LTF sequence in an 80 MHz, the largest PAPR is selected from a plurality of PAPRs in an entire bandwidth, in a single RU, and in a combined RU. Therefore, 10 largest PAPRs may be correspondingly selected for the 10 2×LTF sequences in an 80 MHz.

Then, the smallest PAPR value is selected from the x1 largest PAPR values. A 2×LTF sequence in an 80 MHz generated by a GAN network corresponding to the selected smallest PAPR is a desired 2×LTF sequence in an 80 MHz.

For example, 5.9927 dB in Table 7 is the smallest PAPR selected from the x1 largest PAPR values, and a 2× sequence in an 80 MHz generated by a GAN network corresponding to 5.9927 dB is a desired 2×LTF sequence in an 80 MHz, namely, the foregoing sequence 1.

Similarly, if the GAN network generates x2 2×LTF sequences in a 160 MHz, x2 largest PAPR values may be selected. 6.2554 dB is the smallest PAPR selected from the x2 largest PAPR values. A 2×LTF sequence in a 160 MHz generated by a GAN network corresponding to 6.2554 dB is a desired 2×LTF sequence in a 160 MHz, namely, the foregoing sequence 2.

If the GAN network generates x3 2×LTF sequences in a 240 MHz, x3 largest PAPR values may be selected. 6.8042 dB is the smallest PAPR selected from the x3 largest PAPR values. A 2× sequence in a 240 MHz generated by a GAN network corresponding to 6.8042 dB is a desired 2×LTF sequence in a 240 MHz, namely, the foregoing sequence 3.

If the GAN network generates x4 2×LTF sequences in a 320 MHz, x4 largest PAPR values may be selected. 7.2206 dB is the smallest PAPR selected from the x4 largest PAPR values. A 2× sequence in a 320 MHz generated by a GAN network corresponding to 7.2206 dB is a desired 2×LTF sequence in a 320 MHz, namely, the foregoing sequence 4.

In addition, the training set includes y1 2×LTF sequences in an 80 MHz, and for each LTF sequence, the largest PAPR is selected from a plurality of PAPRs of the LTF sequence and a rotated sequence corresponding to the LTF sequence in an entire bandwidth, in a single RU, and in a combined RU. In this case, y1 PAPRs may be selected in total. The smallest value of the y1 PAPRs is 6.23 dB in the third row.

Similarly, the training set includes y2 2×LTF sequences in a 160 MHz, and for each LTF sequence, the largest PAPR is selected from a plurality of PAPRs of the LTF sequence and a rotated sequence corresponding to the LTF sequence in an entire bandwidth, in a single RU, and in a combined RU. In this case, y2 PAPRs may be selected in total. The smallest value of the y2 PAPRs is 6.3556 dB in the third row.

Similarly, the training set includes y3 2×LTF sequences in a 240 MHz, and for each LTF sequence, the largest PAPR is selected from a plurality of PAPRs of the LTF sequence and a rotated sequence corresponding to the LTF sequence in an entire bandwidth, in a single RU, and in a combined RU. In this case, y3 PAPRs may be selected in total. The smallest value of the y3 PAPRs is 7.0284 dB in the third row.

Similarly, the training set includes y4 2×LTF sequences in a 240 MHz, and for each LTF sequence, the largest PAPR is selected from a plurality of PAPRs of the LTF sequence and a rotated sequence corresponding to the LTF sequence in an entire bandwidth, in a single RU, and in a combined RU. In this case, y4 PAPRs may be selected in total. The smallest value of the y4 PAPRs is 7.3882 dB in the third row.

In Table 7, values in the fourth row are all less than values in the third row. In other words, a PAPR of an LTF sequence generated by the GAN network is less than a PAPR of an LTF sequence in the training set. In this case, PAPR values of LTF sequences that are generated by the GAN network and that are in different bandwidths are lower.

TABLE 7

| Comparison of PAPRs of LTFs | | | | |
|---|---|---|---|---|
| 2x LTF sequences generated by a GAN | Sequence 1 | Sequence 2 | Sequence 3 | Sequence 4 |
| Bandwidth | 80 MHz | 160 MHz | 240 MHz | 320 MHz |
| Largest PAPR of a 2x LTF sequence in a training set | 6.23 dB | 6.3556 dB | 7.0284 dB | 7.3882 dB |
| Largest PAPR of a 2x LTF sequence generated by a GAN | 5.9927 dB | 6.2554 dB | 6.8042 dB | 7.2206 dB |

(5) A possible 2×LTF sequence in the 80 MHz bandwidth, denoted as a sequence 5.

| | | | | | | | | | | | | | | | | | | | |
|---|---|---|---|---|---|---|---|---|---|---|---|---|---|---|---|---|---|---|---|
| | | Sequence 5= | | | | | | | | | | | | | | | | | |
| | | {0 | 0 | 0 | 0 | 0 | 0 | 0 | 0 | 0 | 0 | 0 | 0 | 0 | 0 | −1 | 0 | 1 | 0 |
| 1 | 0 | 1 | 0 | −1 | 0 | −1 | 0 | 1 | 0 | −1 | 0 | 1 | 0 | −1 | 0 | 1 | 0 | 1 | 0 |
| 1 | 0 | 1 | 0 | 1 | 0 | 1 | 0 | 1 | 0 | −1 | 0 | −1 | 0 | 1 | 0 | −1 | 0 | −1 | 0 |
| 1 | 0 | 1 | 0 | −1 | 0 | 1 | 0 | −1 | 0 | 1 | 0 | 1 | 0 | 1 | 0 | 1 | 0 | −1 | 0 |
| −1 | 0 | 1 | 0 | 1 | 0 | 1 | 0 | −1 | 0 | −1 | 0 | 1 | 0 | −1 | 0 | 1 | 0 | −1 | 0 |
| 1 | 0 | −1 | 0 | −1 | 0 | −1 | 0 | −1 | 0 | −1 | 0 | −1 | 0 | 1 | 0 | 1 | 0 | −1 | 0 |
| 1 | 0 | 1 | 0 | −1 | 0 | −1 | 0 | 1 | 0 | −1 | 0 | 1 | 0 | −1 | 0 | −1 | 0 | −1 | 0 |
| −1 | 0 | 1 | 0 | 1 | 0 | −1 | 0 | −1 | 0 | −1 | 0 | 1 | 0 | 1 | 0 | −1 | 0 | 1 | 0 |
| −1 | 0 | 1 | 0 | −1 | 0 | −1 | 0 | −1 | 0 | −1 | 0 | −1 | 0 | −1 | 0 | −1 | 0 | 1 | 0 |
| 1 | 0 | −1 | 0 | 1 | 0 | 1 | 0 | −1 | 0 | −1 | 0 | 1 | 0 | −1 | 0 | 1 | 0 | 1 | 0 |
| 1 | 0 | 1 | 0 | 1 | 0 | −1 | 0 | −1 | 0 | 1 | 0 | 1 | 0 | 1 | 0 | −1 | 0 | −1 | 0 |
| 1 | 0 | −1 | 0 | 1 | 0 | −1 | 0 | 1 | 0 | −1 | 0 | −1 | 0 | −1 | 0 | −1 | 0 | −1 | 0 |
| −1 | 0 | 1 | 0 | 1 | 0 | −1 | 0 | 1 | 0 | 1 | 0 | −1 | 0 | 1 | 0 | −1 | 0 | −1 | 0 |
| −1 | 0 | −1 | 0 | 1 | 0 | 1 | 0 | −1 | 0 | −1 | 0 | −1 | 0 | 1 | 0 | 1 | 0 | −1 | 0 |
| 1 | 0 | −1 | 0 | 1 | 0 | −1 | 0 | −1 | 0 | −1 | 0 | −1 | 0 | −1 | 0 | −1 | 0 | −1 | 0 |
| 1 | 0 | −1 | 0 | −1 | 0 | 1 | 0 | 1 | 0 | −1 | 0 | −1 | 0 | 1 | 0 | −1 | 0 | 1 | 0 |
| −1 | 0 | −1 | 0 | −1 | 0 | −1 | 0 | 1 | 0 | 1 | 0 | −1 | 0 | −1 | 0 | −1 | 0 | 1 | 0 |
| 1 | 0 | −1 | 0 | 1 | 0 | −1 | 0 | 1 | 0 | −1 | 0 | 1 | 0 | 1 | 0 | 1 | 0 | 1 | 0 |
| 1 | 0 | 1 | 0 | −1 | 0 | −1 | 0 | 1 | 0 | −1 | 0 | −1 | 0 | 1 | 0 | 1 | 0 | −1 | 0 |
| 1 | 0 | −1 | 0 | −1 | 0 | −1 | 0 | −1 | 0 | −1 | 0 | 1 | 0 | 1 | 0 | −1 | 0 | −1 | 0 |
| −1 | 0 | 1 | 0 | 1 | 0 | −1 | 0 | 1 | 0 | −1 | 0 | 1 | 0 | −1 | 0 | −1 | 0 | −1 | 0 |
| −1 | 0 | −1 | 0 | – | 0 | −1 | 0 | 1 | 0 | 1 | 0 | −1 | 0 | 1 | 0 | 1 | 0 | −1 | 0 |
| −1 | 0 | 1 | 0 | −1 | 0 | 1 | 0 | 1 | 0 | 1 | 0 | 1 | 0 | 1 | 0 | −1 | 0 | −1 | 0 |
| 1 | 0 | 1 | 0 | 1 | 0 | −1 | 0 | −1 | 0 | 1 | 0 | −1 | 0 | 1 | 0 | −1 | 0 | 1 | 0 |
| −1 | 0 | −1 | 0 | −1 | 0 | −1 | 0 | −1 | 0 | −1 | 0 | 1 | 0 | 1 | 0 | −1 | 0 | 1 | 0 |
| 1 | 0 | 1 | 0 | −1 | 0 | 1 | 0 | −1 | 0 | 1 | 0 | 0 | 0 | 0 | 0 | 0 | 0 | −1 | 0 |
| −1 | 0 | −1 | 0 | −1 | 0 | 1 | 0 | 1 | 0 | −1 | 0 | −1 | 0 | −1 | 0 | 1 | 0 | 1 | 0 |
| −1 | 0 | 1 | 0 | −1 | 0 | 1 | 0 | −1 | 0 | −1 | 0 | −1 | 0 | −1 | 0 | −1 | 0 | −1 | 0 |
| −1 | 0 | 1 | 0 | 1 | 0 | −1 | 0 | 1 | 0 | 1 | 0 | −1 | 0 | −1 | 0 | 1 | 0 | −1 | 0 |
| 1 | 0 | −1 | 0 | −1 | 0 | −1 | 0 | −1 | 0 | 1 | 0 | 1 | 0 | −1 | 0 | −1 | 0 | −1 | 0 |
| 1 | 0 | 1 | 0 | −1 | 0 | 1 | 0 | −1 | 0 | 1 | 0 | −1 | 0 | 1 | 0 | 1 | 0 | 1 | 0 |
| 1 | 0 | 1 | 0 | 1 | 0 | −1 | 0 | −1 | 0 | 1 | 0 | −1 | 0 | −1 | 0 | −1 | 0 | 1 | 0 |
| −1 | 0 | 1 | 0 | −1 | 0 | 1 | 0 | 1 | 0 | 1 | 0 | 1 | 0 | −1 | 0 | −1 | 0 | 1 | 0 |
| 1 | 0 | 1 | 0 | −1 | 0 | −1 | 0 | 1 | 0 | −1 | 0 | 1 | 0 | −1 | 0 | 1 | 0 | 1 | 0 |
| 1 | 0 | 1 | 0 | 1 | 0 | 1 | 0 | 1 | 0 | −1 | 0 | −1 | 0 | 1 | 0 | −1 | 0 | −1 | 0 |
| 1 | 0 | 1 | 0 | −1 | 0 | 1 | 0 | −1 | 0 | −1 | 0 | −1 | 0 | −1 | 0 | −1 | 0 | 1 | 0 |
| 1 | 0 | −1 | 0 | −1 | 0 | −1 | 0 | 1 | 0 | 1 | 0 | −1 | 0 | 1 | 0 | 1 | 0 | 1 | 0 |
| −1 | 0 | 1 | 0 | 1 | 0 | 1 | 0 | 1 | 0 | 1 | 0 | 1 | 0 | −1 | 0 | 1 | 0 | 1 | 0 |
| −1 | 0 | −1 | 0 | 1 | 0 | 1 | 0 | −1 | 0 | 1 | 0 | −1 | 0 | 1 | 0 | −1 | 0 | −1 | 0 |
| 1 | 0 | 1 | 0 | 1 | 0 | −1 | 0 | −1 | 0 | 1 | 0 | −1 | 0 | 1 | 0 | −1 | 0 | 1 | 0 |
| 1 | 0 | 1 | 0 | 1 | 0 | 1 | 0 | 1 | 0 | 1 | 0 | −1 | 0 | −1 | 0 | 1 | 0 | −1 | 0 |
| −1 | 0 | 1 | 0 | 1 | 0 | −1 | 0 | 1 | 0 | −1 | 0 | 1 | 0 | 1 | 0 | 1 | 0 | 1 | 0 |
| −1 | 0 | −1 | 0 | 1 | 0 | 1 | 0 | 1 | 0 | −1 | 0 | −1 | 0 | 1 | 0 | −1 | 0 | 1 | 0 |
| −1 | 0 | 1 | 0 | −1 | 0 | −1 | 0 | 1 | 0 | −1 | 0 | −1 | 0 | −1 | 0 | 1 | 0 | 1 | 0 |
| −1 | 0 | 1 | 0 | 1 | 0 | −1 | 0 | −1 | 0 | 1 | 0 | −1 | 0 | 1 | 0 | 1 | 0 | 1 | 0 |
| 1 | 0 | 1 | 0 | −1 | 0 | −1 | 0 | 1 | 0 | 1 | 0 | 1 | 0 | −1 | 0 | −1 | 0 | 1 | 0 |
| −1 | 0 | 1 | 0 | −1 | 0 | 1 | 0 | 1 | 0 | 1 | 0 | 1 | 0 | 1 | 0 | 1 | 0 | 1 | 0 |
| −1 | 0 | −1 | 0 | 1 | 0 | −1 | 0 | −1 | 0 | 1 | 0 | 1 | 0 | −1 | 0 | 1 | 0 | −1 | 0 |
| −1 | 0 | −1 | 0 | −1 | 0 | −1 | 0 | 1 | 0 | 1 | 0 | −1 | 0 | −1 | 0 | −1 | 0 | 1 | 0 |
| 1 | 0 | −1 | 0 | 1 | 0 | −1 | 0 | 1 | 0 | −1 | 0 | 1 | 0 | 1 | 0 | 0 | 0 | 1 | 0 |
| 1 | 0 | 1 | 0 | −1 | 0 | −1 | 0 | 1 | 0 | −1 | 0 | −1 | 0 | 1 | 0 | 0 | 0 | 0 | 0 |
| 0 | 0 | 0 | 0 | 0 | 0} | | | | | | | | | | | | | | |

(6) A possible 2×LTF sequence in the 80 MHz bandwidth, denoted as a sequence 6.

Sequence 6=
{ 0 0 0 0 0 0 0 0 0 0 0 0 −1 0 −1 0 1 0 1 0 1 0 −0 −1 0 1 0 −1 0 1 0 −0 1 0 1 0 1
0 1 0 1 0 1 0 1 0 −1 0 1 0 1 0 1 0 −1 0 1 0 1 0 −1 0 1 0 −1 0 1 0 1 0 1 0 1 0 1 0 −1 0 1 0 1 0
1 0 −1 0 −1 0 1 0 −1 0 1 0 −1 0 1 0 −1 0 −1 0 −1 0 −1 0 −1 0 −1 0 1 0 1 0 −1 0 1 0 1 0−1 0 −1 0
1 0 −1 0 1 0 −1 0 −0 −1 0 −1 0 1 0 1 0 −1 0 −1 0 −1 0 1 0 1 0 −1 0 1 0 −0 1 0 −1 0 −1 0 −0
1 0 −1 0 −1 0 −1 0 1 0 1 0 −1 0 1 0 1 0 −1 0 1 0 1 0 1 0 1 0 1 0 1 0 1 0 1 0 −1 0 1 0 1 0 1 0
1 0 1 0 −1 0 1 0 1 0 1 0 −1 0 1 0 1 0 −1 0 −1 0 1 0 1 0 −1 0 1 0 1 0 −1 0 1 0 1 0 1 0 1 0
1 0 −1 0−1 0 −1 0 1 0 1 0 −1 0 −1 0 −1 0 1 0 1 0 −1 0 1 0−1 0 1 0 −1 0 −1 0 −1 0 −1 0 −1 0 −1
0 −0 1 0 1 0 −1 0 1 0 1 0 −1 0 −1 0 1 0 −1 0 1 0 −0 −1 0 −1 0 −1 0 1 0 1 0 −1 0 −1 0 −1 0 1
0 1 0 −1 0 1 0 1 0 1 0 −1 0 1 0 1 0 1 0 1 0 1 0 1 0 1 0 −1 0 −1 0 1 0 1 0 1 0 1 0 −1 0 1 0 −1
0 −1 0 −1 0 −1 0 −1 0 1 0 1 0 −1 0−1 0 −1 0 1 0 1 0 −1 0 1 0−1 0 1 0 −1 0 −1 0 −1 0 −1 0 −1 0
−0 −1 0 1 0 1 0 −1 0 1 0 1 0 −1 0 −1 0 1 0 −1 0 1 0 1 0 1 0 1 0 1 0 −1 0 −1 0 1 0 1 0 1 0 −0
1 0 1 0 −1 0 1 0 1 0 1 0 −1 0 −1 0 1 0 −1 0 −1 0 1 0 1 0 1 0 −1 0 1 0 1 0 −1 0 −1 0 1 0 1 0
1 0 0 0 0 0 0 0 −1 0 −1 0 −1 0−1 0 1 0 1 0 −1 0 −1 0−1 0 1 0 1 0 −1 0 1 0 −1 0 1 0 −1 0 −1 0 −
1 0 −1 0 −1 0−1 0 −1 0 1 0 1 0 −1 0 1 0 1 0 −1 0 −1 0 1 0 −1 0 1 0 −1 0 −1 0 −1 0 −1 0 1 0 1 0
−1 0 −1 0 −0 1 0 1 0 −1 0 1 0 −1 0 1 0 −1 0 1 0 1 0 1 0 1 0 1 0 1 0 −1 0 −1 0 1 0 −1 0 −1 0 1 0
1 0 −1 0 1 0 1 0 1 0 1 0 1 0 1 0 1 0 −1 0 1 0 −1 0 1 0 1 0 −1 0 1 0 −1 0 1 0 −1 0 1 0 1 0 1 0
1 0 1 0 1 0 1 0 1 0 −1 0 1 0 −1 0 1 0 1 0 1 0 −1 0 1 0 −1 0 −1 0 −1 0 −1 0 −1 0 1 0 1 0 −1 0 −
1 0 −1 0 1 0 1 0 −1 0 1 0 −0 1 0 −1 0 1 0 1 0 1 0 1 0 1 0 1 0 −1 0 −1 0 1 0 −0 −1 0 1 0 1 0 −
1 0 1 0 −1 0 1 0 −1 0 −1 0 1 0 1 0 1 0 −1 0 1 0 1 0 1 0 1 0 −1 0 1 0 1 0 1 0 1 0 1 0 1 0 1 0 −1
0 −1 0 1 0 −1 0 −1 0 1 0 1 0 −1 0 1 0 −1 0 1 0 1 0 1 0 1 0 −1 0 −1 0 1 0 1 0 1 0 −1 0 −1 0 1 0 −1
0 1 0 −1 0 1 0 −1 0 −1 0 −1 0 −1 0 −1 0 −1 0 1 0 1 0 −1 0 1 0 1 0 −1 0−1 0 1 0 −1 0 1 0 1 0 1 0
1 0 1 0 −1 0 −1 0 1 0 1 0 1 0 −1 0 −1 0 1 0 −1 0 1 0 −1 0 1 0 1 0 1 0 1 0 1 0 1 0 1 0 −1 0 −0 1
0 1 0 −1 0 1 0 1 0 1 0 1 0 −1 0 −1 0 −1 0 −1 0 1 0 1 0 1 0 −1 0 1 0 1 0 1 0 1 0 1 0 1 0 1 0 −1
0 1 0 −1 0 1 0 1 0 1 0 1 0 1 0 1 0 −1 0 −0 1 0 −1 0 −1 0 1 0 0 0 0 0 0 0 0 0 0 0 }

A sequence obtained after the 12 leftmost 0s and the 11 rightmost 0s are removed from the sequence 6 is named LTF2×80 M_1, that is, LTF2×80 M_1=sequence 6(13:1013). Herein, 13:1013 are the 13$^{th}$ to the 1013$^{th}$ elements in the sequence 6.

(7) A possible 2×LTF sequence in the 80 MHz, bandwidth, denoted as a sequence 7.

Sequence 7=
{0 0 0 0 0 0 0 0 0 0 0 0 −1 0 1 0 1 0 1 0 1 0 −1 0 −1 0 1 0 −1 0 1 0 −1 0 1 0 1 0 1 0
1 0 1 0 1 0 1 0 −1 0 −1 0 1 0 −1 0 −1 0 1 0 1 0−1 0 1 0 −1 0 1 0 1 0 1 0 1 0 −1 0 −1 0 1 0 1 0 1
0 −1 0 −1 0 1 0 −1 0 1 0 −1 0 1 0 −1 0 −1 0 1 0 1 0 −1 0 1 0 1 0 1 0 −1 0 1 0 1 0 −1 0 −1 0 1
0 −1 0 1 0 −1 0−1 0 −1 0 −1 0 1 0 1 0 −1 0 −1 0 −1 0 1 0 1 0 −1 0 1 0 −1 0 1 0 −1 0 −1 0 −1 0–
1 0 −1 0 −1 0 −1 0 1 0 1 0 −1 0 1 0 1 0 −1 0 −1 0 1 0 −1 0 1 0 1 0 1 0 1 0 1 0 −1 0 −1 0 1 0 1 0
1 0 −1 0 1 0 1 0 −1 0 1 0 1 0 1 0 −1 0 1 0 1 0 −1 0 −1 0 −1 0 1 0 1 0 −1 0 1 0 1 0 −1 0 −1 0
−1 0 −1 0 −1 0 −1 0 1 0 1 0 −1 0 −1 0 −1 0 1 0 1 0 −1 0 1 0 −1 0 1 0 −1 0 −1 0 −1 0 −1 0 −1 0 −
1 0 −0 1 0 1 0 −1 0 1 0 1 0 −1 0 −1 0 1 0 −1 0 1 0 −1 0 −1 0 −1 0 −1 0 1 0 1 0 −1 0 −0 −1 0
1 0 1 0 −1 0 1 0 −1 0 1 0 1 0 1 0 1 0 1 0 1 0 1 0 1 0 1 0 −1 0 1 0 −1 0 1 0 1 0 1 0 −1 0 1 0 −
1 0 1 0 −1 0 −1 0 −1 0 1 0 1 0 −1 0 −1 0 −1 0 1 0 1 0 −1 0 1 0 −1 0 1 0 1 0 1 0 −1 0 −1 0 −
1 0 −1 0 −1 0 1 0 1 0 −1 0 1 0 1 0 −1 0 −1 0 1 0 −1 0 1 0 1 0 1 0 1 0 1 0 −1 0 −1 0 1 0 1 0 1 0–
1 0 −1 0 1 0 −1 0 1 0 −1 0 1 0 −0 −1 0 −1 0 −1 0 −1 0 −1 0 1 0 1 0 −1 0 1 0 1 0 −1 0 −1 0 1 0
1 0 1 0 0 0 0 0 0 0 1 0 −1 0 −1 0 1 0 1 0 1 0 −1 0 −1 0 1 0 1 0 1 0−1 0 1 0 −1 0 1 0 1 0 −1
0 −1 0 −1 0−1 0 −1 0 1 0 1 0 1 0 −1 0 1 0 1 0 −1 0−1 0 1 0−1 0 1 0 −1 0 −1 0 −1 0 −1 0 1 0 1
0 −1 0 −1 0 −1 0 1 0 1 0 −1 0 1 0 −1 0 1 0 −1 0 1 0 1 0 1 0 1 0 1 0 1 0 −1 0 −1 0 1 0 −1 0 −1 0 1
0 1 0 1 0 1 0 1 0 1 0 1 0 1 0 1 0 1 0 1 0 1 0 1 0 1 0 1 0 1 0 1 0 1 0–1 0 1 0 1 0 1 0 1 0 1 0
1 0 1 0 1 0 1 0 −1 0 1 0 1 0 1 0 −1 0 1 0 1 0 1 0 1 0 1 0 −1 0 −1 0 1 0 1 0 1 0 1 0 −1 0 −
1 0 −1 0 1 0 1 0 −1 0 1 0 −1 0 1 0 −1 0 1 0 1 0 1 0 1 0 1 0 1 0 −1 0 −1 0 1 0 −1 0 −1 0 1 0 1 0–
1 0 1 0 −1 0 1 0 −1 0 −1 0 1 0 1 0 1 0 −1 0 −1 0 1 0 −1 0 1 0 −1 0 1 0 1 0 1 0 1 0 1 0 1 0 1 0 −1
0 1 0 1 0 −1 0 −1 0 1 0 1 0 −1 0 1 0 −1 0 1 0 1 0 1 0 1 0 −1 0 −1 0 1 0 1 0 1 0 −1 0 1 0 1 0 −1
0 1 0 −1 0 1 0 −1 0 −1 0 1 0 1 0 −1 0 −1 0 1 0 1 0 1 0 1 0 1 0 −1 0 1 0 1 0–1 0 1 0 1 0 1 0
1 0 1 0 −1 0 −1 0 1 0 1 0 1 0 −0 −1 0 1 0 −1 0 1 0 −0 1 0 1 0 1 0 1 0 1 0 1 0 1 0 −1 0 −1 0 1
0 −1 0 −1 0 1 0 1 0 −1 0 1 0 1 0 −1 0 −1 0 1 0 −1 0 1 0 1 0 1 0 −1 0 −1 0 1 0 1 0 −1 0 1 0 1
0 1 0 1 0 1 0 1 0 1 0 1 0 1 0 1 0 1 0 −1 0 1 0 1 0 1 0 1 0 0 0 0 0 0 0 0 0 0 0}

The following describes that a sequence obtained after the 12 leftmost 0s and the 11 rightmost 0s are removed from the sequence 7 is named LTF2×80 M_2, that is, LTF2×80 M_2=LTF2×80 M_gan2(13:1013). Herein, 13:1013 are the 13$^{th}$ to the 1013$^{th}$ elements in the sequence 6.

Refer to Table 8. The following describes that the largest values of PAPRs of the foregoing sequence 5 and a corresponding rotated sequence, the foregoing sequence 6 and a corresponding rotated sequence, and the foregoing sequence 7 and a corresponding rotated sequence in an entire bandwidth, in a single RU, and in a combined RU are all 7.1799 dB.

It is assumed that the GAN network generates x5 2×LTF sequences in an 80 MHz. and for each 2×LTF sequence in an 80 MHz, if the largest PAPR is selected from a plurality of PAPRs in an entire bandwidth, in a single RU, and in a combined RU in the 2×LTF sequence in an 80 MHz and in the corresponding rotated sequence, x5 PAPRs may be selected in total. In other words, x5 largest PAPRs are selected. The x5 largest PAPR values may be partially the same or completely different. Each largest PAPR value corresponds to a 2×LTF sequence in an 80 MHz generated by the GAN network.

Then, the smallest PAPR value is selected from the x5 largest PAPR values, and an LTF sequence corresponding to the selected smallest PAPR is a desired 2×LTF sequence in an 80 MHz.

For example, 7.1799 dB in Table 8 is the smallest PAPR selected from the x5 largest PAPR values, and 2× sequences in an 80 MHz generated by the GAN network corresponding to 7.1799 dB are desired 2×LTF sequences in an 80 MHz, namely, the foregoing sequence 5, sequence 6, and sequence 7. That is, there are three largest PAPR values 7.1799 dB in the x5 largest PAPR values.

The training set includes y5 2×LTF sequences in an 80 MHz. For each LTF sequence, the largest PAPR is selected from a plurality of PAPRs of the LTF sequence and a rotated sequence corresponding to the LTF sequence in an entire bandwidth, in a single RU, and in a combined RU. In this case, y5 PAPRs may be selected in total. The smallest value of the y5 PAPRs is 7.3010 dB.

If a PAPR of an LTF sequence generated by the GAN network is less than a PAPR of an LTF sequence in the training set, PAPR values of LTF sequences that are generated by the GAN network and that are in different bandwidths are lower.

TABLE 8

| | 80M, 2x |
|---|---|
| Largest PAPR of an LTF sequence in a training set | 7.3010 dB |
| Largest PAPR of an LTF sequence generated by a GAN | 7.1799 dB |

(8) The Following Describes a 2×LTF Sequence in a 160 MHz.

First, 12 leftmost 0s and 11 rightmost 0s are removed from the 2×LTF sequence in an 80 MHz. Then, the remaining 1013−13+1=1001 elements are divided into five parts, which are as follows: the $1^{st}$ to the $242^{nd}$ elements, the $243^{rd}$ to the $484^{th}$ elements, the $485^{th}$ to the $517^{th}$ elements, the $518^{th}$ to the $759^{th}$ elements, and the $760^{th}$ to the $1001^{th}$ elements. The five parts are multiplied by different coefficients for splicing, and then the 12 leftmost 0s and the 11 rightmost 0s are added to obtain the 2×LTF sequence in a 160 MHz.

For example, the selected 2×LTF sequence in an 80 MHz is the sequence 6 in (6). A sequence obtained after the 12 leftmost 0s and the 11 rightmost 0s are removed from the sequence 6 is named LTF2×80 M_1, that is, LTF2×80 M_1=sequence 6(13:1013). Herein, 13:1013 are the $13^{th}$ to the $1013^{th}$ elements in the sequence 6, corresponding to subcarriers numbered −500 to 500.

1013−13+1=1001 elements in the LTF2×80 M_1 are divided into five parts, which are denoted as LTF2×80 M_1(1:242), LTF2×80 M_1(243:484), LTF2×80 M_1(485:517), LTF2×80 M_1(518:759), and LTF2×80 M_1(760:1001). It should be noted that 1:242, 243:484, 485:517, 518:759 and 760:1001 are the $1^{st}$ to the $242^{nd}$ elements, the $243^{rd}$ to the $484^{th}$ elements, the $485^{th}$ to the $517^{th}$ elements, the $518^{th}$ to the $759^{th}$ elements, and the $760^{th}$ to the $1001^{th}$ elements in the LTF2×80 M_1, instead of subcarrier numbers. The five parts are multiplied by different coefficients for splicing, and the 12 leftmost 0s and the 11 rightmost 0s are added to obtain the 2×160 M MHz sequence, which is denoted as 2×EHT_LTF_160 M.

2×EHT_LTF_160 M=

{$0_{12}$, LTF2×80 M_part1, LTF2×80 M_part2, LTF2×80 M_part3, LTF2×80 M_part4, LTF2×80 M_part5, $0_{23}$, LTF2×80 M_part1, (−1)*LTF2×80 M_part2, (−1)*LTF2×80 M_part3, (−1)*LTF2×80 M_part4, LTF2×80 M_part5, $0_{11}$}.

That is, coefficients corresponding to the five parts are 1, 1, 1, 1, 1; and 1, −1, −1, −1, 1.

LTF2×80 M_part1=LTF2×80 M_1(1:242);
LTF2×80 M_part2=LTF2×80 M_1(243:484);
LTF2×80 M_part3=LTF2×80 M_1(485:517);
LTF2×80 M_part4=LTF2×80 M_1(518:759); and
LTF2×80 M_part5=LTF2×80 M_1(760:1001).

$0_{12}$ indicates 12 consecutive 0s, $0_{23}$ indicates 23 consecutive 0s, and $0_{11}$ indicates 11 consecutive 0s.

The largest PAPR of the 2×EHT_LTF_160 M sequence and the corresponding rotated sequence in an entire bandwidth, in a single resource unit, in a combined resource unit, and in PAPRs in a multi-stream scenario is 7.8274 dB.

(9) The Following Describes a 2×LTF Sequence in a 320 MHz.

First, 12 leftmost 0s and 11 rightmost 0s are removed from the 2×LTF sequence in an 80 MHz. Then, the remaining 1013−13+1=1001 elements are divided into five parts, which are as follows: the $1^{st}$ to the $242^{nd}$ elements, the $243^{rd}$ to the $484^{th}$ elements, the $485^{th}$ to the $517^{th}$ elements, the $518^{th}$ to the $759^{th}$ elements, and the $760^{th}$ to the $1001^{th}$ elements. The five parts are multiplied by different coefficients for splicing, and then the 12 leftmost 0s and the 11 rightmost 0s are added to obtain the 2×LTF sequence in a 320 MHz.

For example, the selected 2×LTF sequence in an 80 MHz is the sequence 7 in (7). A sequence obtained after the 12 leftmost 0s and the 11 rightmost 0s are removed from the sequence 7 is named LTF2×80 M_2, that is. LTF2×80 M_2=sequence 7(13:1013). Herein, 13:1013 are the $13^{th}$ to the $1013^{th}$ elements in the sequence 7, corresponding to subcarriers numbered −500 to 500.

1013−13+1=1001 elements in the LTF2×80 M_2 are divided into five parts, which are denoted as LTF2×80 M_2(1:242), LTF2×80 M_2(243:484), LTF2×80 M_2(485:517), LTF2×80 M_2(518:759), and LTF2×80 M_2(760:1001). It should be noted that 1:242, 243:484, 485:517, 518:759 and 760:1001 are the $1^{st}$ to the $242^{nd}$ elements, the $243^{rd}$ to the $484^{th}$ elements, the $485^{th}$ to the $517^{th}$ elements, the $518^{th}$ to the $759^{th}$ elements, and the $760^{th}$ to the $1001^{th}$ elements in the LTF2×80 M_2, instead of subcarrier number. The five parts are multiplied by different coefficients for splicing, and the 12 leftmost 0s and the 11 rightmost 0s are added to obtain the 2×320 M MHz sequence, which is denoted as 2×EHT_LTF_320 M.

2×EHT_LTF_320 M=

{$0_{12}$, LTF2×80 M_part1, LTF2×80 M_part2, LTF2×80 M_part3, LTF2×80 M_part4, LTF2×80 M_part5, $0_{23}$, (−1)*LTF2×80 M_part1, LTF2×80 M_part2, LTF2×80 M_part3, LTF2×80 M_part4, (−1)*LTF2×80 M_part5, $0_{23}$, LTF2×80 M_part1, LTF2×80 M_part2, LTF2×80 M_part3, LTF2×80 M_part4, (−1)*LTF2×80 M_part5, $0_{23}$, LTF2×80 M_part1, (−1)*LTF2×80 M_part2, (−1)*LTF2×80 M_part3, (−1)*LTF2×80 M_part4, (−1)*LTF2×80 M_part5, $0_{11}$}.

That is, coefficients corresponding to the five parts are 1, 1, 1, 1, 1; −1, 1, 1, 1, −1; 1, 1, 1, 1, −1; and 1, −1, −1, −1, −1.

LTF2×80 M_part1=LTF2×80 M_2(1:242);
LTF2×80 M_part2=LTF2×80 M_2(243:484);
LTF2×80 M_part3=LTF2×80 M_2(485:517);

LTF2×80 M_part4=LTF2×80 M_2(518:759); and

LTF2×80 M_part5=LTF2×80 M_2(760:1001).

$0_{12}$ indicates 12 consecutive 0s, $0_{23}$ indicates 23 consecutive 0s, and $0_{11}$ indicates 11 consecutive 0s.

The largest PAPR of the 2×EHT_LTF_320 M sequence and the corresponding rotated sequence in the entire bandwidth, in the single resource unit, in the combined resource unit, and in the PAPRs in the multi-stream scenario is 8.7366 dB.

The following describes an LTF sequence in the 4× mode in the 80 MHz bandwidth.

(10) A possible 4×LTF sequence of the 80 MHz bandwidth, including 1024 elements and denoted as a sequence 8.

Sequence 8=
{0 0 0 0 0 0 0 0 0 0 0 0 1 1 1 1 1 −1
−1 1 −1
−1 1 1 −1 1 −1 1 −1 −1 −1 −1 −1 1 1 −1 −1 −1 1
1 −1 1
−1 1 1 1 1 1 1 −1 −1 1 −1 −1 1 1 −1 1 −1 1
1 1 1 1 1 −1 −1 1 1 1 −1 −1 1 −1 1 −1 −1 −1 −1 −1
−1 1 1 −1 1 1 −1 −1 1 −1 1 −1 1 1 1 1 1 −1 −1 1
1 1 −1 −1 1 −1 1
−1 1 1 1 1 1 −1 −1 1 −1 −1 1 1 −1 1 −1 1 1
1 1 1 1 −1 −1 1 1 1 −1 −1 1 −1 1 −1 −1 1 1 −1 1
1 −1 1 −1 1
−1 −1 −1 −1 −1 1 1 −1 −1 −1 1 1 −1 1 −1 1 1 1
1 1 1
−1 −1 1 −1 −1 1 1 −1 1 −1 1 1 1 1 1 1 −1 −1
1 1 1
−1 −1 1 −1 1 −1 1 1 1 1 1 −1 −1 1 −1 −1 1 1
−1 1 −1 1 −1 −1 −1 −1 −1 1 1 −1 −1 −1 1 1 −1 1 −1 1
−1 −1 −1 −1 −1 1 1 −1 1 1 −1 −1 1 −1 1 −1 −1 −1 −1 −1
−1 1 1 −1 −1 −1 1 1 −1 1 −1 −1 −1 −1 −1 1 1 −1 1 1
−1 −1 1 −1 1 −1 1 1 1 1 1 −1 −1 1 1 1 −1 −1 1 −1
1 −1 −1 −1 −1 −1 −1 1 1 −1 1 1 −1 −1 1 −1 1 −1 −1 −1
−1 −1 −1 1 1 −1 −1 −1 1 1 −1 1 −1 1 1 1 1 1 1 −1
−1 1 −1 −1 1 1 −1 1 −1 1 −1 −1 −1 −1 −1 1 1 −1 −1 −1
1 1 −1 1 −1 1 −1 −1 −1 −1 −1 1 −1 −1 1 1 −1
−1 1 −1 1 −1 −1 −1 −1 −1 −1 1 1 −1 −1 −1 1 1 1
1 1 −1
−1 1 −1 −1 1 1 −1 1 −1 1 −1 −1 −1 −1 −1 1 1 −1
−1 −1 1 1 −1 1 −1 1 1 1 1 1 1 −1 −1 1 −1 −1 1 1
−1 1 −1 1 1 1 1 1 1 −1 −1 1 1 1 −1 −1 1 −1 1 −1
1 1 1 1 1 −1 −1 1 −1 −1 1 1 −1 1 −1 1 −1 −1 −1 −1
−1 1 1 −1 −1 −1 1 1 −1 1 −1 1 −1 −1 −1 −1 −1 1 1 −1
1 1 −1 −1 1 −1 1 −1 −1 −1 −1
−1 −1 1 1 −1 −1 −1 1 1 −1 1 −1 1 0 0 0 0 0
1 1 1 1 1 −1 −1 1 −1 −1 1 1 −1 1 −1 1 −1 −1 −1 −1
−1 1 1 −1 −1
−1 1 1 −1 1 −1 1 1 1 1 1 1 −1 −1 1 −1 −1 1
1 −1 1
1 1 1 1 1 1 1 −1 −1 1 1 1 −1 −1 1 −1 1 −1
−1 −1 −1
−1 −1 1 1 −1 1 1 −1 −1 1 −1 1 −1 1 1 1 1 1
−1 −1 1 1 1 −1 −1 1 −1 1 −1 1 1 1 1 1 −1 −1 1 −1
−1 1 1 −1 1
−1 1 1 1 1 1 1 −1 −1 1 1 1 −1 −1 1 −1 1 −1
−1 1 −1
1 1 1 −1 1 −1 1 −1 −1 −1 −1 −1 1 1 −1 −1 1 1
1 −1 1
−1 1 1 1 1 1 1 −1 −1 1 −1 −1 1 1 −1 1 −1 1
1 1 1 1 1 −1 −1 1 1 1 −1 −1 1 −1 1 −1 1 1 1 1
1 −1 −1 1 −1
−1 1 1 −1 1 −1 1 −1 −1 −1 −1 −1 1 1 −1 1 −1 1
1 −1 1
−1 1 −1 −1 −1 −1 −1 1 1 −1 1 1 −1 −1 1 −1 1 −1
−1 −1 −1
−1 −1 1 1 −1 −1 −1 1 1 −1 1 −1 1 1 1 1 −1 −1
1 −1 −1 1 1 −1 1 −1 1 −1 −1 −1 −1 −1 1 1 −1 −1 −1 1
1 −1 1 −1 1 1 1 1 1 1 −1 −1 1 −1 −1 1 1 −1 1 −1
1 1 1 1 1 1 −1
−1 1 1 1 −1 −1 1 −1 1 −1 −1 −1 −1 −1 −1 1 1 −1
1 1 −1
−1 1 −1 1 −1 1 1 1 1 1 −1 −1 1 1 1 −1 −1 1
−1 1 −1 1 1 1 1 1 −1 −1 1 −1 −1 1 1 −1 1 −1 1 1
1 1 1 1 −1
−1 1 1 1 −1 −1 −1 −1 −1 1 1 −1 1 1 −1 −1 1 −1
1 −1 1 1 1 I 1 −1 −1 1 1 1 −1 −1 1 −1 1 −1 −1 −1
−1 −1 −1 1 1
−1 1 1 −1 −1 1 −1 1 −1 −1 −1 −1 −1 −1 1 1 −1 −1
−1 1 1
−1 1 −1 1 −1 −1 −1 −1 −1 1 1 −1 1 1 −1 −1 1 −1
1 −1 1 1 1 1 1 −1 −1 1 1 1 −1 −1 1 −1 1 −1 1 1

-continued

| | | | | | | | | | | | | | | | | | | | |
|---|---|---|---|---|---|---|---|---|---|---|---|---|---|---|---|---|---|---|---|
| 1 | 1 | 1 | −1 | −1 | 1 | −1 | −1 | 1 | 1 | −1 | 1 | −1 | 1 | 1 | 1 | 1 | 1 | 1 | −1 |
| −1 | 1 | 1 | 1 | −1 | −1 | 1 | | | | | | | | | | | | | |
| | | −1 | 1 | −1 | 0 | 0 | 0 | 0 | 0 | 0 | 0 | 0 | 0 | 0 | 0} | | | | |

Next, refer to Table 9. It is described that the largest value of PAPRs of the sequence 8 and a rotated sequence corresponding to the sequence 8 in an entire bandwidth, in a single RU, and in a combined RU is 6.8997 dB.

It is assumed that the GAN network generates x6 4×LTF sequences in an 80 MHz. For each 4×LTF sequence in an 80 MHz, if the largest PAPR is selected from a plurality of PAPRs in an entire bandwidth, in a single RU, and in a combined RU in the 4×LTF sequence in an 80 MHz and a corresponding rotated sequence, x6 PAPRs may be selected in total. In other words, x6 largest PAPRs are selected. Each largest PAPR value corresponds to a 4×LTF sequence in an 80 MHz generated by the GAN network.

Then, the smallest PAPR value is selected from the x6 largest PAPR values. A 4×LTF sequence in an 80 MHz generated by a GAN network corresponding to the selected smallest PAPR is a desired 4×LTF sequence in an 80 MHz.

For example, 6.8997 dB in Table 9 is the smallest PAPR selected from the x6 largest PAPR values, and a 4×LTF sequence in an 80 MHz generated by a GAN network corresponding to 6.8997 dB is a desired 4×LTF sequence in an 80 MHz, namely, the foregoing sequence 8.

The training set includes y6 4×LTF sequences in an 80 MHz, and for each LTF sequence, the largest PAPR is selected from a plurality of PAPRs of the LTF sequence and a rotated sequence corresponding to the LTF sequence in an entire bandwidth, in a single RU, and in a combined RU. In this case, y6 PAPRs may be selected in total. The smallest value of the y6 PAPRs is 7.1345 dB.

If a PAPR of an LTF sequence generated by the GAN network is less than a PAPR of an LTF sequence in the training set, PAPR values of LTF sequences that are generated by the GAN network and that are in different bandwidths are lower.

TABLE 9

| | 80M, 4x |
|---|---|
| Largest PAPR of an LTF sequence in a training set | 7.1345 dB |
| Largest PAPR of an LTF sequence generated by a GAN | 6.8997 dB |

The foregoing describes the PPDU transmission method in embodiments of this application, and the following describes PPDU transmission apparatuses in embodiments of this application. The PPDU transmission apparatuses in embodiments of this application include a PPDU transmission apparatus applied to a transmit end and a PPDU transmission apparatus applied to a receive end. It should be understood that the PPDU transmission apparatus applied to the transmit end is the first communication device in the foregoing method, and the apparatus has any function of the first communication device in the foregoing method. The PPDU transmission apparatus applied to the receive end is the second communication device in the foregoing method, and the apparatus has any function of the second communication device in the foregoing method.

In embodiments of this application, the communication device may be divided into functional units based on the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that, in embodiments of this application, division into units is an example, and is merely logical function division. In an actual implementation, another division manner may be used.

Figure 9:
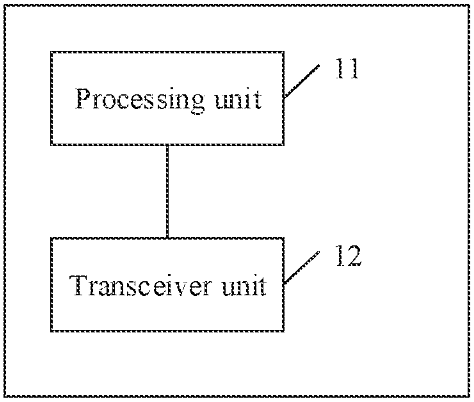
FIG. 9 is a schematic diagram of a structure of a PPDU transmission apparatus applicable to an embodiment of this application.

FIG. 9 is a schematic diagram of a structure of a PPDU transmission apparatus applied to a transmit end according to an embodiment of this application. The apparatus includes a processing unit 11 and a transceiver unit 12.

The processing unit 11 is configured to generate a physical layer protocol data unit PPDU, where the PPDU includes an LTF sequence. The transceiver unit 12 is configured to send the PPDU.

Optionally, the LTF sequence included in the PPDU may be any LTF sequence provided in the foregoing (1) to (10).

The PPDU transmission apparatus that is applied to the transmit end and that is provided in this embodiment of this application is the first communication device in the foregoing method, and has any function of the first communication device in the foregoing method. For specific details, refer to the foregoing method. Details are not described herein again.

Figure 10:
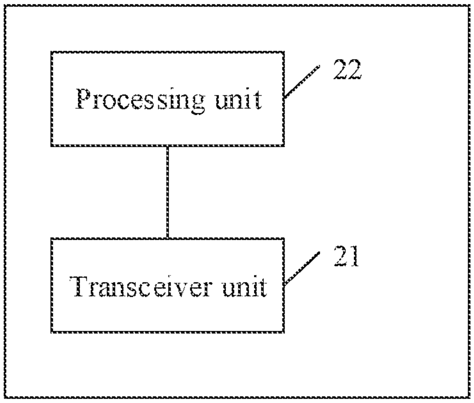
FIG. 10 is a schematic diagram of a structure of a PPDU transmission apparatus applicable to an embodiment of this application.

FIG. 10 is a schematic diagram of a structure of a PPDU transmission apparatus applied to a receive end according to an embodiment of this application. The apparatus includes a transceiver unit 21 and a processing unit 22.

the transceiver unit 21 is configured to receive a PPDU, where the PPDU includes an LTF sequence. The processing unit 22 is configured to parse the PPDU to obtain the LTF sequence.

Optionally, the LTF sequence included in the PPDU may be any LTF sequence provided in the foregoing (1) to (10).

The PPDU transmission apparatus that is applied to the receive end and that is provided in this embodiment of this application is the second communication device in the foregoing method, and has any function of the second communication device in the foregoing method. For specific details, refer to the foregoing method. Details are not described herein again.

The foregoing describes the PPDU transmission apparatus applied to the transmit end and the PPDU transmission apparatus applied to the receive end in embodiments of this application. The following describes possible product forms of the PPDU transmission apparatus applied to the transmit end and the PPDU transmission apparatus applied to the receive end. It should be understood that, any product in any form that has features of the PPDU transmission apparatus applied to the transmit end shown in FIG. 9 and any product in any form that has features of the PPDU transmission apparatus applied to the receive end shown in FIG. 10 shall fall within the protection scope of this application. It should be further understood that the following descriptions are merely examples, and the product form of the PPDU transmission apparatus applied to the transmit end and the product form of the PPDU transmission apparatus applied to the receive end in embodiments of this application are not limited thereto.

As a possible product form, the PPDU transmission apparatus applied to the transmit end and the PPDU transmission apparatus applied to the receive end in embodiments of this application may be implemented by using a general bus architecture.

The PPDU transmission apparatus applied to the transmit end includes a processor and a transceiver that is internally connected to and communicates with the processor. The processor is configured to generate a PPDU, where the PPDU includes an LTF sequence. The transceiver is configured to send the PPDU. Optionally, the PPDU transmission apparatus applied to the transmit end may further include a memory, and the memory is configured to store instructions executed by the processor. Optionally, the LTF sequence included in the PPDU may be any LTF sequence provided in the foregoing (1) to (10).

The PPDU transmission apparatus applied to the receive end includes a processor and a transceiver that is internally connected to and communicates with the processor. The transceiver is configured to receive a PPDU. The processor is configured to parse the received PPDU to obtain an LTF sequence included in the PPDU. Optionally, the PPDU transmission apparatus applied to the receive end may further include a memory, and the memory is configured to store instructions executed by the processor. Optionally, the LTF sequence included in the PPDU may be any LTF sequence provided in the foregoing (1) to (10).

As a possible product form, the PPDU transmission apparatus applied to the transmit end and the PPDU transmission apparatus applied to the receive end in embodiments of this application may be implemented by a general purpose processor.

The general purpose processor used in the PPDU transmission apparatus applied to the transmit end includes a processing circuit and an input/output interface that is internally connected to and communicates with the processing circuit. The processing circuit is configured to generate a PPDU, where the PPDU includes an LTF sequence. The input/output interface is configured to send the PPDU. Optionally, the general purpose processor may further include a storage medium, and the storage medium is configured to store instructions executed by the processing circuit. Optionally, the LTF sequence included in the PPDU may be any LTF sequence provided in the foregoing (1) to (10).

The general purpose processor used in the PPDU transmission apparatus applied to the receive end includes a processing circuit and an input/output interface that is internally connected to and communicates with the processing circuit. The input/output interface is configured to receive a PPDU, where the PPDU includes an LTF. The processing circuit is configured to parse the PPDU to obtain the LTF sequence included in the PPDU. Optionally, the general purpose processor may further include a storage medium, and the storage medium is configured to store instructions executed by the processing circuit. Optionally, the LTF sequence included in the PPDU may be any LTF sequence provided in the foregoing (1) to (10).

As a possible product form, the PPDU transmission apparatus applied to the transmit end and the PPDU transmission apparatus applied to the receive end in embodiments of this application may alternatively be implemented by using the following components: one or more FPGAs (field programmable gate arrays), PLDs (programmable logic devices), controllers, state machines, gate logic, discrete hardware components, any other suitable circuits, or any combination of circuits that can perform various functions described in this application.

It should be understood that the PPDU transmission apparatus applied to the transmit end and the PPDU transmission apparatus applied to the receive end in various product forms respectively have any function of the first communication device and the second communication device in the foregoing method embodiments. Details are not described herein again.

An embodiment of this application further provides a computer-readable storage medium. The computer-readable storage medium stores instructions. When the instructions are run on a computer, the computer is enabled to perform the foregoing PPDU transmission method.

An embodiment of this application further provides a computer program product. When the computer program product runs on a computer, the computer is enabled to perform the foregoing PPDU transmission method.

An embodiment of this application further provides a wireless communication system, including a first communication device (for example, an AP) and a second communication device (for example, a STA). The first communication device and the second communication device may perform the foregoing PPDU transmission method.

Persons of ordinary skill in the art may be aware that, in combination with the examples described in embodiments disclosed in this specification, method steps and units may be implemented by electronic hardware, computer software, or a combination thereof. To clearly describe interchangeability between hardware and software, the foregoing has generally described steps and compositions of each embodiment according to functions. Whether a function is performed by hardware or software depends on particular applications and design constraints of the technical solutions. Persons of ordinary skill in the art may use different methods to implement the described functions for each particular application, but it should not be considered that the implementation goes beyond the scope of this application.

It may be clearly understood by persons skilled in the art that, for the purpose of convenient and brief description, for a detailed working process of the foregoing described system, apparatus, and unit, refer to a corresponding process in the foregoing method embodiment. Details are not described herein again.

In the several embodiments provided in this application, it should be understood that the disclosed system, apparatus, and method may be implemented in other manners. For example, the foregoing described apparatus embodiments are merely examples. For example, division into the units is merely a logical function division and may be another division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of embodiments in this application.

In addition, function units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the functions may be stored in a computer-readable storage medium. Based on such an understanding, the technical solutions in this application essentially, or the part contributing to the conventional technology, or all or a part of the technical solutions may be implemented in a form of a software product. The computer software product is stored in a storage medium and includes several instructions for instructing a computer device (which may be a personal computer, a server, a network device, or the like) to perform all or a part of the steps of the methods in embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

It should be noted that the term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects. The term "at least one" means one or more. The term "at least one of A and B", similar to the term "A and/or B", describes an association relationship between the associated objects and represents that three relationships may exist. For example, at least one of A and B may represent the following three cases: Only A exists, both A and B exist, and only B exists.

Persons skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Clearly, persons skilled in the art can make various modifications and variations to the embodiments of this application without departing from the spirit and scope of the embodiments of this application. In this way, this application is intended to cover these modifications and variations to embodiments of this application provided that they fall within the scope of protection defined by the following claims and their equivalent technologies of this application.

What is claimed is:

1. A communication apparatus for physical layer protocol data unit (PPDU) transmission, the communication apparatus comprising:

at least one processor; and one or more memories coupled to the at least one processor and storing instructions for execution by the at least one processor to:

generate a PPDU, wherein the PPDU comprises a long training field (LTF) sequence; and send the PPDU, wherein in response to the LTF being a 2×LTF sequence in an 80 MHZ, the 2×LTF sequence in the 80 MHz is:

| | | | | | | | | | | | |
|---|---|---|---|---|---|---|---|---|---|---|---|
| {00 | 0 | 0 | 0 | 0 | 0 | 0 | 0 | 0 | 0 | 0 | 1 |
| 0 | 1 | 0 | −1 | 0 | 1 | 0 | 1 | 0 | 1 | 0 | −1 |
| 0 | 1 | 0 | 1 | 0 | 1 | 0 | 1 | 0 | −1 | 0 | −1 |
| 0 | −1 | 0 | 1 | 0 | −1 | 0 | −1 | 0 | 1 | 0 | 1 |
| 0 | −1 | 0 | 1 | 0 | 1 | 0 | 1 | 0 | −1 | 0 | −1 |
| 0 | −1 | 0 | −1 | 0 | 1 | 0 | 1 | 0 | 1 | 0 | 1 |
| 0 | −1 | 0 | 1 | 0 | 1 | 0 | 1 | 0 | −1 | 0 | 1 |
| 0 | −1 | 0 | −1 | 0 | 1 | 0 | −1 | 0 | −1 | 0 | −1 |
| 0 | 1 | 0 | 1 | 0 | −1 | 0 | −1 | 0 | −1 | 0 | 1 |
| 0 | −1 | 0 | −1 | 0 | 1 | 0 | −1 | 0 | 1 | 0 | 1 |
| 0 | −1 | 0 | 1 | 0 | 1 | 0 | −1 | 0 | 1 | 0 | −1 |
| 0 | −1 | 0 | −1 | 0 | 1 | 0 | −1 | 0 | −1 | 0 | −1 |
| 0 | −1 | 0 | 1 | 0 | −1 | 0 | −1 | 0 | 1 | 0 | 1 |
| 0 | −1 | 0 | 1 | 0 | 1 | 0 | 1 | 0 | −1 | 0 | −1 |
| 0 | −1 | 0 | −1 | 0 | 1 | 0 | −1 | 0 | 1 | 0 | 1 |
| 0 | 1 | 0 | −1 | 0 | 1 | 0 | 1 | 0 | 1 | 0 | 1 |
| 0 | −1 | 0 | −1 | 0 | −1 | 0 | 1 | 0 | 1 | 0 | 1 |

-continued

| | | | | | | | | | | | | |
|---|---|---|---|---|---|---|---|---|---|---|---|---|
| 0 | −1 | 0 | −1 | 0 | 1 | 0 | 1 | 0 | 1 | 0 | −1 | |
| 0 | 1 | 0 | 1 | 0 | −1 | 0 | 1 | 0 | −1 | 0 | −1 | |
| 0 | −1 | 0 | −1 | 0 | 1 | 0 | −1 | 0 | −1 | 0 | −1 | |
| 0 | 1 | 0 | −1 | 0 | 1 | 0 | 1 | 0 | −1 | 0 | 1 | |
| 0 | 1 | 0 | −1 | 0 | −1 | 0 | −1 | 0 | 1 | 0 | −1 | |
| 0 | −1 | 0 | −1 | 0 | 1 | 0 | −1 | 0 | 1 | 0 | 1 | |
| 0 | −1 | 0 | 1 | 0 | 1 | 0 | 1 | 0 | −1 | 0 | −1 | |
| 0 | 1 | 0 | 1 | 0 | 1 | 0 | −1 | 0 | 1 | 0 | 1 | |
| 0 | −1 | 0 | 1 | 0 | −1 | 0 | −1 | 0 | 1 | 0 | −1 | |
| 0 | 1 | 0 | 1 | 0 | 1 | 0 | −1 | 0 | 1 | 0 | 1 | |
| 0 | 1 | 0 | 1 | 0 | −1 | 0 | −1 | 0 | −1 | 0 | 1 | |
| 0 | −1 | 0 | −1 | 0 | 1 | 0 | 1 | 0 | −1 | 0 | 1 | |
| 0 | 1 | 0 | 1 | 0 | −1 | 0 | −1 | 0 | −1 | 0 | −1 | |
| 0 | 1 | 0 | 1 | 0 | 1 | 0 | −1 | 0 | −1 | 0 | −1 | |
| 0 | −1 | 0 | 1 | 0 | −1 | 0 | −1 | 0 | −1 | 0 | 1 | |
| 0 | −1 | 0 | 1 | 0 | 1 | 0 | 1 | 0 | −1 | 0 | −1 | |
| 0 | 1 | 0 | 1 | 0 | 1 | 0 | 1 | 0 | 1 | 0 | 1 | |
| 0 | −1 | 0 | 1 | 0 | −1 | 0 | −1 | 0 | −1 | 0 | −1 | |
| 0 | 1 | 0 | −1 | 0 | −1 | 0 | −1 | 0 | 1 | 0 | −1 | |
| 0 | −1 | 0 | 1 | 0 | −1 | 0 | 1 | 0 | 1 | 0 | −1 | |
| 0 | 1 | 0 | 1 | 0 | −1 | 0 | −1 | 0 | 1 | 0 | −1 | |
| 0 | −1 | 0 | −1 | 0 | 1 | 0 | 1 | 0 | 1 | 0 | 1 | |
| 0 | −1 | 0 | 1 | 0 | −1 | 0 | −1 | 0 | −1 | 0 | 1 | |
| 0 | −1 | 0 | −1 | 0 | −1 | 0 | −1 | 0 | 1 | 0 | 1 | |
| 0 | 1 | 0 | 1 | 0 | −1 | 0 | −1 | 0 | −1 | 0 | 1 | |
| 0 | 1 | 0 | 1 | 0 | 0 | 0 | 0 | 0 | 0 | 0 | 1 | |
| 0 | −1 | 0 | −1 | 0 | 1 | 0 | 1 | 0 | −1 | 0 | 1 | |
| 0 | −1 | 0 | −1 | 0 | −1 | 0 | 1 | 0 | 1 | 0 | 1 | |
| 0 | 1 | 0 | −1 | 0 | 1 | 0 | 1 | 0 | 1 | 0 | −1 | |
| 0 | 1 | 0 | −1 | 0 | −1 | 0 | −1 | 0 | −1 | 0 | 1 | |
| 0 | 1 | 0 | 1 | 0 | −1 | 0 | 1 | 0 | 1 | 0 | −1 | |
| 0 | −1 | 0 | 1 | 0 | −1 | 0 | −1 | 0 | 1 | 0 | −1 | |
| 0 | −1 | 0 | 1 | 0 | −1 | 0 | 1 | 0 | 1 | 0 | 1 | |
| 0 | −1 | 0 | 1 | 0 | 1 | 0 | 1 | 0 | 1 | 0 | −1 | |
| 0 | 1 | 0 | −1 | 0 | −1 | 0 | 1 | 0 | −1 | 0 | −1 | |
| 0 | −1 | 0 | 1 | 0 | 1 | 0 | −1 | 0 | −1 | 0 | 1 | |
| 0 | 1 | 0 | −1 | 0 | 1 | 0 | 1 | 0 | 1 | 0 | −1 | |
| 0 | 1 | 0 | 1 | 0 | 1 | 0 | 1 | 0 | −1 | 0 | −1 | |
| 0 | −1 | 0 | 1 | 0 | 1 | 0 | 1 | 0 | 1 | 0 | −1 | |
| 0 | −1 | 0 | 1 | 0 | 1 | 0 | −1 | 0 | −1 | 0 | 1 | |
| 0 | 1 | 0 | −1 | 0 | 1 | 0 | 1 | 0 | 1 | 0 | −1 | |
| 0 | −1 | 0 | −1 | 0 | −1 | 0 | 1 | 0 | −1 | 0 | −1 | |
| 0 | −1 | 0 | 1 | 0 | −1 | 0 | 1 | 0 | 1 | 0 | −1 | |
| 0 | 1 | 0 | −1 | 0 | −1 | 0 | 1 | 0 | −1 | 0 | −1 | |
| 0 | −1 | 0 | 1 | 0 | 1 | 0 | −1 | 0 | −1 | 0 | −1 | |
| 0 | 1 | 0 | −1 | 0 | −1 | 0 | 1 | 0 | −1 | 0 | 1 | |
| 0 | 1 | 0 | 1 | 0 | −1 | 0 | 1 | 0 | 1 | 0 | 1 | |
| 0 | −1 | 0 | 1 | 0 | −1 | 0 | 1 | 0 | 1 | 0 | −1 | |
| 0 | 1 | 0 | −1 | 0 | −1 | 0 | −1 | 0 | 1 | 0 | −1 | |
| 0 | −1 | 0 | −1 | 0 | −1 | 0 | 1 | 0 | −1 | 0 | 1 | |
| 0 | 1 | 0 | −1 | 0 | 1 | 0 | 1 | 0 | 1 | 0 | −1 | |
| 0 | −1 | 0 | 1 | 0 | 1 | 0 | 1 | 0 | −1 | 0 | −1 | |
| 0 | −1 | 0 | 1 | 0 | 1 | 0 | 1 | 0 | 1 | 0 | −1 | |
| 0 | 1 | 0 | 1 | 0 | 1 | 0 | −1 | 0 | 1 | 0 | −1 | |
| 0 | −1 | 0 | −1 | 0 | −1 | 0 | 1 | 0 | 1 | 0 | 1 | |
| 0 | −1 | 0 | 1 | 0 | 1 | 0 | −1 | 0 | −1 | 0 | 1 | |
| 0 | −1 | 0 | −1 | 0 | 1 | 0 | −1 | 0 | 1 | 0 | −1 | |
| 0 | −1 | 0 | −1 | 0 | 1 | 0 | −1 | 0 | 1 | 0 | 1 | |
| 0 | −1 | 0 | 1 | 0 | 1 | 0 | −1 | 0 | 1 | 0 | −1 | |
| 0 | −1 | 0 | 1 | 0 | −1 | 0 | −1 | 0 | −1 | 0 | 1 | |
| 0 | 1 | 0 | −1 | 0 | −1 | 0 | −1 | 0 | 1 | 0 | −1 | |
| 0 | −1 | 0 | 1 | 0 | −1 | 0 | 1 | 0 | 1 | 0 | 1 | |
| 0 | −1 | 0 | 1 | 0 | 1 | 0 | 1 | 0 | 1 | 0 | −1 | |
| 0 | −1 | 0 | −1 | 0 | −1 | 0 | 1 | 0 | 1 | 0 | 1 | |
| 0 | −1 | 0 | 1 | 0 | 1 | 0 | −1 | 0 | −1 | 0 | 1 | |
| 0 | −1 | 0 | −1 | 0 | −1 | 0 | 1 | 0 | 1 | 0 | 1 | |
| 0 | 1 | 0 | −1 | 0 | 1 | 0 | 1 | 0 | 1 | 0 | −1 | |
| 0 | 1 | 0 | 1 | 0 | 0 | 0 | 0 | 0 | 0 | 0 | 0 | |
| 0 | 0 | 0}; | | | | | | | | | | |

| | | | | | | | | | | | |
|---|---|---|---|---|---|---|---|---|---|---|---|
| {0 | 0 | 0 | 0 | 0 | 0 | 0 | 0 | 0 | 0 | 0 | 0 |
| −1 | 0 | −1 | 0 | 1 | 0 | 1 | 0 | 1 | 0 | −1 | 0 |
| −1 | 0 | 1 | 0 | −1 | 0 | 1 | 0 | −1 | 0 | 1 | 0 |
| 1 | 0 | 1 | 0 | 1 | 0 | 1 | 0 | 1 | 0 | 1 | 0 |
| −1 | 0 | −1 | 0 | 1 | 0 | −1 | 0 | −1 | 0 | 1 | 0 |
| 1 | 0 | −1 | 0 | 1 | 0 | −1 | 0 | 1 | 0 | 1 | 0 |

-continued

| | | | | | | | | | | | |
|---|---|---|---|---|---|---|---|---|---|---|---|
| 1 | 0 | 1 | 0 | −1 | 0 | −1 | 0 | 1 | 0 | 1 | 0 |
| 1 | 0 | −1 | 0 | −1 | 0 | 1 | 0 | −1 | 0 | 1 | 0 |
| −1 | 0 | 1 | 0 | −1 | 0 | −1 | 0 | −1 | 0 | −1 | 0 |
| −1 | 0 | −1 | 0 | 1 | 0 | 1 | 0 | −1 | 0 | 1 | 0 |
| 1 | 0 | −1 | 0 | −1 | 0 | 1 | 0 | −1 | 0 | 1 | 0 |
| −1 | 0 | −1 | 0 | −1 | 0 | −1 | 0 | 1 | 0 | 1 | 0 |
| −1 | 0 | −1 | 0 | −1 | 0 | 1 | 0 | 1 | 0 | −1 | 0 |
| 1 | 0 | −1 | 0 | 1 | 0 | −1 | 0 | −1 | 0 | −1 | 0 |
| −1 | 0 | −1 | 0 | −1 | 0 | −1 | 0 | 1 | 0 | 1 | 0 |
| −1 | 0 | 1 | 0 | 1 | 0 | −1 | 0 | −1 | 0 | 1 | 0 |
| −1 | 0 | 1 | 0 | 1 | 0 | 1 | 0 | 1 | 0 | 1 | 0 |
| −1 | 0 | −1 | 0 | 1 | 0 | 1 | 0 | 1 | 0 | −1 | 0 |
| −1 | 0 | 1 | 0 | −1 | 0 | 1 | 0 | −1 | 0 | 1 | 0 |
| −1 | 0 | −1 | 0 | −1 | 0 | −1 | 0 | −1 | 0 | −1 | 0 |
| 1 | 0 | 1 | 0 | −1 | 0 | 1 | 0 | 1 | 0 | −1 | 0 |
| 1 | 0 | −1 | 0 | −1 | 0 | −1 | 0 | −1 | 0 | 1 | 0 |
| 1 | 0 | −1 | 0 | −1 | 0 | −1 | 0 | 1 | 0 | 1 | 0 |
| −1 | 0 | 1 | 0 | −1 | 0 | 1 | 0 | −1 | 0 | −1 | 0 |
| −1 | 0 | −1 | 0 | −1 | 0 | −1 | 0 | −1 | 0 | 1 | 0 |
| −1 | 0 | −1 | 0 | 1 | 0 | 1 | 0 | −1 | 0 | −1 | 0 |
| 1 | 0 | −1 | 0 | 1 | 0 | −1 | 0 | −1 | 0 | −1 | 0 |
| −1 | 0 | 1 | 0 | 1 | 0 | −1 | 0 | −1 | 0 | −1 | 0 |
| 1 | 0 | 1 | 0 | −1 | 0 | 1 | 0 | −1 | 0 | 1 | 0 |
| −1 | 0 | 1 | 0 | 1 | 0 | 1 | 0 | 1 | 0 | 1 | 0 |
| 1 | 0 | −1 | 0 | −1 | 0 | 1 | 0 | −1 | 0 | −1 | 0 |
| 1 | 0 | 1 | 0 | −1 | 0 | 1 | 0 | −1 | 0 | −1 | 0 |
| −1 | 0 | −1 | 0 | −1 | 0 | 1 | 0 | 1 | 0 | −1 | 0 |
| −1 | 0 | −1 | 0 | 1 | 0 | 1 | 0 | −1 | 0 | 1 | 0 |
| −1 | 0 | 1 | 0 | −1 | 0 | −1 | 0 | −1 | 0 | −1 | 0 |
| −1 | 0 | −1 | 0 | −1 | 0 | 1 | 0 | 1 | 0 | −1 | 0 |
| 1 | 0 | 1 | 0 | −1 | 0 | −1 | 0 | 1 | 0 | −1 | 0 |
| 1 | 0 | 1 | 0 | 1 | 0 | 1 | 0 | 1 | 0 | −1 | 0 |
| −1 | 0 | 1 | 0 | 1 | 0 | 1 | 0 | −1 | 0 | −1 | 0 |
| 1 | 0 | −1 | 0 | 1 | 0 | −1 | 0 | 1 | 0 | −1 | 0 |
| −1 | 0 | −1 | 0 | −1 | 0 | −1 | 0 | −1 | 0 | 1 | 0 |
| 1 | 0 | −1 | 0 | 1 | 0 | 1 | 0 | −1 | 0 | −1 | 0 |
| 1 | 0 | −1 | 0 | 1 | 0 | 0 | 0 | 0 | 0 | 0 | 0 |
| −1 | 0 | −1 | 0 | −1 | 0 | −1 | 0 | 1 | 0 | 1 | 0 |
| −1 | 0 | −1 | 0 | −1 | 0 | 1 | 0 | 1 | 0 | −1 | 0 |
| 1 | 0 | −1 | 0 | 1 | 0 | −1 | 0 | −1 | 0 | −1 | 0 |
| −1 | 0 | −1 | 0 | −1 | 0 | −1 | 0 | 1 | 0 | 1 | 0 |
| −1 | 0 | 1 | 0 | 1 | 0 | −1 | 0 | −1 | 0 | 1 | 0 |
| −1 | 0 | 1 | 0 | −1 | 0 | −1 | 0 | −1 | 0 | −1 | 0 |
| 1 | 0 | 1 | 0 | −1 | 0 | −1 | 0 | −1 | 0 | 1 | 0 |
| 1 | 0 | −1 | 0 | 1 | 0 | −1 | 0 | 1 | 0 | −1 | 0 |
| 1 | 0 | 1 | 0 | 1 | 0 | 1 | 0 | 1 | 0 | 1 | 0 |
| −1 | 0 | −1 | 0 | 1 | 0 | −1 | 0 | −1 | 0 | −1 | 0 |
| 1 | 0 | −1 | 0 | 1 | 0 | −1 | 0 | 1 | 0 | 1 | 0 |
| 1 | 0 | 1 | 0 | −1 | 0 | −1 | 0 | 1 | 0 | 1 | 0 |
| 1 | 0 | −1 | 0 | −1 | 0 | 1 | 0 | −1 | 0 | 1 | 0 |
| −1 | 0 | 1 | 0 | 1 | 0 | 1 | 0 | 1 | 0 | 1 | 0 |
| 1 | 0 | 1 | 0 | −1 | 0 | −1 | 0 | 1 | 0 | −1 | 0 |
| −1 | 0 | 1 | 0 | 1 | 0 | −1 | 0 | 1 | 0 | −1 | 0 |
| −1 | 0 | −1 | 0 | −1 | 0 | −1 | 0 | 1 | 0 | 1 | 0 |
| −1 | 0 | −1 | 0 | −1 | 0 | 1 | 0 | 1 | 0 | −1 | 0 |
| 1 | 0 | −1 | 0 | 1 | 0 | −1 | 0 | 1 | 0 | 1 | 0 |
| 1 | 0 | 1 | 0 | 1 | 0 | 1 | 0 | −1 | 0 | −1 | 0 |
| 1 | 0 | −1 | 0 | −1 | 0 | 1 | 0 | 1 | 0 | −1 | 0 |
| 1 | 0 | −1 | 0 | 1 | 0 | −1 | 0 | −1 | 0 | 1 | 0 |
| 1 | 0 | 1 | 0 | −1 | 0 | −1 | 0 | 1 | 0 | −1 | 0 |
| 1 | 0 | −1 | 0 | 1 | 0 | 1 | 0 | 1 | 0 | 1 | 0 |
| 1 | 0 | 1 | 0 | 1 | 0 | −1 | 0 | −1 | 0 | 1 | 0 |
| −1 | 0 | −1 | 0 | 1 | 0 | 1 | 0 | −1 | 0 | 1 | 0 |
| −1 | 0 | 1 | 0 | 1 | 0 | 1 | 0 | 1 | 0 | −1 | 0 |
| −1 | 0 | 1 | 0 | 1 | 0 | 1 | 0 | −1 | 0 | −1 | 0 |
| 1 | 0 | −1 | 0 | 1 | 0 | −1 | 0 | 1 | 0 | −1 | 0 |
| 1 | 0 | −1 | 0 | −1 | 0 | −1 | 0 | −1 | 0 | 1 | 0 |
| 1 | 0 | −1 | 0 | 1 | 0 | 1 | 0 | −1 | 0 | −1 | 0 |
| 1 | 0 | −1 | 0 | 1 | 0 | 1 | 0 | 1 | 0 | 1 | 0 |
| 1 | 0 | −1 | 0 | −1 | 0 | 1 | 0 | 1 | 0 | 1 | 0 |
| −1 | 0 | −1 | 0 | 1 | 0 | −1 | 0 | 1 | 0 | −1 | 0 |
| 1 | 0 | 1 | 0 | 1 | 0 | 1 | 0 | 1 | 0 | 1 | 0 |
| 1 | 0 | −1 | 0 | −1 | 0 | 1 | 0 | −1 | 0 | −1 | 0 |
| 1 | 0 | 1 | 0 | −1 | 0 | 1 | 0 | −1 | 0 | −1 | 0 |
| −1 | 0 | −1 | 0 | −1 | 0 | 1 | 0 | 1 | 0 | −1 | 0 |

-continued

| | | | | | | | | | | | |
|---|---|---|---|---|---|---|---|---|---|---|---|
| −1 | 0 | −1 | 0 | 1 | 0 | 1 | 0 | −1 | 0 | 1 | 0 |
| −1 | 0 | 1 | 0 | −1 | 0 | 1 | 0 | 1 | 0 | 1 | 0 |
| 1 | 0 | 1 | 0 | 1 | 0 | −1 | 0 | −1 | 0 | 1 | 0 |
| −1 | 0 | −1 | 0 | 1 | 0 | 0 | 0 | 0 | 0 | 0 | 0 |
| 0 | 0 | 0 | 0}; | | | | | | | | |

{ 0 0 0 0 0 0 0 0 0 0 0 0 −1 0 −1 0 1 0 1 0 1 0 −1 0 −1 0 1 0 −1 0 1 0
−1 0 1 0 1 0 1 0 1 0 1 0 1 0 1 0 −1 0 −1 0 1 0 −1 0 −1 0 1 0 1 0 −1 0 1
0 −1 0 1 0 1 0 1 0 1 0 −1 0 −1 0 1 0 1 0 1 0 −1 0 −1 0 1 0 −1 0 1 0 −1
0
0 −1 0 −1 0 −1 0 −1 0 −1 0 −1 0 1 0 1 0 −1 0 1 0 1 0 −1 0 −1 0 1 0 −1
0 1 1 0 −1 0 −1 0 −1 0 −1 0 1 0 1 0 −1 0 −1 0 −1 0 1 0 1 0 −1 0 1 0 −1
0 1 0 −1 0 −1 0 −1 0 −1 0 −1 0 −1 0 −1 0 1 0 1 0 −1 0 1 0 1 0 −1 0 −1
0 1 0 −1 0 1 0 1 0 1 0 1 0 1 0 −1 0 −1 0 1 0 1 0 1 0 −1 0 −1 0 1 0 −1 0
1 0 −1 0 1 0 −1 0 −1 0 −1 0 −1 0 −1 0 −1 0 1 0 1 0 −1 0 1 0 1 0 −1 0
−1 0 1 0 −1 0 −1 0 −1 0 1 0 1 0 −1 0 −1 0 −1 0 1 0 1 0 −1 0 1 0 −1 0
1 0 −1 0 −1 0 −1 0 −1 0 −1 0 −1 0 −1 0 1 0 1 0 −1 0 1 0 1 0 −1 0 −1
0 1 0 −1 0 1 0 −1 0 −1 0 −1 0 −1 0 1 0 1 0 −1 0 −1 0 −1 0 1 0 1 0 −1
0 1 0 −1 0 1 0 −1 0 1 0 1 0 1 0 1 0 1 0 1 0 −1 0 −1 0 −1 0 −1 0 −1 0
1 0 1 0 −1 0 1 0 −1 0 −1 0 −1 0 −1 0 −1 0 1 0 1 0 −1 0 −1 0 −1 0 1 0
1 0 −1 0 1 0 −1 0 1 0 −1 0 −1 0 −1 0 −1 0 −1 0 −1 0 −1 0 1 0 1 0 −1
0 1 0 1 0 −1 0 −1 0 1 0 −1 0 1 0 1 0 1 0 1 0 1 0 −1 0 −1 0 1 0 1 0 1 0
−1 0 −1 0 1 0 −1 0 1 0 −1 0 1 0 −1 0 −1 0 −1 0 −1 0 −1 0 −1 0 1 0 1
0 −1 0 1 0 1 0 −1 0 −1 0 1 0 −1 0 1 0 0 0 0 0 0 0 −1 0 −1 0 −1 0 −1
0 1 0 1 0 −1 0 −1 0 −1 0 1 0 1 0 −1 0 1 0 −1 0 1 0 −1 0 −1 0 −1 0 −1
0 −1 0 −1 0 −1 0 1 0 1 0−1 0 1 0 1 0 −1 0 −1 0 1 0 −1 0 1 0 −1 0 −1
0 −1 0 −1 0 1 0 1 0 −1 0 −1 0 −1 0 1 0 1 0 −1 0 1 0 −1 0 1 0 −1 0 1
0 1 0 1 0 1 0 1 0 1 0 −1 0 −1 0 1 0 −1 0 −1 0 1 0 1 0 −1 0 1 0 −1 0 1
0 1 0 1 0 1 0 −1 −1 01 0 −1 0 1 0 −1 0 −1 0 1 0 −1 0 1 0 −1 0 1 0 1 0
1 0 1 0 1 0 1 0 1 0 −1 0 0 −1 0 1 0 −1 0 −1 0 1 0 1 0 −1 0 1 0 −1 0 −1
0 −1 0 −1 0 −1 0 1 0 1 0 −1 0 −1 0 −1 0 1 0 1 0 −1 0 1 0 −1 0 1 0 −1
0 1 0 1 0 1 0 1 0 1 0 1 0 −1 0 −1 0 1 0 −1 0 −1 0 1 0 1 0 −1 0 1 0 −1
0 1 0 −1 0 −1 0 1 0 1 0 −1 0 −1 0 1 0 −1 0 1 0 −1 0 1 0 1 0 1 0 1 0 1
0 1 0 1 0 −1 0 −1 0 1 0 −1 1 0 0 −1 0 1 0 1 0 −1 0 1 0 −1 0 1 0 1 0 1
0 1 0 −1 0 −1 0 1 0 1 0 1 0 −1 0 −1 0 1 0 −1 0 1 0 −1 0 1 0 −1 0 −1
0 −1 0 −1 0 −1 0 −1 0 1 0 1 0 −1 0 1 0 1 0 −1 0 −1 0 1 0 −1 0 1 0 1
0 1 0 1 0 1 0 −1 0 −1 0 1 0 1 0 1 0 −1 0−1 0 1 0 −1 0 1 0 −1 0 1 0 1
0 1 0 1 0 1 0 1 0 1 0 −1 0 −1 0 1 0 −1 0 −1 0 1 0 1 0 −1 0 1 0 −1 0
−1 0 −1 0 −1 0 −1 0 1 0 1 0 −1 0 −1 0 −1 0 1 0 1 0 −1 0 1 0 −1 0 1
0 −1 0 1 0 1 0 1 0 1 0 1 0 1 0 −1 0 −1 0 1 0 −1 0 −1 0 1 0 0 0 0 0 0
0 0 0 0 0 }; or

{0 0 0 0 0 0 0 0 0 0 0 0 −1 0 −1 0 1 0 1 0 1 0 −1 0 −1 0 1 0 −1 0 1 0
−1 0 1 0 1 0 1 0 1 0 1 0 1 0 1 0 −1 0 −1 0 1 0 −1 0 −1 0 1 0 1 0 −1 0
1 0 −1 0 1 0 1 0 10 1 0 −1 0 −1 0 1 0 1 0 1 0 −1 0 −1 0 1 0 −1 0 1 0
−1 0 1 0 −1 0 −1 0 −1 0 −1 0 −1 0 −1 0 1 0 1 0 −1 0 1 0 1 0 −1 0 −1
0 1 0 −1 0 1 0 −1 0 −1 0 −1 0 −1 0 1 0 1 0 −1 0 −1 0 −1 0 1 0 1 0 −1
0 1 0 −1 0 1 0 −1 0 −1 0 −1 0 −1 0 −1 0 −1 0−1 0 1 0 1 0 −1 0 1 0 1
0 −1 0 −1 0 1 0 −1 0 1 0 1 0 1 0 1 0 1 0 −1 0 −1 0 1 01 0 1 0 −1 0
−1 0 1 0 −1 0 1 0 −1 0 1 0 −1 0 −1 0 −1 0 −1 0 −1 0 −1 0 1 0 1 0 −1
0 1 0 1 0 −1 0 −1 0 −1 0 −1 0 −1 0 −1 0 1 0 1 0 −1 0 −1 0 −1 0 1 0
1 0 −1 0 1 0 −1 0 1 0 −1 0 −1 0 −1 0 −1 0 −1 0 −1 0 −1 0 1 0 1 0 −1
0 1 0 1 0 −1 0 −1 0 1 0 −1 0 1 0 −1 0 −1 0 −1 0 −1 0 1 0 1 0 −1 0
−1 0 −1 0 1 0 1 0 −1 0 1 0 −1 0 1 0 −1 0 1 0 1 0 1 0 1 0 1 0 1 0 −1 0
−1 0 1 0 −1 0 −1 0 1 0 1 0 −1 0 1 0 −1 0 −1 0 −1 0 −1 0 −1 0 −1 0 1
0 −1 0 −1 0 −1 0 1 0 1 0 −1 0 1 0 −1 0 1 0 −1 0 −1 0 −1 0 −1 0 −1 0
−1 0 −1 0 1 0 1 0 −1 0 1 0 1 0 −1 0 −1 0 1 0 −1 0 1 0 1 0 1 0 1 0 1 0
−1 0 −1 0 1 0 1 0 1 0 −1 0 −1 0 1 0 −1 0 1 0 −1 0 1 0 −1 0 −1 0 −1 0
−1 0 −1 0 −1 0 1 0 1 0 −1 0 1 0 1 0 −1 0 −1 0 1 0 1 0 1 0 0 0 0 0 0 0
−1 0 −1 0 −1 0 −1 0 1 0 1 0 −1 0 −1 0 −1 0 1 0 1 0 −1 0 1 0 −1 0 1 0
−1 0 −1 0 −1 0 −1 0 −1 0 −1 0 1 0 1 0 1 0 −1 0 1 0 1 0 −1 0 −1 0 1 0
−1 0 1 0 −1 0 −1 0 −1 0 −1 0 1 0 1 0 −1 0 −1 0 −1 0 1 0 1 0 −1 0 1 0
−1 0 1 0 −1 0 1 0 1 0 1 0 1 0 1 0 1 0 −1 0 −1 0 1 0 −1 0 −1 0 1 0 1 0
−1 0 1 0 −1 0 1 0 1 0 1 0 1 0 −1 0 −1 0 1 0 1 0 1 0 −1 0 −1 0 1 0 −1
0 1 0 −1 0 1 0 1 0 1 0 1 0 1 0 1 0 1 0 −1 0 −1 0 1 0 −1 0 −1 0 1 0 1 0
−1 0 1 0 −1 0 −1 0 −1 0 −1 0 −1 0 1 0 1 0 −1 0 −1 0 −1 0 1 0 1 0 −1
0 1 0 −1 0 1 0 −1 0 1 0 1 0 1 0 1 0 1 0 1 0 −1 0 −1 0 1 0 −1 0 −1 0 1
0 1 0 −1 0 1 0 −1 0 1 0 −1 0 −1 0 1 0 1 0 1 0 −1 0 −1 0 1 0 −1 0 1 0
−1 0 1 0 1 0 1 0 1 0 1 0 1 0 −1 0 −1 0 1 0 −1 0 −1 0 1 0 1 0 −1 0
1 0 −1 0 1 0 1 0 1 0 1 0 −1 0 −1 0 1 0 1 0 1 0 −1 0 −1 0 1 0 −1 0 1 0
−1 0 1 0 −1 0 −1 0 −1 0 −1 0 −1 0 −1 0 1 0 1 0 −1 0 1 0 1 0 −1 0 −1
0 1 0 −1 0 1 0 1 0 1 0 1 0 −1 0 −1 0 1 0 1 0 1 0 −1 0 −1 0 1 0 −1
0 1 0 −1 0 1 0 1 0 1 0 1 0 1 0 1 0 1 0 −1 0 −1 0 1 0 −1 0 −1 0 1 0 1 0

-continued

−1 0 1 0 −1 0 −1 0 −1 0 −1 0 −1 0 1 0 1 0 −1 0 −1 0 −1 0 1 0 1 0 −1
0 1 0 −1 0 1 0 −1 0 1 0 1 0 1 0 1 0 1 0 1 0 −1 0 −1 0 1 0 −1 0 −1 0 1
0 0 0 0 0 0 0 0 0 0 0}.

2. The communication apparatus according to claim 1, wherein in response to the LTF being a 2×LTF sequence in a 160 MHz, the 2×LTF sequence in the 160 MHz is:

| | | | | | | | | | | | |
|---|---|---|---|---|---|---|---|---|---|---|---|
| {0 | 0 | 0 | 0 | 0 | 0 | 0 | 0 | 0 | 0 | 0 | 0 |
| 1 | 0 | 1 | 1 | −1 | 0 | 1 | 0 | 1 | 0 | 1 | 0 |
| −1 | 0 | 1 | 0 | 1 | 0 | 1 | 0 | 1 | 0 | −1 | 0 |
| −1 | 0 | −1 | 0 | 1 | 0 | −1 | 0 | −1 | 0 | 1 | 0 |
| 1 | 0 | −1 | 0 | 1 | 0 | 1 | 0 | 1 | 0 | −1 | 0 |
| −1 | 0 | −1 | 0 | −1 | 0 | 1 | 0 | 1 | 0 | 1 | 0 |
| 1 | 0 | −1 | 0 | 1 | 0 | 1 | 0 | 1 | 0 | −1 | 0 |
| 1 | 0 | −1 | 0 | −1 | 0 | 1 | 0 | −1 | 0 | −1 | 0 |
| −1 | 0 | 1 | 0 | 1 | 0 | −1 | 0 | −1 | 0 | −1 | 0 |
| 1 | 0 | −1 | 0 | −1 | 0 | 1 | 0 | −1 | 0 | 1 | 0 |
| 1 | 0 | −1 | 0 | 1 | 0 | 1 | 0 | −1 | 0 | 1 | 0 |
| −1 | 0 | −1 | 0 | −1 | 0 | 1 | 0 | −1 | 0 | −1 | 0 |
| −1 | 0 | −1 | 0 | 1 | 0 | −1 | 0 | −1 | 0 | 1 | 0 |
| 1 | 0 | −1 | 0 | 1 | 0 | 1 | 0 | 1 | 0 | −1 | 0 |
| −1 | 0 | −1 | 0 | −1 | 0 | 1 | 0 | −1 | 0 | 1 | 0 |
| 1 | 0 | 1 | 0 | −1 | 0 | 1 | 0 | 1 | 0 | 1 | 0 |
| 1 | 0 | −1 | 0 | −1 | 0 | −1 | 0 | 1 | – | 1 | 0 |
| 1 | 0 | −1 | 0 | −1 | 0 | 1 | 0 | 1 | 0 | 1 | 0 |
| −1 | 0 | 1 | 0 | 1 | 0 | −1 | 0 | 1 | 0 | −1 | 0 |
| −1 | 0 | −1 | 0 | −1 | 0 | 1 | 0 | −1 | 0 | −1 | 0 |
| −1 | 0 | 1 | 0 | −1 | 0 | 1 | 0 | 1 | 0 | −1 | 0 |
| 1 | 0 | 1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| 1 | 0 | −1 | 0 | 1 | 0 | 1 | 0 | 1 | 0 | −1 | 0 |
| −1 | 0 | 1 | 0 | 1 | 0 | 1 | 0 | −1 | 0 | 1 | 0 |
| 1 | 0 | −1 | 0 | 1 | 0 | −1 | 0 | −1 | 0 | 1 | 0 |
| −1 | 0 | 1 | 0 | 1 | 0 | 1 | 0 | −1 | 0 | 1 | 0 |
| 1 | 0 | 1 | 0 | 1 | 0 | −1 | 0 | −1 | 0 | −1 | 0 |
| 1 | 0 | −1 | 0 | −1 | 0 | 1 | 0 | 1 | 0 | −1 | 0 |
| 1 | 0 | 1 | 0 | 1 | 0 | −1 | 0 | −1 | 0 | −1 | 0 |
| −1 | 0 | 1 | 0 | 1 | 0 | 1 | 0 | −1 | 0 | −1 | 0 |
| −1 | 0 | −1 | 0 | 1 | 0 | −1 | 0 | −1 | 0 | −1 | 0 |
| 1 | 0 | −1 | 0 | 1 | 0 | 1 | 0 | 1 | 0 | −1 | 0 |
| −1 | 0 | 1 | 0 | 1 | 0 | 1 | 0 | −1 | 0 | 1 | 0 |
| 1 | 0 | −1 | 0 | 1 | 0 | −1 | 0 | −1 | 0 | −1 | 0 |
| −1 | 0 | 1 | 0 | −1 | 0 | −1 | 0 | −1 | 0 | 1 | 0 |
| −1 | 0 | 1 | 0 | 1 | 0 | −1 | 0 | 1 | 0 | 1 | 0 |
| −1 | 0 | 1 | 0 | 1 | 0 | −1 | 0 | −1 | 0 | 1 | 0 |
| −1 | 0 | −1 | 0 | −1 | 0 | 1 | 0 | 1 | 0 | 1 | 0 |
| 1 | 0 | −1 | 0 | 1 | 0 | −1 | 0 | −1 | 0 | −1 | 0 |
| 1 | 0 | −1 | 0 | −1 | 0 | −1 | 0 | −1 | 0 | 1 | 0 |
| 1 | 0 | 1 | 0 | 1 | 0 | −1 | 0 | −1 | 0 | −1 | 0 |
| 1 | 0 | 1 | 0 | 1 | 0 | 0 | 0 | 0 | 0 | 0 | 0 |
| 1 | 0 | −1 | 0 | −1 | 0 | 1 | 0 | 1 | 0 | −1 | 0 |
| 1 | 0 | 1 | 0 | 1 | 0 | 1 | 0 | −1 | 0 | −1 | 0 |
| −1 | 0 | −1 | 0 | 1 | 0 | −1 | 0 | −1 | 0 | −1 | 0 |
| 1 | 0 | −1 | 0 | 1 | 0 | 1 | 0 | 1 | 0 | 1 | 0 |
| −1 | 0 | −1 | 0 | −1 | 0 | 1 | 0 | −1 | 0 | −1 | 0 |
| 1 | 0 | 1 | 0 | −1 | 0 | 1 | 0 | 1 | 0 | −1 | 0 |
| 1 | 0 | 1 | 0 | −1 | 0 | 1 | 0 | −1 | 0 | −1 | 0 |
| −1 | 0 | 1 | 0 | −1 | 0 | −1 | 0 | −1 | 0 | −1 | 0 |
| 1 | 0 | −1 | 0 | 1 | 0 | 1 | 0 | −1 | 0 | 1 | 0 |
| 1 | 0 | 1 | 0 | −1 | 0 | −1 | 0 | 1 | 0 | 1 | 0 |
| 1 | 0 | −1 | 0 | 1 | 0 | −1 | 0 | −1 | 0 | −1 | 0 |
| 1 | 0 | −1 | 0 | −1 | 0 | −1 | 0 | −1 | 0 | 1 | 0 |
| 1 | 0 | 1 | 0 | −1 | 0 | −1 | 0 | −1 | 0 | −1 | 0 |
| 1 | 0 | 1 | 0 | 1 | 0 | −1 | 0 | 1 | 0 | 1 | 0 |
| −1 | 0 | −1 | 0 | 1 | 0 | −1 | 0 | −1 | 0 | −1 | 0 |
| 1 | 0 | 1 | 0 | 1 | 0 | 1 | 0 | −1 | 0 | 1 | 0 |
| 1 | 0 | 1 | 0 | −1 | 0 | 1 | 0 | −1 | 0 | −1 | 0 |
| 1 | 0 | −1 | 0 | 1 | 0 | 1 | 0 | −1 | 0 | 1 | 0 |
| 1 | 0 | 1 | 0 | −1 | 0 | −1 | 0 | 1 | 0 | 1 | 0 |
| 1 | 0 | −1 | 0 | 1 | 0 | 1 | 0 | −1 | 0 | 1 | 0 |
| −1 | 0 | −1 | 0 | −1 | 0 | 1 | 0 | −1 | 0 | −1 | 0 |
| −1 | 0 | 1 | 0 | −1 | 0 | 1 | 0 | −1 | 0 | −1 | 0 |
| 1 | 0 | −1 | 0 | 1 | 0 | 1 | 0 | 1 | 0 | −1 | 0 |
| 1 | 0 | 1 | 0 | 1 | 0 | 1 | 0 | 1 | 0 | 1 | 0 |
| −1 | 0 | −1 | 0 | 1 | 0 | −1 | 0 | −1 | 0 | −1 | 0 |
| 1 | 0 | 1 | 0 | −1 | 0 | −1 | 0 | −1 | 0 | 1 | 0 |

-continued

| | | | | | | | | | | | |
|---|---|---|---|---|---|---|---|---|---|---|---|
| 1 | 0 | 1 | 0 | −1 | 0 | −1 | 0 | −1 | 0 | −1 | 0 |
| 1 | 0 | −1 | 0 | −1 | 0 | −1 | 0 | 1 | 0 | −1 | 0 |
| 1 | 0 | 1 | 0 | 1 | 0 | 1 | 0 | −1 | 0 | −1 | 0 |
| −1 | 0 | 1 | 0 | −1 | 0 | −1 | 0 | 1 | 0 | 1 | 0 |
| −1 | 0 | 1 | 0 | 1 | 0 | 1 | 0 | 1 | 0 | −1 | 0 |
| 1 | 0 | 1 | 0 | 1 | 0 | −1 | 0 | 1 | 0 | −1 | 0 |
| −1 | 0 | −1 | 0 | −1 | 0 | −1 | 0 | 1 | 0 | −1 | 0 |
| 1 | 0 | 1 | 0 | −1 | 0 | 1 | 0 | 1 | 0 | 1 | 0 |
| −1 | 0 | −1 | 0 | 1 | 0 | 1 | 0 | 1 | 0 | −1 | 0 |
| 1 | 0 | 1 | 0 | −1 | 0 | 1 | 0 | −1 | 0 | −1 | 0 |
| −1 | 0 | 1 | 0 | −1 | 0 | −1 | 0 | −1 | 0 | −1 | 0 |
| 1 | 0 | 1 | 0 | 1 | 0 | 1 | 0 | −1 | 0 | −1 | 0 |
| −1 | 0 | 1 | 0 | −1 | 0 | −1 | 0 | 1 | 0 | 1 | 0 |
| −1 | 0 | 1 | 0 | 1 | 0 | 1 | 0 | −1 | 0 | −1 | 0 |
| −1 | 0 | −1 | 0 | 1 | 0 | −1 | 0 | −1 | 0 | −1 | 0 |
| 1 | 0 | −1 | 0 | −1 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 1 | 0 | 1 | 0 | −1 | 0 | 1 | 0 |
| 1 | 0 | 1 | 0 | −1 | 0 | 1 | 0 | 1 | 0 | 1 | 0 |
| 1 | 0 | −1 | 0 | −1 | 0 | −1 | 0 | 1 | 0 | −1 | 0 |
| −1 | 0 | 1 | 0 | 1 | 0 | −1 | 0 | 1 | 0 | 1 | 0 |
| 1 | 0 | −1 | 0 | −1 | 0 | −1 | 0 | −1 | 0 | 1 | 0 |
| 1 | 0 | 1 | 0 | 1 | 0 | −1 | 0 | 1 | 0 | 1 | 0 |
| 1 | 0 | −1 | 0 | 1 | 0 | −1 | 0 | −1 | 0 | 1 | 0 |
| −1 | 0 | −1 | 0 | −1 | 0 | 1 | 0 | 1 | 0 | −1 | 0 |
| −1 | 0 | −1 | 0 | 1 | 0 | −1 | 0 | −1 | 0 | 1 | 0 |
| −1 | 0 | 1 | 0 | 1 | 0 | −1 | 0 | 1 | 0 | 1 | 0 |
| −1 | 0 | 1 | 0 | −1 | 0 | −1 | 0 | −1 | 0 | 1 | 0 |
| −1 | 0 | −1 | 0 | −1 | 0 | −1 | 0 | 1 | 0 | −1 | 0 |
| −1 | 0 | 1 | 0 | 1 | 0 | −1 | 0 | 1 | 0 | 1 | 0 |
| 1 | 0 | −1 | 0 | −1 | 0 | −1 | 0 | −1 | 0 | 1 | 0 |
| −1 | 0 | 1 | 0 | 1 | 0 | 1 | 0 | −1 | 0 | 1 | 0 |
| 1 | 0 | 1 | 0 | 1 | 0 | −1 | 0 | −1 | 0 | −1 | 0 |
| 1 | 0 | 1 | 0 | 1 | 0 | −1 | 0 | −1 | 0 | 1 | 0 |
| 1 | 0 | 1 | 0 | 1 | 0 | 1 | 0 | 1 | 0 | −1 | 0 |
| 1 | 0 | −1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| 1 | 0 | −1 | 0 | 1 | 0 | −1 | 0 | 1 | 0 | 1 | 0 |
| 1 | 0 | −1 | 0 | 1 | 0 | 1 | 0 | 1 | 0 | −1 | 0 |
| 1 | 0 | −1 | 0 | −1 | 0 | 1 | 0 | −1 | 0 | −1 | 0 |
| −1 | 0 | 1 | 0 | 1 | 0 | −1 | 0 | −1 | 0 | −1 | 0 |
| 1 | 0 | −1 | 0 | −1 | 0 | 1 | 0 | −1 | 0 | 1 | 0 |
| 1 | 0 | −1 | 0 | 1 | 0 | −1 | 0 | −1 | 0 | −1 | 0 |
| 1 | 0 | −1 | 0 | −1 | 0 | −1 | 0 | −1 | 0 | 1 | 0 |
| 1 | 0 | 1 | 0 | −1 | 0 | 1 | 0 | 1 | 0 | −1 | 0 |
| −1 | 0 | 1 | 0 | −1 | 0 | −1 | 0 | −1 | 0 | 1 | 0 |
| 1 | 0 | 1 | 0 | 1 | 0 | −1 | 0 | −1 | 0 | −1 | 0 |
| 1 | 0 | 1 | 0 | 1 | 0 | 1 | 0 | −1 | 0 | 1 | 0 |
| 1 | 0 | 1 | 0 | −1 | 0 | 1 | 0 | −1 | 0 | −1 | 0 |
| −1 | 0 | 1 | 0 | 1 | 0 | −1 | 0 | −1 | 0 | −1 | 0 |
| 1 | 0 | −1 | 0 | −1 | 0 | 1 | 0 | −1 | 0 | 1 | 0 |
| 1 | 0 | 1 | 0 | 1 | 0 | −1 | 0 | 1 | 0 | 1 | 0 |
| 1 | 0 | −1 | 0 | 1 | 0 | −1 | 0 | −1 | 0 | 1 | 0 |
| −1 | 0 | −1 | 0 | 1 | 0 | −1 | 0 | −1 | 0 | 1 | 0 |
| 1 | 0 | −1 | 0 | 1 | 0 | 1 | 0 | 1 | 0 | −1 | 0 |
| −1 | 0 | −1 | 0 | −1 | 0 | 1 | 0 | −1 | 0 | 1 | 0 |
| 1 | 0 | 1 | 0 | −1 | 0 | 1 | 0 | 1 | 0 | 1 | 0 |
| 1 | 0 | −1 | 0 | −1 | 0 | −1 | 0 | −1 | 0 | 1 | 0 |
| 1 | 0 | 1 | 0 | −1 | 0 | −1 | 0 | −1 | 0 | 0 | 0 |
| 0 | 0 | 0 | 0 | −1 | 0 | 1 | 0 | 1 | 0 | −1 | 0 |
| −1 | 0 | 1 | 0 | −1 | 0 | 1 | 0 | 1 | 0 | 1 | 0 |
| −1 | 0 | −1 | 0 | −1 | 0 | −1 | 0 | 1 | 0 | −1 | 0 |
| −1 | 0 | −1 | 0 | 1 | 0 | −1 | 0 | 1 | 0 | 1 | 0 |
| 1 | 0 | 1 | 0 | −1 | 0 | −1 | 0 | −1 | 0 | 1 | 0 |
| −1 | 0 | −1 | 0 | 1 | 0 | 1 | 0 | −1 | 0 | 1 | 0 |
| 1 | 0 | −1 | 0 | 1 | 0 | 1 | 0 | −1 | 0 | 1 | 0 |
| −1 | 0 | −1 | 0 | −1 | 0 | 1 | 0 | −1 | 0 | −1 | 0 |
| −1 | 0 | −1 | 0 | 1 | 0 | −1 | 0 | 1 | 0 | 1 | 0 |
| −1 | 0 | 1 | 0 | 1 | 0 | 1 | 0 | −1 | 0 | −1 | 0 |
| 1 | 0 | 1 | 0 | 1 | 0 | −1 | 0 | 1 | 0 | −1 | 0 |
| −1 | 0 | −1 | 0 | 1 | 0 | −1 | 0 | −1 | 0 | −1 | 0 |
| −1 | 0 | 1 | 0 | 1 | 0 | 1 | 0 | −1 | 0 | −1 | 0 |
| −1 | 0 | −1 | 0 | 1 | 0 | 1 | 0 | 1 | 0 | −1 | 0 |
| 1 | 0 | 1 | 0 | −1 | 0 | −1 | 0 | 1 | 0 | −1 | 0 |
| −1 | 0 | −1 | 0 | 1 | 0 | 1 | 0 | 1 | 0 | 1 | 0 |
| −1 | 0 | 1 | 0 | 1 | 0 | 1 | 0 | −1 | 0 | 1 | 0 |
| −1 | 0 | −1 | 0 | 1 | 0 | −1 | 0 | 1 | 0 | 1 | 0 |
| −1 | 0 | 1 | 0 | 1 | 0 | 1 | 0 | −1 | 0 | −1 | 0 |
| 1 | 0 | 1 | 0 | 1 | 0 | −1 | 0 | 1 | 0 | 1 | 0 |

-continued

| | | | | | | | | | | | |
|---|---|---|---|---|---|---|---|---|---|---|---|
| −1 | 0 | 1 | 0 | −1 | 0 | −1 | 0 | −1 | 0 | 1 | 0 |
| −1 | 0 | −1 | 0 | −1 | 0 | 1 | 0 | 1 | 0 | −1 | 0 |
| 1 | 0 | 1 | 0 | −1 | 0 | 1 | 0 | −1 | 0 | −1 | 0 |
| −1 | 0 | 1 | 0 | −1 | 0 | −1 | 0 | −1 | 0 | −1 | 0 |
| 1 | 0 | −1 | 0 | 1 | 0 | 1 | 0 | −1 | 0 | 1 | 0 |
| 1 | 0 | 1 | 0 | −1 | 0 | −1 | 0 | 1 | 0 | 1 | 0 |
| 1 | 0 | −1 | 0 | −1 | 0 | −1 | 0 | 1 | 0 | 1 | 0 |
| 1 | 0 | 1 | 0 | −1 | 0 | 1 | 0 | 1 | 0 | 1 | 0 |
| −1 | 0 | 1 | 0 | −1 | 0 | −1 | 0 | −1 | 0 | −1 | 0 |
| 1 | 0 | 1 | 0 | 1 | 0 | −1 | 0 | 1 | 0 | 1 | 0 |
| −1 | 0 | −1 | 0 | 1 | 0 | −1 | 0 | −1 | 0 | −1 | 0 |
| −1 | 0 | 1 | 0 | −1 | 0 | −1 | 0 | −1 | 0 | 1 | 0 |
| −1 | 0 | 1 | 0 | 1 | 0 | −1 | 0 | 1 | 0 | 1 | 0 |
| −1 | 0 | 1 | 0 | −1 | 0 | −1 | 0 | 1 | 0 | −1 | 0 |
| −1 | 0 | −1 | 0 | 1 | 0 | 1 | 0 | −1 | 0 | −1 | 0 |
| −1 | 0 | 1 | 0 | −1 | 0 | −1 | 0 | 1 | 0 | −1 | 0 |
| 1 | 0 | 1 | 0 | 1 | 0 | −1 | 0 | 1 | 0 | 1 | 0 |
| 1 | 0 | 1 | 0 | −1 | 0 | −1 | 0 | −1 | 0 | −1 | 0 |
| 1 | 0 | 1 | 0 | 1 | 0 | −1 | 0 | 1 | 0 | 1 | 0 |
| −1 | 0 | −1 | 0 | 1 | 0 | −1 | 0 | −1 | 0 | −1 | 0 |
| 1 | 0 | 1 | 0 | 1 | 0 | 1 | 0 | −1 | 0 | 1 | 0 |
| 1 | 0 | 1 | 0 | −1 | 0 | 1 | 0 | 1 | 0 | 0 | 0 |
| 0 | 0 | 0 | 0 | 0 | 0 | 0 | 0}; | | | | |

or

2×EHT_LTF_160 M=

{$0_{12}$, LTF2×80 M_part1, LTF2×80 M_part2, LTF2×80 M_part3, LTF2×80 M_part4, LTF2×80 M_part5, $0_{23}$, LTF2×80 M_part1, (−1)*LTF2×80 M_part2, (−1)*LTF2×80 M_part3, (−1)*LTF2×80 M_part4, LTF2×80 M_part5, $0_{11}$}, wherein:

LTF2×80 M_part1=LTF2×80 M_1(1:242);

LTF2×80 M_part2=LTF2×80 M_1(243:484);

LTF2×80 M_part3=LTF2×80 M_1(485:517);

LTF2×80 M_part4=LTF2×80 M_1(518:759);

LTF2×80 M_part5=LTF2×80 M_1(760:1001); and

LTF2×80 M_1 is a sequence obtained after the 12 leftmost 0s and the 11 rightmost 0s are removed from a sequence 6 in a specific implementation of the specification.

3. The communication apparatus according to claim 1, wherein in response to the LTF being a 2×LTF sequence in a 240 MHz, the 2×LTF sequence in the 240 MHz is:

| | | | | | | | | | | | |
|---|---|---|---|---|---|---|---|---|---|---|---|
| {0 | 0 | 0 | 0 | 0 | 0 | 0 | 0 | 0 | 0 | 0 | 0 |
| 1 | 0 | −1 | 0 | 1 | 0 | 1 | 0 | −1 | 0 | −1 | 0 |
| −1 | 0 | −1 | 0 | 1 | 0 | −1 | 0 | 1 | 0 | 1 | 0 |
| 1 | 0 | −1 | 0 | −1 | 0 | −1 | 0 | 1 | 0 | 1 | 0 |
| 1 | 0 | −1 | 0 | 1 | 0 | 1 | 0 | −1 | 0 | 1 | 0 |
| −1 | 0 | −1 | 0 | −1 | 0 | 1 | 0 | −1 | 0 | −1 | 0 |
| 1 | 0 | −1 | 0 | −1 | 0 | 1 | 0 | −1 | 0 | −1 | 0 |
| 1 | 0 | −1 | 0 | −1 | 0 | −1 | 0 | −1 | 0 | 1 | 0 |
| −1 | 0 | −1 | 0 | 1 | 0 | −1 | 0 | −1 | 0 | −1 | 0 |
| −1 | 0 | −1 | 0 | −1 | 0 | 1 | 0 | 1 | 0 | 1 | 0 |
| −1 | 0 | 1 | 0 | 1 | 0 | 1 | 0 | 1 | 0 | −1 | 0 |
| −1 | 0 | −1 | 0 | 1 | 0 | −1 | 0 | −1 | 0 | 1 | 0 |
| −1 | 0 | −1 | 0 | −1 | 0 | 1 | 0 | 1 | 0 | 1 | 0 |
| 1 | 0 | −1 | 0 | 1 | 0 | 1 | 0 | 1 | 0 | −1 | 0 |
| −1 | 0 | −1 | 0 | −1 | 0 | −1 | 0 | −1 | 0 | 1 | 0 |
| −1 | 0 | −1 | 0 | 1 | 0 | −1 | 0 | −1 | 0 | −1 | 0 |
| −1 | 0 | 1 | 0 | −1 | 0 | −1 | 0 | 1 | 0 | −1 | 0 |
| 1 | 0 | −1 | 0 | 1 | 0 | 1 | 0 | −1 | 0 | 1 | 0 |
| 1 | 0 | 1 | 0 | −1 | 0 | 1 | 0 | −1 | 0 | −1 | 0 |
| 1 | 0 | −1 | 0 | −1 | 0 | −1 | 0 | 1 | 0 | 1 | 0 |
| 1 | 0 | −1 | 0 | −1 | 0 | −1 | 0 | 1 | 0 | −1 | 0 |
| 1 | 0 | −1 | 0 | 1 | 0 | −1 | 0 | −1 | 0 | −1 | 0 |
| 1 | 0 | 1 | 0 | 1 | 0 | −1 | 0 | 1 | 0 | −1 | 0 |
| −1 | 0 | −1 | 0 | 1 | 0 | 1 | 0 | 1 | 0 | −1 | 0 |
| −1 | 0 | −1 | 0 | 1 | 0 | −1 | 0 | −1 | 0 | 1 | 0 |
| −1 | 0 | 1 | 0 | 1 | 0 | 1 | 0 | −1 | 0 | 1 | 0 |
| 1 | 0 | −1 | 0 | 1 | 0 | 1 | 0 | −1 | 0 | 1 | 0 |
| 1 | 0 | −1 | 0 | 1 | 0 | 1 | 0 | 1 | 0 | 1 | 0 |

-continued

| | | | | | | | | | | | |
|---|---|---|---|---|---|---|---|---|---|---|---|
| −1 | 0 | 1 | 0 | 1 | 0 | −1 | 0 | 1 | 0 | 1 | 0 |
| 1 | 0 | 1 | 0 | 1 | 0 | 1 | 0 | −1 | 0 | −1 | 0 |
| −1 | 0 | 1 | 0 | −1 | 0 | −1 | 0 | −1 | 0 | −1 | 0 |
| 1 | 0 | 1 | 0 | 1 | 0 | −1 | 0 | 1 | 0 | −1 | 0 |
| 1 | 0 | −1 | 0 | −1 | 0 | −1 | 0 | 1 | 0 | 1 | 0 |
| 1 | 0 | 1 | 0 | −1 | 0 | 1 | 0 | 1 | 0 | 1 | 0 |
| −1 | 0 | −1 | 0 | −1 | 0 | −1 | 0 | −1 | 0 | −1 | 0 |
| 1 | 0 | −1 | 0 | −1 | 0 | 1 | 0 | −1 | 0 | −1 | 0 |
| −1 | 0 | −1 | 0 | 1 | 0 | −1 | 0 | −1 | 0 | 1 | 0 |
| −1 | 0 | 1 | 0 | −1 | 0 | 1 | 0 | 1 | 0 | −1 | 0 |
| 1 | 0 | 1 | 0 | 1 | 0 | −1 | 0 | 1 | 0 | −1 | 0 |
| −1 | 0 | 1 | 0 | −1 | 0 | −1 | 0 | −1 | 0 | 1 | 0 |
| 1 | 0 | 1 | 0 | −1 | 0 | −1 | 0 | −1 | 0 | 1 | 0 |
| −1 | 0 | 1 | 0 | 1 | 0 | −1 | 0 | −1 | 0 | −1 | 0 |
| 1 | 0 | 1 | 0 | 1 | 0 | 0 | 0 | 0 | 0 | 0 | 0 |
| −1 | 0 | 1 | 0 | 1 | 0 | −1 | 0 | −1 | 0 | 1 | 0 |
| −1 | 0 | −1 | 0 | 1 | 0 | −1 | 0 | −1 | 0 | −1 | 0 |
| 1 | 0 | 1 | 0 | 1 | 0 | −1 | 0 | 1 | 0 | −1 | 0 |
| −1 | 0 | −1 | 0 | 1 | 0 | 1 | 0 | 1 | 0 | −1 | 0 |
| −1 | 0 | −1 | 0 | 1 | 0 | −1 | 0 | −1 | 0 | 1 | 0 |
| −1 | 0 | 1 | 0 | 1 | 0 | 1 | 0 | −1 | 0 | 1 | 0 |
| 1 | 0 | −1 | 0 | 1 | 0 | 1 | 0 | −1 | 0 | 1 | 0 |
| 1 | 0 | −1 | 0 | 1 | 0 | 1 | 0 | 1 | 0 | 1 | 0 |
| −1 | 0 | 1 | 0 | 1 | 0 | −1 | 0 | 1 | 0 | 1 | 0 |
| 1 | 0 | 1 | 0 | 1 | 0 | 1 | 0 | −1 | 0 | −1 | 0 |
| −1 | 0 | 1 | 0 | −1 | 0 | −1 | 0 | −1 | 0 | −1 | 0 |
| 1 | 0 | 1 | 0 | 1 | 0 | −1 | 0 | 1 | 0 | 1 | 0 |
| −1 | 0 | 1 | 0 | 1 | 0 | 1 | 0 | −1 | 0 | −1 | 0 |
| −1 | 0 | −1 | 0 | 1 | 0 | −1 | 0 | −1 | 0 | −1 | 0 |
| 1 | 0 | 1 | 0 | 1 | 0 | 1 | 0 | 1 | 0 | 1 | 0 |
| −1 | 0 | 1 | 0 | 1 | 0 | −1 | 0 | 1 | 0 | 1 | 0 |
| 1 | 0 | 1 | 0 | −1 | 0 | 1 | 0 | 1 | 0 | −1 | 0 |
| 1 | 0 | −1 | 0 | 1 | 0 | 1 | 0 | −1 | 0 | 1 | 0 |
| −1 | 0 | −1 | 0 | −1 | 0 | 1 | 0 | −1 | 0 | 1 | 0 |
| 1 | 0 | −1 | 0 | 1 | 0 | 1 | 0 | 1 | 0 | −1 | 0 |
| −1 | 0 | −1 | 0 | 1 | 0 | 1 | 0 | 1 | 0 | −1 | 0 |
| 1 | 0 | −1 | 0 | −1 | 0 | 1 | 0 | −1 | 0 | −1 | 0 |
| −1 | 0 | 1 | 0 | 1 | 0 | 1 | 0 | −1 | 0 | 1 | 0 |
| −1 | 0 | −1 | 0 | −1 | 0 | 1 | 0 | 1 | 0 | 1 | 0 |
| −1 | 0 | −1 | 0 | −1 | 0 | 1 | 0 | −1 | 0 | −1 | 0 |
| 1 | 0 | −1 | 0 | 1 | 0 | 1 | 0 | 1 | 0 | −1 | 0 |
| 1 | 0 | 1 | 0 | −1 | 0 | 1 | 0 | 1 | 0 | −1 | 0 |
| 1 | 0 | 1 | 0 | −1 | 0 | 1 | 0 | 1 | 0 | 1 | 0 |
| 1 | 0 | −1 | 0 | 1 | 0 | 1 | 0 | −1 | 0 | 1 | 0 |
| 1 | 0 | 1 | 0 | 1 | 0 | 1 | 0 | 1 | 0 | −1 | 0 |
| −1 | 0 | −1 | 0 | 1 | 0 | −1 | 0 | −1 | 0 | −1 | 0 |
| −1 | 0 | 1 | 0 | 1 | 0 | 1 | 0 | −1 | 0 | 1 | 0 |
| −1 | 0 | 1 | 0 | −1 | 0 | −1 | 0 | −1 | 0 | 1 | 0 |
| 1 | 0 | 1 | 0 | 1 | 0 | −1 | 0 | 1 | 0 | 1 | 0 |
| 1 | 0 | −1 | 0 | −1 | 0 | −1 | 0 | −1 | 0 | −1 | 0 |
| −1 | 0 | 1 | 0 | −1 | 0 | −1 | 0 | 1 | 0 | −1 | 0 |
| −1 | 0 | −1 | 0 | −1 | 0 | 1 | 0 | −1 | 0 | −1 | 0 |
| 1 | 0 | −1 | 0 | 1 | 0 | −1 | 0 | 1 | 0 | 1 | 0 |
| −1 | 0 | 1 | 0 | 1 | 0 | 1 | 0 | −1 | 0 | 1 | 0 |
| −1 | 0 | −1 | 0 | 1 | 0 | −1 | 0 | −1 | 0 | −1 | 0 |
| 1 | 0 | 1 | 0 | 1 | 0 | −1 | 0 | −1 | 0 | −1 | 0 |
| 1 | 0 | −1 | 0 | 1 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 1 | 0 | −1 | 0 | 1 | 0 | 1 | 0 |
| 1 | 0 | −1 | 0 | −1 | 0 | −1 | 0 | 1 | 0 | −1 | 0 |
| 1 | 0 | 1 | 0 | 1 | 0 | −1 | 0 | −1 | 0 | −1 | 0 |
| 1 | 0 | 1 | 0 | 1 | 0 | −1 | 0 | 1 | 0 | 1 | 0 |
| −1 | 0 | 1 | 0 | −1 | 0 | −1 | 0 | −1 | 0 | 1 | 0 |
| −1 | 0 | −1 | 0 | 1 | 0 | −1 | 0 | −1 | 0 | 1 | 0 |
| −1 | 0 | −1 | 0 | 1 | 0 | −1 | 0 | −1 | 0 | −1 | 0 |
| −1 | 0 | 1 | 0 | −1 | 0 | −1 | 0 | 1 | 0 | −1 | 0 |
| −1 | 0 | −1 | 0 | −1 | 0 | −1 | 0 | −1 | 0 | 1 | 0 |
| 1 | 0 | 1 | 0 | −1 | 0 | 1 | 0 | 1 | 0 | 1 | 0 |
| 1 | 0 | −1 | 0 | −1 | 0 | −1 | 0 | 1 | 0 | −1 | 0 |
| −1 | 0 | 1 | 0 | −1 | 0 | −1 | 0 | −1 | 0 | 1 | 0 |
| 1 | 0 | 1 | 0 | 1 | 0 | −1 | 0 | 1 | 0 | 1 | 0 |
| 1 | 0 | −1 | 0 | −1 | 0 | −1 | 0 | −1 | 0 | −1 | 0 |
| −1 | 0 | 1 | 0 | −1 | 0 | −1 | 0 | 1 | 0 | −1 | 0 |
| −1 | 0 | −1 | 0 | −1 | 0 | 1 | 0 | −1 | 0 | −1 | 0 |
| 1 | 0 | −1 | 0 | 1 | 0 | −1 | 0 | 1 | 0 | 1 | 0 |
| −1 | 0 | 1 | 0 | 1 | 0 | 1 | 0 | −1 | 0 | 1 | 0 |
| −1 | 0 | −1 | 0 | 1 | 0 | −1 | 0 | −1 | 0 | −1 | 0 |
| 1 | 0 | 1 | 0 | 1 | 0 | −1 | 0 | −1 | 0 | −1 | 0 |
| 1 | 0 | −1 | 0 | 1 | 0 | −1 | 0 | 1 | 0 | −1 | 0 |

-continued

| | | | | | | | | | | | |
|---|---|---|---|---|---|---|---|---|---|---|---|
| −1 | 0 | −1 | 0 | 1 | 0 | 1 | 0 | 1 | 0 | −1 | 0 |
| 1 | 0 | −1 | 0 | −1 | 0 | −1 | 0 | 1 | 0 | 1 | 0 |
| 1 | 0 | −1 | 0 | −1 | 0 | −1 | 0 | 1 | 0 | −1 | 0 |
| −1 | 0 | 1 | 0 | −1 | 0 | 1 | 0 | 1 | 0 | 1 | 0 |
| −1 | 0 | 1 | 0 | 1 | 0 | −1 | 0 | 1 | 0 | 1 | 0 |
| −1 | 0 | 1 | 0 | 1 | 0 | −1 | 0 | 1 | 0 | 1 | 0 |
| 1 | 0 | 1 | 0 | −1 | 0 | 1 | 0 | 1 | 0 | −1 | 0 |
| 1 | 0 | 1 | 0 | 1 | 0 | 1 | 0 | 1 | 0 | 1 | 0 |
| −1 | 0 | −1 | 0 | −1 | 0 | 1 | 0 | −1 | 0 | −1 | 0 |
| −1 | 0 | −1 | 0 | 1 | 0 | 1 | 0 | 1 | 0 | −1 | 0 |
| 1 | 0 | −1 | 0 | 1 | 0 | −1 | 0 | −1 | 0 | −1 | 0 |
| 1 | 0 | 1 | 0 | 1 | 0 | 1 | 0 | −1 | 0 | 1 | 0 |
| 1 | 0 | 1 | 0 | −1 | 0 | −1 | 0 | −1 | 0 | −1 | 0 |
| −1 | 0 | −1 | 0 | 1 | 0 | −1 | 0 | −1 | 0 | 1 | 0 |
| −1 | 0 | −1 | 0 | −1 | 0 | −1 | 0 | 1 | 0 | −1 | 0 |
| −1 | 0 | 1 | 0 | −1 | 0 | 1 | 0 | −1 | 0 | 1 | 0 |
| 1 | 0 | −1 | 0 | 1 | 0 | 1 | 0 | 1 | 0 | −1 | 0 |
| 1 | 0 | −1 | 0 | −1 | 0 | 1 | 0 | −1 | 0 | −1 | 0 |
| −1 | 0 | 1 | 0 | 1 | 0 | 1 | 0 | −1 | 0 | −1 | 0 |
| −1 | 0 | 1 | 0 | −1 | 0 | 1 | 0 | 1 | 0 | −1 | 0 |
| −1 | 0 | −1 | 0 | 1 | 0 | 1 | 0 | 1 | 0 | 0 | 0 |
| 0 | 0 | 0 | 0 | 1 | 0 | −1 | 0 | −1 | 0 | 1 | 0 |
| 1 | 0 | −1 | 0 | 1 | 0 | 1 | 0 | −1 | 0 | 1 | 0 |
| 1 | 0 | 1 | 0 | −1 | 0 | −1 | 0 | −1 | 0 | 1 | 0 |
| −1 | 0 | 1 | 0 | 1 | 0 | 1 | 0 | −1 | 0 | −1 | 0 |
| −1 | 0 | 1 | 0 | 1 | 0 | 1 | 0 | −1 | 0 | 1 | 0 |
| 1 | 0 | −1 | 0 | 1 | 0 | −1 | 0 | −1 | 0 | −1 | 0 |
| 1 | 0 | −1 | 0 | −1 | 0 | 1 | 0 | −1 | 0 | −1 | 0 |
| 1 | 0 | −1 | 0 | −1 | 0 | 1 | 0 | −1 | 0 | −1 | 0 |
| −1 | 0 | −1 | 0 | 1 | 0 | −1 | 0 | −1 | 0 | 1 | 0 |
| −1 | 0 | −1 | 0 | −1 | 0 | −1 | 0 | −1 | 0 | −1 | 0 |
| 1 | 0 | 1 | 0 | 1 | 0 | −1 | 0 | 1 | 0 | 1 | 0 |
| 1 | 0 | 1 | 0 | −1 | 0 | −1 | 0 | −1 | 0 | 1 | 0 |
| −1 | 0 | −1 | 0 | 1 | 0 | −1 | 0 | −1 | 0 | −1 | 0 |
| 1 | 0 | 1 | 0 | 1 | 0 | 1 | 0 | −1 | 0 | 1 | 0 |
| 1 | 0 | 1 | 0 | −1 | 0 | −1 | 0 | −1 | 0 | −1 | 0 |
| −1 | 0 | −1 | 0 | 1 | 0 | −1 | 0 | −1 | 0 | 1 | 0 |
| −1 | 0 | −1 | 0 | −1 | 0 | −1 | 0 | 1 | 0 | −1 | 0 |
| −1 | 0 | 1 | 0 | −1 | 0 | 1 | 0 | −1 | 0 | 1 | 0 |
| 1 | 0 | −1 | 0 | 1 | 0 | 1 | 0 | 1 | 0 | −1 | 0 |
| 1 | 0 | −1 | 0 | −1 | 0 | 1 | 0 | −1 | 0 | −1 | 0 |
| −1 | 0 | 1 | 0 | 1 | 0 | 1 | 0 | −1 | 0 | −1 | 0 |
| −1 | 0 | 1 | 0 | −1 | 0 | 1 | 0 | 1 | 0 | −1 | 0 |
| 1 | 0 | 1 | 0 | 1 | 0 | −1 | 0 | −1 | 0 | −1 | 0 |
| 1 | 0 | −1 | 0 | 1 | 0 | 1 | 0 | 1 | 0 | −1 | 0 |
| −1 | 0 | −1 | 0 | 1 | 0 | 1 | 0 | 1 | 0 | −1 | 0 |
| 1 | 0 | 1 | 0 | −1 | 0 | 1 | 0 | −1 | 0 | −1 | 0 |
| −1 | 0 | 1 | 0 | −1 | 0 | −1 | 0 | 1 | 0 | −1 | 0 |
| −1 | 0 | 1 | 0 | −1 | 0 | −1 | 0 | 1 | 0 | −1 | 0 |
| −1 | 0 | −1 | 0 | −1 | 0 | 1 | 0 | −1 | 0 | −1 | 0 |
| 1 | 0 | −1 | 0 | −1 | 0 | −1 | 0 | −1 | 0 | −1 | 0 |
| −1 | 0 | 1 | 0 | 1 | 0 | 1 | 0 | −1 | 0 | 1 | 0 |
| 1 | 0 | 1 | 0 | 1 | 0 | −1 | 0 | −1 | 0 | −1 | 0 |
| 1 | 0 | −1 | 0 | 1 | 0 | −1 | 0 | 1 | 0 | 1 | 0 |
| 1 | 0 | −1 | 0 | −1 | 0 | −1 | 0 | −1 | 0 | 1 | 0 |
| −1 | 0 | −1 | 0 | −1 | 0 | 1 | 0 | 1 | 0 | 1 | 0 |
| 1 | 0 | 1 | 0 | 1 | 0 | −1 | 0 | 1 | 0 | 1 | 0 |
| −1 | 0 | 1 | 0 | 1 | 0 | 1 | 0 | 1 | 0 | −1 | 0 |
| 1 | 0 | 1 | 0 | −1 | 0 | 1 | 0 | −1 | 0 | 1 | 0 |
| −1 | 0 | −1 | 0 | 1 | 0 | −1 | 0 | −1 | 0 | −1 | 0 |
| 1 | 0 | −1 | 0 | 1 | 0 | 1 | 0 | −1 | 0 | 1 | 0 |
| 1 | 0 | 1 | 0 | −1 | 0 | −1 | 0 | −1 | 0 | 1 | 0 |
| 1 | 0 | 1 | 0 | −1 | 0 | 1 | 0 | −1 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | −1 | 0 | 1 | 0 |
| −1 | 0 | −1 | 0 | −1 | 0 | 1 | 0 | 1 | 0 | 1 | 0 |
| −1 | 0 | 1 | 0 | −1 | 0 | −1 | 0 | −1 | 0 | 1 | 0 |
| 1 | 0 | 1 | 0 | −1 | 0 | −1 | 0 | −1 | 0 | 1 | 0 |
| −1 | 0 | −1 | 0 | 1 | 0 | −1 | 0 | 1 | 0 | 1 | 0 |
| 1 | 0 | −1 | 0 | 1 | 0 | 1 | 0 | −1 | 0 | 1 | 0 |
| 1 | 0 | −1 | 0 | 1 | 0 | 1 | 0 | −1 | 0 | 1 | 0 |
| 1 | 0 | 1 | 0 | 1 | 0 | −1 | 0 | 1 | 0 | 1 | 0 |
| −1 | 0 | 1 | 0 | 1 | 0 | 1 | 0 | 1 | 0 | 1 | 0 |
| 1 | 0 | −1 | 0 | −1 | 0 | −1 | 0 | 1 | 0 | −1 | 0 |
| −1 | 0 | −1 | 0 | −1 | 0 | 1 | 0 | 1 | 0 | 1 | 0 |
| −1 | 0 | 1 | 0 | 1 | 0 | −1 | 0 | 1 | 0 | 1 | 0 |
| 1 | 0 | −1 | 0 | −1 | 0 | −1 | 0 | −1 | 0 | 1 | 0 |
| −1 | 0 | −1 | 0 | −1 | 0 | 1 | 0 | 1 | 0 | 1 | 0 |
| 1 | 0 | 1 | 0 | 1 | 0 | −1 | 0 | 1 | 0 | 1 | 0 |

-continued

| | | | | | | | | | | | |
|---|---|---|---|---|---|---|---|---|---|---|---|
| −1 | 0 | 1 | 0 | 1 | 0 | 1 | 0 | 1 | 0 | −1 | 0 |
| 1 | 0 | 1 | 0 | −1 | 0 | 1 | 0 | −1 | 0 | 1 | 0 |
| −1 | 0 | −1 | 0 | 1 | 0 | −1 | 0 | −1 | 0 | −1 | 0 |
| 1 | 0 | −1 | 0 | 1 | 0 | 1 | 0 | −1 | 0 | 1 | 0 |
| 1 | 0 | 1 | 0 | −1 | 0 | −1 | 0 | −1 | 0 | 1 | 0 |
| 1 | 0 | 1 | 0 | −1 | 0 | 1 | 0 | −1 | 0 | 1 | 0 |
| −1 | 0 | 1 | 0 | 1 | 0 | 1 | 0 | −1 | 0 | −1 | 0 |
| −1 | 0 | 1 | 0 | −1 | 0 | 1 | 0 | 1 | 0 | 1 | 0 |
| −1 | 0 | −1 | 0 | −1 | 0 | 1 | 0 | 1 | 0 | 1 | 0 |
| −1 | 0 | 1 | 0 | 1 | 0 | −1 | 0 | 1 | 0 | −1 | 0 |
| −1 | 0 | −1 | 0 | 1 | 0 | −1 | 0 | −1 | 0 | 1 | 0 |
| −1 | 0 | −1 | 0 | 1 | 0 | −1 | 0 | −1 | 0 | 1 | 0 |
| −1 | 0 | −1 | 0 | −1 | 0 | −1 | 0 | 1 | 0 | −1 | 0 |
| −1 | 0 | 1 | 0 | −1 | 0 | −1 | 0 | −1 | 0 | −1 | 0 |
| −1 | 0 | −1 | 0 | 1 | 0 | 1 | 0 | 1 | 0 | −1 | 0 |
| 1 | 0 | 1 | 0 | 1 | 0 | 1 | 0 | −1 | 0 | −1 | 0 |
| −1 | 0 | 1 | 0 | −1 | 0 | 1 | 0 | −1 | 0 | 1 | 0 |
| 1 | 0 | 1 | 0 | −1 | 0 | −1 | 0 | −1 | 0 | −1 | 0 |
| 1 | 0 | −1 | 0 | −1 | 0 | −1 | 0 | 1 | 0 | 1 | 0 |
| 1 | 0 | 1 | 0 | 1 | 0 | 1 | 0 | −1 | 0 | 1 | 0 |
| 1 | 0 | −1 | 0 | 1 | 0 | 1 | 0 | 1 | 0 | 1 | 0 |
| −1 | 0 | 1 | 0 | 1 | 0 | −1 | 0 | 1 | 0 | −1 | 0 |
| 1 | 0 | −1 | 0 | −1 | 0 | 1 | 0 | −1 | 0 | −1 | 0 |
| −1 | 0 | 1 | 0 | −1 | 0 | 1 | 0 | 1 | 0 | −1 | 0 |
| 1 | 0 | 1 | 0 | 1 | 0 | −1 | 0 | −1 | 0 | −1 | 0 |
| 1 | 0 | 1 | 0 | 1 | 0 | −1 | 0 | 1 | 0 | −1 | 0 |
| −1 | 0 | 1 | 0 | 1 | 0 | 1 | 0 | −1 | 0 | −1 | 0 |
| −1 | 0 | 0 | 0 | 0 | 0 | 0 | 0 | 1 | 0 | −1 | 0 |
| −1 | 0 | 1 | 0 | 1 | 0 | −1 | 0 | 1 | 0 | 1 | 0 |
| −1 | 0 | 1 | 0 | 1 | 0 | 1 | 0 | −1 | 0 | −1 | 0 |
| −1 | 0 | 1 | 0 | −1 | 0 | 1 | 0 | 1 | 0 | 1 | 0 |
| −1 | 0 | −1 | 0 | −1 | 0 | 1 | 0 | 1 | 0 | 1 | 0 |
| −1 | 0 | 1 | 0 | 1 | 0 | −1 | 0 | 1 | 0 | 1 | 0 |
| −1 | 0 | −1 | 0 | 1 | 0 | −1 | 0 | −1 | 0 | 1 | 0 |
| −1 | 0 | −1 | 0 | 1 | 0 | −1 | 0 | −1 | 0 | 1 | 0 |
| −1 | 0 | −1 | 0 | −1 | 0 | −1 | 0 | 1 | 0 | −1 | 0 |
| −1 | 0 | 1 | 0 | −1 | 0 | −1 | 0 | −1 | 0 | −1 | 0 |
| −1 | 0 | −1 | 0 | 1 | 0 | 1 | 0 | 1 | 0 | −1 | 0 |
| 1 | 0 | 1 | 0 | 1 | 0 | 1 | 0 | −1 | 0 | −1 | 0 |
| −1 | 0 | 1 | 0 | −1 | 0 | −1 | 0 | 1 | 0 | −1 | 0 |
| −1 | 0 | −1 | 0 | 1 | 0 | 1 | 0 | 1 | 0 | 1 | 0 |
| −1 | 0 | 1 | 0 | 1 | 0 | 1 | 0 | −1 | 0 | −1 | 0 |
| −1 | 0 | −1 | 0 | −1 | 0 | −1 | 0 | 1 | 0 | −1 | 0 |
| −1 | 0 | 1 | 0 | −1 | 0 | −1 | 0 | −1 | 0 | −1 | 0 |
| 1 | 0 | −1 | 0 | −1 | 0 | 1 | 0 | −1 | 0 | 1 | 0 |
| −1 | 0 | 1 | 0 | 1 | 0 | −1 | 0 | 1 | 0 | 1 | 0 |
| 1 | 0 | −1 | 0 | 1 | 0 | −1 | 0 | −1 | 0 | 1 | 0 |
| −1 | 0 | −1 | 0 | −1 | 0 | 1 | 0 | 1 | 0 | 1 | 0 |
| −1 | 0 | −1 | 0 | −1 | 0 | 1 | 0 | −1 | 0 | 1 | 0 |
| 1 | 0 | −1 | 0 | 1 | 0 | 1 | 0 | 1 | 0 | −1 | 0 |
| −1 | 0 | −1 | 0 | 1 | 0 | −1 | 0 | 1 | 0 | 1 | 0 |
| 1 | 0 | −1 | 0 | −1 | 0 | −1 | 0 | 1 | 0 | 1 | 0 |
| 1 | 0 | −1 | 0 | 1 | 0 | 1 | 0 | −1 | 0 | 1 | 0 |
| −1 | 0 | −1 | 0 | −1 | 0 | 1 | 0 | −1 | 0 | −1 | 0 |
| 1 | 0 | −1 | 0 | −1 | 0 | 1 | 0 | −1 | 0 | −1 | 0 |
| 1 | 0 | −1 | 0 | −1 | 0 | −1 | 0 | −1 | 0 | 1 | 0 |
| −1 | 0 | −1 | 0 | 1 | 0 | −1 | 0 | −1 | 0 | −1 | 0 |
| −1 | 0 | −1 | 0 | −1 | 0 | 1 | 0 | 1 | 0 | 1 | 0 |
| −1 | 0 | 1 | 0 | 1 | 0 | 1 | 0 | 1 | 0 | −1 | 0 |
| −1 | 0 | −1 | 0 | 1 | 0 | −1 | 0 | 1 | 0 | −1 | 0 |
| 1 | 0 | 1 | 0 | 1 | 0 | −1 | 0 | −1 | 0 | −1 | 0 |
| −1 | 0 | 1 | 0 | −1 | 0 | −1 | 0 | −1 | 0 | 1 | 0 |
| 1 | 0 | 1 | 0 | 1 | 0 | 1 | 0 | 1 | 0 | −1 | 0 |
| 1 | 0 | 1 | 0 | −1 | 0 | 1 | 0 | 1 | 0 | 1 | 0 |
| 1 | 0 | −1 | 0 | 1 | 0 | 1 | 0 | −1 | 0 | 1 | 0 |
| −1 | 0 | 1 | 0 | −1 | 0 | −1 | 0 | 1 | 0 | −1 | 0 |
| −1 | 0 | −1 | 0 | 1 | 0 | −1 | 0 | 1 | 0 | 1 | 0 |
| −1 | 0 | 1 | 0 | 1 | 0 | 1 | 0 | −1 | 0 | −1 | 0 |
| −1 | 0 | 1 | 0 | 1 | 0 | 1 | 0 | −1 | 0 | 1 | 0 |
| −1 | 0 | 0 | 0 | 0 | 0 | 0 | 0 | 0 | 0 | 0 | 0}. |

4. The communication apparatus according to claim 1, wherein in response to the LTF being a 2×LTF sequence in a 320 MHz, the 2×LTF sequence in the 320 MHz is:

| | | | | | | | | | | | |
|---|---|---|---|---|---|---|---|---|---|---|---|
| {0 | 0 | 0 | 0 | 0 | 0 | 0 | 0 | 0 | 0 | 0 | 0 |
| 1 | 0 | 1 | 0 | −1 | 0 | 1 | 0 | 1 | 0 | 1 | 0 |
| −1 | 0 | 1 | 0 | 1 | 0 | 1 | 0 | 1 | 0 | −1 | 0 |
| −1 | 0 | −1 | 0 | 1 | 0 | −1 | 0 | −1 | 0 | 1 | 0 |
| 1 | 0 | −1 | 0 | 1 | 0 | 1 | 0 | 1 | 0 | 1 | 0 |
| −1 | 0 | −1 | 0 | −1 | 0 | 1 | 0 | 1 | 0 | 1 | 0 |
| 1 | 0 | −1 | 0 | 1 | 0 | 1 | 0 | 1 | 0 | −1 | 0 |
| 1 | 0 | −1 | 0 | −1 | 0 | 1 | 0 | −1 | 0 | −1 | 0 |
| −1 | 0 | 1 | 0 | 1 | 0 | −1 | 0 | 1 | 0 | −1 | 0 |
| 1 | 0 | −1 | 0 | −1 | 0 | 1 | 0 | −1 | 0 | 1 | 0 |
| 1 | 0 | −1 | 0 | 1 | 0 | 1 | 0 | −1 | 0 | 1 | 0 |
| −1 | 0 | −1 | 0 | −1 | 0 | 1 | 0 | −1 | 0 | −1 | 0 |
| −1 | 0 | −1 | 0 | 1 | 0 | −1 | 0 | −1 | 0 | 1 | 0 |
| 1 | 0 | −1 | 0 | 1 | 0 | −1 | 0 | 1 | 0 | −1 | 0 |
| −1 | 0 | −1 | 0 | −1 | 0 | 1 | 0 | −1 | 0 | 1 | 0 |
| 1 | 0 | 1 | 0 | −1 | 0 | 1 | 0 | 1 | 0 | 1 | 0 |
| 1 | 0 | −1 | 0 | −1 | 0 | −1 | 0 | 1 | 0 | 1 | 0 |
| 1 | 0 | −1 | 0 | −1 | 0 | 1 | 0 | 1 | 0 | 1 | 0 |
| −1 | 0 | 1 | 0 | 1 | 0 | −1 | 0 | 1 | 0 | −1 | 0 |
| −1 | 0 | −1 | 0 | −1 | 0 | 1 | 0 | −1 | 0 | −1 | 0 |
| −1 | 0 | 1 | 0 | −1 | 0 | 1 | 0 | 1 | 0 | −1 | 0 |
| 1 | 0 | 1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| 1 | 0 | −1 | 0 | 1 | 0 | 1 | 0 | 1 | 0 | −1 | 0 |
| −1 | 0 | 1 | 0 | 1 | 0 | 1 | 0 | −1 | 0 | 1 | 0 |
| 1 | 0 | −1 | 0 | 1 | 0 | −1 | 0 | −1 | 0 | 1 | 0 |
| −1 | 0 | 1 | 0 | 1 | 0 | 1 | 0 | −1 | 0 | 1 | 0 |
| 1 | 0 | 1 | 0 | 1 | 0 | −1 | 0 | −1 | 0 | −1 | 0 |
| 1 | 0 | −1 | 0 | −1 | 0 | 1 | 0 | 1 | 0 | −1 | 0 |
| 1 | 0 | 1 | 0 | 1 | 0 | −1 | 0 | −1 | 0 | −1 | 0 |
| −1 | 0 | 1 | 0 | 1 | 0 | 1 | 0 | −1 | 0 | −1 | 0 |
| −1 | 0 | −1 | 0 | 1 | 0 | 1 | 0 | −1 | 0 | −1 | 0 |
| 1 | 0 | −1 | 0 | 1 | 0 | 1 | 0 | 1 | 0 | −1 | 0 |
| −1 | 0 | 1 | 0 | 1 | 0 | 1 | 0 | −1 | 0 | 1 | 0 |
| 1 | 0 | −1 | 0 | 1 | 0 | −1 | 0 | −1 | 0 | −1 | 0 |
| −1 | 0 | 1 | 0 | −1 | 0 | −1 | 0 | −1 | 0 | 1 | 0 |
| −1 | 0 | 1 | 0 | 1 | 0 | −1 | 0 | 1 | 0 | 1 | 0 |
| −1 | 0 | 1 | 0 | 1 | 0 | −1 | 0 | −1 | 0 | 1 | 0 |
| −1 | 0 | −1 | 0 | −1 | 0 | 1 | 0 | 1 | 0 | 1 | 0 |
| 1 | 0 | −1 | 0 | 1 | 0 | −1 | 0 | −1 | 0 | −1 | 0 |
| 1 | 0 | −1 | 0 | −1 | 0 | −1 | 0 | −1 | 0 | 1 | 0 |
| 1 | 0 | 1 | 0 | 1 | 0 | −1 | 0 | −1 | 0 | −1 | 0 |
| 1 | 0 | 1 | 0 | 1 | 0 | 0 | 0 | 0 | 0 | 0 | 0 |
| 1 | 0 | −1 | 0 | −1 | 0 | 1 | 0 | 1 | 0 | −1 | 0 |
| 1 | 0 | −1 | 0 | −1 | 0 | −1 | 0 | 1 | 0 | 1 | 0 |
| 1 | 0 | 1 | 0 | −1 | 0 | 1 | 0 | 1 | 0 | 1 | 0 |
| −1 | 0 | 1 | 0 | −1 | 0 | −1 | 0 | −1 | 0 | −1 | 0 |
| 1 | 0 | 1 | 0 | 1 | 0 | −1 | 0 | 1 | 0 | 1 | 0 |
| −1 | 0 | −1 | 0 | 1 | 0 | −1 | 0 | −1 | 0 | 1 | 0 |
| −1 | 0 | −1 | 0 | 1 | 0 | −1 | 0 | 1 | 0 | 1 | 0 |
| 1 | 0 | −1 | 0 | 1 | 0 | 1 | 0 | 1 | 0 | 1 | 0 |
| −1 | 0 | 1 | 0 | −1 | 0 | −1 | 0 | 1 | 0 | −1 | 0 |
| −1 | 0 | −1 | 0 | 1 | 0 | 1 | 0 | −1 | 0 | −1 | 0 |
| −1 | 0 | 1 | 0 | −1 | 0 | 1 | 0 | 1 | 0 | 1 | 0 |
| −1 | 0 | 1 | 0 | 1 | 0 | 1 | 0 | 1 | 0 | −1 | 0 |
| −1 | 0 | −1 | 0 | 1 | 0 | 1 | 0 | 1 | 0 | 1 | 0 |
| −1 | 0 | −1 | 0 | −1 | 0 | 1 | 0 | −1 | 0 | −1 | 0 |
| 1 | 0 | 1 | 0 | −1 | 0 | 1 | 0 | 1 | 0 | 1 | 0 |
| −1 | 0 | −1 | 0 | −1 | 0 | −1 | 0 | 1 | 0 | −1 | 0 |
| −1 | 0 | −1 | 0 | 1 | 0 | −1 | 0 | 1 | 0 | 1 | 0 |
| −1 | 0 | 1 | 0 | −1 | 0 | −1 | 0 | 1 | 0 | −1 | 0 |
| −1 | 0 | −1 | 0 | 1 | 0 | 1 | 0 | −1 | 0 | −1 | 0 |
| −1 | 0 | 1 | 0 | −1 | 0 | −1 | 0 | 1 | 0 | −1 | 0 |
| 1 | 0 | 1 | 0 | 1 | 0 | −1 | 0 | 1 | 0 | 1 | 0 |
| 1 | 0 | −1 | 0 | 1 | 0 | −1 | 0 | 1 | 0 | 1 | 0 |
| −1 | 0 | 1 | 0 | −1 | 0 | −1 | 0 | −1 | 0 | 1 | 0 |
| −1 | 0 | −1 | 0 | −1 | 0 | −1 | 0 | 1 | 0 | −1 | 0 |
| 1 | 0 | 1 | 0 | −1 | 0 | 1 | 0 | 1 | 0 | 1 | 0 |
| −1 | 0 | −1 | 0 | 1 | 0 | 1 | 0 | 1 | 0 | −1 | 0 |
| −1 | 0 | −1 | 0 | 1 | 0 | 1 | 0 | 1 | 0 | 1 | 0 |
| −1 | 0 | 1 | 0 | 1 | 0 | 1 | 0 | −1 | 0 | 1 | 0 |
| −1 | 0 | −1 | 0 | −1 | 0 | 1 | 0 | 1 | 0 | 1 | 0 |
| 1 | 0 | −1 | 0 | 1 | 0 | 1 | 0 | −1 | 0 | −1 | 0 |
| 1 | 0 | −1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| −1 | 0 | −1 | 0 | 1 | 0 | 1 | 0 | −1 | 0 | 1 | 0 |
| −1 | 0 | −1 | 0 | 1 | 0 | −1 | 0 | −1 | 0 | −1 | 0 |
| 1 | 0 | 1 | 0 | −1 | 0 | −1 | 0 | −1 | 0 | 1 | 0 |
| −1 | 0 | −1 | 0 | 1 | 0 | −1 | 0 | 1 | 0 | 1 | 0 |
| 1 | 0 | −1 | 0 | 1 | 0 | 1 | 0 | 1 | 0 | 1 | 0 |
| −1 | 0 | −1 | 0 | −1 | 0 | −1 | 0 | 1 | 0 | 1 | 0 |

-continued

| | | | | | | | | | | | |
|---|---|---|---|---|---|---|---|---|---|---|---|
| 1 | 0 | −1 | 0 | 1 | 0 | 1 | 0 | −1 | 0 | −1 | 0 |
| 1 | 0 | −1 | 0 | −1 | 0 | −1 | 0 | 1 | 0 | 1 | 0 |
| 1 | 0 | 1 | 0 | −1 | 0 | 1 | 0 | 1 | 0 | 1 | 0 |
| −1 | 0 | 1 | 0 | 1 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 1 | 0 | 1 | 0 | −1 | 0 | 1 | 0 |
| 1 | 0 | 1 | 0 | −1 | 0 | 1 | 0 | 1 | 0 | 1 | 0 |
| 1 | 0 | −1 | 0 | −1 | 0 | −1 | 0 | 1 | 0 | −1 | 0 |
| −1 | 0 | 1 | 0 | 1 | 0 | −1 | 0 | 1 | 0 | 1 | 0 |
| 1 | 0 | −1 | 0 | −1 | 0 | −1 | 0 | −1 | 0 | 1 | 0 |
| 1 | 0 | 1 | 0 | 1 | 0 | −1 | 0 | 1 | 0 | 1 | 0 |
| 1 | 0 | −1 | 0 | 1 | 0 | −1 | 0 | −1 | 0 | 1 | 0 |
| −1 | 0 | −1 | 0 | −1 | 0 | 1 | 0 | 1 | 0 | −1 | 0 |
| −1 | 0 | −1 | 0 | 1 | 0 | −1 | 0 | −1 | 0 | 1 | 0 |
| −1 | 0 | 1 | 0 | 1 | 0 | −1 | 0 | 1 | 0 | 1 | 0 |
| −1 | 0 | 1 | 0 | −1 | 0 | −1 | 0 | −1 | 0 | 1 | 0 |
| −1 | 0 | −1 | 0 | −1 | 0 | −1 | 0 | 1 | 0 | −1 | 0 |
| −1 | 0 | 1 | 0 | 1 | 0 | −1 | 0 | 1 | 0 | 1 | 0 |
| 1 | 0 | −1 | 0 | −1 | 0 | −1 | 0 | −1 | 0 | 1 | 0 |
| −1 | 0 | 1 | 0 | 1 | 0 | 1 | 0 | −1 | 0 | 1 | 0 |
| 1 | 0 | 1 | 0 | 1 | 0 | −1 | 0 | −1 | 0 | −1 | 0 |
| 1 | 0 | 1 | 0 | 1 | 0 | −1 | 0 | 1 | 0 | 1 | 0 |
| 1 | 0 | 1 | 0 | −1 | 0 | 1 | 0 | 1 | 0 | −1 | 0 |
| 1 | 0 | −1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| 1 | 0 | −1 | 0 | 1 | 0 | 1 | 0 | −1 | 0 | −1 | 0 |
| −1 | 0 | −1 | 0 | −1 | 0 | −1 | 0 | −1 | 0 | 1 | 0 |
| −1 | 0 | 1 | 0 | 1 | 0 | −1 | 0 | 1 | 0 | 1 | 0 |
| 1 | 0 | −1 | 0 | −1 | 0 | 1 | 0 | 1 | 0 | 1 | 0 |
| −1 | 0 | 1 | 0 | 1 | 0 | −1 | 0 | 1 | 0 | −1 | 0 |
| −1 | 0 | 1 | 0 | −1 | 0 | 1 | 0 | 1 | 0 | 1 | 0 |
| −1 | 0 | 1 | 0 | 1 | 0 | 1 | 0 | 1 | 0 | −1 | 0 |
| −1 | 0 | −1 | 0 | 1 | 0 | −1 | 0 | −1 | 0 | 1 | 0 |
| 1 | 0 | −1 | 0 | 1 | 0 | 1 | 0 | 1 | 0 | −1 | 0 |
| −1 | 0 | −1 | 0 | −1 | 0 | 1 | 0 | 1 | 0 | 1 | 0 |
| −1 | 0 | −1 | 0 | −1 | 0 | −1 | 0 | 1 | 0 | −1 | 0 |
| −1 | 0 | −1 | 0 | 1 | 0 | −1 | 0 | 1 | 0 | 1 | 0 |
| 1 | 0 | −1 | 0 | −1 | 0 | 1 | 0 | 1 | 0 | 1 | 0 |
| −1 | 0 | 1 | 0 | 1 | 0 | −1 | 0 | 1 | 0 | −1 | 0 |
| −1 | 0 | −1 | 0 | −1 | 0 | 1 | 0 | −1 | 0 | −1 | 0 |
| −1 | 0 | 1 | 0 | −1 | 0 | 1 | 0 | 1 | 0 | −1 | 0 |
| 1 | 0 | 1 | 0 | −1 | 0 | 1 | 0 | 1 | 0 | −1 | 0 |
| −1 | 0 | 1 | 0 | −1 | 0 | −1 | 0 | −1 | 0 | 1 | 0 |
| 1 | 0 | 1 | 0 | 1 | 0 | −1 | 0 | 1 | 0 | −1 | 0 |
| −1 | 0 | −1 | 0 | 1 | 0 | −1 | 0 | −1 | 0 | −1 | 0 |
| −1 | 0 | 1 | 0 | 1 | 0 | 1 | 0 | −1 | 0 | 1 | 0 |
| 1 | 0 | 1 | 0 | −1 | 0 | −1 | 0 | −1 | 0 | 0 | 0 |
| 0 | 0 | 0 | 0 | −1 | 0 | 1 | 0 | 1 | 0 | −1 | 0 |
| −1 | 0 | 1 | 0 | −1 | 0 | 1 | 0 | 1 | 0 | 1 | 0 |
| −1 | 0 | −1 | 0 | −1 | 0 | −1 | 0 | 1 | 0 | −1 | 0 |
| −1 | 0 | −1 | 0 | 1 | 0 | −1 | 0 | 1 | 0 | 1 | 0 |
| 1 | 0 | 1 | 0 | −1 | 0 | −1 | 0 | −1 | 0 | 1 | 0 |
| −1 | 0 | −1 | 0 | 1 | 0 | 1 | 0 | −1 | 0 | 1 | 0 |
| 1 | 0 | −1 | 0 | 1 | 0 | 1 | 0 | −1 | 0 | 1 | 0 |
| −1 | 0 | −1 | 0 | −1 | 0 | 1 | 0 | −1 | 0 | −1 | 0 |
| −1 | 0 | −1 | 0 | 1 | 0 | −1 | 0 | 1 | 0 | 1 | 0 |
| −1 | 0 | 1 | 0 | 1 | 0 | 1 | 0 | −1 | 0 | −1 | 0 |
| 1 | 0 | 1 | 0 | 1 | 0 | −1 | 0 | 1 | 0 | −1 | 0 |
| −1 | 0 | −1 | 0 | 1 | − | −1 | 0 | −1 | 0 | −1 | 0 |
| −1 | 0 | 1 | 0 | 1 | 0 | 1 | 0 | −1 | 0 | −1 | 0 |
| −1 | 0 | −1 | 0 | 1 | 0 | 1 | 0 | 1 | 0 | −1 | 0 |
| 1 | 0 | 1 | 0 | −1 | 0 | −1 | 0 | 1 | 0 | −1 | 0 |
| −1 | 0 | −1 | 0 | 1 | 0 | 1 | 0 | 1 | 0 | 1 | 0 |
| −1 | 0 | 1 | 0 | 1 | 0 | 1 | 0 | −1 | 0 | 1 | 0 |
| −1 | 0 | −1 | 0 | 1 | 0 | −1 | 0 | 1 | 0 | 1 | 0 |
| −1 | 0 | 1 | 0 | 1 | 0 | 1 | 0 | −1 | 0 | −1 | 0 |
| 1 | 0 | 1 | 0 | 1 | 0 | −1 | 0 | 1 | 0 | 1 | 0 |
| −1 | 0 | 1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| −1 | 0 | −1 | 0 | 1 | 0 | −1 | 0 | 1 | 0 | 1 | 0 |
| 1 | 0 | −1 | 0 | 1 | 0 | 1 | 0 | 1 | 0 | 1 | 0 |
| −1 | 0 | 1 | 0 | −1 | 0 | −1 | 0 | 1 | 0 | −1 | 0 |
| −1 | 0 | −1 | 0 | 1 | 0 | 1 | 0 | −1 | 0 | −1 | 0 |
| −1 | 0 | 1 | 0 | 1 | 0 | 1 | 0 | −1 | 0 | −1 | 0 |
| −1 | 0 | −1 | 0 | 1 | 0 | −1 | 0 | −1 | 0 | −1 | 0 |
| 1 | 0 | −1 | 0 | 1 | 0 | 1 | 0 | 1 | 0 | 1 | 0 |
| −1 | 0 | −1 | 0 | −1 | 0 | 1 | 0 | −1 | 0 | −1 | 0 |
| 1 | 0 | 1 | 0 | −1 | 0 | 1 | 0 | 1 | 0 | 1 | 0 |
| 1 | 0 | −1 | 0 | 1 | 0 | 1 | 0 | 1 | 0 | −1 | 0 |

-continued

| | | | | | | | | | | | |
|---|---|---|---|---|---|---|---|---|---|---|---|
| 1 | 0 | −1 | 0 | −1 | 0 | 1 | 0 | −1 | 0 | −1 | 0 |
| 1 | 0 | −1 | 0 | 1 | 0 | 1 | 0 | −1 | 0 | 1 | 0 |
| 1 | 0 | 1 | 0 | −1 | 0 | −1 | 0 | 1 | 0 | 1 | 0 |
| 1 | 0 | −1 | 0 | 1 | 0 | 1 | 0 | −1 | 0 | 1 | 0 |
| −1 | 0 | −1 | 0 | −1 | 0 | 1 | 0 | −1 | 0 | −1 | 0 |
| −1 | 0 | −1 | 0 | 1 | 0 | 1 | 0 | 1 | 0 | 1 | 0 |
| −1 | 0 | −1 | 0 | −1 | 0 | 1 | 0 | −1 | 0 | −1 | 0 |
| 1 | 0 | 1 | 0 | −1 | 0 | 1 | 0 | 1 | 0 | 1 | 0 |
| −1 | 0 | −1 | 0 | −1 | 0 | −1 | 0 | 1 | 0 | −1 | 0 |
| −1 | 0 | −1 | 0 | 1 | 0 | −1 | 0 | −1 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 1 | 0 | −1 | 0 |
| 1 | 0 | −1 | 0 | −1 | 0 | −1 | 0 | 1 | 0 | −1 | 0 |
| −1 | 0 | −1 | 0 | −1 | 0 | 1 | 0 | 1 | 0 | 1 | 0 |
| −1 | 0 | 1 | 0 | 1 | 0 | −1 | 0 | −1 | 0 | 1 | 0 |
| −1 | 0 | −1 | 0 | −1 | 0 | 1 | 0 | 1 | 0 | 1 | 0 |
| 1 | 0 | −1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| 1 | 0 | −1 | 0 | 1 | 0 | 1 | 0 | 1 | 0 | −1 | 0 |
| −1 | 0 | 1 | 0 | 1 | 0 | 1 | 0 | −1 | 0 | 1 | 0 |
| 1 | 0 | −1 | 0 | 1 | 0 | −1 | 0 | −1 | 0 | 1 | 0 |
| −1 | 0 | −1 | 0 | 1 | 0 | −1 | 0 | 1 | 0 | 1 | 0 |
| 1 | 0 | −1 | 0 | 1 | 0 | 1 | 0 | 1 | 0 | 1 | 0 |
| −1 | 0 | 1 | 0 | 1 | 0 | −1 | 0 | −1 | 0 | 1 | 0 |
| −1 | 0 | −1 | 0 | −1 | 0 | 1 | 0 | 1 | 0 | 1 | 0 |
| 1 | 0 | −1 | 0 | 1 | 0 | −1 | 0 | −1 | 0 | −1 | 0 |
| 1 | 0 | −1 | 0 | −1 | 0 | −1 | 0 | −1 | 0 | 1 | 0 |
| 1 | 0 | 1 | 0 | −1 | 0 | −1 | 0 | −1 | 0 | 1 | 0 |
| 1 | 0 | −1 | 0 | −1 | 0 | −1 | 0 | 1 | 0 | −1 | 0 |
| 1 | 0 | 1 | 0 | −1 | 0 | 1 | 0 | 1 | 0 | 1 | 0 |
| 1 | 0 | −1 | 0 | 1 | 0 | 1 | 0 | 1 | 0 | −1 | 0 |
| 1 | 0 | −1 | 0 | −1 | 0 | 1 | 0 | −1 | 0 | 1 | 0 |
| −1 | 0 | −1 | 0 | −1 | 0 | 1 | 0 | −1 | 0 | −1 | 0 |
| −1 | 0 | 1 | 0 | −1 | 0 | 1 | 0 | 1 | 0 | −1 | 0 |
| 1 | 0 | 1 | 0 | 1 | 0 | −1 | 0 | −1 | 0 | 1 | 0 |
| 1 | 0 | 1 | 0 | −1 | 0 | 1 | 0 | 1 | 0 | −1 | 0 |
| 1 | 0 | −1 | 0 | −1 | 0 | 1 | 0 | −1 | 0 | 1 | 0 |
| 1 | 0 | 1 | 0 | −1 | 0 | 1 | 0 | 1 | 0 | 1 | 0 |
| 1 | 0 | −1 | 0 | −1 | 0 | −1 | 0 | 1 | 0 | −1 | 0 |
| −1 | 0 | 1 | 0 | 1 | 0 | −1 | 0 | 1 | 0 | 1 | 0 |
| 1 | 0 | −1 | 0 | −1 | 0 | −1 | 0 | −1 | 0 | 1 | 0 |
| 1 | 0 | 1 | 0 | −1 | 0 | −1 | 0 | −1 | 0 | −1 | 0 |
| 1 | 0 | −1 | 0 | −1 | 0 | −1 | 0 | 1 | 0 | −1 | 0 |
| 1 | 0 | 1 | 0 | 1 | 0 | −1 | 0 | −1 | 0 | 1 | 0 |
| 1 | 0 | 1 | 0 | −1 | 0 | 1 | 0 | 1 | 0 | −1 | 0 |
| 1 | 0 | −1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| 1 | 0 | −1 | 0 | 1 | 0 | 1 | 0 | −1 | 0 | 1 | 0 |
| 1 | 0 | −1 | 0 | −1 | 0 | 1 | 0 | −1 | 0 | −1 | 0 |
| −1 | 0 | 1 | 0 | 1 | 0 | 1 | 0 | 1 | 0 | −1 | 0 |
| 1 | 0 | −1 | 0 | −1 | 0 | −1 | 0 | 1 | 0 | −1 | 0 |
| −1 | 0 | −1 | 0 | −1 | 0 | 1 | 0 | 1 | 0 | 1 | 0 |
| −1 | 0 | 1 | 0 | 1 | 0 | 1 | 0 | −1 | 0 | −1 | 0 |
| −1 | 0 | 0 | 0 | 0 | 0 | 0 | 0 | −1 | 0 | 1 | 0 |
| 1 | 0 | −1 | 0 | −1 | 0 | 1 | 0 | −1 | 0 | −1 | 0 |
| −1 | 0 | −1 | 0 | 1 | 0 | 1 | 0 | 1 | 0 | 1 | 0 |
| −1 | 0 | 1 | 0 | 1 | 0 | 1 | 0 | −1 | 0 | 1 | 0 |
| −1 | 0 | −1 | 0 | −1 | 0 | −1 | 0 | 1 | 0 | 1 | 0 |
| 1 | 0 | −1 | 0 | 1 | 0 | 1 | 0 | −1 | 0 | −1 | 0 |
| 1 | 0 | −1 | 0 | −1 | 0 | 1 | 0 | −1 | 0 | −1 | 0 |
| 1 | 0 | −1 | 0 | 1 | 0 | 1 | 0 | 1 | 0 | −1 | 0 |
| 1 | 0 | 1 | 0 | 1 | 0 | 1 | 0 | −1 | 0 | 1 | 0 |
| −1 | 0 | −1 | 0 | 1 | 0 | −1 | 0 | −1 | 0 | −1 | 0 |
| 1 | 0 | 1 | 0 | −1 | 0 | −1 | 0 | −1 | 0 | 1 | 0 |
| −1 | 0 | 1 | 0 | 1 | 0 | 1 | 0 | −1 | 0 | 1 | 0 |
| 1 | 0 | 1 | 0 | 1 | 0 | −1 | 0 | −1 | 0 | −1 | 0 |
| 1 | 0 | 1 | 0 | 1 | 0 | 1 | 0 | −1 | 0 | −1 | 0 |
| −1 | 0 | 1 | 0 | −1 | 0 | −1 | 0 | 1 | 0 | 1 | 0 |
| −1 | 0 | 1 | 0 | 1 | 0 | 1 | 0 | −1 | 0 | −1 | 0 |
| −1 | 0 | −1 | 0 | 1 | 0 | −1 | 0 | −1 | 0 | −1 | 0 |
| 1 | 0 | −1 | 0 | 1 | 0 | 1 | 0 | −1 | 0 | 1 | 0 |
| −1 | 0 | −1 | 0 | 1 | 0 | −1 | 0 | −1 | 0 | −1 | 0 |
| 1 | 0 | 1 | 0 | −1 | 0 | −1 | 0 | −1 | 0 | 1 | 0 |
| −1 | 0 | −1 | 0 | 1 | 0 | −1 | 0 | 1 | 0 | 1 | 0 |
| 1 | 0 | −1 | 0 | 1 | 0 | 1 | 0 | 1 | 0 | −1 | 0 |
| −1 | 0 | 1 | 0 | −1 | 0 | −1 | 0 | 1 | 0 | −1 | 0 |
| 1 | 0 | 1 | 0 | 1 | 0 | −1 | 0 | 1 | 0 | 1 | 0 |
| 1 | 0 | 1 | 0 | −1 | 0 | 1 | 0 | −1 | 0 | −1 | 0 |
| 1 | 0 | −1 | 0 | −1 | 0 | −1 | 0 | 1 | 0 | 1 | 0 |

-continued

| | | | | | | | | | | | |
|---|---|---|---|---|---|---|---|---|---|---|---|
| −1 | 0 | −1 | 0 | −1 | 0 | 1 | 0 | 1 | 0 | 1 | 0 |
| −1 | 0 | −1 | 0 | −1 | 0 | −1 | 0 | 1 | 0 | −1 | 0 |
| −1 | 0 | −1 | 0 | −1 | 0 | −1 | 0 | 1 | 0 | 1 | 0 |
| 1 | 0 | 1 | 0 | −1 | 0 | −1 | 0 | −1 | 0 | 1 | 0 |
| −1 | 0 | −1 | 0 | 1 | 0 | 1 | 0 | −1 | 0 | 1 | 0 |
| 1 | 0 | 1 | 0 | 1 | 0 | −1 | 0 | 1 | 0 | 1 | 0 |
| 1 | 0 | −1 | 0 | 1 | 0 | −1 | 0 | −1 | 0 | 1 | 0 |
| −1 | 0 | −1 | 0 | 1 | 0 | −1 | 0 | 1 | 0 | 1 | 0 |
| −1 | 0 | 1 | 0 | 1 | 0 | 1 | 0 | −1 | 0 | −1 | 0 |
| 1 | 0 | 1 | 0 | 1 | 0 | −1 | 0 | 1 | 0 | 1 | 0 |
| −1 | 0 | 1 | 0 | −1 | 0 | −1 | 0 | −1 | 0 | 1 | 0 |
| −1 | 0 | −1 | 0 | −1 | 0 | −1 | 0 | 1 | 0 | −1 | 0 |
| −1 | 0 | 1 | 0 | −1 | 0 | −1 | 0 | −1 | 0 | 1 | 0 |
| −1 | 0 | −1 | 0 | 1 | 0 | 1 | 0 | −1 | 0 | 1 | 0 |
| 1 | 0 | 1 | 0 | −1 | 0 | −1 | 0 | −1 | 0 | −1 | 0 |
| 1 | 0 | −1 | 0 | −1 | 0 | −1 | 0 | 1 | 0 | −1 | 0 |
| −1 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| −1 | 0 | −1 | 0 | 1 | 0 | −1 | 0 | −1 | 0 | −1 | 0 |
| 1 | 0 | −1 | 0 | −1 | 0 | −1 | 0 | −1 | 0 | 1 | 0 |
| 1 | 0 | 1 | 0 | −1 | 0 | 1 | 0 | 1 | 0 | −1 | 0 |
| −1 | 0 | 1 | 0 | −1 | 0 | −1 | 0 | −1 | 0 | 1 | 0 |
| 1 | 0 | 1 | 0 | 1 | 0 | −1 | 0 | −1 | 0 | −1 | 0 |
| −1 | 0 | 1 | 0 | −1 | 0 | −1 | 0 | −1 | 0 | 1 | 0 |
| −1 | 0 | 1 | 0 | 1 | 0 | −1 | 0 | 1 | 0 | 1 | 0 |
| 1 | 0 | −1 | 0 | −1 | 0 | 1 | 0 | 1 | 0 | 1 | 0 |
| −1 | 0 | 1 | 0 | 1 | 0 | −1 | 0 | 1 | 0 | −1 | 0 |
| −1 | 0 | 1 | 0 | −1 | 0 | −1 | 0 | 1 | 0 | −1 | 0 |
| 1 | 0 | 1 | 0 | 1 | 0 | −1 | 0 | 1 | 0 | 1 | 0 |
| 1 | 0 | 1 | 0 | −1 | 0 | 1 | 0 | 1 | 0 | −1 | 0 |
| −1 | 0 | 1 | 0 | −1 | 0 | −1 | 0 | −1 | 0 | 1 | 0 |
| 1 | 0 | 1 | 0 | 1 | 0 | −1 | 0 | 1 | 0 | −1 | 0 |
| −1 | 0 | −1 | 0 | 1 | 0 | −1 | 0 | −1 | 0 | −1 | 0 |
| −1 | 0 | 1 | 0 | 1 | 0 | 1 | 0 | −1 | 0 | −1 | 0 |
| −1 | 0 | 1 | 0 | 1 | 0 | −1 | 0 | −1 | 0 | −1 | 0 |
| 1 | 0 | −1 | 0 | −1 | 0 | 1 | 0 | −1 | 0 | 1 | 0 |
| 1 | 0 | 1 | 0 | 1 | 0 | −1 | 0 | 1 | 0 | 1 | 0 |
| 1 | 0 | −1 | 0 | 1 | 0 | −1 | 0 | −1 | 0 | 1 | 0 |
| −1 | 0 | 1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| 1 | 0 | −1 | 0 | 1 | 0 | 1 | 0 | 1 | 0 | −1 | 0 |
| −1 | 0 | 1 | 0 | 1 | 0 | 1 | 0 | −1 | 0 | 1 | 0 |
| 1 | 0 | −1 | 0 | 1 | 0 | −1 | 0 | −1 | 0 | 1 | 0 |
| −1 | 0 | 1 | 0 | 1 | 0 | 1 | 0 | −1 | 0 | 1 | 0 |
| 1 | 0 | 1 | 0 | 1 | 0 | −1 | 0 | −1 | 0 | −1 | 0 |
| 1 | 0 | −1 | 0 | −1 | 0 | 1 | 0 | 1 | 0 | −1 | 0 |
| 1 | 0 | 1 | 0 | 1 | 0 | −1 | 0 | −1 | 0 | −1 | 0 |
| −1 | 0 | 1 | 0 | 1 | 0 | 1 | 0 | −1 | 0 | −1 | 0 |
| −1 | 0 | −1 | 0 | 1 | 0 | −1 | 0 | −1 | 0 | −1 | 0 |
| 1 | 0 | −1 | 0 | 1 | 0 | 1 | 0 | 1 | 0 | −1 | 0 |
| −1 | 0 | 1 | 0 | 1 | 0 | 1 | 0 | −1 | 0 | 1 | 0 |
| 1 | 0 | −1 | 0 | 1 | 0 | −1 | 0 | −1 | 0 | −1 | 0 |
| −1 | 0 | 1 | 0 | −1 | 0 | −1 | 0 | −1 | 0 | 1 | 0 |
| −1 | 0 | 1 | 0 | 1 | 0 | −1 | 0 | 1 | 0 | 1 | 0 |
| −1 | 0 | 1 | 0 | 1 | 0 | −1 | 0 | −1 | 0 | 1 | 0 |
| −1 | 0 | −1 | 0 | −1 | 0 | 1 | 0 | 1 | 0 | 1 | 0 |
| 1 | 0 | −1 | 0 | 1 | 0 | −1 | 0 | −1 | 0 | −1 | 0 |
| 1 | 0 | −1 | 0 | −1 | 0 | −1 | 0 | −1 | 0 | 1 | 0 |
| 1 | 0 | 1 | 0 | 1 | 0 | −1 | 0 | −1 | 0 | −1 | 0 |
| 1 | 0 | 1 | 0 | 1 | 0 | 0 | 0 | 0 | 0 | 0 | 0 |
| 1 | 0 | −1 | 0 | −1 | 0 | 1 | 0 | 1 | 0 | −1 | 0 |
| 1 | 0 | 1 | 0 | 1 | 0 | 1 | 0 | −1 | 0 | −1 | 0 |
| −1 | 0 | −1 | 0 | 1 | 0 | −1 | 0 | −1 | 0 | −1 | 0 |
| 1 | 0 | −1 | 0 | 1 | 0 | 1 | 0 | 1 | 0 | 1 | 0 |
| −1 | 0 | −1 | 0 | −1 | 0 | 1 | 0 | −1 | 0 | −1 | 0 |
| 1 | 0 | 1 | 0 | −1 | 0 | 1 | 0 | 1 | 0 | −1 | 0 |
| 1 | 0 | 1 | 0 | −1 | 0 | 1 | 0 | −1 | 0 | −1 | 0 |
| −1 | 0 | 1 | 0 | −1 | 0 | −1 | 0 | −1 | 0 | −1 | 0 |
| 1 | 0 | −1 | 0 | 1 | 0 | 1 | 0 | −1 | 0 | 1 | 0 |
| 1 | 0 | 1 | 0 | −1 | 0 | −1 | 0 | 1 | 0 | 1 | 0 |
| 1 | 0 | −1 | 0 | 1 | 0 | −1 | 0 | −1 | 0 | −1 | 0 |
| 1 | 0 | −1 | 0 | −1 | 0 | −1 | 0 | −1 | 0 | 1 | 0 |
| 1 | 0 | 1 | 0 | −1 | 0 | −1 | 0 | −1 | 0 | −1 | 0 |
| 1 | 0 | 1 | 0 | 1 | 0 | −1 | 0 | 1 | 0 | 1 | 0 |
| −1 | 0 | −1 | 0 | 1 | 0 | −1 | 0 | −1 | 0 | −1 | 0 |
| 1 | 0 | 1 | 0 | 1 | 0 | 1 | 0 | −1 | 0 | 1 | 0 |
| 1 | 0 | 1 | 0 | −1 | 0 | 1 | 0 | −1 | 0 | −1 | 0 |
| 1 | 0 | −1 | 0 | 1 | 0 | 1 | 0 | −1 | 0 | 1 | 0 |
| 1 | 0 | 1 | 0 | −1 | 0 | −1 | 0 | 1 | 0 | 1 | 0 |
| 1 | 0 | −1 | 0 | 1 | 0 | 1 | 0 | −1 | 0 | 1 | 0 |
| −1 | 0 | −1 | 0 | −1 | 0 | 1 | 0 | −1 | 0 | −1 | 0 |
| −1 | 0 | 1 | 0 | 1 | 0 | −1 | 0 | 1 | 0 | 1 | 0 |
| −1 | 0 | 1 | 0 | −1 | 0 | −1 | 0 | −1 | 0 | 1 | 0 |
| −1 | 0 | −1 | 0 | 1 | 0 | −1 | 0 | 1 | 0 | −1 | 0 |
| 1 | 0 | 1 | 0 | −1 | 0 | 1 | 0 | 1 | 0 | 1 | 0 |
| −1 | 0 | −1 | 0 | 1 | 0 | 1 | 0 | 1 | 0 | −1 | 0 |
| −1 | 0 | −1 | 0 | 1 | 0 | 1 | 0 | 1 | 0 | 1 | 0 |
| −1 | 0 | 1 | 0 | 1 | 0 | 1 | 0 | −1 | 0 | 1 | 0 |
| −1 | 0 | −1 | 0 | −1 | 0 | −1 | 0 | 1 | 0 | 1 | 0 |
| 1 | 0 | −1 | 0 | 1 | 0 | 1 | 0 | −1 | 0 | −1 | 0 |
| 1 | 0 | −1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| 1 | 0 | −1 | 0 | 1 | 0 | 1 | 0 | −1 | 0 | 1 | 0 |
| −1 | 0 | −1 | 0 | 1 | 0 | −1 | 0 | −1 | 0 | −1 | 0 |
| 1 | 0 | 1 | 0 | −1 | 0 | −1 | 0 | −1 | 0 | 1 | 0 |
| −1 | 0 | −1 | 0 | 1 | 0 | −1 | 0 | 1 | 0 | 1 | 0 |
| 1 | 0 | −1 | 0 | 1 | 0 | 1 | 0 | 1 | 0 | 1 | 0 |
| −1 | 0 | −1 | 0 | −1 | 0 | −1 | 0 | 1 | 0 | 1 | 0 |
| 1 | 0 | −1 | 0 | 1 | 0 | 1 | 0 | −1 | 0 | −1 | 0 |
| 1 | 0 | −1 | 0 | −1 | 0 | −1 | 0 | 1 | 0 | 1 | 0 |
| −1 | 0 | 1 | 0 | −1 | 0 | 1 | 0 | 1 | 0 | 1 | 0 |
| −1 | 0 | 1 | 0 | 1 | 0 | 0 | 0 | 0 | 0 | 0 | 0 |
| 0 | 0 | 0 | 0}; | | | | | | | | |

or

2×EHT_LTF_320 M=

{$0_{12}$, LTF2×80 M_part1, LTF2×80 M_part2, LTF2×80 M_part3, LTF2×80 M_part4, LTF2×80 M_part5, $0_{23}$, (−1)*LTF2×80 M_part1, LTF2×80 M_part2, LTF2×80 M_part3, LTF2×80 M_part4, (−1)*LTF2×80 M_part5, $0_{23}$, LTF2×80 M_part1, LTF2×80 M_part2, LTF2×80 M_part3, LTF2×80 M_part4, (−1)*LTF2×80 M_part5, $0_{23}$, LTF2×80 M_part1, (−1)*LTF2×80 M_part2, (−1)*LTF2×80 M_part3, (−1)*LTF2×80 M_part4, (−1)*LTF2×80 M_part5, $0_{11}$}, wherein:

LTF2×80 M_part1=LTF2×80 M_2(1:242);

LTF2×80 M_part2=LTF2×80 M_2(243:484);

LTF2×80 M_part3=LTF2×80 M_2(485:517);

LTF2×80 M_part4=LTF2×80 M_2(518:759);

LTF2×80 M_part5=LTF2×80 M_2(760:1001); and

LTF2×80 M_2 is a sequence obtained after the 12 leftmost 0s and the 11 rightmost 0s are removed from a sequence 7 in a specific implementation of the specification.

5. The communication apparatus according to claim 1, wherein in response to the LTF being a 4×LTF sequence in an 80 MHz, the 4×LTF sequence in the 80 MHz is:

| | | | | | | | | | | | |
|---|---|---|---|---|---|---|---|---|---|---|---|
| {0 | 0 | 0 | 0 | 0 | 0 | 0 | 0 | 0 | 0 | 0 | 0 |
| 1 | 1 | 1 | 1 | 1 | −1 | −1 | 1 | −1 | | | |
| −1 | 1 | 1 | −1 | 1 | −1 | 1 | −1 | −1 | −1 | −1 | −1 |
| 1 | 1 | −1 | −1 | −1 | 1 | 1 | −1 | 1 | | | |
| −1 | 1 | 1 | 1 | 1 | 1 | 1 | −1 | −1 | 1 | −1 | −1 |
| 1 | 1 | −1 | 1 | −1 | 1 | 1 | 1 | 1 | 1 | 1 | −1 |
| −1 | 1 | 1 | 1 | −1 | −1 | 1 | −1 | 1 | −1 | −1 | −1 |
| −1 | −1 | −1 | 1 | 1 | −1 | 1 | 1 | −1 | −1 | 1 | −1 |
| 1 | −1 | 1 | 1 | 1 | 1 | 1 | −1 | −1 | 1 | 1 | 1 |
| −1 | −1 | 1 | −1 | 1 | | | | | | | |
| −1 | 1 | 1 | 1 | 1 | 1 | −1 | −1 | 1 | −1 | −1 | 1 |
| 1 | −1 | 1 | −1 | 1 | 1 | 1 | 1 | 1 | 1 | −1 | −1 |
| 1 | 1 | 1 | −1 | −1 | 1 | −1 | 1 | −1 | −1 | 1 | 1 |
| −1 | 1 | 1 | −1 | 1 | −1 | 1 | | | | | |
| −1 | −1 | −1 | −1 | −1 | 1 | 1 | −1 | −1 | −1 | 1 | 1 |
| −1 | 1 | −1 | 1 | 1 | 1 | 1 | 1 | 1 | | | |
| −1 | −1 | 1 | −1 | −1 | 1 | 1 | −1 | 1 | −1 | 1 | 1 |
| 1 | 1 | 1 | 1 | −1 | −1 | 1 | 1 | 1 | | | |
| −1 | −1 | 1 | −1 | 1 | −1 | 1 | 1 | 1 | 1 | 1 | −1 |
| −1 | 1 | −1 | −1 | 1 | 1 | −1 | 1 | −1 | 1 | −1 | −1 |
| −1 | −1 | −1 | 1 | 1 | −1 | −1 | −1 | 1 | 1 | −1 | 1 |
| −1 | 1 | −1 | −1 | −1 | −1 | −1 | 1 | 1 | −1 | 1 | 1 |

-continued

| | | | | | | | | | | | |
|---|---|---|---|---|---|---|---|---|---|---|---|
| −1 | −1 | 1 | −1 | 1 | −1 | −1 | −1 | −1 | −1 | −1 | 1 |
| 1 | −1 | −1 | −1 | 1 | 1 | −1 | 1 | −1 | −1 | −1 | −1 |
| −1 | 1 | 1 | −1 | 1 | 1 | −1 | −1 | 1 | −1 | 1 | −1 |
| 1 | 1 | 1 | 1 | 1 | −1 | −1 | 1 | 1 | 1 | −1 | −1 |
| 1 | −1 | 1 | −1 | −1 | −1 | −1 | −1 | −1 | 1 | 1 | −1 |
| 1 | 1 | −1 | −1 | 1 | −1 | 1 | −1 | −1 | −1 | −1 | −1 |
| −1 | 1 | 1 | −1 | −1 | −1 | 1 | 1 | −1 | 1 | −1 | 1 |
| 1 | 1 | 1 | 1 | 1 | −1 | −1 | 1 | −1 | −1 | 1 | 1 |
| −1 | 1 | −1 | 1 | −1 | −1 | −1 | −1 | −1 | 1 | 1 | −1 |
| −1 | −1 | 1 | 1 | −1 | 1 | −1 | 1 | −1 | −1 | −1 | −1 |
| −1 | 1 | −1 | −1 | 1 | 1 | −1 | | | | | |
| −1 | 1 | −1 | 1 | −1 | −1 | −1 | −1 | −1 | −1 | 1 | 1 |
| −1 | −1 | −1 | 1 | 1 | 1 | 1 | 1 | −1 | | | |
| −1 | 1 | −1 | −1 | 1 | 1 | −1 | 1 | −1 | 1 | −1 | −1 |
| −1 | −1 | −1 | 1 | 1 | −1 | −1 | −1 | 1 | 1 | −1 | 1 |
| −1 | 1 | 1 | 1 | 1 | 1 | 1 | −1 | −1 | 1 | −1 | −1 |
| 1 | 1 | −1 | 1 | −1 | 1 | 1 | 1 | 1 | 1 | 1 | −1 |
| −1 | 1 | 1 | 1 | −1 | −1 | 1 | −1 | 1 | −1 | 1 | 1 |
| 1 | 1 | 1 | −1 | −1 | 1 | −1 | −1 | 1 | 1 | −1 | 1 |
| −1 | 1 | −1 | −1 | −1 | −1 | −1 | 1 | 1 | −1 | −1 | −1 |
| 1 | 1 | −1 | 1 | −1 | 1 | −1 | −1 | −1 | −1 | −1 | 1 |
| 1 | −1 | 1 | 1 | −1 | −1 | 1 | −1 | 1 | −1 | −1 | −1 |
| −1 | | | | | | | | | | | |
| −1 | −1 | 1 | 1 | −1 | −1 | −1 | 1 | 1 | −1 | 1 | −1 |
| 1 | 0 | 0 | 0 | 0 | 0 | 1 | 1 | 1 | 1 | 1 | −1 |
| −1 | 1 | −1 | −1 | 1 | 1 | −1 | 1 | −1 | 1 | −1 | −1 |
| −1 | −1 | −1 | 1 | 1 | −1 | −1 | | | | | |
| −1 | 1 | 1 | −1 | 1 | −1 | 1 | 1 | 1 | 1 | 1 | 1 |
| −1 | −1 | 1 | −1 | −1 | 1 | 1 | −1 | 1 | | | |
| −1 | 1 | 1 | 1 | 1 | 1 | 1 | −1 | −1 | 1 | 1 | 1 |
| −1 | −1 | 1 | −1 | 1 | −1 | −1 | −1 | −1 | | | |
| −1 | −1 | 1 | 1 | −1 | 1 | 1 | −1 | −1 | 1 | −1 | 1 |
| −1 | 1 | 1 | 1 | 1 | 1 | −1 | −1 | 1 | 1 | 1 | −1 |
| −1 | 1 | −1 | 1 | −1 | 1 | 1 | 1 | 1 | 1 | −1 | −1 |
| 1 | −1 | −1 | 1 | 1 | −1 | 1 | | | | | |
| −1 | 1 | 1 | 1 | 1 | 1 | 1 | −1 | −1 | 1 | 1 | 1 |
| −1 | −1 | 1 | −1 | 1 | −1 | −1 | 1 | −1 | | | |
| −1 | 1 | 1 | −1 | 1 | −1 | 1 | −1 | −1 | −1 | −1 | −1 |
| 1 | 1 | −1 | −1 | 1 | 1 | 1 | −1 | 1 | | | |
| −1 | 1 | 1 | 1 | 1 | 1 | 1 | −1 | −1 | 1 | −1 | −1 |
| 1 | 1 | −1 | 1 | −1 | 1 | 1 | 1 | 1 | 1 | 1 | −1 |
| −1 | 1 | 1 | 1 | −1 | −1 | 1 | −1 | 1 | −1 | 1 | 1 |
| 1 | 1 | 1 | −1 | −1 | 1 | −1 | | | | | |
| −1 | 1 | 1 | −1 | 1 | −1 | 1 | −1 | −1 | −1 | −1 | −1 |
| 1 | 1 | −1 | −1 | −1 | 1 | 1 | −1 | 1 | | | |
| −1 | 1 | −1 | −1 | −1 | −1 | −1 | 1 | 1 | −1 | 1 | 1 |
| −1 | −1 | 1 | −1 | 1 | −1 | −1 | −1 | −1 | | | |
| −1 | −1 | 1 | 1 | −1 | −1 | −1 | 1 | 1 | −1 | 1 | −1 |
| 1 | 1 | 1 | 1 | −1 | −1 | 1 | −1 | −1 | 1 | 1 | −1 |
| 1 | −1 | 1 | −1 | −1 | −1 | −1 | −1 | 1 | 1 | −1 | −1 |
| −1 | 1 | 1 | −1 | 1 | −1 | 1 | 1 | 1 | 1 | 1 | 1 |
| −1 | −1 | 1 | −1 | −1 | 1 | 1 | −1 | 1 | −1 | 1 | 1 |
| 1 | 1 | 1 | 1 | −1 | | | | | | | |
| −1 | 1 | 1 | 1 | −1 | −1 | 1 | −1 | 1 | −1 | −1 | −1 |
| −1 | −1 | −1 | 1 | 1 | −1 | 1 | 1 | −1 | | | |
| −1 | 1 | −1 | 1 | −1 | 1 | 1 | 1 | 1 | 1 | −1 | −1 |
| 1 | 1 | 1 | −1 | −1 | 1 | −1 | 1 | −1 | 1 | 1 | 1 |
| 1 | 1 | −1 | −1 | 1 | −1 | −1 | 1 | 1 | −1 | 1 | −1 |
| 1 | 1 | 1 | 1 | 1 | 1 | −1 | | | | | |
| −1 | 1 | 1 | 1 | −1 | −1 | −1 | −1 | −1 | 1 | 1 | −1 |
| 1 | 1 | −1 | −1 | 1 | −1 | 1 | −1 | 1 | 1 | 1 | 1 |
| 1 | −1 | −1 | 1 | 1 | 1 | −1 | −1 | 1 | −1 | 1 | −1 |
| −1 | −1 | −1 | −1 | −1 | 1 | 1 | | | | | |
| −1 | 1 | 1 | −1 | −1 | 1 | −1 | 1 | −1 | −1 | −1 | −1 |
| −1 | −1 | 1 | 1 | −1 | −1 | −1 | 1 | 1 | | | |
| −1 | 1 | −1 | 1 | −1 | −1 | −1 | −1 | −1 | 1 | 1 | −1 |
| 1 | 1 | −1 | −1 | 1 | −1 | 1 | −1 | 1 | 1 | 1 | 1 |
| 1 | −1 | −1 | 1 | 1 | 1 | −1 | −1 | 1 | −1 | 1 | −1 |
| 1 | 1 | 1 | 1 | 1 | −1 | −1 | 1 | −1 | −1 | 1 | 1 |
| −1 | 1 | −1 | 1 | 1 | 1 | 1 | 1 | 1 | −1 | −1 | 1 |
| 1 | 1 | −1 | −1 | 1 | | | | | | | |
| −1 | 1 | −1 | 0 | 0 | 0 | 0 | 0 | 0 | 0 | 0 | 0 |
| 0 | 0}. | | | | | | | | | | |

6. A communication apparatus for physical layer protocol data unit (PPDU) transmission, the communication apparatus comprising:

at least one processor; and one or more memories coupled to the at least one processor and storing instructions for execution by the at least one processor to:

receive a PPDU; and parse the received PPDU to obtain a long training field (LTF) sequence comprised in the PPDU, wherein in response to the LTF being a 2×LTF sequence in an 80 MHZ, the 2×LTF sequence in the 80 MHz is:

| | | | | | | | | | | | |
|---|---|---|---|---|---|---|---|---|---|---|---|
| {00 | 0 | 0 | 0 | 0 | 0 | 0 | 0 | 0 | 0 | 0 | 1 |
| 0 | 1 | 0 | −1 | 0 | 1 | 0 | 1 | 0 | 1 | 0 | −1 |
| 0 | 1 | 0 | 1 | 0 | 1 | 0 | 1 | 0 | −1 | 0 | −1 |
| 0 | −1 | 0 | 1 | 0 | −1 | 0 | −1 | 0 | 1 | 0 | 1 |
| 0 | −1 | 0 | 1 | 0 | 1 | 0 | 1 | 0 | −1 | 0 | −1 |
| 0 | −1 | 0 | −1 | 0 | 1 | 0 | 1 | 0 | 1 | 0 | 1 |
| 0 | −1 | 0 | 1 | 0 | 1 | 0 | 1 | 0 | −1 | 0 | 1 |
| 0 | −1 | 0 | −1 | 0 | 1 | 0 | −1 | 0 | −1 | 0 | −1 |
| 0 | 1 | 0 | 1 | 0 | −1 | 0 | −1 | 0 | −1 | 0 | 1 |
| 0 | −1 | 0 | −1 | 0 | 1 | 0 | −1 | 0 | 1 | 0 | 1 |
| 0 | −1 | 0 | 1 | 0 | 1 | 0 | −1 | 0 | 1 | 0 | −1 |
| 0 | −1 | 0 | −1 | 0 | 1 | 0 | −1 | 0 | −1 | 0 | −1 |
| 0 | −1 | 0 | 1 | 0 | −1 | 0 | −1 | 0 | 1 | 0 | 1 |
| 0 | −1 | 0 | 1 | 0 | 1 | 0 | 1 | 0 | −1 | 0 | −1 |
| 0 | −1 | 0 | −1 | 0 | 1 | 0 | −1 | 0 | 1 | 0 | 1 |
| 0 | 1 | 0 | −1 | 0 | 1 | 0 | 1 | 0 | 1 | 0 | 1 |
| 0 | −1 | 0 | −1 | 0 | −1 | 0 | 1 | 0 | 1 | 0 | 1 |
| 0 | −1 | 0 | −1 | 0 | 1 | 0 | 1 | 0 | 1 | 0 | −1 |
| 0 | 1 | 0 | 1 | 0 | −1 | 0 | 1 | 0 | −1 | 0 | −1 |
| 0 | −1 | 0 | −1 | 0 | 1 | 0 | −1 | 0 | −1 | 0 | −1 |
| 0 | 1 | 0 | −1 | 0 | 1 | 0 | 1 | 0 | −1 | 0 | 1 |
| 0 | 1 | 0 | −1 | 0 | −1 | 0 | −1 | 0 | 1 | 0 | −1 |
| 0 | −1 | 0 | −1 | 0 | 1 | 0 | −1 | 0 | 1 | 0 | 1 |
| 0 | −1 | 0 | 1 | 0 | 1 | 0 | 1 | 0 | −1 | 0 | −1 |
| 0 | 1 | 0 | 1 | 0 | 1 | 0 | −1 | 0 | 1 | 0 | 1 |
| 0 | −1 | 0 | 1 | 0 | −1 | 0 | −1 | 0 | 1 | 0 | −1 |
| 0 | 1 | 0 | 1 | 0 | 1 | 0 | −1 | 0 | 1 | 0 | 1 |
| 0 | 1 | 0 | 1 | 0 | −1 | 0 | −1 | 0 | −1 | 0 | 1 |
| 0 | −1 | 0 | −1 | 0 | 1 | 0 | 1 | 0 | −1 | 0 | 1 |
| 0 | 1 | 0 | 1 | 0 | −1 | 0 | −1 | 0 | −1 | 0 | −1 |
| 0 | 1 | 0 | 1 | 0 | 1 | 0 | −1 | 0 | −1 | 0 | −1 |
| 0 | −1 | 0 | 1 | 0 | −1 | 0 | −1 | 0 | −1 | 0 | 1 |
| 0 | −1 | 0 | 1 | 0 | 1 | 0 | 1 | 0 | −1 | 0 | −1 |
| 0 | 1 | 0 | 1 | 0 | 1 | 0 | 1 | 0 | 1 | 0 | 1 |
| 0 | −1 | 0 | 1 | 0 | −1 | 0 | −1 | 0 | −1 | 0 | −1 |
| 0 | 1 | 0 | −1 | 0 | −1 | 0 | −1 | 0 | 1 | 0 | −1 |
| 0 | −1 | 0 | 1 | 0 | −1 | 0 | 1 | 0 | 1 | 0 | −1 |
| 0 | 1 | 0 | 1 | 0 | −1 | 0 | −1 | 0 | 1 | 0 | −1 |
| 0 | −1 | 0 | −1 | 0 | 1 | 0 | 1 | 0 | 1 | 0 | 1 |
| 0 | −1 | 0 | 1 | 0 | −1 | 0 | −1 | 0 | −1 | 0 | 1 |
| 0 | −1 | 0 | −1 | 0 | −1 | 0 | −1 | 0 | 1 | 0 | 1 |
| 0 | 1 | 0 | 1 | 0 | −1 | 0 | −1 | 0 | −1 | 0 | 1 |
| 0 | 1 | 0 | 1 | 0 | 0 | 0 | 0 | 0 | 0 | 0 | 1 |
| 0 | −1 | 0 | −1 | 0 | 1 | 0 | 1 | 0 | −1 | 0 | 1 |
| 0 | −1 | 0 | −1 | 0 | −1 | 0 | 1 | 0 | 1 | 0 | 1 |
| 0 | 1 | 0 | −1 | 0 | 1 | 0 | 1 | 0 | 1 | 0 | −1 |
| 0 | 1 | 0 | −1 | 0 | −1 | 0 | −1 | 0 | −1 | 0 | 1 |
| 0 | 1 | 0 | 1 | 0 | −1 | 0 | 1 | 0 | 1 | 0 | −1 |
| 0 | −1 | 0 | 1 | 0 | −1 | 0 | −1 | 0 | 1 | 0 | −1 |
| 0 | −1 | 0 | 1 | 0 | −1 | 0 | 1 | 0 | 1 | 0 | 1 |
| 0 | −1 | 0 | 1 | 0 | 1 | 0 | 1 | 0 | 1 | 0 | −1 |
| 0 | 1 | 0 | −1 | 0 | −1 | 0 | 1 | 0 | −1 | 0 | −1 |
| 0 | −1 | 0 | 1 | 0 | 1 | 0 | −1 | 0 | −1 | 0 | 1 |
| 0 | 1 | 0 | −1 | 0 | 1 | 0 | 1 | 0 | 1 | 0 | −1 |
| 0 | 1 | 0 | 1 | 0 | 1 | 0 | 1 | 0 | −1 | 0 | −1 |
| 0 | −1 | 0 | 1 | 0 | 1 | 0 | 1 | 0 | 1 | 0 | −1 |
| 0 | −1 | 0 | 1 | 0 | 1 | 0 | −1 | 0 | −1 | 0 | 1 |
| 0 | 1 | 0 | −1 | 0 | 1 | 0 | 1 | 0 | 1 | 0 | −1 |
| 0 | −1 | 0 | −1 | 0 | −1 | 0 | 1 | 0 | −1 | 0 | −1 |
| 0 | −1 | 0 | 1 | 0 | −1 | 0 | 1 | 0 | 1 | 0 | −1 |
| 0 | 1 | 0 | −1 | 0 | −1 | 0 | 1 | 0 | −1 | 0 | −1 |
| 0 | −1 | 0 | 1 | 0 | 1 | 0 | −1 | 0 | −1 | 0 | −1 |
| 0 | 1 | 0 | −1 | 0 | −1 | 0 | 1 | 0 | −1 | 0 | 1 |
| 0 | 1 | 0 | 1 | 0 | −1 | 0 | 1 | 0 | 1 | 0 | 1 |
| 0 | −1 | 0 | 1 | 0 | −1 | 0 | 1 | 0 | 1 | 0 | −1 |
| 0 | 1 | 0 | −1 | 0 | −1 | 0 | −1 | 0 | 1 | 0 | −1 |
| 0 | −1 | 0 | −1 | 0 | −1 | 0 | 1 | 0 | −1 | 0 | 1 |
| 0 | 1 | 0 | −1 | 0 | 1 | 0 | 1 | 0 | 1 | 0 | −1 |
| 0 | −1 | 0 | 1 | 0 | 1 | 0 | 1 | 0 | −1 | 0 | −1 |
| 0 | −1 | 0 | 1 | 0 | 1 | 0 | 1 | 0 | 1 | 0 | −1 |

-continued

| | | | | | | | | | | | |
|---|---|---|---|---|---|---|---|---|---|---|---|
| 0 | 1 | 0 | 1 | 0 | 1 | 0 | −1 | 0 | 1 | 0 | −1 |
| 0 | −1 | 0 | −1 | 0 | −1 | 0 | 1 | 0 | 1 | 0 | 1 |
| 0 | −1 | 0 | 1 | 0 | 1 | 0 | −1 | 0 | −1 | 0 | 1 |
| 0 | −1 | 0 | −1 | 0 | 1 | 0 | −1 | 0 | 1 | 0 | −1 |
| 0 | −1 | 0 | −1 | 0 | 1 | 0 | −1 | 0 | 1 | 0 | 1 |
| 0 | −1 | 0 | 1 | 0 | 1 | 0 | −1 | 0 | 1 | 0 | −1 |
| 0 | −1 | 0 | 1 | 0 | −1 | 0 | −1 | 0 | −1 | 0 | 1 |
| 0 | 1 | 0 | −1 | 0 | −1 | 0 | −1 | 0 | 1 | 0 | −1 |
| 0 | −1 | 0 | 1 | 0 | −1 | 0 | 1 | 0 | 1 | 0 | 1 |
| 0 | −1 | 0 | 1 | 0 | 1 | 0 | 1 | 0 | 1 | 0 | −1 |
| 0 | −1 | 0 | −1 | 0 | −1 | 0 | 1 | 0 | 1 | 0 | 1 |
| 0 | −1 | 0 | 1 | 0 | 1 | 0 | −1 | 0 | −1 | 0 | 1 |
| 0 | −1 | 0 | −1 | 0 | −1 | 0 | 1 | 0 | 1 | 0 | 1 |
| 0 | 1 | 0 | −1 | 0 | 1 | 0 | 1 | 0 | 1 | 0 | −1 |
| 0 | 1 | 0 | 1 | 0 | 0 | 0 | 0 | 0 | 0 | 0 | 0 |
| 0 | 0 | 0}; | | | | | | | | | |

| | | | | | | | | | | | |
|---|---|---|---|---|---|---|---|---|---|---|---|
| {0 | 0 | 0 | 0 | 0 | 0 | 0 | 0 | 0 | 0 | 0 | 0 |
| −1 | 0 | −1 | 0 | 1 | 0 | 1 | 0 | 1 | 0 | −1 | 0 |
| −1 | 0 | 1 | 0 | −1 | 0 | 1 | 0 | −1 | 0 | 1 | 0 |
| 1 | 0 | 1 | 0 | 1 | 0 | 1 | 0 | 1 | 0 | 1 | 0 |
| −1 | 0 | −1 | 0 | 1 | 0 | −1 | 0 | −1 | 0 | 1 | 0 |
| 1 | 0 | −1 | 0 | 1 | 0 | −1 | 0 | 1 | 0 | 1 | 0 |
| 1 | 0 | 1 | 0 | −1 | 0 | −1 | 0 | 1 | 0 | 1 | 0 |
| 1 | 0 | −1 | 0 | −1 | 0 | 1 | 0 | −1 | 0 | 1 | 0 |
| −1 | 0 | 1 | 0 | −1 | 0 | −1 | 0 | −1 | 0 | −1 | 0 |
| −1 | 0 | −1 | 0 | 1 | 0 | 1 | 0 | −1 | 0 | 1 | 0 |
| 1 | 0 | −1 | 0 | −1 | 0 | 1 | 0 | −1 | 0 | 1 | 0 |
| −1 | 0 | −1 | 0 | −1 | 0 | −1 | 0 | 1 | 0 | 1 | 0 |
| −1 | 0 | −1 | 0 | −1 | 0 | 1 | 0 | 1 | 0 | −1 | 0 |
| 1 | 0 | −1 | 0 | 1 | 0 | −1 | 0 | −1 | 0 | −1 | 0 |
| −1 | 0 | −1 | 0 | −1 | 0 | −1 | 0 | 1 | 0 | 1 | 0 |
| −1 | 0 | 1 | 0 | 1 | 0 | −1 | 0 | −1 | 0 | 1 | 0 |
| −1 | 0 | 1 | 0 | 1 | 0 | 1 | 0 | 1 | 0 | 1 | 0 |
| −1 | 0 | −1 | 0 | 1 | 0 | 1 | 0 | 1 | 0 | −1 | 0 |
| −1 | 0 | 1 | 0 | −1 | 0 | 1 | 0 | −1 | 0 | 1 | 0 |
| −1 | 0 | −1 | 0 | −1 | 0 | −1 | 0 | −1 | 0 | −1 | 0 |
| 1 | 0 | 1 | 0 | −1 | 0 | 1 | 0 | 1 | 0 | −1 | 0 |
| 1 | 0 | −1 | 0 | −1 | 0 | −1 | 0 | −1 | 0 | 1 | 0 |
| 1 | 0 | −1 | 0 | −1 | 0 | −1 | 0 | 1 | 0 | 1 | 0 |
| −1 | 0 | 1 | 0 | −1 | 0 | 1 | 0 | −1 | 0 | −1 | 0 |
| −1 | 0 | −1 | 0 | −1 | 0 | −1 | 0 | −1 | 0 | 1 | 0 |
| −1 | 0 | −1 | 0 | 1 | 0 | 1 | 0 | −1 | 0 | −1 | 0 |
| 1 | 0 | −1 | 0 | 1 | 0 | −1 | 0 | −1 | 0 | −1 | 0 |
| −1 | 0 | 1 | 0 | 1 | 0 | −1 | 0 | −1 | 0 | −1 | 0 |
| 1 | 0 | 1 | 0 | −1 | 0 | 1 | 0 | −1 | 0 | 1 | 0 |
| −1 | 0 | 1 | 0 | 1 | 0 | 1 | 0 | 1 | 0 | 1 | 0 |
| 1 | 0 | −1 | 0 | −1 | 0 | 1 | 0 | −1 | 0 | −1 | 0 |
| 1 | 0 | 1 | 0 | −1 | 0 | 1 | 0 | −1 | 0 | −1 | 0 |
| −1 | 0 | −1 | 0 | −1 | 0 | 1 | 0 | 1 | 0 | −1 | 0 |
| −1 | 0 | −1 | 0 | 1 | 0 | 1 | 0 | −1 | 0 | 1 | 0 |
| −1 | 0 | 1 | 0 | −1 | 0 | −1 | 0 | −1 | 0 | −1 | 0 |
| −1 | 0 | −1 | 0 | −1 | 0 | 1 | 0 | 1 | 0 | −1 | 0 |
| 1 | 0 | 1 | 0 | −1 | 0 | −1 | 0 | 1 | 0 | −1 | 0 |
| 1 | 0 | 1 | 0 | 1 | 0 | 1 | 0 | 1 | 0 | −1 | 0 |
| −1 | 0 | 1 | 0 | 1 | 0 | 1 | 0 | −1 | 0 | −1 | 0 |
| 1 | 0 | −1 | 0 | 1 | 0 | −1 | 0 | 1 | 0 | −1 | 0 |
| −1 | 0 | −1 | 0 | −1 | 0 | −1 | 0 | −1 | 0 | 1 | 0 |

-continued

| | | | | | | | | | | | |
|---|---|---|---|---|---|---|---|---|---|---|---|
| 1 | 0 | −1 | 0 | 1 | 0 | 1 | 0 | −1 | 0 | −1 | 0 |
| 1 | 0 | −1 | 0 | 1 | 0 | 0 | 0 | 0 | 0 | 0 | 0 |
| −1 | 0 | −1 | 0 | −1 | 0 | −1 | 0 | 1 | 0 | 1 | 0 |
| −1 | 0 | −1 | 0 | −1 | 0 | 1 | 0 | 1 | 0 | −1 | 0 |
| 1 | 0 | −1 | 0 | 1 | 0 | −1 | 0 | −1 | 0 | −1 | 0 |
| −1 | 0 | −1 | 0 | −1 | 0 | −1 | 0 | 1 | 0 | 1 | 0 |
| −1 | 0 | 1 | 0 | 1 | 0 | −1 | 0 | −1 | 0 | 1 | 0 |
| −1 | 0 | 1 | 0 | −1 | 0 | −1 | 0 | −1 | 0 | −1 | 0 |
| 1 | 0 | 1 | 0 | −1 | 0 | −1 | 0 | −1 | 0 | 1 | 0 |
| 1 | 0 | −1 | 0 | 1 | 0 | −1 | 0 | 1 | 0 | −1 | 0 |
| 1 | 0 | 1 | 0 | 1 | 0 | 1 | 0 | 1 | 0 | 1 | 0 |
| −1 | 0 | −1 | 0 | 1 | 0 | −1 | 0 | −1 | 0 | −1 | 0 |
| 1 | 0 | −1 | 0 | 1 | 0 | −1 | 0 | 1 | 0 | 1 | 0 |
| 1 | 0 | 1 | 0 | −1 | 0 | −1 | 0 | 1 | 0 | 1 | 0 |
| 1 | 0 | −1 | 0 | −1 | 0 | 1 | 0 | −1 | 0 | 1 | 0 |
| −1 | 0 | 1 | 0 | 1 | 0 | 1 | 0 | 1 | 0 | 1 | 0 |
| 1 | 0 | 1 | 0 | −1 | 0 | −1 | 0 | 1 | 0 | −1 | 0 |
| −1 | 0 | 1 | 0 | 1 | 0 | −1 | 0 | 1 | 0 | −1 | 0 |
| −1 | 0 | −1 | 0 | −1 | 0 | −1 | 0 | 1 | 0 | 1 | 0 |
| −1 | 0 | −1 | 0 | −1 | 0 | 1 | 0 | 1 | 0 | −1 | 0 |
| 1 | 0 | −1 | 0 | 1 | 0 | −1 | 0 | 1 | 0 | 1 | 0 |
| 1 | 0 | 1 | 0 | 1 | 0 | 1 | 0 | −1 | 0 | −1 | 0 |
| 1 | 0 | −1 | 0 | −1 | 0 | 1 | 0 | 1 | 0 | −1 | 0 |
| 1 | 0 | −1 | 0 | 1 | 0 | −1 | 0 | −1 | 0 | 1 | 0 |
| 1 | 0 | 1 | 0 | −1 | 0 | −1 | 0 | 1 | 0 | −1 | 0 |
| 1 | 0 | −1 | 0 | 1 | 0 | 1 | 0 | 1 | 0 | 1 | 0 |
| 1 | 0 | 1 | 0 | 1 | 0 | −1 | 0 | −1 | 0 | 1 | 0 |
| −1 | 0 | −1 | 0 | 1 | 0 | 1 | 0 | −1 | 0 | 1 | 0 |
| −1 | 0 | 1 | 0 | 1 | 0 | 1 | 0 | 1 | 0 | −1 | 0 |
| −1 | 0 | 1 | 0 | 1 | 0 | 1 | 0 | −1 | 0 | −1 | 0 |
| 1 | 0 | −1 | 0 | 1 | 0 | −1 | 0 | 1 | 0 | −1 | 0 |
| −1 | 0 | −1 | 0 | −1 | 0 | −1 | 0 | −1 | 0 | 1 | 0 |
| 1 | 0 | −1 | 0 | 1 | 0 | 1 | 0 | −1 | 0 | −1 | 0 |
| 1 | 0 | −1 | 0 | 1 | 0 | 1 | 0 | 1 | 0 | 1 | 0 |
| 1 | 0 | −1 | 0 | −1 | 0 | 1 | 0 | 1 | 0 | 1 | 0 |
| −1 | 0 | −1 | 0 | 1 | 0 | −1 | 0 | 1 | 0 | −1 | 0 |
| 1 | 0 | 1 | 0 | 1 | 0 | 1 | 0 | 1 | 0 | 1 | 0 |
| 1 | 0 | −1 | 0 | −1 | 0 | 1 | 0 | −1 | 0 | −1 | 0 |
| 1 | 0 | 1 | 0 | −1 | 0 | 1 | 0 | −1 | 0 | −1 | 0 |
| −1 | 0 | −1 | 0 | −1 | 0 | 1 | 0 | 1 | 0 | −1 | 0 |
| −1 | 0 | −1 | 0 | 1 | 0 | 1 | 0 | −1 | 0 | 1 | 0 |
| −1 | 0 | 1 | 0 | −1 | 0 | 1 | 0 | 1 | 0 | 1 | 0 |
| 1 | 0 | 1 | 0 | 1 | 0 | −1 | 0 | −1 | 0 | 1 | 0 |
| −1 | 0 | −1 | 0 | 1 | 0 | 0 | 0 | 0 | 0 | 0 | 0 |
| 0 | 0 | 0 | 0}; | | | | | | | | |

{ 0 0 0 0 0 0 0 0 0 0 0 0 −1 0 −1 0 1 0 1 0 1 0 −1 0 −1 0 1 0 −1 0 1 0 −1 0 1 0 1 0 1 0 1
0 1 0 1 0 1 0 −1 0 −1 0 1 0 −1 0 −1 0 1 0 1 0 −1 0 1 0 −1 0 1 0 1 0 1 0 1 0 −1 0 −1 0 1 0 1 0 1 0 −1
0 −1 0 1 0 −1 0 1 0 −1 0 1 0 −1 0 −1 0 −1 0 −1 0 −1 0 −1 0 1 0 1 0 −1 0 1 0 1 0 −1 0 −1 0 1 0 −1 0
1 0 −1 0 −1 0 −1 0 −1 0 1 0 1 0 −1 0 −1 0 −1 0 1 0 1 0 −1 0 1 0 −1 0 1 0 −1 0 −1 0 −1 0 −1 0 −1 0
−1 0 −1 0 1 0 1 0 −1 0 1 0 1 0 −1 0 −1 0 1 0 −1 0 1 0 1 0 1 0 1 0 1 0 −1 0 −1 0 1 0 1 0 1 0 −1 0 −1 0
1 0 −1 0 1 0 −1 0 1 0 −1 0 −1 0 −1 0 −1 0 −1 0 −1 0 1 0 1 0 −1 0 1 0 1 0 −1 0 −1 0 1 0 −1 0 −1 0 −1
0 1 0 1 0 −1 0 −1 0 −1 0 1 0 1 0 −1 0 1 0 −1 0 1 0 −1 0 −1 0 −1 0 −1 0 −1 0 −1 0 −1 0 1 0 1 0 −1 0
1 0 1 0 −1 0 −1 0 1 0 −1 0 1 0 −1 0 −1 0 −1 0 −1 0 1 0 1 0 −1 0 −1 0 −1 0 1 0 1 0 −1 0 1 0 −1 0 1 0
−1 0 1 0 1 0 1 0 1 0 1 0 1 0 −1 0 −1 0 −1 0 −1 0 −1 0 1 0 1 0 −1 0 1 0 −1 0 −1 0 −1 0 −1 0 −1 0 1 0
1 0 −1 0 −1 0 −1 0 1 0 1 0 −1 0 1 0 −1 0 1 0 −1 0 −1 0 −1 0 −1 0 −1 0 −1 0 −1 0 1 0 1 0 −1 0 1 0 1
0 −1 0 −1 0 1 0 −1 0 1 0 1 0 1 0 1 0 1 0 −1 0 −1 0 1 0 1 0 1 0 −1 0 −1 0 1 0 −1 0 1 0 −1 0 1 0 −1 0
−1 0 −1 0 −1 0 −1 0 −1 0 1 0 1 0 −1 0 1 0 1 0 −1 0 −1 0 1 0 −1 0 1 0 0 0 0 0 0 0 −1 0 −1 0 −1 0 −1
0 1 0 1 0 −1 0 −1 0 −1 0 1 0 1 0 −1 0 1 0 −1 0 1 0 −1 0 −1 0 −1 0 −1 0 −1 0 −1 0 −1 0 1 0 1 0 −1 0
1 0 1 0 −1 0 −1 0 1 0 −1 0 1 0 −1 0 −1 0 −1 0 −1 0 1 0 1 0 −1 0 −1 0 −1 0 1 0 1 0 −1 0 1 0 −1 0 1 0

-continued

−1 0 1 0 1 0 1 0 1 0 1 0 1 0 −1 0 −1 0 1 0 −1 0 −1 0 1 0 1 0 −1 0 1 0 −1 0 1 0 1 0 1 0 1 0 −1 0 −1 0
1 0 −1 0 1 0 −1 0 −1 0 1 0 −1 0 1 0 −1 0 1 0 1 0 1 0 1 0 1 0 1 0 −1 0 −1 0 1 0 −1 0 −1 0 1 0 1 0
−1 0 1 0 −1 0 −1 0 −1 0 −1 0 −1 0 1 0 1 0 −1 0 −1 0 −1 0 1 0 1 0 −1 0 1 0 −1 0 1 0 −1 0 1 0 1 0 1 0
1 0 1 0 1 0 −1 0 −1 0 1 0 −1 0 −1 0 1 0 1 0 −1 0 1 0 −1 0 1 0 −1 0 −1 0 1 0 1 0 1 0 −1 0 −1 0 1 0 −1
0 1 0 −1 0 1 0 1 0 1 0 1 0 1 0 1 0 1 0 −1 0 −1 0 1 0 −1 0 −1 0 1 0 1 0 −1 0 1 0 −1 0 1 0 1 0 1 0 1 0
−1 0 −1 0 1 0 1 0 1 0 −1 0 −1 0 1 0 −1 0 1 0 −1 0 1 0 −1 0 −1 0 −1 0 −1 0 −1 0 −1 0 1 0 1 0 −1 0 1
0 1 0 −1 0 −1 0 1 0 −1 0 1 0 1 0 1 0 1 0 −1 0 −1 0 1 0 1 0 1 0 −1 0 −1 0 1 0 −1 0 1 0 −1 0 1 0 1
0 1 0 1 0 1 0 1 0 1 0 −1 0 −1 0 1 0 −1 0 −1 0 1 0 1 0 −1 0 1 0 −1 0 −1 0 −1 0 −1 0 −1 0 1 0 1 0 −1 0
−1 0 −1 0 1 0 1 0 −1 0 1 0 −1 0 1 0 −1 0 1 0 1 0 1 0 1 0 1 0 1 0 −1 0 −1 0 1 0 −1 0 −1 0 1 0 0 0 0 0
0 0 0 0 0 0 }; or

{ 0 0 0 0 0 0 0 0 0 0 0 0 −1 0 −1 0 1 0 1 0 1 0 −1 0 −1 0 1 0 −1 0 1 0 −1 0 1 0 1 0 1 0 1 0 1 0 1
0 1 0 −1 0 −1 0 1 0 −1 0 −1 0 1 0 1 0 −1 0 1 0 −1 0 1 0 1 0 1 0 1 0 −1 0 −1 0 1 0 1 0 1 0 −1 0 −1 0
1 0 −1 0 1 0 −1 0 1 0 −1 0 −1 0 −1 0 −1 0 −1 0 −1 0 1 0 1 0 −1 0 1 0 1 0 −1 0 −1 0 1 0 −1 0 1 0 −1
0 −1 0 −1 0 −1 0 1 0 1 0 −1 0 −1 0 −1 0 1 0 1 0 −1 0 1 0 −1 0 1 0 −1 0 −1 0 −1 0 −1 0 −1 0 −1 0 −1
0 1 0 1 0 −1 0 1 0 1 0 −1 0 −1 0 1 0 −1 0 1 0 1 0 1 0 1 0 1 0 −1 0 −1 0 1 0 1 0 1 0 −1 0 −1 0 1 0 −1
0 1 0 −1 0 1 0 −1 0 −1 0 −1 0 −1 0 −1 0 −1 0 1 0 1 0 −1 0 1 0 1 0 −1 0 −1 0 −1 0 −1 0 −1 0 −1 0 1 0
1 0 −1 0 −1 0 −1 0 1 0 1 0 −1 0 1 0 −1 0 1 0 −1 0 −1 0 −1 0 −1 0 −1 0 −1 0 −1 0 1 0 1 0 −1 0 1 0 1
0 −1 0 −1 0 1 0 −1 0 1 0 −1 0 −1 0 −1 0 −1 0 1 0 1 0 −1 0 −1 0 −1 0 1 0 1 0 −1 0 1 0 −1 0 1 0 −1 0
1 0 1 0 1 0 1 0 1 0 1 0 −1 0 −1 0 1 0 −1 0 −1 0 1 0 1 0 −1 0 1 0 −1 0 −1 0 −1 0 −1 0 −1 0 −1 0 1 0
−1 0 −1 0 −1 0 1 0 1 0 −1 0 1 0 −1 0 1 0 −1 0 −1 0 −1 0 −1 0 −1 0 −1 0 −1 0 1 0 1 0 −1 0 1 0 1 0 −1
0 −1 0 1 0 −1 0 1 0 1 0 1 0 1 0 1 0 −1 0 −1 0 1 0 1 0 1 0 −1 0 −1 0 1 0 −1 0 1 0 −1 0 1 0 −1 0 −1 0
−1 0 −1 0 −1 0 −1 0 1 0 1 0 −1 0 1 0 1 0 −1 0 −1 0 1 0 1 0 1 0 0 0 0 0 0 0 −1 0 −1 0 −1 0 −1 0 1 0 1
0 −1 0 −1 0 −1 0 1 0 1 0 −1 0 1 0 −1 0 1 0 −1 0 −1 0 −1 0 −1 0 −1 0 −1 0 1 0 1 0 1 0 −1 0 1 0 1 0
−1 0 −1 0 1 0 −1 0 1 0 −1 0 −1 0 −1 0 −1 0 1 0 1 0 −1 0 −1 0 −1 0 1 0 1 0 −1 0 1 0 −1 0 1 0 −1 0 1 0
1 0 1 0 1 0 1 0 1 0 −1 0 −1 0 1 0 −1 0 −1 0 1 0 1 0 −1 0 1 0 −1 0 1 0 1 0 1 0 1 0 −1 0 −1 0 1 0 1 0 1
0 −1 0 −1 0 1 0 −1 0 1 0 −1 0 1 0 1 0 1 0 1 0 1 0 1 0 1 0 −1 0 −1 0 1 0 −1 0 −1 0 1 0 1 0 −1 0 1 0
−1 0 −1 0 −1 0 −1 0 −1 0 1 0 1 0 −1 0 −1 0 −1 0 1 0 1 0 −1 0 1 0 −1 0 1 0 −1 0 1 0 1 0 1 0 1 0 1 0 1
0 −1 0 −1 0 1 0 −1 0 −1 0 1 0 1 0 −1 0 1 0 −1 0 1 0 −1 0 −1 0 1 0 1 0 1 0 −1 0 −1 0 1 0 −1 0 1 0 −1
0 1 0 1 0 1 0 1 0 1 0 1 0 1 0 −1 0 −1 0 1 0 −1 0 −1 0 1 0 1 0 −1 0 1 0 −1 0 1 0 1 0 1 0 1 0 − 1 0 −1 0
1 0 1 0 1 0 −1 0 −1 0 1 0 −1 0 1 0 −1 0 1 0 −1 0 −1 0 −1 0 −1 0 −1 0 −1 0 1 0 1 0 −1 0 1 0 1 0 −1 0
−1 0 1 0 −1 0 1 0 1 0 1 0 1 0 1 0 −1 0 −1 0 1 0 1 0 1 0 −1 0 −1 0 1 0 −1 0 1 0 −1 0 1 0 1 0 1 0 1 0 1
0 1 0 1 0 −1 0 −1 0 1 0 −1 0 −1 0 1 0 1 0 −1 0 1 0 −1 0 −1 0 −1 0 −1 0 −1 0 1 0 1 0 −1 0 −1 0 −1 0
1 0 1 0 −1 0 1 0 −1 0 1 0 −1 0 1 0 1 0 1 0 1 0 1 0 1 0 −1 0 −1 0 1 0 −1 0 −1 0 1 0 0 0 0 0 0 0 0 0 0
0}.

7. The communication apparatus according to claim 6, wherein in response to the LTF being a 2×LTF sequence in a 160 MHZ, the 2×LTF sequence in the 160 MHz is:

| | | | | | | | | | | | |
|---|---|---|---|---|---|---|---|---|---|---|---|
| | {0 0 | 0 | 0 | 0 | 0 | 0 | 0 | 0 | 0 | 0 | 0 |
| 1 | 0 | 1 | 0 | −1 | 0 | 1 | 0 | 1 | 0 | 1 | 0 |
| −1 | 0 | 1 | 0 | 1 | 0 | 1 | 0 | 1 | 0 | −1 | 0 |
| −1 | 0 | −1 | 0 | 1 | 0 | −1 | 0 | −1 | 0 | 1 | 0 |
| 1 | 0 | −1 | 0 | 1 | 0 | 1 | 0 | 1 | 0 | −1 | 0 |
| −1 | 0 | −1 | 0 | −1 | 0 | 1 | 0 | 1 | 0 | 1 | 0 |
| 1 | 0 | −1 | 0 | 1 | 0 | 1 | 0 | 1 | 0 | −1 | 0 |
| 1 | 0 | −1 | 0 | −1 | 0 | 1 | 0 | −1 | 0 | −1 | 0 |
| −1 | 0 | 1 | 0 | 1 | 0 | −1 | 0 | −1 | 0 | −1 | 0 |
| 1 | 0 | −1 | 0 | −1 | 0 | 1 | 0 | −1 | 0 | 1 | 0 |
| 1 | 0 | −1 | 0 | 1 | 0 | 1 | 0 | −1 | 0 | 1 | 0 |
| −1 | 0 | −1 | 0 | −1 | 0 | 1 | 0 | −1 | 0 | −1 | 0 |
| −1 | 0 | −1 | 0 | 1 | 0 | −1 | 0 | −1 | 0 | 1 | 0 |
| 1 | 0 | −1 | 0 | 1 | 0 | 1 | 0 | 1 | 0 | −1 | 0 |
| −1 | 0 | −1 | 0 | −1 | 0 | 1 | 0 | −1 | 0 | 1 | 0 |
| 1 | 0 | 1 | 0 | −1 | 0 | 1 | 0 | 1 | 0 | 1 | 0 |
| 1 | 0 | −1 | 0 | −1 | 0 | −1 | 0 | 1 | 0 | 1 | 0 |
| 1 | 0 | −1 | 0 | −1 | 0 | 1 | 0 | 1 | 0 | 1 | 0 |
| −1 | 0 | 1 | 0 | 1 | 0 | −1 | 0 | 1 | 0 | −1 | 0 |
| −1 | 0 | −1 | 0 | −1 | 0 | 1 | 0 | −1 | 0 | −1 | 0 |
| −1 | 0 | 1 | 0 | −1 | 0 | 1 | 0 | 1 | 0 | −1 | 0 |
| 1 | 0 | 1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| 1 | 0 | −1 | 0 | 1 | 0 | 1 | 0 | 1 | 0 | −1 | 0 |
| −1 | 0 | 1 | 0 | 1 | 0 | 1 | 0 | −1 | 0 | 1 | 0 |
| 1 | 0 | −1 | 0 | 1 | 0 | −1 | 0 | −1 | 0 | 1 | 0 |
| −1 | 0 | 1 | 0 | 1 | 0 | 1 | 0 | −1 | 0 | 1 | 0 |
| 1 | 0 | 1 | 0 | 1 | 0 | −1 | 0 | −1 | 0 | −1 | 0 |
| 1 | 0 | −1 | 0 | −1 | 0 | 1 | 0 | 1 | 0 | −1 | 0 |
| 1 | 0 | 1 | 0 | 1 | 0 | −1 | 0 | −1 | 0 | −1 | 0 |

-continued

| | | | | | | | | | | | |
|---|---|---|---|---|---|---|---|---|---|---|---|
| −1 | 0 | 1 | 0 | 1 | 0 | 1 | 0 | −1 | 0 | −1 | 0 |
| −1 | 0 | −1 | 0 | 1 | 0 | −1 | 0 | −1 | 0 | −1 | 0 |
| 1 | 0 | −1 | 0 | 1 | 0 | 1 | 0 | 1 | 0 | −1 | 0 |
| −1 | 0 | 1 | 0 | 1 | 0 | 1 | 0 | −1 | 0 | 1 | 0 |
| 1 | 0 | −1 | 0 | 1 | 0 | −1 | 0 | −1 | 0 | −1 | 0 |
| −1 | 0 | 1 | 0 | −1 | 0 | −1 | 0 | −1 | 0 | 1 | 0 |
| −1 | 0 | 1 | 0 | 1 | 0 | −1 | 0 | 1 | 0 | 1 | 0 |
| −1 | 0 | 1 | 0 | 1 | 0 | −1 | 0 | −1 | 0 | 1 | 0 |
| −1 | 0 | −1 | 0 | −1 | 0 | 1 | 0 | 1 | 0 | 1 | 0 |
| 1 | 0 | −1 | 0 | 1 | 0 | −1 | 0 | −1 | 0 | −1 | 0 |
| 1 | 0 | −1 | 0 | −1 | 0 | −1 | 0 | −1 | 0 | 1 | 0 |
| 1 | 0 | 1 | 0 | 1 | 0 | −1 | 0 | −1 | 0 | −1 | 0 |
| 1 | 0 | 1 | 0 | 1 | 0 | 0 | 0 | 0 | 0 | 0 | 0 |
| 1 | 0 | −1 | 0 | −1 | 0 | 1 | 0 | 1 | 0 | −1 | 0 |
| 1 | 0 | 1 | 0 | 1 | 0 | 1 | 0 | −1 | 0 | −1 | 0 |
| −1 | 0 | −1 | 0 | 1 | 0 | −1 | 0 | −1 | 0 | −1 | 0 |
| 1 | 0 | −1 | 0 | 1 | 0 | 1 | 0 | 1 | 0 | 1 | 0 |
| −1 | 0 | −1 | 0 | −1 | 0 | 1 | 0 | −1 | 0 | −1 | 0 |
| 1 | 0 | 1 | 0 | −1 | 0 | 1 | 0 | 1 | 0 | −1 | 0 |
| 1 | 0 | 1 | 0 | −1 | 0 | 1 | 0 | −1 | 0 | −1 | 0 |
| −1 | 0 | 1 | 0 | −1 | 0 | −1 | 0 | −1 | 0 | −1 | 0 |
| 1 | 0 | −1 | 0 | 1 | 0 | 1 | 0 | −1 | 0 | 1 | 0 |
| 1 | 0 | 1 | 0 | −1 | 0 | −1 | 0 | 1 | 0 | 1 | 0 |
| 1 | 0 | −1 | 0 | 1 | 0 | −1 | 0 | −1 | 0 | −1 | 0 |
| 1 | 0 | −1 | 0 | −1 | 0 | −1 | 0 | −1 | 0 | 1 | 0 |
| 1 | 0 | 1 | 0 | −1 | 0 | −1 | 0 | −1 | 0 | −1 | 0 |
| 1 | 0 | 1 | 0 | 1 | 0 | −1 | 0 | 1 | 0 | 1 | 0 |
| −1 | 0 | −1 | 0 | 1 | 0 | −1 | 0 | −1 | 0 | −1 | 0 |
| 1 | 0 | 1 | 0 | 1 | 0 | 1 | 0 | −1 | 0 | 1 | 0 |
| 1 | 0 | 1 | 0 | −1 | 0 | 1 | 0 | −1 | 0 | −1 | 0 |
| 1 | 0 | −1 | 0 | 1 | 0 | 1 | 0 | −1 | 0 | 1 | 0 |
| 1 | 0 | 1 | 0 | −1 | 0 | −1 | 0 | 1 | 0 | 1 | 0 |
| 1 | 0 | −1 | 0 | 1 | 0 | 1 | 0 | −1 | 0 | 1 | 0 |
| −1 | 0 | −1 | 0 | −1 | 0 | 1 | 0 | −1 | 0 | −1 | 0 |

-continued

| | | | | | | | | | | | |
|---|---|---|---|---|---|---|---|---|---|---|---|
| −1 | 0 | 1 | 0 | −1 | 0 | 1 | 0 | −1 | 0 | −1 | 0 |
| 1 | 0 | −1 | 0 | 1 | 0 | 1 | 0 | 1 | 0 | −1 | 0 |
| 1 | 0 | 1 | 0 | 1 | 0 | 1 | 0 | 1 | 0 | 1 | 0 |
| −1 | 0 | −1 | 0 | 1 | 0 | −1 | 0 | −1 | 0 | −1 | 0 |
| 1 | 0 | 1 | 0 | −1 | 0 | −1 | 0 | −1 | 0 | 1 | 0 |
| 1 | 0 | 1 | 0 | −1 | 0 | −1 | 0 | −1 | 0 | −1 | 0 |
| 1 | 0 | −1 | 0 | −1 | 0 | −1 | 0 | 1 | 0 | −1 | 0 |
| 1 | 0 | 1 | 0 | 1 | 0 | 1 | 0 | −1 | 0 | −1 | 0 |
| −1 | 0 | 1 | 0 | −1 | 0 | −1 | 0 | 1 | 0 | 1 | 0 |
| −1 | 0 | 1 | 0 | 1 | 0 | 1 | 0 | 1 | 0 | −1 | 0 |
| 1 | 0 | 1 | 0 | 1 | 0 | −1 | 0 | 1 | 0 | −1 | 0 |
| −1 | 0 | −1 | 0 | −1 | 0 | −1 | 0 | 1 | 0 | −1 | 0 |
| 1 | 0 | 1 | 0 | −1 | 0 | 1 | 0 | 1 | 0 | 1 | 0 |
| −1 | 0 | −1 | 0 | 1 | 0 | 1 | 0 | 1 | 0 | −1 | 0 |
| 1 | 0 | 1 | 0 | −1 | 0 | 1 | 0 | −1 | 0 | −1 | 0 |
| −1 | 0 | 1 | 0 | −1 | 0 | −1 | 0 | −1 | 0 | −1 | 0 |
| 1 | 0 | 1 | 0 | 1 | 0 | 1 | 0 | −1 | 0 | −1 | 0 |
| −1 | 0 | 1 | 0 | −1 | 0 | −1 | 0 | 1 | 0 | 1 | 0 |
| −1 | 0 | 1 | 0 | 1 | 0 | 1 | 0 | −1 | 0 | −1 | 0 |
| −1 | 0 | −1 | 0 | 1 | 0 | −1 | 0 | −1 | 0 | −1 | 0 |
| 1 | 0 | −1 | 0 | −1 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 1 | 0 | 1 | 0 | −1 | 0 | 1 | 0 |
| 1 | 0 | 1 | 0 | −1 | 0 | 1 | 0 | 1 | 0 | 1 | 0 |
| 1 | 0 | −1 | 0 | −1 | 0 | −1 | 0 | 1 | 0 | −1 | 0 |
| −1 | 0 | 1 | 0 | 1 | 0 | −1 | 0 | 1 | 0 | 1 | 0 |
| 1 | 0 | −1 | 0 | −1 | 0 | −1 | 0 | −1 | 0 | 1 | 0 |
| 1 | 0 | 1 | 0 | 1 | 0 | −1 | 0 | 1 | 0 | 1 | 0 |
| 1 | 0 | −1 | 0 | 1 | 0 | −1 | 0 | −1 | 0 | 1 | 0 |
| −1 | 0 | −1 | 0 | −1 | 0 | 1 | 0 | 1 | 0 | −1 | 0 |
| −1 | 0 | −1 | 0 | 1 | 0 | −1 | 0 | −1 | 0 | 1 | 0 |
| −1 | 0 | 1 | 0 | 1 | 0 | −1 | 0 | 1 | 0 | 1 | 0 |
| −1 | 0 | 1 | 0 | −1 | 0 | −1 | 0 | −1 | 0 | 1 | 0 |
| −1 | 0 | −1 | 0 | −1 | 0 | −1 | 0 | 1 | 0 | −1 | 0 |
| −1 | 0 | 1 | 0 | 1 | 0 | −1 | 0 | 1 | 0 | 1 | 0 |
| 1 | 0 | −1 | 0 | −1 | 0 | −1 | 0 | −1 | 0 | 1 | 0 |
| −1 | 0 | 1 | 0 | 1 | 0 | 1 | 0 | −1 | 0 | 1 | 0 |
| 1 | 0 | 1 | 0 | 1 | 0 | −1 | 0 | −1 | 0 | −1 | 0 |
| 1 | 0 | 1 | 0 | 1 | 0 | −1 | 0 | −1 | 0 | 1 | 0 |
| 1 | 0 | 1 | 0 | −1 | 0 | 1 | 0 | 1 | 0 | −1 | 0 |
| 1 | 0 | −1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| 1 | 0 | −1 | 0 | 1 | 0 | −1 | 0 | 1 | 0 | 1 | 0 |
| 1 | 0 | −1 | 0 | 1 | 0 | 1 | 0 | 1 | 0 | −1 | 0 |
| 1 | 0 | −1 | 0 | −1 | 0 | 1 | 0 | −1 | 0 | −1 | 0 |
| −1 | 0 | 1 | 0 | 1 | 0 | −1 | 0 | −1 | 0 | −1 | 0 |
| 1 | 0 | −1 | 0 | −1 | 0 | 1 | 0 | −1 | 0 | 1 | 0 |
| 1 | 0 | −1 | 0 | 1 | 0 | −1 | 0 | −1 | 0 | −1 | 0 |
| 1 | 0 | −1 | 0 | −1 | 0 | −1 | 0 | −1 | 0 | 1 | 0 |
| 1 | 0 | 1 | 0 | −1 | 0 | 1 | 0 | 1 | 0 | −1 | 0 |
| −1 | 0 | 1 | 0 | −1 | 0 | −1 | 0 | −1 | 0 | 1 | 0 |
| 1 | 0 | 1 | 0 | 1 | 0 | −1 | 0 | −1 | 0 | −1 | 0 |
| 1 | 0 | 1 | 0 | 1 | 0 | 1 | 0 | −1 | 0 | 1 | 0 |
| 1 | 0 | 1 | 0 | −1 | 0 | 1 | 0 | −1 | 0 | −1 | 0 |
| −1 | 0 | 1 | 0 | 1 | 0 | −1 | 0 | −1 | 0 | −1 | 0 |
| 1 | 0 | −1 | 0 | −1 | 0 | 1 | 0 | −1 | 0 | 1 | 0 |
| 1 | 0 | 1 | 0 | 1 | 0 | −1 | 0 | 1 | 0 | 1 | 0 |
| 1 | 0 | −1 | 0 | 1 | 0 | −1 | 0 | −1 | 0 | 1 | 0 |
| −1 | 0 | −1 | 0 | 1 | 0 | −1 | 0 | −1 | 0 | 1 | 0 |
| 1 | 0 | −1 | 0 | 1 | 0 | 1 | 0 | 1 | 0 | −1 | 0 |
| −1 | 0 | −1 | 0 | −1 | 0 | 1 | 0 | −1 | 0 | 1 | 0 |
| 1 | 0 | 1 | 0 | −1 | 0 | 1 | 0 | 1 | 0 | 1 | 0 |
| 1 | 0 | −1 | 0 | −1 | 0 | −1 | 0 | −1 | 0 | 1 | 0 |
| 1 | 0 | 1 | 0 | −1 | 0 | −1 | 0 | −1 | 0 | 0 | 0 |
| 0 | 0 | 0 | 0 | −1 | 0 | 1 | 0 | 1 | 0 | −1 | 0 |
| −1 | 0 | 1 | 0 | −1 | 0 | 1 | 0 | 1 | 0 | 1 | 0 |
| −1 | 0 | −1 | 0 | −1 | 0 | −1 | 0 | 1 | 0 | −1 | 0 |
| −1 | 0 | −1 | 0 | 1 | 0 | −1 | 0 | 1 | 0 | 1 | 0 |
| 1 | 0 | 1 | 0 | −1 | 0 | −1 | 0 | −1 | 0 | 1 | 0 |
| −1 | 0 | −1 | 0 | 1 | 0 | 1 | 0 | −1 | 0 | 1 | 0 |
| 1 | 0 | −1 | 0 | 1 | 0 | 1 | 0 | −1 | 0 | 1 | 0 |
| −1 | 0 | −1 | 0 | −1 | 0 | 1 | 0 | −1 | 0 | −1 | 0 |
| −1 | 0 | −1 | 0 | 1 | 0 | −1 | 0 | 1 | 0 | 1 | 0 |
| −1 | 0 | 1 | 0 | 1 | 0 | 1 | 0 | −1 | 0 | −1 | 0 |
| 1 | 0 | 1 | 0 | 1 | 0 | −1 | 0 | 1 | 0 | −1 | 0 |
| −1 | 0 | −1 | 0 | 1 | 0 | −1 | 0 | −1 | 0 | −1 | 0 |
| −1 | 0 | 1 | 0 | 1 | 0 | 1 | 0 | −1 | 0 | −1 | 0 |
| −1 | 0 | −1 | 0 | 1 | 0 | 1 | 0 | 1 | 0 | −1 | 0 |
| 1 | 0 | 1 | 0 | −1 | 0 | −1 | 0 | 1 | 0 | −1 | 0 |

-continued

| | | | | | | | | | | | |
|---|---|---|---|---|---|---|---|---|---|---|---|
| −1 | 0 | −1 | 0 | 1 | 0 | 1 | 0 | 1 | 0 | 1 | 0 |
| −1 | 0 | 1 | 0 | 1 | 0 | 1 | 0 | −1 | 0 | 1 | 0 |
| −1 | 0 | −1 | 0 | 1 | 0 | −1 | 0 | 1 | 0 | 1 | 0 |
| −1 | 0 | 1 | 0 | 1 | 0 | 1 | 0 | −1 | 0 | −1 | 0 |
| 1 | 0 | 1 | 0 | 1 | 0 | −1 | 0 | 1 | 0 | 1 | 0 |
| −1 | 0 | 1 | 0 | −1 | 0 | −1 | 0 | −1 | 0 | 1 | 0 |
| −1 | 0 | −1 | 0 | −1 | 0 | 1 | 0 | 1 | 0 | −1 | 0 |
| 1 | 0 | 1 | 0 | −1 | 0 | 1 | 0 | −1 | 0 | −1 | 0 |
| −1 | 0 | 1 | 0 | −1 | 0 | −1 | 0 | −1 | 0 | −1 | 0 |
| 1 | 0 | −1 | 0 | 1 | 0 | 1 | 0 | −1 | 0 | 1 | 0 |
| 1 | 0 | 1 | 0 | −1 | 0 | −1 | 0 | 1 | 0 | 1 | 0 |
| 1 | 0 | −1 | 0 | −1 | 0 | −1 | 0 | 1 | 0 | | 0 |
| 1 | 0 | 1 | 0 | −1 | 0 | 1 | 0 | 1 | 0 | 1 | 0 |
| −1 | 0 | 1 | 0 | −1 | 0 | −1 | 0 | −1 | 0 | −1 | 0 |
| 1 | 0 | 1 | 0 | 1 | 0 | −1 | 0 | 1 | 0 | 1 | 0 |
| −1 | 0 | −1 | 0 | 1 | 0 | −1 | 0 | −1 | 0 | −1 | 0 |
| −1 | 0 | 1 | 0 | −1 | 0 | −1 | 0 | −1 | 0 | 1 | 0 |
| −1 | 0 | 1 | 0 | 1 | 0 | −1 | 0 | 1 | 0 | 1 | 0 |
| −1 | 0 | 1 | 0 | −1 | 0 | −1 | 0 | 1 | 0 | −1 | 0 |
| −1 | 0 | −1 | 0 | 1 | 0 | 1 | 0 | −1 | 0 | −1 | 0 |
| −1 | 0 | 1 | 0 | −1 | 0 | −1 | 0 | 1 | 0 | −1 | 0 |
| 1 | 0 | 1 | 0 | 1 | 0 | −1 | 0 | 1 | 0 | 1 | 0 |
| 1 | 0 | 1 | 0 | −1 | 0 | −1 | 0 | −1 | 0 | −1 | 0 |
| 1 | 0 | 1 | 0 | 1 | 0 | −1 | 0 | 1 | 0 | 1 | 0 |
| −1 | 0 | −1 | 0 | 1 | 0 | −1 | 0 | −1 | 0 | −1 | 0 |
| 1 | 0 | 1 | 0 | 1 | 0 | 1 | 0 | −1 | 0 | 1 | 0 |
| 1 | 0 | 1 | 0 | −1 | 0 | 1 | 0 | 10 | | 0 | 0 |
| 0 | 0 | 0 | 0 | 0 | 0 | 0 | 0}; | | | | |

or

2×EHT_LTF_160 M=

{$0_{12}$, LTF2×80 M_part1, LTF2×80 M_part2, LTF2×80 M_part3, LTF2×80 M_part4, LTF2×80 M_part5, $0_{23}$, LTF2×80 M_part1, (−1)*LTF2×80 M_part2, (−1)*LTF2×80 M_part3, (−1)*LTF2×80 M_part4, LTF2×80 M_part5, $0_{11}$}, wherein:

LTF2×80 M_part1=LTF2×80 M_1(1:242);

LTF2×80 M_part2=LTF2×80 M_1(243:484);

LTF2×80 M_part3=LTF2×80 M_1(485:517);

LTF2×80 M_part4=LTF2×80 M_1(518:759);

LTF2×80 M_part5=LTF2×80 M_1(760:1001); and

LTF2×80 M_1 is a sequence obtained after the 12 leftmost 0s and the 11 rightmost 0s are removed from a sequence 6 in a specific implementation of the specification.

8. The communication apparatus according to claim 6, wherein in response to the LTF being a 2×LTF sequence in a 240 MHZ, the 2×LTF sequence in the 240 MHz is:

| | | | | | | | | | | | |
|---|---|---|---|---|---|---|---|---|---|---|---|
| {00 | 0 | 0 | 0 | 0 | 0 | 0 | 0 | 0 | 0 | 0 | 1 |
| 0 | −1 | 0 | 1 | 0 | 1 | 0 | −1 | 0 | −1 | 0 | −1 |
| 0 | −1 | 0 | 1 | 0 | −1 | 0 | 1 | 0 | 1 | 0 | 1 |
| 0 | −1 | 0 | −1 | 0 | −1 | 0 | 1 | 0 | 1 | 0 | 1 |
| 0 | −1 | 0 | 1 | 0 | 1 | 0 | −1 | 0 | 1 | 0 | −1 |
| 0 | −1 | 0 | −1 | 0 | 1 | 0 | −1 | 0 | −1 | 0 | 1 |
| 0 | −1 | 0 | −1 | 0 | 1 | 0 | −1 | 0 | −1 | 0 | 1 |
| 0 | −1 | 0 | −1 | 0 | −1 | 0 | −1 | 0 | 1 | 0 | −1 |
| 0 | −1 | 0 | 1 | 0 | −1 | 0 | −1 | 0 | −1 | 0 | −1 |
| 0 | −1 | 0 | −1 | 0 | 1 | 0 | 1 | 0 | 1 | 0 | −1 |
| 0 | 1 | 0 | 1 | 0 | 1 | 0 | 1 | 0 | − 1 | 0 | −1 |
| 0 | −1 | 0 | 1 | 0 | −1 | 0 | −1 | 0 | 1 | 0 | −1 |
| 0 | −1 | 0 | −1 | 0 | 1 | 0 | 1 | 0 | 1 | 0 | 1 |
| 0 | −1 | 0 | 1 | 0 | 1 | 0 | 1 | 0 | −1 | 0 | −1 |
| 0 | −1 | 0 | −1 | 0 | −1 | 0 | −1 | 0 | 1 | 0 | −1 |
| 0 | −1 | 0 | 1 | 0 | −1 | 0 | −1 | 0 | −1 | 0 | −1 |
| 0 | 1 | 0 | −1 | 0 | −1 | 0 | 1 | 0 | −1 | 0 | 1 |
| 0 | −1 | 0 | 1 | 0 | 1 | 0 | −1 | 0 | 1 | 0 | 1 |
| 0 | 1 | 0 | −1 | 0 | 1 | 0 | −1 | 0 | −1 | 0 | 1 |
| 0 | −1 | 0 | −1 | 0 | −1 | 0 | 1 | 0 | 1 | 0 | 1 |
| 0 | −1 | 0 | −1 | 0 | −1 | 0 | 1 | 0 | −1 | 0 | 1 |
| 0 | −1 | 0 | 1 | 0 | −1 | 0 | −1 | 0 | −1 | 0 | 1 |
| 0 | 1 | 0 | 1 | 0 | −1 | 0 | 1 | 0 | −1 | 0 | −1 |

-continued

| | | | | | | | | | | | |
|---|---|---|---|---|---|---|---|---|---|---|---|
| 0 | −1 | 0 | 1 | 0 | 1 | 0 | 1 | 0 | −1 | 0 | −1 |
| 0 | −1 | 0 | 1 | 0 | −1 | 0 | −1 | 0 | 1 | 0 | −1 |
| 0 | 1 | 0 | 1 | 0 | 1 | 0 | −1 | 0 | 1 | 0 | 1 |
| 0 | −1 | 0 | 1 | 0 | 1 | 0 | −1 | 0 | 1 | 0 | 1 |
| 0 | −1 | 0 | 1 | 0 | 1 | 0 | 1 | 0 | 1 | 0 | −1 |
| 0 | 1 | 0 | 1 | 0 | −1 | 0 | 1 | 0 | 1 | 0 | 1 |
| 0 | 1 | 0 | 1 | 0 | 1 | 0 | −1 | 0 | −1 | 0 | −1 |
| 0 | 1 | 0 | −1 | 0 | −1 | 0 | −1 | 0 | −1 | 0 | 1 |
| 0 | 1 | 0 | 1 | 0 | −1 | 0 | 1 | 0 | −1 | 0 | 1 |
| 0 | −1 | 0 | −1 | 0 | −1 | 0 | 1 | 0 | 1 | 0 | 1 |
| 0 | 1 | 0 | −1 | 0 | 1 | 0 | 1 | 0 | 1 | 0 | −1 |
| 0 | −1 | 0 | −1 | 0 | −1 | 0 | −1 | 0 | −1 | 0 | 1 |
| 0 | −1 | 0 | −1 | 0 | 1 | 0 | −1 | 0 | −1 | 0 | −1 |
| 0 | −1 | 0 | 1 | 0 | −1 | 0 | −1 | 0 | 1 | 0 | −1 |
| 0 | 1 | 0 | −1 | 0 | 1 | 0 | 1 | 0 | −1 | 0 | 1 |
| 0 | 1 | 0 | 1 | 0 | −1 | 0 | 1 | 0 | −1 | 0 | −1 |
| 0 | 1 | 0 | −1 | 0 | −1 | 0 | −1 | 0 | 1 | 0 | 1 |
| 0 | 1 | 0 | −1 | 0 | −1 | 0 | −1 | 0 | 1 | 0 | −1 |
| 0 | 1 | 0 | 1 | 0 | −1 | 0 | −1 | 0 | −1 | 0 | 1 |
| 0 | 1 | 0 | 1 | 0 | 0 | 0 | 0 | 0 | 0 | 0 | −1 |
| 0 | 1 | 0 | 1 | 0 | −1 | 0 | −1 | 0 | 1 | 0 | −1 |
| 0 | −1 | 0 | 1 | 0 | −1 | 0 | −1 | 0 | −1 | 0 | 1 |
| 0 | 1 | 0 | 1 | 0 | −1 | 0 | 1 | 0 | −1 | 0 | −1 |
| 0 | −1 | 0 | 1 | 0 | 1 | 0 | 1 | 0 | −1 | 0 | −1 |
| 0 | −1 | 0 | 1 | 0 | −1 | 0 | −1 | 0 | 1 | 0 | −1 |
| 0 | 1 | 0 | 1 | 0 | 1 | 0 | −1 | 0 | 1 | 0 | 1 |
| 0 | −1 | 0 | 1 | 0 | 1 | 0 | −1 | 0 | 1 | 0 | 1 |
| 0 | −1 | 0 | 1 | 0 | 1 | 0 | 1 | 0 | 1 | 0 | −1 |
| 0 | 1 | 0 | 1 | 0 | −1 | 0 | 1 | 0 | 1 | 0 | 1 |
| 0 | 1 | 0 | 1 | 0 | 1 | 0 | −1 | 0 | −1 | 0 | −1 |
| 0 | 1 | 0 | −1 | 0 | −1 | 0 | −1 | 0 | −1 | 0 | 1 |
| 0 | 1 | 0 | 1 | 0 | −1 | 0 | 1 | 0 | 1 | 0 | −1 |
| 0 | 1 | 0 | 1 | 0 | 1 | 0 | −1 | 0 | −1 | 0 | −1 |
| 0 | −1 | 0 | 1 | 0 | −1 | 0 | −1 | 0 | −1 | 0 | 1 |
| 0 | 1 | 0 | 1 | 0 | 1 | 0 | 1 | 0 | 1 | 0 | −1 |
| 0 | 1 | 0 | 1 | 0 | −1 | 0 | 1 | 0 | 1 | 0 | 1 |
| 0 | 1 | 0 | −1 | 0 | 1 | 0 | 1 | 0 | −1 | 0 | 1 |
| 0 | −1 | 0 | 1 | 0 | 1 | 0 | −1 | 0 | 1 | 0 | −1 |
| 0 | −1 | 0 | −1 | 0 | 1 | 0 | −1 | 0 | 1 | 0 | 1 |
| 0 | −1 | 0 | 1 | 0 | 1 | 0 | 1 | 0 | −1 | 0 | −1 |
| 0 | −1 | 0 | 1 | 0 | 1 | 0 | 1 | 0 | −1 | 0 | 1 |
| 0 | −1 | 0 | −1 | 0 | 1 | 0 | −1 | 0 | −1 | 0 | −1 |
| 0 | 1 | 0 | 1 | 0 | 1 | 0 | −1 | 0 | 1 | 0 | −1 |
| 0 | −1 | 0 | −1 | 0 | 1 | 0 | 1 | 0 | 1 | 0 | −1 |
| 0 | −1 | 0 | −1 | 0 | 1 | 0 | −1 | 0 | −1 | 0 | 1 |
| 0 | −1 | 0 | 1 | 0 | 1 | 0 | 1 | 0 | −1 | 0 | 1 |
| 0 | 1 | 0 | −1 | 0 | 1 | 0 | 1 | 0 | −1 | 0 | 1 |
| 0 | 1 | 0 | −1 | 0 | 1 | 0 | 1 | 0 | 1 | 0 | 1 |
| 0 | −1 | 0 | 1 | 0 | 1 | 0 | −1 | 0 | 1 | 0 | 1 |
| 0 | 1 | 0 | 1 | 0 | 1 | 0 | 1 | 0 | −1 | 0 | −1 |
| 0 | −1 | 0 | 1 | 0 | −1 | 0 | −1 | 0 | −1 | 0 | −1 |
| 0 | 1 | 0 | 1 | 0 | 1 | 0 | −1 | 0 | 1 | 0 | −1 |
| 0 | 1 | 0 | −1 | 0 | −1 | 0 | −1 | 0 | 1 | 0 | 1 |
| 0 | 1 | 0 | 1 | 0 | −1 | 0 | 1 | 0 | 1 | 0 | 1 |
| 0 | −1 | 0 | −1 | 0 | −1 | 0 | −1 | 0 | −1 | 0 | −1 |
| 0 | 1 | 0 | −1 | 0 | −1 | 0 | 1 | 0 | −1 | 0 | −1 |
| 0 | −1 | 0 | −1 | 0 | 1 | 0 | −1 | 0 | −1 | 0 | 1 |
| 0 | −1 | 0 | 1 | 0 | −1 | 0 | 1 | 0 | 1 | 0 | −1 |
| 0 | 1 | 0 | 1 | 0 | 1 | 0 | −1 | 0 | 1 | 0 | −1 |
| 0 | −1 | 0 | 1 | 0 | −1 | 0 | −1 | 0 | −1 | 0 | 1 |
| 0 | 1 | 0 | 1 | 0 | −1 | 0 | −1 | 0 | −1 | 0 | 1 |
| 0 | −1 | 0 | 1 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 1 | 0 | −1 | 0 | 1 | 0 | 1 | 0 | 1 |
| 0 | −1 | 0 | −1 | 0 | −1 | 0 | 1 | 0 | −1 | 0 | 1 |
| 0 | 1 | 0 | 1 | 0 | −1 | 0 | −1 | 0 | −1 | 0 | 1 |
| 0 | 1 | 0 | 1 | 0 | −1 | 0 | 1 | 0 | 1 | 0 | −1 |
| 0 | 1 | 0 | −1 | 0 | −1 | 0 | −1 | 0 | 1 | 0 | −1 |
| 0 | −1 | 0 | 1 | 0 | −1 | 0 | −1 | 0 | 1 | 0 | −1 |
| 0 | −1 | 0 | 1 | 0 | −1 | 0 | −1 | 0 | −1 | 0 | −1 |
| 0 | 1 | 0 | −1 | 0 | −1 | 0 | 1 | 0 | −1 | 0 | −1 |
| 0 | −1 | 0 | −1 | 0 | −1 | 0 | −1 | 0 | 1 | 0 | 1 |
| 0 | 1 | 0 | −1 | 0 | 1 | 0 | 1 | 0 | 1 | 0 | 1 |
| 0 | −1 | 0 | −1 | 0 | −1 | 0 | 1 | 0 | −1 | 0 | −1 |
| 0 | 1 | 0 | −1 | 0 | −1 | 0 | −1 | 0 | 1 | 0 | 1 |
| 0 | 1 | 0 | 1 | 0 | −1 | 0 | 1 | 0 | 1 | 0 | 1 |
| 0 | −1 | 0 | −1 | 0 | −1 | 0 | −1 | 0 | −1 | 0 | −1 |
| 0 | 1 | 0 | −1 | 0 | −1 | 0 | 1 | 0 | −1 | 0 | −1 |
| 0 | −1 | 0 | −1 | 0 | 1 | 0 | −1 | 0 | −1 | 0 | 1 |

-continued

| | | | | | | | | | | | |
|---|---|---|---|---|---|---|---|---|---|---|---|
| 0 | −1 | 0 | 1 | 0 | −1 | 0 | 1 | 0 | 1 | 0 | −1 |
| 0 | 1 | 0 | 1 | 0 | 1 | 0 | −1 | 0 | 1 | 0 | −1 |
| 0 | −1 | 0 | 1 | 0 | −1 | 0 | −1 | 0 | −1 | 0 | 1 |
| 0 | 1 | 0 | 1 | 0 | −1 | 0 | −1 | 0 | −1 | 0 | 1 |
| 0 | −1 | 0 | 1 | 0 | −1 | 0 | 1 | 0 | −1 | 0 | −1 |
| 0 | −1 | 0 | 1 | 0 | 1 | 0 | 1 | 0 | −1 | 0 | 1 |
| 0 | −1 | 0 | −1 | 0 | −1 | 0 | 1 | 0 | 1 | 0 | 1 |
| 0 | −1 | 0 | −1 | 0 | −1 | 0 | 1 | 0 | −1 | 0 | −1 |
| 0 | 1 | 0 | −1 | 0 | 1 | 0 | 1 | 0 | 1 | 0 | −1 |
| 0 | 1 | 0 | 1 | 0 | −1 | 0 | 1 | 0 | 1 | 0 | −1 |
| 0 | 1 | 0 | 1 | 0 | −1 | 0 | 1 | 0 | 1 | 0 | 1 |
| 0 | 1 | 0 | −1 | 0 | 1 | 0 | 1 | 0 | −1 | 0 | 1 |
| 0 | 1 | 0 | 1 | 0 | 1 | 0 | 1 | 0 | 1 | 0 | −1 |
| 0 | −1 | 0 | −1 | 0 | 1 | 0 | −1 | 0 | −1 | 0 | −1 |
| 0 | −1 | 0 | 1 | 0 | 1 | 0 | 1 | 0 | −1 | 0 | 1 |
| 0 | −1 | 0 | 1 | 0 | −1 | 0 | −1 | 0 | −1 | 0 | 1 |
| 0 | 1 | 0 | 1 | 0 | 1 | 0 | −1 | 0 | 1 | 0 | 1 |
| 0 | 1 | 0 | −1 | 0 | −1 | 0 | −1 | 0 | −1 | 0 | −1 |
| 0 | −1 | 0 | 1 | 0 | −1 | 0 | −1 | 0 | 1 | 0 | −1 |
| 0 | −1 | 0 | −1 | 0 | −1 | 0 | 1 | 0 | −1 | 0 | −1 |
| 0 | 1 | 0 | −1 | 0 | 1 | 0 | −1 | 0 | 1 | 0 | 1 |
| 0 | −1 | 0 | 1 | 0 | 1 | 0 | 1 | 0 | −1 | 0 | 1 |
| 0 | −1 | 0 | −1 | 0 | 1 | 0 | −1 | 0 | −1 | 0 | −1 |
| 0 | 1 | 0 | 1 | 0 | 1 | 0 | −1 | 0 | −1 | 0 | −1 |
| 0 | 1 | 0 | −1 | 0 | 1 | 0 | 1 | 0 | −1 | 0 | −1 |
| 0 | −1 | 0 | 1 | 0 | 1 | 0 | 1 | 0 | 0 | 0 | 0 |
| 0 | 0 | 0 | 1 | 0 | −1 | 0 | −1 | 0 | 1 | 0 | 1 |
| 0 | −1 | 0 | 1 | 0 | 1 | 0 | −1 | 0 | 1 | 0 | 1 |
| 0 | 1 | 0 | −1 | 0 | −1 | 0 | −1 | 0 | 1 | 0 | −1 |
| 0 | 1 | 0 | 1 | 0 | 1 | 0 | −1 | 0 | −1 | 0 | −1 |
| 0 | 1 | 0 | 1 | 0 | 1 | 0 | −1 | 0 | 1 | 0 | 1 |
| 0 | −1 | 0 | 1 | 0 | −1 | 0 | −1 | 0 | −1 | 0 | 1 |
| 0 | −1 | 0 | −1 | 0 | 1 | 0 | −1 | 0 | −1 | 0 | 1 |
| 0 | −1 | 0 | −1 | 0 | 1 | 0 | −1 | 0 | −1 | 0 | −1 |
| 0 | −1 | 0 | 1 | 0 | −1 | 0 | −1 | 0 | 1 | 0 | −1 |
| 0 | −1 | 0 | −1 | 0 | −1 | 0 | −1 | 0 | −1 | 0 | 1 |
| 0 | 1 | 0 | 1 | 0 | −1 | 0 | 1 | 0 | 1 | 0 | 1 |
| 0 | 1 | 0 | −1 | 0 | −1 | 0 | −1 | 0 | 1 | 0 | −1 |
| 0 | −1 | 0 | 1 | 0 | −1 | 0 | −1 | 0 | −1 | 0 | 1 |
| 0 | 1 | 0 | 1 | 0 | 1 | 0 | −1 | 0 | 1 | 0 | 1 |
| 0 | 1 | 0 | −1 | 0 | −1 | 0 | −1 | 0 | −1 | 0 | −1 |
| 0 | −1 | 0 | 1 | 0 | −1 | 0 | −1 | 0 | 1 | 0 | −1 |
| 0 | −1 | 0 | −1 | 0 | −1 | 0 | 1 | 0 | −1 | 0 | −1 |
| 0 | 1 | 0 | −1 | 0 | 1 | 0 | −1 | 0 | 1 | 0 | 1 |
| 0 | −1 | 0 | 1 | 0 | 1 | 0 | 1 | 0 | −1 | 0 | 1 |
| 0 | −1 | 0 | −1 | 0 | 1 | 0 | −1 | 0 | −1 | 0 | −1 |
| 0 | 1 | 0 | 1 | 0 | 1 | 0 | −1 | 0 | −1 | 0 | −1 |
| 0 | 1 | 0 | −1 | 0 | 1 | 0 | 1 | 0 | −1 | 0 | 1 |
| 0 | 1 | 0 | 1 | 0 | −1 | 0 | −1 | 0 | −1 | 0 | 1 |
| 0 | −1 | 0 | 1 | 0 | 1 | 0 | 1 | 0 | −1 | 0 | −1 |
| 0 | −1 | 0 | 1 | 0 | 1 | 0 | 1 | 0 | −1 | 0 | 1 |
| 0 | 1 | 0 | −1 | 0 | 1 | 0 | −1 | 0 | −1 | 0 | −1 |
| 0 | 1 | 0 | −1 | 0 | −1 | 0 | 1 | 0 | −1 | 0 | −1 |
| 0 | 1 | 0 | −1 | 0 | −1 | 0 | 1 | 0 | −1 | 0 | −1 |
| 0 | −1 | 0 | −1 | 0 | 1 | 0 | −1 | 0 | −1 | 0 | 1 |
| 0 | −1 | 0 | −1 | 0 | −1 | 0 | −1 | 0 | −1 | 0 | −1 |
| 0 | 1 | 0 | 1 | 0 | 1 | 0 | −1 | 0 | 1 | 0 | 1 |
| 0 | 1 | 0 | 1 | 0 | −1 | 0 | −1 | 0 | −1 | 0 | 1 |
| 0 | −1 | 0 | 1 | 0 | −1 | 0 | 1 | 0 | 1 | 0 | 1 |
| 0 | −1 | 0 | −1 | 0 | −1 | 0 | −1 | 0 | 1 | 0 | −1 |
| 0 | −1 | 0 | −1 | 0 | 1 | 0 | 1 | 0 | 1 | 0 | 1 |
| 0 | 1 | 0 | 1 | 0 | −1 | 0 | 1 | 0 | 1 | 0 | −1 |
| 0 | 1 | 0 | 1 | 0 | 1 | 0 | 1 | 0 | −1 | 0 | 1 |
| 0 | 1 | 0 | −1 | 0 | 1 | 0 | −1 | 0 | 1 | 0 | −1 |
| 0 | −1 | 0 | 1 | 0 | −1 | 0 | −1 | 0 | −1 | 0 | 1 |
| 0 | −1 | 0 | 1 | 0 | 1 | 0 | −1 | 0 | 1 | 0 | 1 |
| 0 | 1 | 0 | −1 | 0 | −1 | 0 | −1 | 0 | 1 | 0 | 1 |
| 0 | 1 | 0 | −1 | 0 | 1 | 0 | −1 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | −1 | 0 | 1 | 0 | −1 |
| 0 | −1 | 0 | −1 | 0 | 1 | 0 | 1 | 0 | 1 | 0 | −1 |
| 0 | 1 | 0 | −1 | 0 | −1 | 0 | −1 | 0 | 1 | 0 | 1 |
| 0 | 1 | 0 | −1 | 0 | −1 | 0 | −1 | 0 | 1 | 0 | −1 |
| 0 | −1 | 0 | 1 | 0 | −1 | 0 | 1 | 0 | 1 | 0 | 1 |
| 0 | −1 | 0 | 1 | 0 | 1 | 0 | −1 | 0 | 1 | 0 | 1 |
| 0 | −1 | 0 | 1 | 0 | 1 | 0 | −1 | 0 | 1 | 0 | 1 |
| 0 | 1 | 0 | 1 | 0 | −1 | 0 | 1 | 0 | 1 | 0 | −1 |
| 0 | 1 | 0 | 1 | 0 | 1 | 0 | 1 | 0 | 1 | 0 | 1 |
| 0 | −1 | 0 | −1 | 0 | −1 | 0 | 1 | 0 | −1 | 0 | −1 |

-continued

| | | | | | | | | | | | |
|---|---|---|---|---|---|---|---|---|---|---|---|
| 0 | −1 | 0 | −1 | 0 | 1 | 0 | 1 | 0 | 1 | 0 | −1 |
| 0 | 1 | 0 | 1 | 0 | −1 | 0 | 1 | 0 | 1 | 0 | 1 |
| 0 | −1 | 0 | −1 | 0 | −1 | 0 | −1 | 0 | 1 | 0 | −1 |
| 0 | −1 | 0 | −1 | 0 | 1 | 0 | 1 | 0 | 1 | 0 | 1 |
| 0 | 1 | 0 | 1 | 0 | −1 | 0 | 1 | 0 | 1 | 0 | −1 |
| 0 | 1 | 0 | 1 | 0 | 1 | 0 | 1 | 0 | −1 | 0 | 1 |
| 0 | 1 | 0 | −1 | 0 | 1 | 0 | −1 | 0 | 1 | 0 | −1 |
| 0 | −1 | 0 | 1 | 0 | −1 | 0 | −1 | 0 | −1 | 0 | 1 |
| 0 | −1 | 0 | 1 | 0 | 1 | 0 | −1 | 0 | 1 | 0 | 1 |
| 0 | 1 | 0 | −1 | 0 | −1 | 0 | −1 | 0 | 1 | 0 | 1 |
| 0 | 1 | 0 | −1 | 0 | 1 | 0 | −1 | 0 | 1 | 0 | −1 |
| 0 | 1 | 0 | 1 | 0 | 1 | 0 | −1 | 0 | −1 | 0 | −1 |
| 0 | 1 | 0 | −1 | 0 | 1 | 0 | 1 | 0 | 1 | 0 | −1 |
| 0 | −1 | 0 | −1 | 0 | 1 | 0 | 1 | 0 | 1 | 0 | −1 |
| 0 | 1 | 0 | 1 | 0 | −1 | 0 | 1 | 0 | −1 | 0 | −1 |
| 0 | −1 | 0 | 1 | 0 | −1 | 0 | −1 | 0 | 1 | 0 | −1 |
| 0 | −1 | 0 | 1 | 0 | −1 | 0 | −1 | 0 | 1 | 0 | −1 |
| 0 | −1 | 0 | −1 | 0 | −1 | 0 | 1 | 0 | −1 | 0 | −1 |
| 0 | 1 | 0 | −1 | 0 | −1 | 0 | −1 | 0 | −1 | 0 | −1 |
| 0 | −1 | 0 | 1 | 0 | 1 | 0 | 1 | 0 | −1 | 0 | 1 |
| 0 | 1 | 0 | 1 | 0 | 1 | 0 | −1 | 0 | −1 | 0 | −1 |
| 0 | 1 | 0 | −1 | 0 | 1 | 0 | −1 | 0 | 1 | 0 | 1 |
| 0 | 1 | 0 | −1 | 0 | −1 | 0 | −1 | 0 | −1 | 0 | 1 |
| 0 | −1 | 0 | −1 | 0 | −1 | 0 | 1 | 0 | 1 | 0 | 1 |
| 0 | 1 | 0 | 1 | 0 | 1 | 0 | −1 | 0 | 1 | 0 | 1 |
| 0 | −1 | 0 | 1 | 0 | 1 | 0 | 1 | 0 | 1 | 0 | −1 |
| 0 | 1 | 0 | 1 | 0 | −1 | 0 | 1 | 0 | −1 | 0 | 1 |
| 0 | −1 | 0 | −1 | 0 | 1 | 0 | −1 | 0 | −1 | 0 | −1 |
| 0 | 1 | 0 | −1 | 0 | 1 | 0 | 1 | 0 | −1 | 0 | 1 |
| 0 | 1 | 0 | 1 | 0 | −1 | 0 | −1 | 0 | −1 | 0 | 1 |
| 0 | 1 | 0 | 1 | 0 | −1 | 0 | 1 | 0 | −1 | 0 | −1 |
| 0 | 1 | 0 | 1 | 0 | 1 | 0 | −1 | 0 | −1 | 0 | −1 |
| 0 | 0 | 0 | 0 | 0 | 0 | 0 | 1 | 0 | −1 | 0 | −1 |
| 0 | 1 | 0 | 1 | 0 | −1 | 0 | 1 | 0 | 1 | 0 | −1 |
| 0 | 1 | 0 | 1 | 0 | 1 | 0 | −1 | 0 | −1 | 0 | −1 |
| 0 | 1 | 0 | −1 | 0 | 1 | 0 | 1 | 0 | 1 | 0 | −1 |
| 0 | −1 | 0 | −1 | 0 | 1 | 0 | 1 | 0 | 1 | 0 | −1 |
| 0 | 1 | 0 | 1 | 0 | −1 | 0 | 1 | 0 | −1 | 0 | −1 |
| 0 | −1 | 0 | 1 | 0 | −1 | 0 | −1 | 0 | 1 | 0 | −1 |
| 0 | −1 | 0 | 1 | 0 | −1 | 0 | −1 | 0 | 1 | 0 | −1 |
| 0 | −1 | 0 | −1 | 0 | −1 | 0 | 1 | 0 | −1 | 0 | −1 |
| 0 | 1 | 0 | −1 | 0 | −1 | 0 | −1 | 0 | −1 | 0 | −1 |
| 0 | −1 | 0 | 1 | 0 | 1 | 0 | 1 | 0 | −1 | 0 | 1 |
| 0 | 1 | 0 | 1 | 0 | 1 | 0 | −1 | 0 | −1 | 0 | −1 |
| 0 | 1 | 0 | −1 | 0 | −1 | 0 | 1 | 0 | −1 | 0 | −1 |
| 0 | −1 | 0 | 1 | 0 | 1 | 0 | 1 | 0 | 1 | 0 | −1 |
| 0 | 1 | 0 | 1 | 0 | 1 | 0 | −1 | 0 | −1 | 0 | −1 |
| 0 | −1 | 0 | −1 | 0 | −1 | 0 | 1 | 0 | −1 | 0 | −1 |
| 0 | 1 | 0 | −1 | 0 | −1 | 0 | −1 | 0 | −1 | 0 | 1 |
| 0 | −1 | 0 | −1 | 0 | 1 | 0 | −1 | 0 | 1 | 0 | −1 |
| 0 | 1 | 0 | 1 | 0 | −1 | 0 | 1 | 0 | 1 | 0 | 1 |
| 0 | −1 | 0 | 1 | 0 | −1 | 0 | −1 | 0 | 1 | 0 | −1 |
| 0 | −1 | 0 | −1 | 0 | 1 | 0 | 1 | 0 | 1 | 0 | −1 |
| 0 | −1 | 0 | −1 | 0 | 1 | 0 | −1 | 0 | 1 | 0 | 1 |
| 0 | −1 | 0 | 1 | 0 | 1 | 0 | 1 | 0 | −1 | 0 | −1 |
| 0 | −1 | 0 | 1 | 0 | −1 | 0 | 1 | 0 | 1 | 0 | 1 |
| 0 | −1 | 0 | −1 | 0 | −1 | 0 | 1 | 0 | 1 | 0 | 1 |
| 0 | −1 | 0 | 1 | 0 | 1 | 0 | −1 | 0 | 1 | 0 | −1 |
| 0 | −1 | 0 | −1 | 0 | 1 | 0 | −1 | 0 | −1 | 0 | 1 |
| 0 | −1 | 0 | −1 | 0 | 1 | 0 | −1 | 0 | −1 | 0 | 1 |
| 0 | −1 | 0 | −1 | 0 | −1 | 0 | −1 | 0 | 1 | 0 | −1 |
| 0 | −1 | 0 | 1 | 0 | −1 | 0 | −1 | 0 | −1 | 0 | −1 |
| 0 | −1 | 0 | −1 | 0 | 1 | 0 | 1 | 0 | 1 | 0 | −1 |
| 0 | 1 | 0 | 1 | 0 | 1 | 0 | 1 | 0 | −1 | 0 | −1 |
| 0 | −1 | 0 | 1 | 0 | −1 | 0 | 1 | 0 | −1 | 0 | 1 |
| 0 | 1 | 0 | 1 | 0 | −1 | 0 | −1 | 0 | −1 | 0 | −1 |
| 0 | 1 | 0 | −1 | 0 | −1 | 0 | −1 | 0 | 1 | 0 | 1 |
| 0 | 1 | 0 | 1 | 0 | 1 | 0 | 1 | 0 | −1 | 0 | 1 |
| 0 | 1 | 0 | −1 | 0 | 1 | 0 | 1 | 0 | 1 | 0 | 1 |
| 0 | −1 | 0 | 1 | 0 | 1 | 0 | −1 | 0 | 1 | 0 | −1 |
| 0 | 1 | 0 | −1 | 0 | −1 | 0 | 1 | 0 | −1 | 0 | −1 |
| 0 | −1 | 0 | 1 | 0 | −1 | 0 | 1 | 0 | 1 | 0 | −1 |
| 0 | 1 | 0 | 1 | 0 | 1 | 0 | −1 | 0 | −1 | 0 | −1 |
| 0 | 1 | 0 | 1 | 0 | 1 | 0 | −1 | 0 | 1 | 0 | −1 |
| 0 | 0 | 0 | 0 | 0 | 0 | 0 | 0 | 0 | 0 | 0}. | |

9. The communication apparatus according to claim 6, wherein in response to the LTF being a 2×LTF sequence in a 320 MHZ, the 2×LTF sequence in the 320 MHz is:

| | | | | | | | | | | | |
|---|---|---|---|---|---|---|---|---|---|---|---|
| | {00 | 0 | 0 | 0 | 0 | 0 | 0 | 0 | 0 | 0 | 0 |
| 1 | 0 | 1 | 0 | −1 | 0 | 1 | 0 | 1 | 0 | 1 | 0 |
| −1 | 0 | 1 | 0 | 1 | 0 | 1 | 0 | 1 | 0 | −1 | 0 |
| −1 | 0 | −1 | 0 | 1 | 0 | −1 | 0 | −1 | 0 | 1 | 0 |
| 1 | 0 | −1 | 0 | 1 | 0 | 1 | 0 | 1 | 0 | 1 | 0 |
| −1 | 0 | −1 | 0 | −1 | 0 | 1 | 0 | 1 | 0 | 1 | 0 |
| 1 | 0 | −1 | 0 | 1 | 0 | 1 | 0 | 1 | 0 | −1 | 0 |
| 1 | 0 | −1 | 0 | −1 | 0 | 1 | 0 | −1 | 0 | −1 | 0 |
| −1 | 0 | 1 | 0 | 1 | 0 | −1 | 0 | 1 | 0 | −1 | 0 |
| 1 | 0 | −1 | 0 | −1 | 0 | 1 | 0 | −1 | 0 | 1 | 0 |
| 1 | 0 | −1 | 0 | 1 | 0 | 1 | 0 | −1 | 0 | 1 | 0 |
| −1 | 0 | −1 | 0 | −1 | 0 | 1 | 0 | −1 | 0 | −1 | 0 |
| −1 | 0 | −1 | 0 | 1 | 0 | −1 | 0 | −1 | 0 | 1 | 0 |
| 1 | 0 | −1 | 0 | 1 | 0 | −1 | 0 | 1 | 0 | −1 | 0 |
| −1 | 0 | −1 | 0 | −1 | 0 | 1 | 0 | −1 | 0 | 1 | 0 |
| 1 | 0 | 1 | 0 | −1 | 0 | 1 | 0 | 1 | 0 | 1 | 0 |
| 1 | 0 | −1 | 0 | −1 | 0 | −1 | 0 | 1 | 0 | 1 | 0 |
| 1 | 0 | −1 | 0 | −1 | 0 | 1 | 0 | 1 | 0 | 1 | 0 |
| −1 | 0 | 1 | 0 | 1 | 0 | −1 | 0 | 1 | 0 | −1 | 0 |
| −1 | 0 | −1 | 0 | −1 | 0 | 1 | 0 | −1 | 0 | −1 | 0 |
| −1 | 0 | 1 | 0 | −1 | 0 | 1 | 0 | 1 | 0 | −1 | 0 |
| 1 | 0 | 1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| 1 | 0 | −1 | 0 | 1 | 0 | 1 | 0 | 1 | 0 | −1 | 0 |
| −1 | 0 | 1 | 0 | 1 | 0 | 1 | 0 | −1 | 0 | 1 | 0 |
| 1 | 0 | −1 | 0 | 1 | 0 | −1 | 0 | −1 | 0 | 1 | 0 |
| −1 | 0 | 1 | 0 | 1 | 0 | 1 | 0 | −1 | 0 | 1 | 0 |
| 1 | 0 | 1 | 0 | 1 | 0 | −1 | 0 | −1 | 0 | −1 | 0 |
| 1 | 0 | −1 | 0 | −1 | 0 | 1 | 0 | 1 | 0 | −1 | 0 |
| 1 | 0 | 1 | 0 | 1 | 0 | −1 | 0 | −1 | 0 | −1 | 0 |
| −1 | 0 | 1 | 0 | 1 | 0 | 1 | 0 | −1 | 0 | −1 | 0 |
| −1 | 0 | −1 | 0 | 1 | 0 | 1 | 0 | −1 | 0 | −1 | 0 |
| 1 | 0 | −1 | 0 | 1 | 0 | 1 | 0 | 1 | 0 | −1 | 0 |
| −1 | 0 | 1 | 0 | 1 | 0 | 1 | 0 | −1 | 0 | 1 | 0 |
| 1 | 0 | −1 | 0 | 1 | 0 | −1 | 0 | −1 | 0 | −1 | 0 |
| −1 | 0 | 1 | 0 | −1 | 0 | −1 | 0 | −1 | 0 | 1 | 0 |
| −1 | 0 | 1 | 0 | 1 | 0 | −1 | 0 | 1 | 0 | 1 | 0 |
| −1 | 0 | 1 | 0 | 1 | 0 | −1 | 0 | −1 | 0 | 1 | 0 |
| −1 | 0 | −1 | 0 | −1 | 0 | 1 | 0 | 1 | 0 | 1 | 0 |
| 1 | 0 | −1 | 0 | 1 | 0 | −1 | 0 | −1 | 0 | −1 | 0 |
| 1 | 0 | −1 | 0 | −1 | 0 | −1 | 0 | −1 | 0 | 1 | 0 |
| 1 | 0 | 1 | 0 | 1 | 0 | −1 | 0 | −1 | 0 | −1 | 0 |
| 1 | 0 | 1 | 0 | 1 | 0 | 0 | 0 | 0 | 0 | 0 | 0 |
| 1 | 0 | −1 | 0 | −1 | 0 | 1 | 0 | 1 | 0 | −1 | 0 |
| 1 | 0 | −1 | 0 | −1 | 0 | −1 | 0 | 1 | 0 | 1 | 0 |
| 1 | 0 | 1 | 0 | −1 | 0 | 1 | 0 | 1 | 0 | 1 | 0 |
| −1 | 0 | 1 | 0 | −1 | 0 | −1 | 0 | −1 | 0 | −1 | 0 |
| 1 | 0 | 1 | 0 | 1 | 0 | −1 | 0 | 1 | 0 | 1 | 0 |
| −1 | 0 | −1 | 0 | 1 | 0 | −1 | 0 | −1 | 0 | 1 | 0 |
| −1 | 0 | −1 | 0 | 1 | 0 | −1 | 0 | 1 | 0 | 1 | 0 |
| 1 | 0 | −1 | 0 | 1 | 0 | 1 | 0 | 1 | 0 | 1 | 0 |
| −1 | 0 | 1 | 0 | −1 | 0 | −1 | 0 | 1 | 0 | −1 | 0 |
| −1 | 0 | −1 | 0 | 1 | 0 | 1 | 0 | −1 | 0 | −1 | 0 |
| −1 | 0 | 1 | 0 | −1 | 0 | 1 | 0 | 1 | 0 | 1 | 0 |
| −1 | 0 | 1 | 0 | 1 | 0 | 1 | 0 | 1 | 0 | −1 | 0 |
| −1 | 0 | −1 | 0 | 1 | 0 | 1 | 0 | 1 | 0 | 1 | 0 |
| −1 | 0 | −1 | 0 | −1 | 0 | 1 | 0 | −1 | 0 | −1 | 0 |
| 1 | 0 | 1 | 0 | −1 | 0 | 1 | 0 | 1 | 0 | 1 | 0 |
| −1 | 0 | −1 | 0 | −1 | 0 | −1 | 0 | 1 | 0 | −1 | 0 |
| −1 | 0 | −1 | 0 | 1 | 0 | −1 | 0 | 1 | 0 | 1 | 0 |
| −1 | 0 | 1 | 0 | −1 | 0 | −1 | 0 | 1 | 0 | −1 | 0 |
| −1 | 0 | −1 | 0 | 1 | 0 | 1 | 0 | −1 | 0 | −1 | 0 |
| −1 | 0 | 1 | 0 | −1 | 0 | −1 | 0 | 1 | 0 | −1 | 0 |
| 1 | 0 | 1 | 0 | 1 | 0 | −1 | 0 | 1 | 0 | 1 | 0 |
| 1 | 0 | −1 | 0 | 1 | 0 | −1 | 0 | 1 | 0 | 1 | 0 |
| −1 | 0 | 1 | 0 | −1 | 0 | −1 | 0 | −1 | 0 | 1 | 0 |
| −1 | 0 | −1 | 0 | −1 | 0 | −1 | 0 | 1 | 0 | −1 | 0 |
| 1 | 0 | 1 | 0 | −1 | 0 | 1 | 0 | 1 | 0 | 1 | 0 |
| −1 | 0 | −1 | 0 | 1 | 0 | 1 | 0 | 1 | 0 | −1 | 0 |
| −1 | 0 | −1 | 0 | 1 | 0 | 1 | 0 | 1 | 0 | 1 | 0 |
| −1 | 0 | 1 | 0 | 1 | 0 | 1 | 0 | −1 | 0 | 1 | 0 |
| −1 | 0 | −1 | 0 | −1 | 0 | −1 | 0 | 1 | 0 | 1 | 0 |
| 1 | 0 | −1 | 0 | 1 | 0 | 1 | 0 | −1 | 0 | −1 | 0 |
| 1 | 0 | −1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| −1 | 0 | −1 | 0 | 1 | 0 | 1 | 0 | −1 | 0 | 1 | 0 |
| −1 | 0 | −1 | 0 | 1 | 0 | −1 | 0 | −1 | 0 | −1 | 0 |
| 1 | 0 | 1 | 0 | −1 | 0 | −1 | 0 | −1 | 0 | 1 | 0 |
| −1 | 0 | −1 | 0 | 1 | 0 | −1 | 0 | 1 | 0 | 1 | 0 |
| 1 | 0 | −1 | 0 | 1 | 0 | 1 | 0 | 1 | 0 | 1 | 0 |
| −1 | 0 | −1 | 0 | −1 | 0 | −1 | 0 | 1 | 0 | 1 | 0 |

-continued

| | | | | | | | | | | | |
|---|---|---|---|---|---|---|---|---|---|---|---|
| 1 | 0 | −1 | 0 | 1 | 0 | 1 | 0 | −1 | 0 | −1 | 0 |
| 1 | 0 | −1 | 0 | −1 | 0 | −1 | 0 | 1 | 0 | 1 | 0 |
| 1 | 0 | 1 | 0 | −1 | 0 | 1 | 0 | 1 | 0 | 1 | 0 |
| −1 | 0 | 1 | 0 | 1 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 1 | 0 | 1 | 0 | −1 | 0 | 1 | 0 |
| 1 | 0 | 1 | 0 | −1 | 0 | 1 | 0 | 1 | 0 | 1 | 0 |
| 1 | 0 | −1 | 0 | −1 | 0 | −1 | 0 | 1 | 0 | −1 | 0 |
| −1 | 0 | 1 | 0 | 1 | 0 | −1 | 0 | 1 | 0 | 1 | 0 |
| 1 | 0 | −1 | 0 | −1 | 0 | −1 | 0 | −1 | 0 | 1 | 0 |
| 1 | 0 | 1 | 0 | 1 | 0 | −1 | 0 | 1 | 0 | 1 | 0 |
| 1 | 0 | −1 | 0 | 1 | 0 | −1 | 0 | −1 | 0 | 1 | 0 |
| −1 | 0 | −1 | 0 | −1 | 0 | 1 | 0 | 1 | 0 | −1 | 0 |
| −1 | 0 | −1 | 0 | 1 | 0 | −1 | 0 | −1 | 0 | 1 | 0 |
| −1 | 0 | 1 | 0 | 1 | 0 | −1 | 0 | 1 | 0 | 1 | 0 |
| −1 | 0 | 1 | 0 | −1 | 0 | −1 | 0 | −1 | 0 | 1 | 0 |
| −1 | 0 | −1 | 0 | −1 | 0 | −1 | 0 | 1 | 0 | −1 | 0 |
| −1 | 0 | 1 | 0 | 1 | 0 | −1 | 0 | 1 | 0 | 1 | 0 |
| 1 | 0 | −1 | 0 | −1 | 0 | −1 | 0 | −1 | 0 | 1 | 0 |
| −1 | 0 | 1 | 0 | 1 | 0 | 1 | 0 | −1 | 0 | 1 | 0 |
| 1 | 0 | 1 | 0 | 1 | 0 | −1 | 0 | −1 | 0 | −1 | 0 |
| 1 | 0 | 1 | 0 | 1 | 0 | −1 | 0 | 1 | 0 | 1 | 0 |
| 1 | 0 | 1 | 0 | −1 | 0 | 1 | 0 | 1 | 0 | −1 | 0 |
| 1 | 0 | −1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| 1 | 0 | −1 | 0 | 1 | 0 | 1 | 0 | −1 | 0 | −1 | 0 |
| −1 | 0 | −1 | 0 | −1 | 0 | −1 | 0 | −1 | 0 | 1 | 0 |
| −1 | 0 | 1 | 0 | 1 | 0 | −1 | 0 | 1 | 0 | 1 | 0 |
| 1 | 0 | −1 | 0 | −1 | 0 | 1 | 0 | 1 | 0 | 1 | 0 |
| −1 | 0 | 1 | 0 | 1 | 0 | −1 | 0 | 1 | 0 | −1 | 0 |
| −1 | 0 | 1 | 0 | −1 | 0 | 1 | 0 | 1 | 0 | 1 | 0 |
| −1 | 0 | 1 | 0 | 1 | 0 | 1 | 0 | 1 | 0 | −1 | 0 |
| −1 | 0 | −1 | 0 | 1 | 0 | −1 | 0 | −1 | 0 | 1 | 0 |
| 1 | 0 | −1 | 0 | 1 | 0 | 1 | 0 | 1 | 0 | −1 | 0 |
| −1 | 0 | −1 | 0 | −1 | 0 | 1 | 0 | 1 | 0 | 1 | 0 |
| −1 | 0 | −1 | 0 | −1 | 0 | −1 | 0 | 1 | 0 | −1 | 0 |
| −1 | 0 | −1 | 0 | 1 | 0 | −1 | 0 | 1 | 0 | 1 | 0 |
| 1 | 0 | −1 | 0 | −1 | 0 | 1 | 0 | 1 | 0 | 1 | 0 |
| −1 | 0 | 1 | 0 | 1 | 0 | −1 | 0 | 1 | 0 | −1 | 0 |
| −1 | 0 | −1 | 0 | −1 | 0 | 1 | 0 | −1 | 0 | −1 | 0 |
| −1 | 0 | 1 | 0 | −1 | 0 | 1 | 0 | 1 | 0 | −1 | 0 |
| 1 | 0 | 1 | 0 | −1 | 0 | 1 | 0 | 1 | 0 | −1 | 0 |
| −1 | 0 | 1 | 0 | −1 | 0 | −1 | 0 | −1 | 0 | 1 | 0 |
| 1 | 0 | 1 | 0 | 1 | 0 | −1 | 0 | 1 | 0 | −1 | 0 |
| −1 | 0 | −1 | 0 | 1 | 0 | −1 | 0 | −1 | 0 | −1 | 0 |
| −1 | 0 | 1 | 0 | 1 | 0 | 1 | 0 | −1 | 0 | 1 | 0 |
| 1 | 0 | 1 | 0 | −1 | 0 | −1 | 0 | −1 | 0 | 0 | 0 |
| 0 | 0 | 0 | 0 | −1 | 0 | 1 | 0 | 1 | 0 | −1 | 0 |
| −1 | 0 | 1 | 0 | −1 | 0 | 1 | 0 | 1 | 0 | 1 | 0 |
| −1 | 0 | −1 | 0 | −1 | 0 | −1 | 0 | 1 | 0 | −1 | 0 |
| −1 | 0 | −1 | 0 | 1 | 0 | −1 | 0 | 1 | 0 | 1 | 0 |
| 1 | 0 | 1 | 0 | −1 | 0 | −1 | 0 | −1 | 0 | 1 | 0 |
| −1 | 0 | −1 | 0 | 1 | 0 | 1 | 0 | −1 | 0 | 1 | 0 |
| 1 | 0 | −1 | 0 | 1 | 0 | 1 | 0 | −1 | 0 | 1 | 0 |
| −1 | 0 | −1 | 0 | −1 | 0 | 1 | 0 | −1 | 0 | −1 | 0 |
| −1 | 0 | −1 | 0 | 1 | 0 | −1 | 0 | 1 | 0 | 1 | 0 |
| −1 | 0 | 1 | 0 | 1 | 0 | 1 | 0 | −1 | 0 | −1 | 0 |
| 1 | 0 | 1 | 0 | 1 | 0 | −1 | 0 | 1 | 0 | −1 | 0 |
| −1 | 0 | −1 | 0 | 1 | 0 | −1 | 0 | −1 | 0 | −1 | 0 |
| −1 | 0 | 1 | 0 | 1 | 0 | 1 | 0 | −1 | 0 | −1 | 0 |
| −1 | 0 | −1 | 0 | 1 | 0 | 1 | 0 | 1 | 0 | −1 | 0 |
| 1 | 0 | 1 | 0 | −1 | 0 | −1 | 0 | 1 | 0 | −1 | 0 |
| −1 | 0 | −1 | 0 | 1 | 0 | 1 | 0 | 1 | 0 | 1 | 0 |
| −1 | 0 | 1 | 0 | 1 | 0 | 1 | 0 | −1 | 0 | 1 | 0 |
| −1 | 0 | −1 | 0 | 1 | 0 | −1 | 0 | 1 | 0 | 1 | 0 |
| −1 | 0 | 1 | 0 | 1 | 0 | 1 | 0 | −1 | 0 | −1 | 0 |
| 1 | 0 | 1 | 0 | 1 | 0 | −1 | 0 | 1 | 0 | 1 | 0 |
| −1 | 0 | 1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| −1 | 0 | −1 | 0 | 1 | 0 | −1 | 0 | 1 | 0 | 1 | 0 |
| 1 | 0 | −1 | 0 | 1 | 0 | 1 | 0 | 1 | 0 | 1 | 0 |
| −1 | 0 | 1 | 0 | −1 | 0 | −1 | 0 | 1 | 0 | −1 | 0 |
| −1 | 0 | −1 | 0 | 1 | 0 | 1 | 0 | −1 | 0 | −1 | 0 |
| 1 | 0 | 1 | 0 | 1 | 0 | 1 | 0 | −1 | 0 | −1 | 0 |
| −1 | 0 | −1 | 0 | 1 | 0 | −1 | 0 | −1 | 0 | −1 | 0 |
| 1 | 0 | −1 | 0 | 1 | 0 | 1 | 0 | 1 | 0 | 1 | 0 |
| −1 | 0 | −1 | 0 | −1 | 0 | 1 | 0 | −1 | 0 | −1 | 0 |
| 1 | 0 | 1 | 0 | −1 | 0 | 1 | 0 | 1 | 0 | 1 | 0 |
| 1 | 0 | −1 | 0 | 1 | 0 | 1 | 0 | 1 | 0 | −1 | 0 |

-continued

| | | | | | | | | | | | |
|---|---|---|---|---|---|---|---|---|---|---|---|
| 1 | 0 | −1 | 0 | −1 | 0 | 1 | 0 | −1 | 0 | −1 | 0 |
| 1 | 0 | −1 | 0 | 1 | 0 | 1 | 0 | −1 | 0 | 1 | 0 |
| 1 | 0 | 1 | 0 | −1 | 0 | −1 | 0 | 1 | 0 | 1 | 0 |
| 1 | 0 | −1 | 0 | 1 | 0 | 1 | 0 | −1 | 0 | 1 | 0 |
| −1 | 0 | −1 | 0 | −1 | 0 | 1 | 0 | −1 | 0 | −1 | 0 |
| −1 | 0 | −1 | 0 | 1 | 0 | 1 | 0 | 1 | 0 | 1 | 0 |
| −1 | 0 | −1 | 0 | −1 | 0 | 1 | 0 | −1 | 0 | −1 | 0 |
| 1 | 0 | 1 | 0 | −1 | 0 | 1 | 0 | 1 | 0 | 1 | 0 |
| −1 | 0 | −1 | 0 | −1 | 0 | −1 | 0 | 1 | 0 | −1 | 0 |
| −1 | 0 | −1 | 0 | 1 | 0 | −1 | 0 | −1 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | −1 | 0 | −1 | 0 |
| 1 | 0 | −1 | 0 | −1 | 0 | −1 | 0 | 1 | 0 | −1 | 0 |
| −1 | 0 | −1 | 0 | −1 | 0 | 1 | 0 | 1 | 0 | 1 | 0 |
| −1 | 0 | 1 | 0 | 1 | 0 | −1 | 0 | −1 | 0 | 1 | 0 |
| −1 | 0 | −1 | 0 | −1 | 0 | 1 | 0 | 1 | 0 | 1 | 0 |
| 1 | 0 | −1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| 1 | 0 | −1 | 0 | 1 | 0 | 1 | 0 | 1 | 0 | −1 | 0 |
| −1 | 0 | 1 | 0 | 1 | 0 | 1 | 0 | −1 | 0 | 1 | 0 |
| 1 | 0 | −1 | 0 | 1 | 0 | −1 | 0 | −1 | 0 | 1 | 0 |
| −1 | 0 | −1 | 0 | 1 | 0 | −1 | 0 | 1 | 0 | 1 | 0 |
| 1 | 0 | −1 | 0 | 1 | 0 | 1 | 0 | 1 | 0 | 1 | 0 |
| −1 | 0 | 1 | 0 | 1 | 0 | −1 | 0 | −1 | 0 | 1 | 0 |
| −1 | 0 | −1 | 0 | −1 | 0 | 1 | 0 | 1 | 0 | 1 | 0 |
| 1 | 0 | −1 | 0 | 1 | 0 | −1 | 0 | −1 | 0 | −1 | 0 |
| 1 | 0 | −1 | 0 | −1 | 0 | −1 | 0 | −1 | 0 | 1 | 0 |
| 1 | 0 | 1 | 0 | −1 | 0 | −1 | 0 | −1 | 0 | 1 | 0 |
| 1 | 0 | −1 | 0 | −1 | 0 | −1 | 0 | 1 | 0 | −1 | 0 |
| −1 | 0 | 1 | 0 | −1 | 0 | 1 | 0 | 1 | 0 | 1 | 0 |
| 1 | 0 | −1 | 0 | 1 | 0 | 1 | 0 | 1 | 0 | −1 | 0 |
| 1 | 0 | −1 | 0 | −1 | 0 | 1 | 0 | −1 | 0 | 1 | 0 |
| −1 | 0 | −1 | 0 | −1 | 0 | 1 | 0 | −1 | 0 | −1 | 0 |
| −1 | 0 | 1 | 0 | −1 | 0 | 1 | 0 | 1 | 0 | −1 | 0 |
| 1 | 0 | 1 | 0 | 1 | 0 | −1 | 0 | −1 | 0 | 1 | 0 |
| 1 | 0 | 1 | 0 | −1 | 0 | 1 | 0 | 1 | 0 | −1 | 0 |
| 1 | 0 | −1 | 0 | −1 | 0 | 1 | 0 | −1 | 0 | 1 | 0 |
| 1 | 0 | 1 | 0 | −1 | 0 | 1 | 0 | 1 | 0 | 1 | 0 |
| 1 | 0 | −1 | 0 | −1 | 0 | −1 | 0 | 1 | 0 | −1 | 0 |
| −1 | 0 | 1 | 0 | 1 | 0 | −1 | 0 | 1 | 0 | 1 | 0 |
| 1 | 0 | −1 | 0 | −1 | 0 | −1 | 0 | −1 | 0 | 1 | 0 |
| 1 | 0 | 1 | 0 | −1 | 0 | −1 | 0 | −1 | 0 | −1 | 0 |
| 1 | 0 | −1 | 0 | −1 | 0 | −1 | 0 | 1 | 0 | −1 | 0 |
| 1 | 0 | 1 | 0 | 1 | 0 | −1 | 0 | −1 | 0 | 1 | 0 |
| 1 | 0 | 1 | 0 | −1 | 0 | 1 | 0 | 1 | 0 | −1 | 0 |
| 1 | 0 | −1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| 1 | 0 | −1 | 0 | 1 | 0 | 1 | 0 | −1 | 0 | 1 | 0 |
| 1 | 0 | −1 | 0 | −1 | 0 | 1 | 0 | −1 | 0 | −1 | 0 |
| −1 | 0 | 1 | 0 | 1 | 0 | 1 | 0 | 1 | 0 | −1 | 0 |
| 1 | 0 | −1 | 0 | −1 | 0 | −1 | 0 | 1 | 0 | −1 | 0 |
| −1 | 0 | −1 | 0 | −1 | 0 | 1 | 0 | 1 | 0 | 1 | 0 |
| −1 | 0 | 1 | 0 | 1 | 0 | 1 | 0 | −1 | 0 | −1 | 0 |
| −1 | 0 | 0 | 0 | 0 | 0 | 0 | 0 | −1 | 0 | 1 | 0 |
| 1 | 0 | −1 | 0 | −1 | 0 | 1 | 0 | −1 | 0 | −1 | 0 |
| −1 | 0 | −1 | 0 | 1 | 0 | 1 | 0 | 1 | 0 | 1 | 0 |
| −1 | 0 | 1 | 0 | 1 | 0 | 1 | 0 | −1 | 0 | 1 | 0 |
| −1 | 0 | −1 | 0 | −1 | 0 | −1 | 0 | 1 | 0 | 1 | 0 |
| 1 | 0 | −1 | 0 | 1 | 0 | 1 | 0 | −1 | 0 | −1 | 0 |
| 1 | 0 | −1 | 0 | −1 | 0 | 1 | 0 | −1 | 0 | −1 | 0 |
| 1 | 0 | −1 | 0 | 1 | 0 | 1 | 0 | 1 | 0 | −1 | 0 |
| 1 | 0 | 1 | 0 | 1 | 0 | 1 | 0 | −1 | 0 | 1 | 0 |
| −1 | 0 | −1 | 0 | 1 | 0 | −1 | 0 | −1 | 0 | −1 | 0 |
| 1 | 0 | 1 | 0 | −1 | 0 | −1 | 0 | −1 | 0 | 1 | 0 |
| −1 | 0 | 1 | 0 | 1 | 0 | 1 | 0 | −1 | 0 | 1 | 0 |
| 1 | 0 | 1 | 0 | 1 | 0 | −1 | 0 | −1 | 0 | −1 | 0 |
| 1 | 0 | 1 | 0 | 1 | 0 | 1 | 0 | −1 | 0 | −1 | 0 |
| −1 | 0 | 1 | 0 | −1 | 0 | −1 | 0 | 1 | 0 | 1 | 0 |
| −1 | 0 | 1 | 0 | 1 | 0 | 1 | 0 | −1 | 0 | −1 | 0 |
| −1 | 0 | −1 | 0 | 1 | 0 | −1 | 0 | −1 | 0 | −1 | 0 |
| 1 | 0 | −1 | 0 | 1 | 0 | 1 | 0 | −1 | 0 | 1 | 0 |
| −1 | 0 | −1 | 0 | 1 | 0 | −1 | 0 | −1 | 0 | −1 | 0 |
| 1 | 0 | 1 | 0 | −1 | 0 | −1 | 0 | −1 | 0 | 1 | 0 |
| −1 | 0 | −1 | 0 | 1 | 0 | −1 | 0 | 1 | 0 | 1 | 0 |
| 1 | 0 | −1 | 0 | 1 | 0 | 1 | 0 | 1 | 0 | −1 | 0 |
| −1 | 0 | 1 | 0 | −1 | 0 | −1 | 0 | 1 | 0 | −1 | 0 |
| 1 | 0 | 1 | 0 | 1 | 0 | −1 | 0 | 1 | 0 | 1 | 0 |
| 1 | 0 | 1 | 0 | −1 | 0 | 1 | 0 | −1 | 0 | −1 | 0 |
| 1 | 0 | −1 | 0 | −1 | 0 | −1 | 0 | 1 | 0 | 1 | 0 |

-continued

| | | | | | | | | | | | |
|---|---|---|---|---|---|---|---|---|---|---|---|
| −1 | 0 | −1 | 0 | −1 | 0 | 1 | 0 | 1 | 0 | 1 | 0 |
| −1 | 0 | −1 | 0 | −1 | 0 | −1 | 0 | 1 | 0 | −1 | 0 |
| −1 | 0 | −1 | 0 | −1 | 0 | −1 | 0 | 1 | 0 | 1 | 0 |
| 1 | 0 | 1 | 0 | −1 | 0 | −1 | 0 | −1 | 0 | 1 | 0 |
| −1 | 0 | −1 | 0 | 1 | 0 | 1 | 0 | −1 | 0 | 1 | 0 |
| 1 | 0 | 1 | 0 | 1 | 0 | −1 | 0 | 1 | 0 | 1 | 0 |
| 1 | 0 | −1 | 0 | 1 | 0 | −1 | 0 | −1 | 0 | 1 | 0 |
| −1 | 0 | −1 | 0 | 1 | 0 | −1 | 0 | 1 | 0 | 1 | 0 |
| −1 | 0 | 1 | 0 | 1 | 0 | 1 | 0 | −1 | 0 | −1 | 0 |
| 1 | 0 | 1 | 0 | 1 | 0 | −1 | 0 | 1 | 0 | 1 | 0 |
| −1 | 0 | 1 | 0 | −1 | 0 | −1 | 0 | −1 | 0 | 1 | 0 |
| −1 | 0 | −1 | 0 | −1 | 0 | −1 | 0 | 1 | 0 | −1 | 0 |
| 1 | 0 | 1 | 0 | −1 | 0 | −1 | 0 | −1 | 0 | 1 | 0 |
| −1 | 0 | −1 | 0 | 1 | 0 | 1 | 0 | −1 | 0 | 1 | 0 |
| 1 | 0 | 1 | 0 | −1 | 0 | −1 | 0 | −1 | 0 | −1 | 0 |
| 1 | 0 | −1 | 0 | −1 | 0 | −1 | 0 | 1 | 0 | −1 | 0 |
| −1 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| −1 | 0 | −1 | 0 | 1 | 0 | −1 | 0 | −1 | 0 | −1 | 0 |
| 1 | 0 | −1 | 0 | −1 | 0 | −1 | 0 | −1 | 0 | 1 | 0 |
| 1 | 0 | 1 | 0 | −1 | 0 | 1 | 0 | 1 | 0 | −1 | 0 |
| −1 | 0 | 1 | 0 | −1 | 0 | −1 | 0 | −1 | 0 | 1 | 0 |
| 1 | 0 | 1 | 0 | 1 | 0 | −1 | 0 | −1 | 0 | −1 | 0 |
| −1 | 0 | 1 | 0 | −1 | 0 | −1 | 0 | −1 | 0 | 1 | 0 |
| −1 | 0 | 1 | 0 | 1 | 0 | −1 | 0 | 1 | 0 | 1 | 0 |
| 1 | 0 | −1 | 0 | −1 | 0 | 1 | 0 | 1 | 0 | 1 | 0 |
| −1 | 0 | 1 | 0 | 1 | 0 | −1 | 0 | 1 | 0 | −1 | 0 |
| −1 | 0 | 1 | 0 | −1 | 0 | −1 | 0 | 1 | 0 | −1 | 0 |
| 1 | 0 | 1 | 0 | 1 | 0 | −1 | 0 | 1 | 0 | 1 | 0 |
| 1 | 0 | 1 | 0 | −1 | 0 | 1 | 0 | 1 | 0 | −1 | 0 |
| −1 | 0 | 1 | 0 | −1 | 0 | −1 | 0 | −1 | 0 | 1 | 0 |
| 1 | 0 | 1 | 0 | 1 | 0 | −1 | 0 | 1 | 0 | −1 | 0 |
| −1 | 0 | −1 | 0 | 1 | 0 | −1 | 0 | −1 | 0 | −1 | 0 |
| −1 | 0 | 1 | 0 | 1 | 0 | 1 | 0 | −1 | 0 | −1 | 0 |
| −1 | 0 | 1 | 0 | 1 | 0 | −1 | 0 | −1 | 0 | −1 | 0 |
| 1 | 0 | −1 | 0 | −1 | 0 | 1 | 0 | −1 | 0 | 1 | 0 |
| 1 | 0 | 1 | 0 | 1 | 0 | −1 | 0 | 1 | 0 | 1 | 0 |
| 1 | 0 | −1 | 0 | 1 | 0 | −1 | 0 | −1 | 0 | 1 | 0 |
| −1 | 0 | 1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| 1 | 0 | −1 | 0 | 1 | 0 | 1 | 0 | 1 | 0 | −1 | 0 |
| −1 | 0 | 1 | 0 | 1 | 0 | 1 | 0 | −1 | 0 | 1 | 0 |
| 1 | 0 | −1 | 0 | 1 | 0 | −1 | 0 | −1 | 0 | 1 | 0 |
| 1 | 0 | 1 | 0 | 1 | 0 | 1 | 0 | −1 | 0 | 1 | 0 |
| 1 | 0 | 1 | 0 | 1 | 0 | −1 | 0 | −1 | 0 | −1 | 0 |
| 1 | 0 | −1 | 0 | −1 | 0 | 1 | 0 | 1 | 0 | −1 | 0 |
| 1 | 0 | 1 | 0 | 1 | 0 | −1 | 0 | −1 | 0 | −1 | 0 |
| −1 | 0 | 1 | 0 | 1 | 0 | 1 | 0 | −1 | 0 | −1 | 0 |
| −1 | 0 | −1 | 0 | 1 | 0 | −1 | 0 | −1 | 0 | −1 | 0 |
| 1 | 0 | −1 | 0 | 1 | 0 | 1 | 0 | 1 | 0 | −1 | 0 |
| −1 | 0 | 1 | 0 | 1 | 0 | 1 | 0 | −1 | 0 | 1 | 0 |
| 1 | 0 | −1 | 0 | 1 | 0 | −1 | 0 | −1 | 0 | −1 | 0 |
| −1 | 0 | 1 | 0 | −1 | 0 | −1 | 0 | −1 | 0 | 1 | 0 |
| −1 | 0 | 1 | 0 | 1 | 0 | −1 | 0 | 1 | 0 | 1 | 0 |
| −1 | 0 | 1 | 0 | 1 | 0 | −1 | 0 | −1 | 0 | 1 | 0 |
| −1 | 0 | −1 | 0 | −1 | 0 | 1 | 0 | 1 | 0 | 1 | 0 |
| 1 | 0 | −1 | 0 | 1 | 0 | −1 | 0 | −1 | 0 | −1 | 0 |
| 1 | 0 | −1 | 0 | −1 | 0 | −1 | 0 | −1 | 0 | 1 | 0 |
| 1 | 0 | 1 | 0 | 1 | 0 | −1 | 0 | −1 | 0 | −1 | 0 |
| 1 | 0 | 1 | 0 | 1 | 0 | 0 | 0 | 0 | 0 | 0 | 0 |
| 1 | 0 | −1 | 0 | −1 | 0 | 1 | 0 | 1 | 0 | −1 | 0 |
| 1 | 0 | 1 | 0 | 1 | 0 | 1 | 0 | −1 | 0 | −1 | 0 |
| −1 | 0 | −1 | 0 | 1 | 0 | −1 | 0 | −1 | 0 | −1 | 0 |
| 1 | 0 | −1 | 0 | 1 | 0 | 1 | 0 | 1 | 0 | 1 | 0 |
| −1 | 0 | −1 | 0 | −1 | 0 | 1 | 0 | −1 | 0 | −1 | 0 |
| 1 | 0 | 1 | 0 | −1 | 0 | 1 | 0 | 1 | 0 | −1 | 0 |
| 1 | 0 | 1 | 0 | −1 | 0 | 1 | 0 | −1 | 0 | −1 | 0 |
| −1 | 0 | 1 | 0 | −1 | 0 | −1 | 0 | −1 | 0 | −1 | 0 |
| 1 | 0 | −1 | 0 | 1 | 0 | 1 | 0 | −1 | 0 | 1 | 0 |
| 1 | 0 | 1 | 0 | −1 | 0 | −1 | 0 | 1 | 0 | 1 | 0 |
| 1 | 0 | −1 | 0 | 1 | 0 | −1 | 0 | −1 | 0 | −1 | 0 |
| 1 | 0 | −1 | 0 | −1 | 0 | −1 | 0 | −1 | 0 | 1 | 0 |
| 1 | 0 | 1 | 0 | −1 | 0 | −1 | 0 | −1 | 0 | −1 | 0 |
| 1 | 0 | 1 | 0 | 1 | 0 | −1 | 0 | 1 | 0 | 1 | 0 |
| −1 | 0 | −1 | 0 | 1 | 0 | −1 | 0 | −1 | 0 | −1 | 0 |
| 1 | 0 | 1 | 0 | 1 | 0 | 1 | 0 | −1 | 0 | 1 | 0 |
| 1 | 0 | 1 | 0 | −1 | 0 | 1 | 0 | −1 | 0 | −1 | 0 |
| 1 | 0 | −1 | 0 | 1 | 0 | 1 | 0 | −1 | 0 | 1 | 0 |
| 1 | 0 | 1 | 0 | −1 | 0 | −1 | 0 | 1 | 0 | 1 | 0 |

-continued

| | | | | | | | | | | | |
|---|---|---|---|---|---|---|---|---|---|---|---|
| 1 | 0 | −1 | 0 | 1 | 0 | 1 | 0 | −1 | 0 | 1 | 0 |
| −1 | 0 | −1 | 0 | −1 | 0 | 1 | 0 | −1 | 0 | −1 | 0 |
| −1 | 0 | 1 | 0 | 1 | 0 | −1 | 0 | 1 | 0 | 1 | 0 |
| −1 | 0 | 1 | 0 | −1 | 0 | −1 | 0 | −1 | 0 | 1 | 0 |
| −1 | 0 | −1 | 0 | 1 | 0 | −1 | 0 | 1 | 0 | −1 | 0 |
| 1 | 0 | 1 | 0 | −1 | 0 | 1 | 0 | 1 | 0 | 1 | 0 |
| −1 | 0 | −1 | 0 | 1 | 0 | 1 | 0 | 1 | 0 | −1 | 0 |
| −1 | 0 | −1 | 0 | 1 | 0 | 1 | 0 | 1 | 0 | 1 | 0 |
| −1 | 0 | 1 | 0 | 1 | 0 | 1 | 0 | −1 | 0 | 1 | 0 |
| −1 | 0 | −1 | 0 | −1 | 0 | −1 | 0 | 1 | 0 | 1 | 0 |
| 1 | 0 | −1 | 0 | 1 | 0 | 1 | 0 | −1 | 0 | −1 | 0 |
| 1 | 0 | −1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| 1 | 0 | −1 | 0 | 1 | 0 | 1 | 0 | −1 | 0 | 1 | 0 |
| −1 | 0 | −1 | 0 | 1 | 0 | −1 | 0 | −1 | 0 | −1 | 0 |
| 1 | 0 | 1 | 0 | −1 | 0 | −1 | 0 | −1 | 0 | 1 | 0 |
| −1 | 0 | −1 | 0 | 1 | 0 | −1 | 0 | 1 | 0 | 1 | 0 |
| 1 | 0 | −1 | 0 | 1 | 0 | 1 | 0 | 1 | 0 | 1 | 0 |
| −1 | 0 | −1 | 0 | −1 | 0 | −1 | 0 | 1 | 0 | 1 | 0 |
| 1 | 0 | −1 | 0 | 1 | 0 | 1 | 0 | −1 | 0 | −1 | 0 |
| 1 | 0 | −1 | 0 | −1 | 0 | −1 | 0 | 1 | 0 | 1 | 0 |
| −1 | 0 | 1 | 0 | −1 | 0 | 1 | 0 | 1 | 0 | 1 | 0 |
| −1 | 0 | 1 | 0 | 1 | 0 | 0 | 0 | 0 | 0 | 0 | 0 |
| 0 | 0 | 0 | 0} | | | | | | | | |

or

2×EHT_LTF_320 M=

{$0_{12}$, LTF2×80 M_part1, LTF2×80 M_part2, LTF2×80 M_part3, LTF2×80 M_part4, LTF2×80 M_part5, $0_{23}$, (−1)*LTF2×80 M_part1, LTF2×80 M_part2, LTF2×80 M_part3, LTF2×80 M_part4, (−1)*LTF2×80 M_part5, $0_{23}$, LTF2×80 M_part1, LTF2×80 M_part2, LTF2×80 M_part3, LTF2×80 M_part4, (−1)*LTF2×80 M_part5, $0_{23}$, LTF2×80 M_part1, (−1)*LTF2×80 M_part2, (−1)*LTF2×80 M_part3, (−1)*LTF2×80 M_part4, (−1)*LTF2×80 M_part5, $0_{11}$}, wherein:

LTF2×80 M_part1=LTF2×80 M_2(1:242);

LTF2×80 M_part2=LTF2×80 M_2(243:484);

LTF2×80 M_part3=LTF2×80 M_2(485:517);

LTF2×80 M_part4=LTF2×80 M_2(518:759);

LTF2×80 M_part5=LTF2×80 M_2(760:1001); and

LTF2×80 M_2 is a sequence obtained after the 12 leftmost 0s and the 11 rightmost 0s are removed from a sequence 7 in a specific implementation of the specification.

10. The communication apparatus according to claim 6, wherein in response to the LTF being a 4×LTF sequence in an 80 MHz, the 4×LTF sequence in the 80 MHz is:

| | | | | | | | | | | | |
|---|---|---|---|---|---|---|---|---|---|---|---|
| {0 | 0 | 0 | 0 | 0 | 0 | 0 | 0 | 0 | 0 | 0 | 0 |
| 1 | 1 | 1 | 1 | 1 | −1 | −1 | 1 | −1 | | | |
| −1 | 1 | 1 | −1 | 1 | −1 | 1 | −1 | −1 | −1 | −1 | −1 |
| 1 | 1 | −1 | −1 | −1 | 1 | 1 | −1 | 1 | | | |
| −1 | 1 | 1 | 1 | 1 | 1 | 1 | −1 | −1 | 1 | −1 | −1 |
| 1 | 1 | −1 | 1 | −1 | 1 | 1 | 1 | 1 | 1 | 1 | −1 |
| −1 | 1 | 1 | 1 | −1 | −1 | 1 | −1 | 1 | −1 | −1 | −1 |
| −1 | −1 | −1 | 1 | 1 | −1 | 1 | 1 | −1 | −1 | 1 | −1 |
| 1 | −1 | 1 | 1 | 1 | 1 | 1 | −1 | −1 | 1 | 1 | 1 |
| −1 | −1 | 1 | −1 | 1 | | | | | | | |
| −1 | 1 | 1 | 1 | 1 | 1 | −1 | −1 | 1 | −1 | −1 | 1 |
| 1 | −1 | 1 | −1 | 1 | 1 | 1 | 1 | 1 | 1 | −1 | −1 |
| 1 | 1 | 1 | −1 | −1 | 1 | −1 | 1 | −1 | −1 | 1 | 1 |
| −1 | 1 | 1 | −1 | 1 | −1 | 1 | | | | | |
| −1 | −1 | −1 | −1 | −1 | 1 | 1 | −1 | −1 | −1 | 1 | 1 |
| −1 | 1 | −1 | 1 | 1 | 1 | 1 | 1 | 1 | | | |
| −1 | −1 | 1 | −1 | −1 | 1 | 1 | −1 | 1 | −1 | 1 | 1 |
| 1 | 1 | 1 | 1 | −1 | −1 | 1 | 1 | 1 | | | |
| −1 | −1 | 1 | −1 | 1 | −1 | 1 | 1 | 1 | 1 | 1 | −1 |
| −1 | 1 | −1 | −1 | 1 | 1 | −1 | 1 | −1 | 1 | −1 | −1 |
| −1 | −1 | −1 | 1 | 1 | −1 | −1 | −1 | 1 | 1 | −1 | 1 |
| −1 | 1 | −1 | −1 | −1 | −1 | −1 | 1 | 1 | −1 | 1 | 1 |

-continued

| | | | | | | | | | | | |
|---|---|---|---|---|---|---|---|---|---|---|---|
| −1 | −1 | 1 | −1 | 1 | −1 | −1 | −1 | −1 | −1 | −1 | 1 |
| 1 | −1 | −1 | −1 | 1 | 1 | −1 | 1 | −1 | −1 | −1 | −1 |
| −1 | 1 | 1 | −1 | 1 | 1 | −1 | −1 | 1 | −1 | 1 | −1 |
| 1 | 1 | 1 | 1 | 1 | −1 | −1 | 1 | 1 | 1 | −1 | −1 |
| 1 | −1 | 1 | −1 | −1 | −1 | −1 | −1 | −1 | 1 | 1 | −1 |
| 1 | 1 | −1 | −1 | 1 | −1 | 1 | −1 | −1 | −1 | −1 | −1 |
| −1 | 1 | 1 | −1 | −1 | −1 | 1 | 1 | −1 | 1 | −1 | 1 |
| 1 | 1 | 1 | 1 | 1 | −1 | −1 | 1 | −1 | −1 | 1 | 1 |
| −1 | 1 | −1 | 1 | −1 | −1 | −1 | −1 | −1 | 1 | 1 | −1 |
| −1 | −1 | 1 | 1 | −1 | 1 | −1 | 1 | −1 | −1 | −1 | −1 |
| −1 | 1 | −1 | −1 | 1 | 1 | −1 | | | | | |
| −1 | 1 | −1 | 1 | −1 | −1 | −1 | −1 | −1 | −1 | 1 | 1 |
| −1 | −1 | −1 | 1 | 1 | 1 | 1 | 1 | −1 | | | |
| −1 | 1 | −1 | −1 | 1 | 1 | −1 | 1 | −1 | 1 | −1 | −1 |
| −1 | −1 | −1 | 1 | 1 | −1 | −1 | −1 | 1 | 1 | −1 | 1 |
| −1 | 1 | 1 | 1 | 1 | 1 | 1 | −1 | −1 | 1 | −1 | −1 |
| 1 | 1 | −1 | 1 | −1 | 1 | 1 | 1 | 1 | 1 | 1 | −1 |
| −1 | 1 | 1 | 1 | −1 | −1 | 1 | −1 | 1 | −1 | 1 | 1 |
| 1 | 1 | 1 | −1 | −1 | 1 | −1 | −1 | 1 | 1 | −1 | 1 |
| −1 | 1 | −1 | −1 | −1 | −1 | −1 | 1 | 1 | −1 | −1 | −1 |
| 1 | 1 | −1 | 1 | −1 | 1 | −1 | −1 | −1 | −1 | −1 | 1 |
| 1 | −1 | 1 | 1 | −1 | −1 | 1 | −1 | 1 | −1 | −1 | −1 |
| −1 | | | | | | | | | | | |
| −1 | −1 | 1 | 1 | −1 | −1 | −1 | 1 | 1 | −1 | 1 | −1 |
| 1 | 0 | 0 | 0 | 0 | 0 | 1 | 1 | 1 | 1 | 1 | −1 |
| −1 | 1 | −1 | −1 | 1 | 1 | −1 | 1 | −1 | 1 | −1 | −1 |
| −1 | −1 | −1 | 1 | 1 | −1 | −1 | | | | | |
| −1 | 1 | 1 | −1 | 1 | −1 | 1 | 1 | 1 | 1 | 1 | 1 |
| −1 | −1 | 1 | −1 | −1 | 1 | 1 | −1 | 1 | | | |
| −1 | 1 | 1 | 1 | 1 | 1 | 1 | −1 | −1 | 1 | 1 | 1 |
| −1 | −1 | 1 | −1 | 1 | −1 | −1 | −1 | −1 | | | |
| −1 | −1 | 1 | 1 | −1 | 1 | 1 | −1 | −1 | 1 | −1 | 1 |
| −1 | 1 | 1 | 1 | 1 | 1 | −1 | −1 | 1 | 1 | 1 | −1 |
| −1 | 1 | −1 | 1 | −1 | 1 | 1 | 1 | 1 | 1 | −1 | −1 |
| 1 | −1 | −1 | 1 | 1 | −1 | 1 | | | | | |
| −1 | 1 | 1 | 1 | 1 | 1 | 1 | −1 | −1 | 1 | 1 | 1 |
| −1 | −1 | 1 | −1 | 1 | −1 | −1 | 1 | −1 | | | |
| −1 | 1 | 1 | −1 | 1 | −1 | 1 | −1 | −1 | −1 | −1 | −1 |
| 1 | 1 | −1 | −1 | 1 | 1 | 1 | −1 | 1 | | | |
| −1 | 1 | 1 | 1 | 1 | 1 | 1 | −1 | −1 | 1 | −1 | −1 |
| 1 | 1 | −1 | 1 | −1 | 1 | 1 | 1 | 1 | 1 | 1 | −1 |
| −1 | 1 | 1 | 1 | −1 | −1 | 1 | −1 | 1 | −1 | 1 | 1 |
| 1 | 1 | 1 | −1 | −1 | 1 | −1 | | | | | |
| −1 | 1 | 1 | −1 | 1 | −1 | 1 | −1 | −1 | −1 | −1 | −1 |
| 1 | 1 | −1 | −1 | −1 | 1 | 1 | −1 | 1 | | | |
| −1 | 1 | −1 | −1 | −1 | −1 | −1 | 1 | 1 | −1 | 1 | 1 |
| −1 | −1 | 1 | −1 | 1 | −1 | −1 | −1 | −1 | | | |
| −1 | −1 | 1 | 1 | −1 | −1 | −1 | 1 | 1 | −1 | 1 | −1 |
| 1 | 1 | 1 | 1 | −1 | −1 | 1 | −1 | −1 | 1 | 1 | −1 |
| 1 | −1 | 1 | −1 | −1 | −1 | −1 | −1 | 1 | 1 | −1 | −1 |
| −1 | 1 | 1 | −1 | 1 | −1 | 1 | 1 | 1 | 1 | 1 | 1 |
| −1 | −1 | 1 | −1 | −1 | 1 | 1 | −1 | 1 | −1 | 1 | 1 |
| 1 | 1 | 1 | 1 | −1 | | | | | | | |
| −1 | 1 | 1 | 1 | −1 | −1 | 1 | −1 | 1 | −1 | −1 | −1 |
| −1 | −1 | −1 | 1 | 1 | −1 | 1 | 1 | −1 | | | |
| −1 | 1 | −1 | 1 | −1 | 1 | 1 | 1 | 1 | 1 | −1 | −1 |
| 1 | 1 | 1 | −1 | −1 | 1 | −1 | 1 | −1 | 1 | 1 | 1 |
| 1 | 1 | −1 | −1 | 1 | −1 | −1 | 1 | 1 | −1 | 1 | −1 |
| 1 | 1 | 1 | 1 | 1 | 1 | −1 | | | | | |
| −1 | 1 | 1 | 1 | −1 | −1 | −1 | −1 | −1 | 1 | 1 | −1 |
| 1 | 1 | −1 | −1 | 1 | −1 | 1 | −1 | 1 | 1 | 1 | 1 |
| 1 | −1 | −1 | 1 | 1 | 1 | −1 | −1 | 1 | −1 | 1 | −1 |
| −1 | −1 | −1 | −1 | −1 | 1 | 1 | | | | | |
| −1 | 1 | 1 | −1 | −1 | 1 | −1 | 1 | −1 | −1 | −1 | −1 |
| −1 | −1 | 1 | 1 | −1 | −1 | −1 | 1 | 1 | | | |
| −1 | 1 | −1 | 1 | −1 | −1 | −1 | −1 | −1 | 1 | 1 | −1 |
| 1 | 1 | −1 | −1 | 1 | −1 | 1 | −1 | 1 | 1 | 1 | 1 |
| 1 | −1 | −1 | 1 | 1 | 1 | −1 | −1 | 1 | −1 | 1 | −1 |
| 1 | 1 | 1 | 1 | 1 | −1 | −1 | 1 | −1 | −1 | 1 | 1 |
| −1 | 1 | −1 | 1 | 1 | 1 | 1 | 1 | 1 | −1 | −1 | 1 |
| 1 | 1 | −1 | −1 | 1 | | | | | | | |
| −1 | 1 | −1 | 0 | 0 | 0 | 0 | 0 | 0 | 0 | 0 | 0 |
| 0 | 0}. | | | | | | | | | | |

11. A computer-implemented method for physical layer protocol data unit (PPDU) transmission, the computer-implemented method comprising:

generating a PPDU, wherein the PPDU comprises a long training field (LTF) sequence; and sending the PPDU, wherein in response to the LTF being a 2×LTF sequence in an 80 MHZ, the 2×LTF sequence in the 80 MHz is:

| | | | | | | | | | | | |
|---|---|---|---|---|---|---|---|---|---|---|---|
| {00 | 0 | 0 | 0 | 0 | 0 | 0 | 0 | 0 | 0 | 0 | 1 |
| 0 | 1 | 0 | −1 | 0 | 1 | 0 | 1 | 0 | 1 | 0 | −1 |
| 0 | 1 | 0 | 1 | 0 | 1 | 0 | 1 | 0 | −1 | 0 | −1 |
| 0 | −1 | 0 | 1 | 0 | −1 | 0 | −1 | 0 | 1 | 0 | 1 |
| 0 | −1 | 0 | 1 | 0 | 1 | 0 | 1 | 0 | −1 | 0 | −1 |
| 0 | −1 | 0 | −1 | 0 | 1 | 0 | 1 | 0 | 1 | 0 | 1 |
| 0 | −1 | 0 | 1 | 0 | 1 | 0 | 1 | 0 | −1 | 0 | 1 |
| 0 | −1 | 0 | −1 | 0 | 1 | 0 | −1 | 0 | −1 | 0 | −1 |
| 0 | 1 | 0 | 1 | 0 | −1 | 0 | −1 | 0 | −1 | 0 | 1 |
| 0 | −1 | 0 | −1 | 0 | 1 | 0 | −1 | 0 | 1 | 0 | 1 |
| 0 | −1 | 0 | 1 | 0 | 1 | 0 | −1 | 0 | 1 | 0 | −1 |
| 0 | −1 | 0 | −1 | 0 | 1 | 0 | −1 | 0 | −1 | 0 | −1 |
| 0 | −1 | 0 | 1 | 0 | −1 | 0 | −1 | 0 | 1 | 0 | 1 |
| 0 | −1 | 0 | 1 | 0 | 1 | 0 | 1 | 0 | −1 | 0 | −1 |
| 0 | −1 | 0 | −1 | 0 | 1 | 0 | −1 | 0 | 1 | 0 | 1 |
| 0 | 1 | 0 | −1 | 0 | 1 | 0 | 1 | 0 | 1 | 0 | 1 |
| 0 | −1 | 0 | −1 | 0 | −1 | 0 | 1 | 0 | 1 | 0 | 1 |
| 0 | −1 | 0 | −1 | 0 | 1 | 0 | 1 | 0 | 1 | 0 | −1 |
| 0 | 1 | 0 | 1 | 0 | −1 | 0 | 1 | 0 | −1 | 0 | −1 |
| 0 | −1 | 0 | −1 | 0 | 1 | 0 | −1 | 0 | −1 | 0 | −1 |
| 0 | 1 | 0 | −1 | 0 | 1 | 0 | 1 | 0 | −1 | 0 | 1 |
| 0 | 1 | 0 | −1 | 0 | −1 | 0 | −1 | 0 | 1 | 0 | −1 |
| 0 | −1 | 0 | −1 | 0 | 1 | 0 | −1 | 0 | 1 | 0 | 1 |
| 0 | −1 | 0 | 1 | 0 | 1 | 0 | 1 | 0 | −1 | 0 | −1 |
| 0 | 1 | 0 | 1 | 0 | 1 | 0 | −1 | 0 | 1 | 0 | 1 |
| 0 | −1 | 0 | 1 | 0 | −1 | 0 | −1 | 0 | 1 | 0 | −1 |
| 0 | 1 | 0 | 1 | 0 | 1 | 0 | −1 | 0 | 1 | 0 | 1 |
| 0 | 1 | 0 | 1 | 0 | −1 | 0 | −1 | 0 | −1 | 0 | 1 |
| 0 | −1 | 0 | −1 | 0 | 1 | 0 | 1 | 0 | −1 | 0 | 1 |
| 0 | 1 | 0 | 1 | 0 | −1 | 0 | −1 | 0 | −1 | 0 | −1 |
| 0 | 1 | 0 | 1 | 0 | 1 | 0 | −1 | 0 | −1 | 0 | −1 |
| 0 | −1 | 0 | 1 | 0 | −1 | 0 | −1 | 0 | −1 | 0 | 1 |
| 0 | −1 | 0 | 1 | 0 | 1 | 0 | 1 | 0 | −1 | 0 | −1 |
| 0 | 1 | 0 | 1 | 0 | 1 | 0 | 1 | 0 | 1 | 0 | 1 |
| 0 | −1 | 0 | 1 | 0 | −1 | 0 | −1 | 0 | −1 | 0 | −1 |
| 0 | 1 | 0 | −1 | 0 | −1 | 0 | −1 | 0 | 1 | 0 | −1 |
| 0 | −1 | 0 | 1 | 0 | −1 | 0 | 1 | 0 | 1 | 0 | −1 |
| 0 | 1 | 0 | 1 | 0 | −1 | 0 | −1 | 0 | 1 | 0 | −1 |
| 0 | −1 | 0 | −1 | 0 | 1 | 0 | 1 | 0 | 1 | 0 | 1 |
| 0 | −1 | 0 | 1 | 0 | −1 | 0 | −1 | 0 | −1 | 0 | 1 |
| 0 | −1 | 0 | −1 | 0 | −1 | 0 | −1 | 0 | 1 | 0 | 1 |
| 0 | 1 | 0 | 1 | 0 | −1 | 0 | −1 | 0 | −1 | 0 | 1 |
| 0 | 1 | 0 | 1 | 0 | 0 | 0 | 0 | 0 | 0 | 0 | 1 |
| 0 | −1 | 0 | −1 | 0 | 1 | 0 | 1 | 0 | −1 | 0 | 1 |
| 0 | −1 | 0 | −1 | 0 | −1 | 0 | 1 | 0 | 1 | 0 | 1 |
| 0 | 1 | 0 | −1 | 0 | 1 | 0 | 1 | 0 | 1 | 0 | −1 |
| 0 | 1 | 0 | −1 | 0 | −1 | 0 | −1 | 0 | −1 | 0 | 1 |
| 0 | 1 | 0 | 1 | 0 | −1 | 0 | 1 | 0 | 1 | 0 | −1 |
| 0 | −1 | 0 | 1 | 0 | −1 | 0 | −1 | 0 | 1 | 0 | −1 |
| 0 | −1 | 0 | 1 | 0 | −1 | 0 | 1 | 0 | 1 | 0 | 1 |
| 0 | −1 | 0 | 1 | 0 | 1 | 0 | 1 | 0 | 1 | 0 | −1 |
| 0 | 1 | 0 | −1 | 0 | −1 | 0 | 1 | 0 | −1 | 0 | −1 |
| 0 | −1 | 0 | 1 | 0 | 1 | 0 | −1 | 0 | −1 | 0 | 1 |
| 0 | 1 | 0 | −1 | 0 | 1 | 0 | 1 | 0 | 1 | 0 | −1 |
| 0 | 1 | 0 | 1 | 0 | 1 | 0 | 1 | 0 | −1 | 0 | −1 |
| 0 | −1 | 0 | 1 | 0 | 1 | 0 | 1 | 0 | 1 | 0 | −1 |
| 0 | −1 | 0 | 1 | 0 | 1 | 0 | −1 | 0 | −1 | 0 | 1 |
| 0 | 1 | 0 | −1 | 0 | 1 | 0 | 1 | 0 | 1 | 0 | −1 |
| 0 | −1 | 0 | −1 | 0 | −1 | 0 | 1 | 0 | −1 | 0 | −1 |
| 0 | −1 | 0 | 1 | 0 | −1 | 0 | 1 | 0 | 1 | 0 | −1 |
| 0 | 1 | 0 | −1 | 0 | −1 | 0 | 1 | 0 | −1 | 0 | −1 |
| 0 | −1 | 0 | 1 | 0 | 1 | 0 | −1 | 0 | −1 | 0 | −1 |
| 0 | 1 | 0 | −1 | 0 | −1 | 0 | 1 | 0 | −1 | 0 | 1 |
| 0 | 1 | 0 | 1 | 0 | −1 | 0 | 1 | 0 | 1 | 0 | 1 |
| 0 | −1 | 0 | 1 | 0 | −1 | 0 | 1 | 0 | 1 | 0 | −1 |
| 0 | 1 | 0 | −1 | 0 | −1 | 0 | −1 | 0 | 1 | 0 | −1 |
| 0 | −1 | 0 | −1 | 0 | −1 | 0 | 1 | 0 | −1 | 0 | 1 |
| 0 | 1 | 0 | −1 | 0 | 1 | 0 | 1 | 0 | 1 | 0 | −1 |
| 0 | −1 | 0 | 1 | 0 | 1 | 0 | 1 | 0 | −1 | 0 | −1 |
| 0 | −1 | 0 | 1 | 0 | 1 | 0 | 1 | 0 | 1 | 0 | −1 |
| 0 | 1 | 0 | 1 | 0 | 1 | 0 | −1 | 0 | 1 | 0 | −1 |
| 0 | −1 | 0 | −1 | 0 | −1 | 0 | 1 | 0 | 1 | 0 | 1 |
| 0 | −1 | 0 | 1 | 0 | 1 | 0 | −1 | 0 | −1 | 0 | 1 |
| 0 | −1 | 0 | −1 | 0 | 1 | 0 | −1 | 0 | 1 | 0 | −1 |
| 0 | −1 | 0 | −1 | 0 | 1 | 0 | −1 | 0 | 1 | 0 | 1 |
| 0 | −1 | 0 | 1 | 0 | 1 | 0 | −1 | 0 | 1 | 0 | −1 |

-continued

| | | | | | | | | | | | |
|---|---|---|---|---|---|---|---|---|---|---|---|
| 0 | −1 | 0 | 1 | 0 | −1 | 0 | −1 | 0 | −1 | 0 | 1 |
| 0 | 1 | 0 | −1 | 0 | −1 | 0 | −1 | 0 | 1 | 0 | −1 |
| 0 | −1 | 0 | 1 | 0 | −1 | 0 | 1 | 0 | 1 | 0 | 1 |
| 0 | −1 | 0 | 1 | 0 | 1 | 0 | 1 | 0 | 1 | 0 | −1 |
| 0 | −1 | 0 | −1 | 0 | −1 | 0 | 1 | 0 | 1 | 0 | 1 |
| 0 | −1 | 0 | 1 | 0 | 1 | 0 | −1 | 0 | −1 | 0 | 1 |
| 0 | −1 | 0 | −1 | 0 | −1 | 0 | 1 | 0 | 1 | 0 | 1 |
| 0 | 1 | 0 | −1 | 0 | 1 | 0 | 1 | 0 | 1 | 0 | −1 |
| 0 | 1 | 0 | 1 | 0 | 0 | 0 | 0 | 0 | 0 | 0 | 0 |
| 0 | 0 | 0}; | | | | | | | | | |

| | | | | | | | | | | | |
|---|---|---|---|---|---|---|---|---|---|---|---|
| {0 | 0 | 0 | 0 | 0 | 0 | 0 | 0 | 0 | 0 | 0 | 0 |
| −1 | 0 | −1 | 0 | 1 | 0 | 1 | 0 | 1 | 0 | −1 | 0 |
| −1 | 0 | 1 | 0 | −1 | 0 | 1 | 0 | −1 | 0 | 1 | 0 |
| 1 | 0 | 1 | 0 | 1 | 0 | 1 | 0 | 1 | 0 | 1 | 0 |
| −1 | 0 | −1 | 0 | 1 | 0 | −1 | 0 | −1 | 0 | 1 | 0 |
| 1 | 0 | −1 | 0 | 1 | 0 | −1 | 0 | 1 | 0 | 1 | 0 |
| 1 | 0 | 1 | 0 | −1 | 0 | −1 | 0 | 1 | 0 | 1 | 0 |
| 1 | 0 | −1 | 0 | −1 | 0 | 1 | 0 | −1 | 0 | 1 | 0 |
| −1 | 0 | 1 | 0 | −1 | 0 | −1 | 0 | −1 | 0 | −1 | 0 |
| −1 | 0 | −1 | 0 | 1 | 0 | 1 | 0 | −1 | 0 | 1 | 0 |
| 1 | 0 | −1 | 0 | −1 | 0 | 1 | 0 | −1 | 0 | 1 | 0 |
| −1 | 0 | −1 | 0 | −1 | 0 | −1 | 0 | 1 | 0 | 1 | 0 |
| −1 | 0 | −1 | 0 | −1 | 0 | 1 | 0 | 1 | 0 | −1 | 0 |
| 1 | 0 | −1 | 0 | 1 | 0 | −1 | 0 | −1 | 0 | −1 | 0 |
| −1 | 0 | −1 | 0 | −1 | 0 | −1 | 0 | 1 | 0 | 1 | 0 |
| −1 | 0 | 1 | 0 | 1 | 0 | −1 | 0 | −1 | 0 | 1 | 0 |
| −1 | 0 | 1 | 0 | 1 | 0 | 1 | 0 | 1 | 0 | 1 | 0 |
| −1 | 0 | −1 | 0 | 1 | 0 | 1 | 0 | 1 | 0 | −1 | 0 |
| −1 | 0 | 1 | 0 | −1 | 0 | 1 | 0 | −1 | 0 | 1 | 0 |
| −1 | 0 | −1 | 0 | −1 | 0 | −1 | 0 | −1 | 0 | −1 | 0 |
| 1 | 0 | 1 | 0 | −1 | 0 | 1 | 0 | 1 | 0 | −1 | 0 |
| 1 | 0 | −1 | 0 | −1 | 0 | −1 | 0 | −1 | 0 | 1 | 0 |
| 1 | 0 | −1 | 0 | −1 | 0 | −1 | 0 | 1 | 0 | 1 | 0 |
| −1 | 0 | 1 | 0 | −1 | 0 | 1 | 0 | −1 | 0 | −1 | 0 |
| −1 | 0 | −1 | 0 | −1 | 0 | −1 | 0 | −1 | 0 | 1 | 0 |
| −1 | 0 | −1 | 0 | 1 | 0 | 1 | 0 | −1 | 0 | −1 | 0 |
| 1 | 0 | −1 | 0 | 1 | 0 | −1 | 0 | −1 | 0 | −1 | 0 |
| −1 | 0 | 1 | 0 | 1 | 0 | −1 | 0 | −1 | 0 | −1 | 0 |
| 1 | 0 | 1 | 0 | −1 | 0 | 1 | 0 | −1 | 0 | 1 | 0 |
| −1 | 0 | 1 | 0 | 1 | 0 | 1 | 0 | 1 | 0 | 1 | 0 |
| 1 | 0 | −1 | 0 | −1 | 0 | 1 | 0 | −1 | 0 | −1 | 0 |
| 1 | 0 | 1 | 0 | −1 | 0 | 1 | 0 | −1 | 0 | −1 | 0 |
| −1 | 0 | −1 | 0 | −1 | 0 | 1 | 0 | 1 | 0 | −1 | 0 |
| −1 | 0 | −1 | 0 | 1 | 0 | 1 | 0 | −1 | 0 | 1 | 0 |
| −1 | 0 | 1 | 0 | −1 | 0 | −1 | 0 | −1 | 0 | −1 | 0 |
| −1 | 0 | −1 | 0 | −1 | 0 | 1 | 0 | 1 | 0 | −1 | 0 |
| 1 | 0 | 1 | 0 | −1 | 0 | −1 | 0 | 1 | 0 | −1 | 0 |
| 1 | 0 | 1 | 0 | 1 | 0 | 1 | 0 | 1 | 0 | −1 | 0 |
| −1 | 0 | 1 | 0 | 1 | 0 | 1 | 0 | −1 | 0 | −1 | 0 |
| 1 | 0 | −1 | 0 | 1 | 0 | −1 | 0 | 1 | 0 | −1 | 0 |
| −1 | 0 | −1 | 0 | −1 | 0 | −1 | 0 | −1 | 0 | 1 | 0 |
| 1 | 0 | −1 | 0 | 1 | 0 | | 0 | −1 | 0 | −1 | 0 |
| 1 | 0 | −1 | 0 | 1 | 0 | 0 | 0 | 0 | 0 | 0 | 0 |
| −1 | 0 | −1 | 0 | −1 | 0 | −1 | 0 | 1 | 0 | 1 | 0 |

-continued

| | | | | | | | | | | | |
|---|---|---|---|---|---|---|---|---|---|---|---|
| −1 | 0 | −1 | 0 | −1 | 0 | 1 | 0 | 1 | 0 | −1 | 0 |
| 1 | 0 | −1 | 0 | 1 | 0 | −1 | 0 | −1 | 0 | −1 | 0 |
| −1 | 0 | −1 | 0 | −1 | 0 | −1 | 0 | 1 | 0 | 1 | 0 |
| −1 | 0 | 1 | 0 | 1 | 0 | −1 | 0 | −1 | 0 | 1 | 0 |
| −1 | 0 | 1 | 0 | −1 | 0 | −1 | 0 | −1 | 0 | −1 | 0 |
| 1 | 0 | 1 | 0 | −1 | 0 | −1 | 0 | −1 | 0 | 1 | 0 |
| 1 | 0 | −1 | 0 | 1 | 0 | −1 | 0 | 1 | 0 | −1 | 0 |
| 1 | 0 | 1 | 0 | 1 | 0 | 1 | 0 | 1 | 0 | 1 | 0 |
| −1 | 0 | −1 | 0 | 1 | 0 | −1 | 0 | −1 | 0 | −1 | 0 |
| 1 | 0 | −1 | 0 | 1 | 0 | −1 | 0 | 1 | 0 | 1 | 0 |
| 1 | 0 | 1 | 0 | −1 | 0 | −1 | 0 | 1 | 0 | 1 | 0 |
| 1 | 0 | −1 | 0 | −1 | 0 | 1 | 0 | −1 | 0 | 1 | 0 |
| −1 | 0 | 1 | 0 | 1 | 0 | 1 | 0 | 1 | 0 | 1 | 0 |
| 1 | 0 | 1 | 0 | −1 | 0 | −1 | 0 | 1 | 0 | −1 | 0 |
| −1 | 0 | 1 | 0 | 1 | 0 | −1 | 0 | 1 | 0 | −1 | 0 |
| −1 | 0 | −1 | 0 | −1 | 0 | −1 | 0 | 1 | 0 | 1 | 0 |
| −1 | 0 | −1 | 0 | −1 | 0 | 1 | 0 | 1 | 0 | −1 | 0 |
| 1 | 0 | −1 | 0 | 1 | 0 | −1 | 0 | 1 | 0 | 1 | 0 |
| 1 | 0 | 1 | 0 | 1 | 0 | 1 | 0 | −1 | 0 | −1 | 0 |
| 1 | 0 | −1 | 0 | −1 | 0 | 1 | 0 | 1 | 0 | −1 | 0 |
| 1 | 0 | −1 | 0 | 1 | 0 | −1 | 0 | −1 | 0 | 1 | 0 |
| 1 | 0 | 1 | 0 | −1 | 0 | −1 | 0 | 1 | 0 | −1 | 0 |
| 1 | 0 | −1 | 0 | 1 | 0 | 1 | 0 | 1 | 0 | 1 | 0 |
| 1 | 0 | 1 | 0 | 1 | 0 | −1 | 0 | −1 | 0 | 1 | 0 |
| −1 | 0 | −1 | 0 | 1 | 0 | 1 | 0 | −1 | 0 | 1 | 0 |
| −1 | 0 | 1 | 0 | 1 | 0 | 1 | 0 | 1 | 0 | −1 | 0 |
| −1 | 0 | 1 | 0 | 1 | 0 | 1 | 0 | −1 | 0 | −1 | 0 |
| 1 | 0 | −1 | 0 | 1 | 0 | −1 | 0 | 1 | 0 | −1 | 0 |
| −1 | 0 | −1 | 0 | −1 | 0 | −1 | 0 | −1 | 0 | 1 | 0 |
| 1 | 0 | −1 | 0 | 1 | 0 | 1 | 0 | −1 | 0 | −1 | 0 |
| 1 | 0 | −1 | 0 | 1 | 0 | 1 | 0 | 1 | 0 | 1 | 0 |
| 1 | 0 | −1 | 0 | −1 | 0 | 1 | 0 | 1 | 0 | 1 | 0 |
| −1 | 0 | −1 | 0 | 1 | 0 | −1 | 0 | 1 | 0 | −1 | 0 |
| 1 | 0 | 1 | 0 | 1 | 0 | 1 | 0 | 1 | 0 | 1 | 0 |
| 1 | 0 | −1 | 0 | −1 | 0 | 1 | 0 | −1 | 0 | −1 | 0 |
| 1 | 0 | 1 | 0 | −1 | 0 | 1 | 0 | −1 | 0 | −1 | 0 |
| −1 | 0 | −1 | 0 | −1 | 0 | 1 | 0 | 1 | 0 | −1 | 0 |
| −1 | 0 | −1 | 0 | 1 | 0 | 1 | 0 | −1 | 0 | 1 | 0 |
| −1 | 0 | 1 | 0 | −1 | 0 | 1 | 0 | 1 | 0 | 1 | 0 |
| 1 | 0 | 1 | 0 | 1 | 0 | −1 | 0 | −1 | 0 | 1 | 0 |
| −1 | 0 | −1 | 0 | 1 | 0 | 0 | 0 | 0 | 0 | 0 | 0 |
| 0 | 0 | 0 | 0}; | | | | | | | | |

{0 0 0 0 0 0 0 0 0 0 0 0 −1 0 −1 0 1 0 1 0 1 0 −1 0 −1 0 1 0 −1 0 1 0 −1 0 1 0 1 0 1 0 1
0 1 0 1 0 1 0 −1 0 −1 0 1 0 −1 0 −1 0 1 0 1 0 −1 0 1 0 −1 0 1 0 1 0 1 0 1 0 −1 0 −1 0 1 0 1 0 1 0 −1
0 −1 0 1 0 −1 0 1 0 −1 0 1 0 −1 0 −1 0 −1 0 −1 0 −1 0 −1 0 1 0 1 0 −1 0 1 0 1 0 −1 0 −1 0 1 0 −1 0
1 0 −1 0 −1 0 −1 0 −1 0 1 0 1 0 −1 0 −1 0 −1 0 1 0 1 0 −1 0 1 0 −1 0 1 0 −1 0 −1 0 −1 0 −1 0 −1 0
−1 0 −1 0 1 0 1 0 −1 0 1 0 1 0 −1 0 −1 0 1 0 −1 0 1 0 1 0 1 0 1 0 1 0 −1 0 −1 0 1 0 1 0 1 0 −1 0 −1 0
1 0 −1 0 1 0 −1 0 1 0 −1 0 −1 0 −1 0 −1 0 −1 0 −1 0 1 0 1 0 −1 0 1 0 1 0 −1 0 −1 0 1 0–1 0 −1 0 −1
0 1 0 1 0 −1 0 −1 0 −1 0 1 0 1 0 −1 0 1 0 −1 0 1 0 −1 0 −1 0 −1 0 −1 0 −1 0 −1 0 −1 0 1 0 1 0 −1 0
1 0 1 0 −1 0 −1 0 1 0 −1 0 1 0 −1 0 −1 0 −1 0 −1 0 1 0 1 0 −1 0 −1 0 −1 0 1 0 1 0 −1 0 1 0 −1 0 1 0
−1 0 1 0 1 0 1 0 1 0 1 0 1 0 −1 0 −1 0 −1 0 −1 0 −1 0 1 0 1 0 −1 0 1 0 −1 0 −1 0 −1 0 −1 0 −1 0 1 0
1 0 −1 0 −1 0 −1 0 1 0 1 0 −1 0 1 0 −1 0 1 0 −1 0 −1 0 −1 0 −1 0 −1 0 −1 0 −1 0 1 0 1 0 −1 0 1 0 1
0 −1 0 −1 0 1 0 −1 0 1 0 1 0 1 0 1 0 1 0 −1 0 −1 0 1 0 1 0 1 0 −1 0 −1 0 1 0 −1 0 1 0 −1 0 1 0 −1 0
−1 0 −1 0 −1 0 −1 0 −1 0 1 0 1 0 −1 0 1 0 1 0 −1 0 −1 0 1 0 −1 0 1 0 0 0 0 0 0 0 −1 0 −1 0 −1 0 −1
0 1 0 1 0 −1 0 −1 0 −1 0 1 0 1 0 −1 0 1 0 −1 0 1 0 −1 0 −1 0 −1 0 −1 0 −1 0 −1 0 −1 0 1 0 1 0 −1 0
1 0 1 0 −1 0 −1 0 1 0 −1 0 1 0 −1 0 −1 0 −1 0 −1 0 1 0 1 0 −1 0 −1 0 −1 0 1 0 1 0 −1 0 1 0 −1 0 1 0
−1 0 1 0 1 0 1 0 1 0 1 0 1 0 −1 0 −1 0 1 0 −1 0 −1 0 1 0 1 0 −1 0 1 0 −1 0 1 0 1 0 1 0 1 0 −1 0 −1 0
1 0 −1 0 1 0 −1 0 −1 0 1 0 −1 0 1 0 −1 0 1 0 1 0 1 0 1 0 1 0 1 0 1 0 −1 0 −1 0 1 0 −1 0 −1 0 1 0 1 0
−1 0 1 0 −1 0 −1 0 −1 0 −1 0 −1 0 1 0 1 0 −1 0 −1 0 −1 0 1 0 1 0 −1 0 1 0 −1 0 1 0 −1 0 1 0 1 0 1 0

-continued 1 0 1 0 1 0 –1 0 –1 0 1 0 –1 0 –1 0 1 0 1 0 –1 0 1 0 –1 0 1 0 –1 0 –1 0 1 0 1 0 1 0 –1 0 –1 0 1 0 –1
0 1 0 –1 0 1 0 1 0 1 0 1 0 1 0 1 0 –1 0 –1 0 1 0 –1 0 –1 0 1 0 1 0 –1 0 1 0 –1 0 1 0 1 0 1 0 1 0
–1 0 –1 0 1 0 1 0 1 0 –1 0 –1 0 1 0 –1 0 1 0 –1 0 1 0 –1 0 –1 0 –1 0 –1 0 –1 0 –1 0 1 0 1 0 –1 0 1
0 1 0 –1 0 –1 0 1 0 –1 0 1 0 1 0 1 0 1 0 1 0 –1 0 –1 0 1 0 1 0 1 0 –1 0 –1 0 1 0 –1 0 1 0 –1 0 1 0 1
0 1 0 1 0 1 0 1 0 1 0 –1 0 –1 0 1 0 –1 0 –1 0 1 0 1 0 –1 0 1 0 –1 0 –1 0 –1 0 –1 0 –1 0 1 0 1 0 –1 0
–1 0 –1 0 1 0 1 0 –1 0 1 0 –1 0 1 0 –1 0 1 0 1 0 1 0 1 0 1 0 1 0 –1 0 –1 0 1 0 –1 0 –1 0 1 0 0 0 0 0
0 0 0 0 0 0}; or {0 0 0 0 0 0 0 0 0 0 0 0 –1 0 –1 0 1 0 1 0 1 0 –1 0 –1 0 1 0 –1 0 1 0 –1 0 1 0 1 0 1 0 1 0 1 0 1
0 1 0 –1 0 –1 0 1 0 –1 0 –1 0 1 0 1 0 –1 0 1 0 –1 0 1 0 1 0 1 0 1 0 –1 0 –1 0 1 0 1 0 1 0 –1 0 –1 0
1 0 –1 0 1 0 –1 0 1 0 –1 0 –1 0 –1 0 –1 0 –1 0 –1 0 1 0 1 0 –1 0 1 0 1 0 –1 0 –1 0 1 0 –1 0 1 0 –1
0 –1 0 –1 0 –1 0 1 0 1 0 –1 0 –1 0 –1 0 1 0 1 0 –1 0 1 0 –1 0 1 0 –1 0 –1 0 –1 0 –1 0 –1 0 –1 0 –1
0 1 0 1 0 –1 0 1 0 1 0 –1 0 –1 0 1 0 –1 0 1 0 1 0 1 0 1 0 1 0 –1 0 –1 0 1 0 1 0 1 0 –1 0 –1 0 1 0 –1
0 1 0 –1 0 1 0 –1 0 –1 0 –1 0 –1 0 –1 0 –1 0 1 0 1 0 –1 0 1 0 1 0 –1 0 –1 0 –1 0 –1 0 –1 0 –1 0 1 0
1 0 –1 0 –1 0 –1 0 1 0 1 0 –1 0 1 0 –1 0 1 0 –1 0 –1 0 –1 0 –1 0 –1 0 –1 0 –1 0 1 0 1 0 –1 0 1 0 1
0 – 1 0 –1 0 1 0 –1 0 1 0 –1 0 –1 0 –1 0 –1 0 1 0 1 0 –1 0 –1 0 –1 0 1 0 1 0 –1 0 1 0 –1 0 1 0 –1 0
1 0 1 0 1 0 1 0 1 0 1 0 –1 0 –1 0 1 0 –1 0 –1 0 1 0 1 0 –1 0 1 0 –1 0 –1 0 –1 0 –1 0 –1 0 –1 0 1 0
–1 0 –1 0 –1 0 1 0 1 0 –1 0 1 0 –1 0 1 0 –1 0 –1 0 –1 0 –1 0 –1 0 –1 0 –1 0 1 0 1 0 –1 0 1 0 1 0 –1
0 –1 0 1 0 –1 0 1 0 1 0 1 0 1 0 1 0 –1 0 –1 0 1 0 1 0 1 0 –1 0 –1 0 1 0 –1 0 1 0 –1 0 1 0 –1 0 –1 0
–1 0 –1 0 –1 0 –1 0 1 0 1 0 –1 0 1 0 1 0 –1 0 –1 0 1 0 1 0 1 0 1 0 0 0 0 0 0 0 –1 0 –1 0 –1 0 –1 0 1 0 1
0 –1 0 –1 0 –1 0 1 0 1 0 –1 0 1 0 –1 0 1 0 –1 0 –1 0 –1 0 –1 0 –1 0 –1 0 1 0 1 0 1 0 –1 0 1 0 1 0
–1 0 –1 0 1 0 –1 0 1 0 –1 0 –1 0 –1 0 –1 0 1 0 1 0 –1 0 –1 0 –1 0 1 0 1 0 –1 0 1 0 –1 0 1 0 –1 0 1 0
1 0 1 0 1 0 1 0 1 0 –1 0 –1 0 1 0 –1 0 –1 0 1 0 1 0 –1 0 1 0 –1 0 1 0 1 0 1 0 1 0 –1 0 –1 0 1 0 1 0 1
0 –1 0 –1 0 1 0 –1 0 1 0 –1 0 1 0 1 0 1 0 1 0 1 0 1 0 1 0 –1 0 –1 0 1 0 –1 0 –1 0 1 0 1 0 –1 0 1 0
–1 0 –1 0 –1 0 –1 0 –1 0 1 0 1 0 –1 0 –1 0 –1 0 1 0 1 0 –1 0 1 0 –1 0 1 0 –1 0 1 0 1 0 1 0 1 0 1 0 1
0 –1 0 –1 0 1 0 –1 0 –1 0 1 0 1 0 –1 0 1 0 –1 0 1 0 –1 0 –1 0 1 0 1 0 1 0 –1 0 –1 0 1 0 –1 0 1 0 –1
0 1 0 1 0 1 0 1 0 1 0 1 0 1 0 –1 0 –1 0 1 0 –1 0 –1 0 1 0 1 0 –1 0 1 0 –1 0 1 0 1 0 1 0 1 0 –1 0 –1 0
1 0 1 0 1 0 –1 0 –1 0 1 0 –1 0 1 0 –1 0 1 0 –1 0 –1 0 –1 0 –1 0 –1 0 –1 0 1 0 1 0 –1 0 1 0 1 0 –1 0
–1 0 1 0 –1 0 1 0 1 0 1 0 1 0 1 0 –1 0 –1 0 1 0 1 0 1 0 –1 0 –1 0 1 0 –1 0 1 0 –1 0 1 0 1 0 1 0 1 0 1
0 1 0 1 0 –1 0 –1 0 1 0 –1 0 –1 0 1 0 1 0 –1 0 1 0 –1 0 –1 0 –1 0 –1 0 –1 0 1 0 1 0 –1 0 –1 0 –1 0
1 0 1 0 –1 0 1 0 –1 0 1 0 –1 0 1 0 1 0 1 0 1 0 1 0 –1 0 –1 0 1 0 –1 0 –1 0 1 0 0 0 0 0 0 0 0 0 0 0
0}.

12. The computer-implemented method according to claim 11, wherein in response to the LTF being a 2×LTF sequence in a 160 MHz, the 2×LTF sequence in the 160 MHz is:

| | | | | | | | | | | | |
|---|---|---|---|---|---|---|---|---|---|---|---|
| {0 | 0 | 0 | 0 | 0 | 0 | 0 | 0 | 0 | 0 | 0 | 0 |
| 1 | 0 | 1 | 0 | 1 | 0 | 1 | 0 | 1 | 0 | 1 | 0 |
| -1 | 0 | 1 | 0 | 1 | 0 | 1 | 0 | 1 | 0 | -1 | 0 |
| -1 | 0 | -1 | 0 | 1 | 0 | -1 | 0 | -1 | 0 | 1 | 0 |
| 1 | 0 | -1 | 0 | 1 | 0 | 1 | 0 | 1 | 0 | -1 | 0 |
| -1 | 0 | -1 | 0 | -1 | 0 | 1 | 0 | 1 | 0 | 1 | 0 |
| 1 | 0 | -1 | 0 | 1 | 0 | 1 | 0 | 1 | 0 | -1 | 0 |
| 1 | 0 | -1 | 0 | -1 | 0 | 1 | 0 | -1 | 0 | -1 | 0 |
| -1 | 0 | 1 | 0 | 1 | 0 | -1 | 0 | -1 | 0 | -1 | 0 |
| 1 | 0 | -1 | 0 | -1 | 0 | 1 | 0 | -1 | 0 | 1 | 0 |
| 1 | 0 | -1 | 0 | 1 | 0 | 1 | 0 | -1 | 0 | 1 | 0 |
| -1 | 0 | -1 | 0 | -1 | 0 | 1 | 0 | -1 | 0 | -1 | 0 |
| -1 | 0 | -1 | 0 | 1 | 0 | -1 | 0 | -1 | 0 | 1 | 0 |
| 1 | 0 | -1 | 0 | 1 | 0 | 1 | 0 | 1 | 0 | -1 | 0 |
| -1 | 0 | -1 | 0 | -1 | 0 | 1 | 0 | -1 | 0 | 1 | 0 |
| 1 | 0 | 1 | 0 | -1 | 0 | 1 | 0 | 1 | 0 | 1 | 0 |
| 1 | 0 | -1 | 0 | -1 | 0 | -1 | 0 | 1 | 0 | 1 | 0 |
| 1 | 0 | -1 | 0 | -1 | 0 | 1 | 0 | 1 | 0 | 1 | 0 |
| -1 | 0 | 1 | 0 | 1 | 0 | -1 | 0 | 1 | 0 | -1 | 0 |
| -1 | 0 | -1 | 0 | -1 | 0 | 1 | 0 | -1 | 0 | -1 | 0 |
| -1 | 0 | 1 | 0 | -1 | 0 | 1 | 0 | 1 | 0 | -1 | 0 |
| 1 | 0 | 1 | 0 | -1 | 0 | -1 | 0 | -1 | 0 | 1 | 0 |
| -1 | 0 | -1 | 0 | -1 | 0 | 1 | 0 | -1 | 0 | 1 | 0 |
| 1 | 0 | -1 | 0 | 1 | 0 | 1 | 0 | 1 | 0 | -1 | 0 |
| -1 | 0 | 1 | 0 | 1 | 0 | 1 | 0 | -1 | 0 | 1 | 0 |
| 1 | 0 | -1 | 0 | 1 | 0 | -1 | 0 | -1 | 0 | 1 | 0 |
| -1 | 0 | 1 | 0 | 1 | 0 | 1 | 0 | -1 | 0 | 1 | 0 |
| 1 | 0 | 1 | 0 | 1 | 0 | -1 | 0 | -1 | 0 | -1 | 0 |
| 1 | 0 | -1 | 0 | -1 | 0 | 1 | 0 | 1 | 0 | -1 | 0 |
| 1 | 0 | 1 | 0 | 1 | 0 | -1 | 0 | -1 | 0 | -1 | 0 |
| -1 | 0 | 1 | 0 | 1 | 0 | 1 | 0 | -1 | 0 | -1 | 0 |
| -1 | 0 | -1 | 0 | 1 | 0 | -1 | 0 | -1 | 0 | -1 | 0 |

-continued

| | | | | | | | | | | | |
|---|---|---|---|---|---|---|---|---|---|---|---|
| 1 | 0 | -1 | 0 | 1 | 0 | 1 | 0 | 1 | 0 | -1 | 0 |
| 1 | 0 | 1 | 0 | 1 | 0 | 1 | 0 | -1 | 0 | 1 | 0 |
| 1 | 0 | -1 | 0 | 1 | 0 | -1 | 0 | -1 | 0 | -1 | 0 |
| -1 | 0 | 1 | 0 | -1 | 0 | -1 | 0 | -1 | 0 | 1 | 0 |
| -1 | 0 | 1 | 0 | 1 | 0 | -1 | 0 | 1 | 0 | 1 | 0 |
| -1 | 0 | 1 | 0 | 1 | 0 | -1 | 0 | -1 | 0 | 1 | 0 |
| -1 | 0 | -1 | 0 | -1 | 0 | 1 | 0 | 1 | 0 | 1 | 0 |
| 1 | 0 | -1 | 0 | 1 | 0 | -1 | 0 | -1 | 0 | -1 | 0 |
| 1 | 0 | -1 | 0 | -1 | 0 | -1 | 0 | -1 | 0 | 1 | 0 |
| 1 | 0 | 1 | 0 | 1 | 0 | -1 | 0 | -1 | 0 | -1 | 0 |
| 1 | 0 | 1 | 0 | 1 | 0 | 0 | 0 | 0 | 0 | 0 | 0 |
| 1 | 0 | -1 | 0 | -1 | 0 | 1 | 0 | 1 | 0 | -1 | 0 |
| 1 | 0 | 1 | 0 | 1 | 0 | 1 | 0 | -1 | 0 | -1 | 0 |
| -1 | 0 | -1 | 0 | 1 | 0 | -1 | 0 | -1 | 0 | -1 | 0 |
| 1 | 0 | -1 | 0 | 1 | 0 | 1 | 0 | 1 | 0 | 1 | 0 |
| -1 | 0 | -1 | 0 | -1 | 0 | 1 | 0 | -1 | 0 | -1 | 0 |
| 1 | 0 | 1 | 0 | -1 | 0 | 1 | 0 | 1 | 0 | -1 | 0 |
| 1 | 0 | 1 | 0 | -1 | 0 | 1 | 0 | -1 | 0 | -1 | 0 |
| -1 | 0 | 1 | 0 | -1 | 0 | -1 | 0 | -1 | 0 | -1 | 0 |
| 1 | 0 | -1 | 0 | 1 | 0 | 1 | 0 | -1 | 0 | 1 | 0 |
| 1 | 0 | 1 | 0 | -1 | 0 | -1 | 0 | 1 | 0 | 1 | 0 |
| 1 | 0 | -1 | 0 | 1 | 0 | -1 | 0 | -1 | 0 | -1 | 0 |
| 1 | 0 | -1 | 0 | -1 | 0 | -1 | 0 | -1 | 0 | 1 | 0 |
| 1 | 0 | 1 | 0 | -1 | 0 | -1 | 0 | -1 | 0 | -1 | 0 |
| 1 | 0 | 1 | 0 | 1 | 0 | -1 | 0 | 1 | 0 | 1 | 0 |
| 1 | 0 | -1 | 0 | 1 | 0 | -1 | 0 | -1 | 0 | -1 | 0 |
| 1 | 0 | 1 | 0 | 1 | 0 | 1 | 0 | -1 | 0 | 1 | 0 |
| 1 | 0 | 1 | 0 | -1 | 0 | 1 | 0 | -1 | 0 | -1 | 0 |
| 1 | 0 | -1 | 0 | 1 | 0 | 1 | 0 | -1 | 0 | 1 | 0 |
| 1 | 0 | 1 | 0 | -1 | 0 | -1 | 0 | 1 | 0 | 1 | 0 |
| 1 | 0 | -1 | 0 | 1 | 0 | 1 | 0 | -1 | 0 | 1 | 0 |
| -1 | 0 | -1 | 0 | -1 | 0 | 1 | 0 | -1 | 0 | -1 | 0 |
| -1 | 0 | 1 | 0 | -1 | 0 | 1 | 0 | -1 | 0 | -1 | 0 |
| 1 | 0 | -1 | 0 | 1 | 0 | 1 | 0 | 1 | 0 | -1 | 0 |
| 1 | 0 | 1 | 0 | 1 | 0 | 1 | 0 | 1 | 0 | 1 | 0 |
| -1 | 0 | -1 | 0 | 1 | 0 | -1 | 0 | -1 | 0 | -1 | 0 |
| 1 | 0 | 1 | 0 | -1 | 0 | -1 | 0 | -1 | 0 | 1 | 0 |

-continued

| | | | | | | | | | | | |
|---|---|---|---|---|---|---|---|---|---|---|---|
| 1 | 0 | 1 | 0 | −1 | 0 | −1 | 0 | −1 | 0 | −1 | 0 |
| 1 | 0 | −1 | 0 | −1 | 0 | −1 | 0 | 1 | 0 | −1 | 0 |
| 1 | 0 | 1 | 0 | 1 | 0 | 1 | 0 | −1 | 0 | −1 | 0 |
| −1 | 0 | 1 | 0 | −1 | 0 | 1 | 0 | 1 | 0 | 1 | 0 |
| −1 | 0 | 1 | 0 | 1 | 0 | 1 | 0 | 1 | 0 | −1 | 0 |
| 1 | 0 | 1 | 0 | 1 | 0 | −1 | 0 | 1 | 0 | −1 | 0 |
| −1 | 0 | −1 | 0 | −1 | 0 | −1 | 0 | 1 | 0 | −1 | 0 |
| 1 | 0 | 1 | 0 | −1 | 0 | 1 | 0 | 1 | 0 | 1 | 0 |
| −1 | 0 | −1 | 0 | 1 | 0 | 1 | 0 | 1 | 0 | −1 | 0 |
| 1 | 0 | 1 | 0 | −1 | 0 | 1 | 0 | −1 | 0 | −1 | 0 |
| −1 | 0 | 1 | 0 | −1 | 0 | −1 | 0 | −1 | 0 | −1 | 0 |
| 1 | 0 | 1 | 0 | 1 | 0 | 1 | 0 | −1 | 0 | −1 | 0 |
| −1 | 0 | 1 | 0 | −1 | 0 | −1 | 0 | 1 | 0 | 1 | 0 |
| −1 | 0 | 1 | 0 | 1 | 0 | 1 | 0 | −1 | 0 | −1 | 0 |
| −1 | 0 | −1 | 0 | 1 | 0 | −1 | 0 | −1 | 0 | −1 | 0 |
| 1 | 0 | −1 | 0 | −1 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 1 | 0 | 1 | 0 | −1 | 0 | 1 | 0 |
| 1 | 0 | 1 | 0 | −1 | 0 | 1 | 0 | 1 | 0 | 1 | 0 |
| 1 | 0 | −1 | 0 | −1 | 0 | −1 | 0 | 1 | 0 | −1 | 0 |
| −1 | 0 | 1 | 0 | 1 | 0 | −1 | 0 | 1 | 0 | 1 | 0 |
| 1 | 0 | −1 | 0 | −1 | 0 | −1 | 0 | −1 | 0 | 1 | 0 |
| 1 | 0 | 1 | 0 | 1 | 0 | −1 | 0 | 1 | 0 | 1 | 0 |
| 1 | 0 | −1 | 0 | 1 | 0 | −1 | 0 | −1 | 0 | 1 | 0 |
| −1 | 0 | −1 | 0 | −1 | 0 | 1 | 0 | 1 | 0 | −1 | 0 |
| −1 | 0 | −1 | 0 | 1 | 0 | −1 | 0 | −1 | 0 | 1 | 0 |
| −1 | 0 | 1 | 0 | 1 | 0 | −1 | 0 | 1 | 0 | 1 | 0 |
| −1 | 0 | 1 | 0 | −1 | 0 | −1 | 0 | −1 | 0 | 1 | 0 |
| −1 | 0 | −1 | 0 | −1 | 0 | −1 | 0 | 1 | 0 | −1 | 0 |
| −1 | 0 | 1 | 0 | 1 | 0 | −1 | 0 | 1 | 0 | 1 | 0 |
| 1 | 0 | −1 | 0 | −1 | 0 | −1 | 0 | −1 | 0 | 1 | 0 |
| −1 | 0 | 1 | 0 | 1 | 0 | 1 | 0 | −1 | 0 | 1 | 0 |
| 1 | 0 | 1 | 0 | 1 | 0 | −1 | 0 | −1 | 0 | −1 | 0 |
| 1 | 0 | 1 | 0 | 1 | 0 | −1 | 0 | −1 | 0 | 1 | 0 |
| 1 | 0 | 1 | 0 | −1 | 0 | 1 | 0 | 1 | 0 | −1 | 0 |
| 1 | 0 | −1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| 1 | 0 | −1 | 0 | 1 | 0 | −1 | 0 | 1 | 0 | 1 | 0 |
| 1 | 0 | −1 | 0 | 1 | 0 | 1 | 0 | 1 | 0 | −1 | 0 |
| 1 | 0 | −1 | 0 | −1 | 0 | 1 | 0 | −1 | 0 | −1 | 0 |
| −1 | 0 | 1 | 0 | 1 | 0 | −1 | 0 | −1 | 0 | −1 | 0 |
| 1 | 0 | −1 | 0 | −1 | 0 | 1 | 0 | −1 | 0 | 1 | 0 |
| 1 | 0 | −1 | 0 | 1 | 0 | −1 | 0 | −1 | 0 | −1 | 0 |
| 1 | 0 | −1 | 0 | −1 | 0 | −1 | 0 | −1 | 0 | 1 | 0 |
| 1 | 0 | 1 | 0 | −1 | 0 | 1 | 0 | 1 | 0 | −1 | 0 |
| −1 | 0 | 1 | 0 | −1 | 0 | −1 | 0 | −1 | 0 | 1 | 0 |
| 1 | 0 | 1 | 0 | 1 | 0 | −1 | 0 | −1 | 0 | −1 | 0 |
| 1 | 0 | 1 | 0 | 1 | 0 | 1 | 0 | −1 | 0 | 1 | 0 |
| 1 | 0 | 1 | 0 | −1 | 0 | 1 | 0 | −1 | 0 | −1 | 0 |
| −1 | 0 | 1 | 0 | 1 | 0 | −1 | 0 | −1 | 0 | −1 | 0 |
| 1 | 0 | −1 | 0 | −1 | 0 | 1 | 0 | −1 | 0 | 1 | 0 |
| 1 | 0 | 1 | 0 | 1 | 0 | −1 | 0 | 1 | 0 | 1 | 0 |
| 1 | 0 | −1 | 0 | 1 | 0 | −1 | 0 | −1 | 0 | 1 | 0 |
| −1 | 0 | −1 | 0 | 1 | 0 | −1 | 0 | −1 | 0 | 1 | 0 |
| 1 | 0 | −1 | 0 | 1 | 0 | 1 | 0 | 1 | 0 | −1 | 0 |
| −1 | 0 | −1 | 0 | −1 | 0 | 1 | 0 | −1 | 0 | 1 | 0 |
| 1 | 0 | 1 | 0 | −1 | 0 | 1 | 0 | 1 | 0 | 1 | 0 |
| 1 | 0 | −1 | 0 | −1 | 0 | −1 | 0 | −1 | 0 | 1 | 0 |
| 1 | 0 | 1 | 0 | −1 | 0 | −1 | 0 | −1 | 0 | 0 | 0 |
| 0 | 0 | 0 | 0 | −1 | 0 | 1 | 0 | 1 | 0 | −1 | 0 |
| −1 | 0 | 1 | 0 | −1 | 0 | 1 | 0 | 1 | 0 | 1 | 0 |
| −1 | 0 | −1 | 0 | −1 | 0 | −1 | 0 | 1 | 0 | −1 | 0 |
| −1 | 0 | −1 | 0 | 1 | 0 | −1 | 0 | 1 | 0 | 1 | 0 |
| 1 | 0 | 1 | 0 | −1 | 0 | −1 | 0 | −1 | 0 | 1 | 0 |
| −1 | 0 | −1 | 0 | 1 | 0 | 1 | 0 | −1 | 0 | 1 | 0 |
| 1 | 0 | −1 | 0 | 1 | 0 | 1 | 0 | −1 | 0 | 1 | 0 |
| −1 | 0 | −1 | 0 | −1 | 0 | 1 | 0 | −1 | 0 | −1 | 0 |
| −1 | 0 | −1 | 0 | 1 | 0 | −1 | 0 | 1 | 0 | 1 | 0 |
| −1 | 0 | 1 | 0 | 1 | 0 | 1 | 0 | −1 | 0 | −1 | 0 |
| 1 | 0 | 1 | 0 | 1 | 0 | −1 | 0 | 1 | 0 | −1 | 0 |
| −1 | 0 | −1 | 0 | 1 | 0 | −1 | 0 | −1 | 0 | −1 | 0 |
| −1 | 0 | 1 | 0 | 1 | 0 | 1 | 0 | −1 | 0 | −1 | 0 |
| −1 | 0 | −1 | 0 | 1 | 0 | 1 | 0 | 1 | 0 | −1 | 0 |
| 1 | 0 | 1 | 0 | −1 | 0 | −1 | 0 | 1 | 0 | −1 | 0 |
| −1 | 0 | −1 | 0 | 1 | 0 | 1 | 0 | 1 | 0 | 1 | 0 |
| −1 | 0 | 1 | 0 | 1 | 0 | 1 | 0 | −1 | 0 | 1 | 0 |
| −1 | 0 | −1 | 0 | 1 | 0 | −1 | 0 | 1 | 0 | 1 | 0 |
| −1 | 0 | 1 | 0 | 1 | 0 | 1 | 0 | −1 | 0 | −1 | 0 |
| 1 | 0 | 1 | 0 | 1 | 0 | −1 | 0 | 1 | 0 | 1 | 0 |

-continued

| | | | | | | | | | | | |
|---|---|---|---|---|---|---|---|---|---|---|---|
| −1 | 0 | 1 | 0 | −1 | 0 | −1 | 0 | −1 | 0 | 1 | 0 |
| −1 | 0 | −1 | 0 | −1 | 0 | 1 | 0 | 1 | 0 | −1 | 0 |
| 1 | 0 | 1 | 0 | −1 | 0 | 1 | 0 | −1 | 0 | −1 | 0 |
| −1 | 0 | 1 | 0 | −1 | 0 | −1 | 0 | −1 | 0 | −1 | 0 |
| 1 | 0 | −1 | 0 | 1 | 0 | 1 | 0 | −1 | 0 | 1 | 0 |
| 1 | 0 | 1 | 0 | −1 | 0 | −1 | 0 | 1 | 0 | 1 | 0 |
| 1 | 0 | −1 | 0 | −1 | 0 | −1 | 0 | 1 | 0 | 1 | 0 |
| 1 | 0 | 1 | 0 | −1 | 0 | 1 | 0 | 1 | 0 | 1 | 0 |
| −1 | 0 | 1 | 0 | −1 | 0 | −1 | 0 | −1 | 0 | −1 | 0 |
| 1 | 0 | 1 | 0 | 1 | 0 | −1 | 0 | 1 | 0 | 1 | 0 |
| −1 | 0 | −1 | 0 | 1 | 0 | −1 | 0 | −1 | 0 | −1 | 0 |
| −1 | 0 | 1 | 0 | −1 | 0 | −1 | 0 | −1 | 0 | 1 | 0 |
| −1 | 0 | 1 | 0 | 1 | 0 | −1 | 0 | 1 | 0 | 1 | 0 |
| −1 | 0 | 1 | 0 | −1 | 0 | −1 | 0 | 1 | 0 | −1 | 0 |
| −1 | 0 | −1 | 0 | 1 | 0 | 1 | 0 | −1 | 0 | −1 | 0 |
| −1 | 0 | 1 | 0 | −1 | 0 | −1 | 0 | 1 | 0 | −1 | 0 |
| 1 | 0 | 1 | 0 | 1 | 0 | −1 | 0 | 1 | 0 | 1 | 0 |
| 1 | 0 | 1 | 0 | −1 | 0 | −1 | 0 | −1 | 0 | −1 | 0 |
| 1 | 0 | 1 | 0 | 1 | 0 | −1 | 0 | 1 | 0 | 1 | 0 |
| −1 | 0 | −1 | 0 | 1 | 0 | −1 | 0 | −1 | 0 | −1 | 0 |
| 1 | 0 | 1 | 0 | 1 | 0 | 1 | 0 | −1 | 0 | 1 | 0 |
| 1 | 0 | 1 | 0 | −1 | 0 | 1 | 0 | 1 | 0 | 0 | 0 |
| 0 | 0 | 0 | 0 | 0 | 0 | 0 | 0}; | | | | |

or

2×EHT_LTF_160 M=LTF2×80 M_part1, LTF2×80 M_part2, LTF2×80 M_part3, LTF2×80 M_part4, {$0_{12}$, LTF2×80 M_part5, $0_{23}$, LTF2×80 M_part1, (−1)*LTF2×80 M_part2, (−1)*LTF2×80 M_part3, (−1)*LTF2×80 M_part4, LTF2×80 M_part5, $0_{11}$}, wherein:

LTF2×80 M_part1=LTF2×80 M_1(1:242);

LTF2×80 M_part2=LTF2×80 M_1(243:484);

LTF2×80 M_part3=LTF2×80 M_1(485:517);

LTF2×80 M_part4-LTF2×80 M_1(518:759);

LTF2×80 M_part5=LTF2×80 M_1(760:1001); and

LTF2×80 M_1 is a sequence obtained after the 12 leftmost 0s and the 11 rightmost 0s are removed from a sequence 6 in a specific implementation of the specification.

13. The computer-implemented method according to claim 11, wherein in response to the LTF being a 2×LTF sequence in a 240 MHz, the 2×LTF sequence in the 240 MHz is:

| | | | | | | | | | | | | |
|---|---|---|---|---|---|---|---|---|---|---|---|---|
| {0 | 0 | 0 | 0 | 0 | 0 | 0 | 0 | 0 | 0 | 0 | 0 | 1 |
| | 0 | −1 | 0 | 1 | 0 | 1 | 0 | −1 | 0 | −1 | 0 | −1 |
| | 0 | −1 | 0 | 1 | 0 | −1 | 0 | 1 | 0 | 1 | 0 | 1 |
| | 0 | −1 | 0 | −1 | 0 | −1 | 0 | 1 | 0 | 1 | 0 | 1 |
| | 0 | −1 | 0 | 1 | 0 | 1 | 0 | −1 | 0 | 1 | 0 | −1 |
| | 0 | −1 | 0 | −1 | 0 | 1 | 0 | −1 | 0 | −1 | 0 | 1 |
| | 0 | −1 | 0 | −1 | 0 | 1 | 0 | −1 | 0 | −1 | 0 | 1 |
| | 0 | −1 | 0 | −1 | 0 | −1 | 0 | −1 | 0 | 1 | 0 | −1 |
| | 0 | −1 | 0 | 1 | 0 | −1 | 0 | −1 | 0 | −1 | 0 | −1 |
| | 0 | −1 | 0 | −1 | 0 | 1 | 0 | 1 | 0 | 1 | 0 | −1 |
| | 0 | 1 | 0 | 1 | 0 | 1 | 0 | 1 | 0 | −1 | 0 | −1 |
| | 0 | −1 | 0 | 1 | 0 | −1 | 0 | −1 | 0 | 1 | 0 | −1 |
| | 0 | −1 | 0 | −1 | 0 | 1 | 0 | 1 | 0 | 1 | 0 | 1 |
| | 0 | −1 | 0 | 1 | 0 | 1 | 0 | 1 | 0 | −1 | 0 | −1 |
| | 0 | −1 | 0 | −1 | 0 | −1 | 0 | −1 | 0 | 1 | 0 | −1 |
| | 0 | −1 | 0 | 1 | 0 | −1 | 0 | −1 | 0 | −1 | 0 | −1 |
| | 0 | 1 | 0 | −1 | 0 | −1 | 0 | 1 | 0 | −1 | 0 | 1 |
| | 0 | −1 | 0 | 1 | 0 | 1 | 0 | −1 | 0 | 1 | 0 | 1 |
| | 0 | 1 | 0 | −1 | 0 | 1 | 0 | −1 | 0 | −1 | 0 | 1 |
| | 0 | −1 | 0 | −1 | 0 | −1 | 0 | 1 | 0 | 1 | 0 | 1 |
| | 0 | −1 | 0 | −1 | 0 | −1 | 0 | 1 | 0 | −1 | 0 | 1 |
| | 0 | −1 | 0 | 1 | 0 | −1 | 0 | −1 | 0 | −1 | 0 | 1 |
| | 0 | 1 | 0 | 1 | 0 | −1 | 0 | 1 | 0 | −1 | 0 | −1 |
| | 0 | −1 | 0 | 1 | 0 | 1 | 0 | 1 | 0 | −1 | 0 | −1 |
| | 0 | −1 | 0 | 1 | 0 | −1 | 0 | −1 | 0 | 1 | 0 | −1 |
| | 0 | 1 | 0 | 1 | 0 | 1 | 0 | −1 | 0 | 1 | 0 | 1 |
| | 0 | −1 | 0 | 1 | 0 | 1 | 0 | −1 | 0 | 1 | 0 | 1 |
| | 0 | −1 | 0 | 1 | 0 | 1 | 0 | 1 | 0 | 1 | 0 | −1 |

-continued

| | | | | | | | | | | | |
|---|---|---|---|---|---|---|---|---|---|---|---|
| 0 | 1 | 0 | 1 | 0 | −1 | 0 | 1 | 0 | 1 | 0 | 1 |
| 0 | 1 | 0 | 1 | 0 | 1 | 0 | −1 | 0 | −1 | 0 | −1 |
| 0 | 1 | 0 | −1 | 0 | −1 | 0 | −1 | 0 | −1 | 0 | 1 |
| 0 | 1 | 0 | 1 | 0 | −1 | 0 | 1 | 0 | −1 | 0 | 1 |
| 0 | −1 | 0 | −1 | 0 | −1 | 0 | 1 | 0 | 1 | 0 | 1 |
| 0 | 1 | 0 | −1 | 0 | 1 | 0 | 1 | 0 | 1 | 0 | −1 |
| 0 | −1 | 0 | −1 | 0 | −1 | 0 | −1 | 0 | −1 | 0 | 1 |
| 0 | −1 | 0 | −1 | 0 | 1 | 0 | −1 | 0 | −1 | 0 | −1 |
| 0 | −1 | 0 | 1 | 0 | −1 | 0 | −1 | 0 | 1 | 0 | −1 |
| 0 | 1 | 0 | −1 | 0 | 1 | 0 | 1 | 0 | −1 | 0 | 1 |
| 0 | 1 | 0 | 1 | 0 | −1 | 0 | 1 | 0 | −1 | 0 | −1 |
| 0 | 1 | 0 | −1 | 0 | −1 | 0 | −1 | 0 | 1 | 0 | 1 |
| 0 | 1 | 0 | −1 | 0 | −1 | 0 | −1 | 0 | 1 | 0 | −1 |
| 0 | 1 | 0 | 1 | 0 | −1 | 0 | −1 | 0 | −1 | 0 | 1 |
| 0 | 1 | 0 | 1 | 0 | 0 | 0 | 0 | 0 | 0 | 0 | – 1 |
| 0 | 1 | 0 | 1 | 0 | −1 | 0 | −1 | 0 | 1 | 0 | −1 |
| 0 | −1 | 0 | 1 | 0 | −1 | 0 | −1 | 0 | −1 | 0 | 1 |
| 0 | 1 | 0 | 1 | 0 | −1 | 0 | 1 | 0 | −1 | 0 | −1 |
| 0 | −1 | 0 | 1 | 0 | 1 | 0 | 1 | 0 | −1 | 0 | −1 |
| 0 | −1 | 0 | 1 | 0 | −1 | 0 | −1 | 0 | 1 | 0 | −1 |
| 0 | 1 | 0 | 1 | 0 | 1 | 0 | −1 | 0 | 1 | 0 | 1 |
| 0 | −1 | 0 | 1 | 0 | 1 | 0 | −1 | 0 | 1 | 0 | 1 |
| 0 | −1 | 0 | 1 | 0 | 1 | 0 | 1 | 0 | 1 | 0 | −1 |
| 0 | 1 | 0 | 1 | 0 | −1 | 0 | 1 | 0 | 1 | 0 | 1 |
| 0 | 1 | 0 | 1 | 0 | 1 | 0 | −1 | 0 | −1 | 0 | −1 |
| 0 | 1 | 0 | −1 | 0 | −1 | 0 | −1 | 0 | −1 | 0 | 1 |
| 0 | 1 | 0 | 1 | 0 | −1 | 0 | 1 | 0 | 1 | 0 | −1 |
| 0 | 1 | 0 | 1 | 0 | 1 | 0 | −1 | 0 | −1 | 0 | −1 |
| 0 | −1 | 0 | 1 | 0 | −1 | 0 | −1 | 0 | −1 | 0 | 1 |
| 0 | 1 | 0 | 1 | 0 | 1 | 0 | 1 | 0 | 1 | 0 | −1 |
| 0 | 1 | 0 | 1 | 0 | −1 | 0 | 1 | 0 | 1 | 0 | 1 |
| 0 | 1 | 0 | −1 | 0 | 1 | 0 | 1 | 0 | −1 | 0 | 1 |
| 0 | −1 | 0 | 1 | 0 | 1 | 0 | −1 | 0 | 1 | 0 | −1 |
| 0 | −1 | 0 | −1 | 0 | 1 | 0 | −1 | 0 | 1 | 0 | 1 |
| 0 | −1 | 0 | 1 | 0 | 1 | 0 | 1 | 0 | −1 | 0 | −1 |
| 0 | −1 | 0 | 1 | 0 | 1 | 0 | 1 | 0 | −1 | 0 | 1 |
| 0 | −1 | 0 | −1 | 0 | 1 | 0 | −1 | 0 | −1 | 0 | −1 |
| 0 | 1 | 0 | 1 | 0 | 1 | 0 | −1 | 0 | 1 | 0 | −1 |
| 0 | −1 | 0 | −1 | 0 | 1 | 0 | 1 | 0 | 1 | 0 | −1 |
| 0 | −1 | 0 | −1 | 0 | 1 | 0 | −1 | 0 | −1 | 0 | 1 |
| 0 | −1 | 0 | 1 | 0 | 1 | 0 | 1 | 0 | −1 | 0 | 1 |
| 0 | 1 | 0 | −1 | 0 | 1 | 0 | 1 | 0 | −1 | 0 | 1 |
| 0 | 1 | 0 | −1 | 0 | 1 | 0 | 1 | 0 | 1 | 0 | 1 |
| 0 | −1 | 0 | 1 | 0 | 1 | 0 | −1 | 0 | 1 | 0 | 1 |
| 0 | 1 | 0 | 1 | 0 | 1 | 0 | 1 | 0 | −1 | 0 | −1 |
| 0 | −1 | 0 | 1 | 0 | −1 | 0 | −1 | 0 | −1 | 0 | −1 |
| 0 | 1 | 0 | 1 | 0 | 1 | 0 | −1 | 0 | 1 | 0 | −1 |
| 0 | 1 | 0 | −1 | 0 | −1 | 0 | −1 | 0 | 1 | 0 | 1 |
| 0 | 1 | 0 | 1 | 0 | −1 | 0 | 1 | 0 | 1 | 0 | 1 |
| 0 | −1 | 0 | −1 | 0 | −1 | 0 | −1 | 0 | −1 | 0 | −1 |
| 0 | 1 | 0 | −1 | 0 | −1 | 0 | 1 | 0 | −1 | 0 | −1 |
| 0 | −1 | 0 | −1 | 0 | 1 | 0 | −1 | 0 | −1 | 0 | 1 |
| 0 | −1 | 0 | 1 | 0 | −1 | 0 | 1 | 0 | 1 | 0 | −1 |
| 0 | 1 | 0 | 1 | 0 | 1 | 0 | −1 | 0 | 1 | 0 | −1 |
| 0 | −1 | 0 | 1 | 0 | −1 | 0 | −1 | 0 | −1 | 0 | 1 |
| 0 | 1 | 0 | 1 | 0 | −1 | 0 | −1 | 0 | −1 | 0 | 1 |
| 0 | −1 | 0 | 1 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 1 | 0 | −1 | 0 | 1 | 0 | 1 | 0 | 1 |
| 0 | −1 | 0 | −1 | 0 | −1 | 0 | 1 | 0 | −1 | 0 | 1 |
| 0 | 1 | 0 | 1 | 0 | −1 | 0 | −1 | 0 | −1 | 0 | 1 |
| 0 | 1 | 0 | 1 | 0 | −1 | 0 | 1 | 0 | 1 | 0 | −1 |
| 0 | 1 | 0 | −1 | 0 | −1 | 0 | −1 | 0 | 1 | 0 | −1 |
| 0 | −1 | 0 | 1 | 0 | −1 | 0 | −1 | 0 | 1 | 0 | −1 |
| 0 | −1 | 0 | 1 | 0 | −1 | 0 | −1 | 0 | −1 | 0 | −1 |
| 0 | 1 | 0 | −1 | 0 | −1 | 0 | 1 | 0 | −1 | 0 | −1 |
| 0 | −1 | 0 | −1 | 0 | −1 | 0 | −1 | 0 | 1 | 0 | 1 |
| 0 | 1 | 0 | −1 | 0 | 1 | 0 | 1 | 0 | 1 | 0 | 1 |
| 0 | −1 | 0 | −1 | 0 | −1 | 0 | 1 | 0 | −1 | 0 | −1 |
| 0 | 1 | 0 | −1 | 0 | −1 | 0 | −1 | 0 | 1 | 0 | 1 |
| 0 | 1 | 0 | 1 | 0 | −1 | 0 | 1 | 0 | 1 | 0 | 1 |
| 0 | −1 | 0 | −1 | 0 | −1 | 0 | −1 | 0 | −1 | 0 | −1 |
| 0 | 1 | 0 | −1 | 0 | −1 | 0 | 1 | 0 | −1 | 0 | −1 |
| 0 | −1 | 0 | −1 | 0 | 1 | 0 | −1 | 0 | −1 | 0 | 1 |
| 0 | −1 | 0 | 1 | 0 | −1 | 0 | 1 | 0 | 1 | 0 | −1 |
| 0 | 1 | 0 | 1 | 0 | 1 | 0 | −1 | 0 | 1 | 0 | −1 |
| 0 | −1 | 0 | 1 | 0 | −1 | 0 | −1 | 0 | −1 | 0 | 1 |
| 0 | 1 | 0 | 1 | 0 | −1 | 0 | −1 | 0 | −1 | 0 | 1 |
| 0 | −1 | 0 | 1 | 0 | −1 | 0 | 1 | 0 | −1 | 0 | −1 |

-continued

| | | | | | | | | | | | |
|---|---|---|---|---|---|---|---|---|---|---|---|
| 0 | −1 | 0 | 1 | 0 | 1 | 0 | 1 | 0 | −1 | 0 | 1 |
| 0 | −1 | 0 | −1 | 0 | −1 | 0 | 1 | 0 | 1 | 0 | 1 |
| 0 | −1 | 0 | −1 | 0 | −1 | 0 | 1 | 0 | −1 | 0 | −1 |
| 0 | 1 | 0 | −1 | 0 | 1 | 0 | 1 | 0 | 1 | 0 | −1 |
| 0 | 1 | 0 | 1 | 0 | −1 | 0 | 1 | 0 | 1 | 0 | −1 |
| 0 | 1 | 0 | 1 | 0 | −1 | 0 | 1 | 0 | 1 | 0 | 1 |
| 0 | 1 | 0 | −1 | 0 | 1 | 0 | 1 | 0 | −1 | 0 | 1 |
| 0 | 1 | 0 | 1 | 0 | 1 | 0 | 1 | 0 | 1 | 0 | −1 |
| 0 | −1 | 0 | −1 | 0 | 1 | 0 | −1 | 0 | −1 | 0 | −1 |
| 0 | −1 | 0 | 1 | 0 | 1 | 0 | 1 | 0 | −1 | 0 | 1 |
| 0 | −1 | 0 | 1 | 0 | −1 | 0 | −1 | 0 | −1 | 0 | 1 |
| 0 | 1 | 0 | 1 | 0 | 1 | 0 | −1 | 0 | 1 | 0 | 1 |
| 0 | 1 | 0 | −1 | 0 | −1 | 0 | −1 | 0 | −1 | 0 | −1 |
| 0 | −1 | 0 | 1 | 0 | −1 | 0 | −1 | 0 | 1 | 0 | −1 |
| 0 | −1 | 0 | −1 | 0 | −1 | 0 | 1 | 0 | −1 | 0 | −1 |
| 0 | 1 | 0 | −1 | 0 | 1 | 0 | −1 | 0 | 1 | 0 | 1 |
| 0 | −1 | 0 | 1 | 0 | 1 | 0 | 1 | 0 | −1 | 0 | 1 |
| 0 | −1 | 0 | −1 | 0 | 1 | 0 | −1 | 0 | −1 | 0 | −1 |
| 0 | 1 | 0 | 1 | 0 | 1 | 0 | −1 | 0 | −1 | 0 | −1 |
| 0 | 1 | 0 | −1 | 0 | 1 | 0 | 1 | 0 | −1 | 0 | −1 |
| 0 | −1 | 0 | 1 | 0 | 1 | 0 | 1 | 0 | 0 | 0 | 0 |
| 0 | 0 | 0 | 1 | 0 | −1 | 0 | −1 | 0 | 1 | 0 | 1 |
| 0 | −1 | 0 | 1 | 0 | 1 | 0 | −1 | 0 | 1 | 0 | 1 |
| 0 | 1 | 0 | −1 | 0 | −1 | 0 | −1 | 0 | 1 | 0 | −1 |
| 0 | 1 | 0 | 1 | 0 | 1 | 0 | −1 | 0 | −1 | 0 | −1 |
| 0 | 1 | 0 | 1 | 0 | 1 | 0 | −1 | 0 | 1 | 0 | 1 |
| 0 | −1 | 0 | 1 | 0 | −1 | 0 | −1 | 0 | −1 | 0 | 1 |
| 0 | −1 | 0 | −1 | 0 | 1 | 0 | −1 | 0 | −1 | 0 | 1 |
| 0 | −1 | 0 | −1 | 0 | 1 | 0 | −1 | 0 | −1 | 0 | −1 |
| 0 | −1 | 0 | 1 | 0 | −1 | 0 | −1 | 0 | 1 | 0 | −1 |
| 0 | −1 | 0 | −1 | 0 | −1 | 0 | −1 | 0 | −1 | 0 | 1 |
| 0 | 1 | 0 | 1 | 0 | −1 | 0 | 1 | 0 | 1 | 0 | 1 |
| 0 | 1 | 0 | −1 | 0 | −1 | 0 | −1 | 0 | 1 | 0 | −1 |
| 0 | −1 | 0 | 1 | 0 | −1 | 0 | −1 | 0 | −1 | 0 | 1 |
| 0 | 1 | 0 | 1 | 0 | 1 | 0 | −1 | 0 | 1 | 0 | 1 |
| 0 | 1 | 0 | −1 | 0 | −1 | 0 | −1 | 0 | −1 | 0 | −1 |
| 0 | −1 | 0 | 1 | 0 | −1 | 0 | −1 | 0 | 1 | 0 | −1 |
| 0 | −1 | 0 | −1 | 0 | −1 | 0 | 1 | 0 | −1 | 0 | −1 |
| 0 | 1 | 0 | −1 | 0 | 1 | 0 | −1 | 0 | 1 | 0 | 1 |
| 0 | −1 | 0 | 1 | 0 | 1 | 0 | 1 | 0 | −1 | 0 | 1 |
| 0 | −1 | 0 | −1 | 0 | 1 | 0 | −1 | 0 | −1 | 0 | −1 |
| 0 | 1 | 0 | 1 | 0 | 1 | 0 | −1 | 0 | −1 | 0 | −1 |
| 0 | 1 | 0 | −1 | 0 | 1 | 0 | 1 | 0 | −1 | 0 | 1 |
| 0 | 1 | 0 | 1 | 0 | −1 | 0 | −1 | 0 | −1 | 0 | 1 |
| 0 | −1 | 0 | 1 | 0 | 1 | 0 | 1 | 0 | −1 | 0 | −1 |
| 0 | −1 | 0 | 1 | 0 | 1 | 0 | 1 | 0 | −1 | 0 | 1 |
| 0 | 1 | 0 | −1 | 0 | 1 | 0 | −1 | 0 | −1 | 0 | −1 |
| 0 | 1 | 0 | −1 | 0 | −1 | 0 | 1 | 0 | −1 | 0 | −1 |
| 0 | 1 | 0 | −1 | 0 | −1 | 0 | 1 | 0 | −1 | 0 | −1 |
| 0 | −1 | 0 | −1 | 0 | 1 | 0 | −1 | 0 | −1 | 0 | 1 |
| 0 | −1 | 0 | −1 | 0 | −1 | 0 | −1 | 0 | −1 | 0 | −1 |
| 0 | 1 | 0 | 1 | 0 | 1 | 0 | −1 | 0 | 1 | 0 | 1 |
| 0 | 1 | 0 | 1 | 0 | −1 | 0 | −1 | 0 | −1 | 0 | 1 |
| 0 | −1 | 0 | 1 | 0 | −1 | 0 | 1 | 0 | 1 | 0 | 1 |
| 0 | −1 | 0 | −1 | 0 | −1 | 0 | −1 | 0 | 1 | 0 | −1 |
| 0 | −1 | 0 | −1 | 0 | 1 | 0 | 1 | 0 | 1 | 0 | 1 |
| 0 | 1 | 0 | 1 | 0 | −1 | 0 | 1 | 0 | 1 | 0 | −1 |
| 0 | 1 | 0 | 1 | 0 | 1 | 0 | 1 | 0 | −1 | 0 | 1 |
| 0 | 1 | 0 | −1 | 0 | 1 | 0 | −1 | 0 | 1 | 0 | −1 |
| 0 | −1 | 0 | 1 | 0 | −1 | 0 | −1 | 0 | −1 | 0 | 1 |
| 0 | −1 | 0 | 1 | 0 | 1 | 0 | −1 | 0 | 1 | 0 | 1 |
| 0 | 1 | 0 | −1 | 0 | −1 | 0 | −1 | 0 | 1 | 0 | 1 |
| 0 | 1 | 0 | −1 | 0 | 1 | 0 | −1 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | −1 | 0 | 1 | 0 | −1 |
| 0 | −1 | 0 | −1 | 0 | 1 | 0 | 1 | 0 | 1 | 0 | −1 |
| 0 | 1 | 0 | −1 | 0 | −1 | 0 | −1 | 0 | 1 | 0 | 1 |
| 0 | 1 | 0 | −1 | 0 | −1 | 0 | −1 | 0 | 1 | 0 | −1 |
| 0 | −1 | 0 | 1 | 0 | −1 | 0 | 1 | 0 | 1 | 0 | 1 |
| 0 | −1 | 0 | 1 | 0 | 1 | 0 | −1 | 0 | 1 | 0 | 1 |
| 0 | −1 | 0 | 1 | 0 | 1 | 0 | −1 | 0 | 1 | 0 | 1 |
| 0 | 1 | 0 | 1 | 0 | −1 | 0 | 1 | 0 | 1 | 0 | −1 |
| 0 | 1 | 0 | 1 | 0 | 1 | 0 | 1 | 0 | 1 | 0 | 1 |
| 0 | −1 | 0 | −1 | 0 | −1 | 0 | 1 | 0 | −1 | 0 | −1 |
| 0 | −1 | 0 | −1 | 0 | 1 | 0 | 1 | 0 | 1 | 0 | −1 |
| 0 | 1 | 0 | 1 | 0 | −1 | 0 | 1 | 0 | 1 | 0 | 1 |
| 0 | −1 | 0 | −1 | 0 | −1 | 0 | −1 | 0 | 1 | 0 | −1 |
| 0 | −1 | 0 | −1 | 0 | 1 | 0 | 1 | 0 | 1 | 0 | 1 |
| 0 | 1 | 0 | 1 | 0 | −1 | 0 | 1 | 0 | 1 | 0 | −1 |

-continued

| | | | | | | | | | | | |
|---|---|---|---|---|---|---|---|---|---|---|---|
| 0 | 1 | 0 | 1 | 0 | 1 | 0 | 1 | 0 | −1 | 0 | 1 |
| 0 | 1 | 0 | −1 | 0 | 1 | 0 | −1 | 0 | 1 | 0 | −1 |
| 0 | −1 | 0 | 1 | 0 | −1 | 0 | −1 | 0 | −1 | 0 | 1 |
| 0 | −1 | 0 | 1 | 0 | 1 | 0 | −1 | 0 | 1 | 0 | 1 |
| 0 | 1 | 0 | −1 | 0 | −1 | 0 | −1 | 0 | 1 | 0 | 1 |
| 0 | 1 | 0 | −1 | 0 | 1 | 0 | −1 | 0 | 1 | 0 | −1 |
| 0 | 1 | 0 | 1 | 0 | 1 | 0 | −1 | 0 | −1 | 0 | −1 |
| 0 | 1 | 0 | −1 | 0 | 1 | 0 | 1 | 0 | 1 | 0 | −1 |
| 0 | −1 | 0 | −1 | 0 | 1 | 0 | 1 | 0 | 1 | 0 | −1 |
| 0 | 1 | 0 | 1 | 0 | −1 | 0 | 1 | 0 | −1 | 0 | −1 |
| 0 | −1 | 0 | 1 | 0 | −1 | 0 | −1 | 0 | 1 | 0 | −1 |
| 0 | −1 | 0 | 1 | 0 | −1 | 0 | −1 | 0 | 1 | 0 | −1 |
| 0 | −1 | 0 | −1 | 0 | −1 | 0 | 1 | 0 | −1 | 0 | −1 |
| 0 | 1 | 0 | −1 | 0 | −1 | 0 | −1 | 0 | −1 | 0 | −1 |
| 0 | −1 | 0 | 1 | 0 | 1 | 0 | 1 | 0 | −1 | 0 | 1 |
| 0 | 1 | 0 | 1 | 0 | 1 | 0 | −1 | 0 | −1 | 0 | −1 |
| 0 | 1 | 0 | −1 | 0 | 1 | 0 | −1 | 0 | 1 | 0 | 1 |
| 0 | 1 | 0 | −1 | 0 | −1 | 0 | −1 | 0 | −1 | 0 | 1 |
| 0 | −1 | 0 | −1 | 0 | −1 | 0 | 1 | 0 | 1 | 0 | 1 |
| 0 | 1 | 0 | 1 | 0 | 1 | 0 | −1 | 0 | 1 | 0 | 1 |
| 0 | −1 | 0 | 1 | 0 | 1 | 0 | 1 | 0 | 1 | 0 | −1 |
| 0 | 1 | 0 | 1 | 0 | −1 | 0 | 1 | 0 | −1 | 0 | 1 |
| 0 | −1 | 0 | −1 | 0 | 1 | 0 | −1 | 0 | −1 | 0 | −1 |
| 0 | 1 | 0 | −1 | 0 | 1 | 0 | 1 | 0 | −1 | 0 | 1 |
| 0 | 1 | 0 | 1 | 0 | −1 | 0 | −1 | 0 | −1 | 0 | 1 |
| 0 | 1 | 0 | 1 | 0 | −1 | 0 | 1 | 0 | −1 | 0 | −1 |
| 0 | 1 | 0 | 1 | 0 | 1 | 0 | −1 | 0 | −1 | 0 | −1 |
| 0 | 0 | 0 | 0 | 0 | 0 | 0 | 1 | 0 | −1 | 0 | −1 |
| 0 | 1 | 0 | 1 | 0 | −1 | 0 | 1 | 0 | 1 | 0 | −1 |
| 0 | 1 | 0 | 1 | 0 | 1 | 0 | −1 | 0 | −1 | 0 | −1 |
| 0 | 1 | 0 | −1 | 0 | 1 | 0 | 1 | 0 | 1 | 0 | −1 |
| 0 | −1 | 0 | −1 | 0 | 1 | 0 | 1 | 0 | 1 | 0 | −1 |
| 0 | 1 | 0 | 1 | 0 | −1 | 0 | 1 | 0 | −1 | 0 | −1 |
| 0 | −1 | 0 | 1 | 0 | −1 | 0 | −1 | 0 | 1 | 0 | −1 |
| 0 | −1 | 0 | 1 | 0 | −1 | 0 | −1 | 0 | 1 | 0 | −1 |
| 0 | −1 | 0 | −1 | 0 | −1 | 0 | 1 | 0 | −1 | 0 | −1 |
| 0 | 1 | 0 | −1 | 0 | −1 | 0 | −1 | 0 | −1 | 0 | −1 |
| 0 | −1 | 0 | 1 | 0 | 1 | 0 | 1 | 0 | −1 | 0 | 1 |
| 0 | 1 | 0 | 1 | 0 | 1 | 0 | −1 | 0 | −1 | 0 | −1 |
| 0 | 1 | 0 | −1 | 0 | −1 | 0 | 1 | 0 | −1 | 0 | −1 |
| 0 | −1 | 0 | 1 | 0 | 1 | 0 | 1 | 0 | 1 | 0 | −1 |
| 0 | 1 | 0 | 1 | 0 | 1 | 0 | −1 | 0 | −1 | 0 | −1 |
| 0 | −1 | 0 | −1 | 0 | −1 | 0 | 1 | 0 | −1 | 0 | −1 |
| 0 | 1 | 0 | −1 | 0 | −1 | 0 | −1 | 0 | −1 | 0 | 1 |
| 0 | −1 | 0 | −1 | 0 | 1 | 0 | −1 | 0 | 1 | 0 | −1 |
| 0 | 1 | 0 | 1 | 0 | −1 | 0 | 1 | 0 | 1 | 0 | 1 |
| 0 | −1 | 0 | 1 | 0 | −1 | 0 | −1 | 0 | 1 | 0 | −1 |
| 0 | −1 | 0 | −1 | 0 | 1 | 0 | 1 | 0 | 1 | 0 | −1 |
| 0 | −1 | 0 | −1 | 0 | 1 | 0 | −1 | 0 | 1 | 0 | 1 |
| 0 | −1 | 0 | 1 | 0 | 1 | 0 | 1 | 0 | −1 | 0 | −1 |
| 0 | −1 | 0 | 1 | 0 | −1 | 0 | 1 | 0 | 1 | 0 | 1 |
| 0 | −1 | 0 | −1 | 0 | −1 | 0 | 1 | 0 | 1 | 0 | 1 |
| 0 | −1 | 0 | 1 | 0 | 1 | 0 | −1 | 0 | 1 | 0 | −1 |
| 0 | −1 | 0 | −1 | 0 | 1 | 0 | −1 | 0 | −1 | 0 | 1 |
| 0 | −1 | 0 | −1 | 0 | 1 | 0 | −1 | 0 | −1 | 0 | 1 |
| 0 | −1 | 0 | −1 | 0 | −1 | 0 | −1 | 0 | 1 | 0 | −1 |
| 0 | −1 | 0 | 1 | 0 | −1 | 0 | −1 | 0 | −1 | 0 | −1 |
| 0 | −1 | 0 | −1 | 0 | 1 | 0 | 1 | 0 | 1 | 0 | −1 |
| 0 | 1 | 0 | 1 | 0 | 1 | 0 | 1 | 0 | −1 | 0 | −1 |
| 0 | −1 | 0 | 1 | 0 | −1 | 0 | 1 | 0 | −1 | 0 | 1 |
| 0 | 1 | 0 | 1 | 0 | −1 | 0 | −1 | 0 | −1 | 0 | −1 |
| 0 | 1 | 0 | −1 | 0 | −1 | 0 | −1 | 0 | 1 | 0 | 1 |
| 0 | 1 | 0 | 1 | 0 | 1 | 0 | 1 | 0 | −1 | 0 | 1 |
| 0 | 1 | 0 | −1 | 0 | 1 | 0 | 1 | 0 | 1 | 0 | 1 |
| 0 | −1 | 0 | 1 | 0 | 1 | 0 | −1 | 0 | 1 | 0 | −1 |
| 0 | 1 | 0 | −1 | 0 | −1 | 0 | 1 | 0 | −1 | 0 | −1 |
| 0 | −1 | 0 | 1 | 0 | −1 | 0 | 1 | 0 | 1 | 0 | −1 |
| 0 | 1 | 0 | 1 | 0 | 1 | 0 | −1 | 0 | −1 | 0 | −1 |
| 0 | 1 | 0 | 1 | 0 | 1 | 0 | −1 | 0 | 1 | 0 | −1 |
| 0 | 0 | 0 | 0 | 0 | 0 | 0 | 0 | 0 | 0 | 0}. | |

14. The computer-implemented method according to claim 11, wherein in response to the LTF being a 2×LTF sequence in a 320 MHz, the 2×LTF sequence in the 320 MHz is:

| | | | | | | | | | | | |
|---|---|---|---|---|---|---|---|---|---|---|---|
| {0 | 0 | 0 | 0 | 0 | 0 | 0 | 0 | 0 | 0 | 0 | 0 |
| 1 | 0 | 1 | 0 | −1 | 0 | 1 | 0 | 1 | 0 | 1 | 0 |
| −1 | 0 | 1 | 0 | 1 | 0 | 1 | 0 | 1 | 0 | −1 | 0 |
| −1 | 0 | −1 | 0 | 1 | 0 | −1 | 0 | −1 | 0 | 1 | 0 |
| 1 | 0 | −1 | 0 | 1 | 0 | 1 | 0 | 1 | 0 | 1 | 0 |
| −1 | 0 | −1 | 0 | −1 | 0 | 1 | 0 | 1 | 0 | 1 | 0 |
| 1 | 0 | −1 | 0 | 1 | 0 | 1 | 0 | 1 | 0 | −1 | 0 |
| 1 | 0 | −1 | 0 | −1 | 0 | 1 | 0 | −1 | 0 | −1 | 0 |
| −1 | 0 | 1 | 0 | 1 | 0 | −1 | 0 | 1 | 0 | −1 | 0 |
| 1 | 0 | −1 | 0 | −1 | 0 | 1 | 0 | −1 | 0 | 1 | 0 |
| 1 | 0 | −1 | 0 | 1 | 0 | 1 | 0 | −1 | 0 | 1 | 0 |
| −1 | 0 | −1 | 0 | −1 | 0 | 1 | 0 | −1 | 0 | −1 | 0 |
| −1 | 0 | −1 | 0 | 1 | 0 | −1 | 0 | −1 | 0 | 1 | 0 |
| 1 | 0 | −1 | 0 | 1 | 0 | −1 | 0 | 1 | 0 | −1 | 0 |
| −1 | 0 | −1 | 0 | −1 | 0 | 1 | 0 | −1 | 0 | 1 | 0 |
| 1 | 0 | 1 | 0 | −1 | 0 | 1 | 0 | 1 | 0 | 1 | 0 |
| 1 | 0 | −1 | 0 | −1 | 0 | −1 | 0 | 1 | 0 | 1 | 0 |
| 1 | 0 | −1 | 0 | −1 | 0 | 1 | 0 | 1 | 0 | 1 | 0 |
| −1 | 0 | 1 | 0 | 1 | 0 | −1 | 0 | 1 | 0 | −1 | 0 |
| −1 | 0 | −1 | 0 | −1 | 0 | 1 | 0 | −1 | 0 | −1 | 0 |
| −1 | 0 | 1 | 0 | −1 | 0 | 1 | 0 | 1 | 0 | −1 | 0 |
| 1 | 0 | 1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| 1 | 0 | −1 | 0 | 1 | 0 | 1 | 0 | 1 | 0 | −1 | 0 |
| −1 | 0 | 1 | 0 | 1 | 0 | 1 | 0 | −1 | 0 | 1 | 0 |
| 1 | 0 | −1 | 0 | 1 | 0 | −1 | 0 | −1 | 0 | 1 | 0 |
| −1 | 0 | 1 | 0 | 1 | 0 | 1 | 0 | −1 | 0 | 1 | 0 |
| 1 | 0 | 1 | 0 | 1 | 0 | −1 | 0 | −1 | 0 | −1 | 0 |
| 1 | 0 | −1 | 0 | −1 | 0 | 1 | 0 | 1 | 0 | −1 | 0 |
| 1 | 0 | 1 | 0 | 1 | 0 | −1 | 0 | −1 | 0 | −1 | 0 |
| −1 | 0 | 1 | 0 | 1 | 0 | 1 | 0 | −1 | 0 | −1 | 0 |
| −1 | 0 | −1 | 0 | 1 | 0 | 1 | 0 | −1 | 0 | −1 | 0 |
| 1 | 0 | −1 | 0 | 1 | 0 | 1 | 0 | 1 | 0 | −1 | 0 |
| −1 | 0 | 1 | 0 | 1 | 0 | 1 | 0 | −1 | 0 | 1 | 0 |
| 1 | 0 | −1 | 0 | 1 | 0 | −1 | 0 | −1 | 0 | −1 | 0 |
| −1 | 0 | 1 | 0 | −1 | 0 | −1 | 0 | −1 | 0 | 1 | 0 |
| −1 | 0 | 1 | 0 | 1 | 0 | −1 | 0 | 1 | 0 | 1 | 0 |
| −1 | 0 | 1 | 0 | 1 | 0 | −1 | 0 | −1 | 0 | 1 | 0 |
| −1 | 0 | −1 | 0 | −1 | 0 | 1 | 0 | 1 | 0 | 1 | 0 |
| 1 | 0 | −1 | 0 | 1 | 0 | −1 | 0 | −1 | 0 | −1 | 0 |
| 1 | 0 | −1 | 0 | −1 | 0 | −1 | 0 | −1 | 0 | 1 | 0 |
| 1 | 0 | 1 | 0 | 1 | 0 | −1 | 0 | −1 | 0 | −1 | 0 |
| 1 | 0 | 1 | 0 | 1 | 0 | 0 | 0 | 0 | 0 | 0 | 0 |
| 1 | 0 | −1 | 0 | −1 | 0 | 1 | 0 | 1 | 0 | −1 | 0 |
| 1 | 0 | −1 | 0 | −1 | 0 | −1 | 0 | 1 | 0 | 1 | 0 |
| 1 | 0 | 1 | 0 | −1 | 0 | 1 | 0 | 1 | 0 | 1 | 0 |
| −1 | 0 | 1 | 0 | −1 | 0 | −1 | 0 | −1 | 0 | −1 | 0 |
| 1 | 0 | 1 | 0 | 1 | 0 | −1 | 0 | 1 | 0 | 1 | 0 |
| −1 | 0 | −1 | 0 | 1 | 0 | −1 | 0 | −1 | 0 | 1 | 0 |
| −1 | 0 | −1 | 0 | 1 | 0 | −1 | 0 | 1 | 0 | 1 | 0 |
| 1 | 0 | −1 | 0 | 1 | 0 | 1 | 0 | 1 | 0 | 1 | 0 |
| −1 | 0 | 1 | 0 | −1 | 0 | −1 | 0 | 1 | 0 | −1 | 0 |
| −1 | 0 | −1 | 0 | 1 | 0 | 1 | 0 | −1 | 0 | −1 | 0 |
| −1 | 0 | 1 | 0 | −1 | 0 | 1 | 0 | 1 | 0 | 1 | 0 |
| −1 | 0 | 1 | 0 | 1 | 0 | 1 | 0 | 1 | 0 | −1 | 0 |
| −1 | 0 | −1 | 0 | 1 | 0 | 1 | 0 | 1 | 0 | 1 | 0 |
| −1 | 0 | −1 | 0 | −1 | 0 | 1 | 0 | −1 | 0 | −1 | 0 |
| 1 | 0 | 1 | 0 | −1 | 0 | 1 | 0 | 1 | 0 | 1 | 0 |
| −1 | 0 | −1 | 0 | −1 | 0 | −1 | 0 | 1 | 0 | −1 | 0 |
| −1 | 0 | −1 | 0 | 1 | 0 | −1 | 0 | 1 | 0 | 1 | 0 |
| −1 | 0 | 1 | 0 | −1 | 0 | −1 | 0 | 1 | 0 | −1 | 0 |
| −1 | 0 | −1 | 0 | 1 | 0 | 1 | 0 | −1 | 0 | −1 | 0 |
| −1 | 0 | 1 | 0 | −1 | 0 | −1 | 0 | 1 | 0 | −1 | 0 |
| 1 | 0 | 1 | 0 | 1 | 0 | −1 | 0 | 1 | 0 | 1 | 0 |
| 1 | 0 | −1 | 0 | 1 | 0 | −1 | 0 | 1 | 0 | 1 | 0 |
| −1 | 0 | 1 | 0 | −1 | 0 | −1 | 0 | −1 | 0 | 1 | 0 |
| −1 | 0 | −1 | 0 | −1 | 0 | −1 | 0 | 1 | 0 | −1 | 0 |
| 1 | 0 | 1 | 0 | −1 | 0 | 1 | 0 | 1 | 0 | 1 | 0 |
| −1 | 0 | −1 | 0 | 1 | 0 | 1 | 0 | 1 | 0 | −1 | 0 |
| −1 | 0 | −1 | 0 | 1 | 0 | 1 | 0 | 1 | 0 | 1 | 0 |
| −1 | 0 | 1 | 0 | 1 | 0 | 1 | 0 | −1 | 0 | 1 | 0 |
| −1 | 0 | −1 | 0 | −1 | 0 | −1 | 0 | 1 | 0 | 1 | 0 |
| 1 | 0 | −1 | 0 | 1 | 0 | 1 | 0 | −1 | 0 | −1 | 0 |
| 1 | 0 | −1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| −1 | 0 | −1 | 0 | 1 | 0 | 1 | 0 | −1 | 0 | 1 | 0 |
| −1 | 0 | −1 | 0 | 1 | 0 | −1 | 0 | −1 | 0 | −1 | 0 |
| 1 | 0 | 1 | 0 | −1 | 0 | −1 | 0 | −1 | 0 | 1 | 0 |
| −1 | 0 | −1 | 0 | 1 | 0 | −1 | 0 | 1 | 0 | 1 | 0 |
| 1 | 0 | −1 | 0 | 1 | 0 | 1 | 0 | 1 | 0 | 1 | 0 |
| −1 | 0 | −1 | 0 | −1 | 0 | −1 | 0 | 1 | 0 | 1 | 0 |

-continued

| | | | | | | | | | | | |
|---|---|---|---|---|---|---|---|---|---|---|---|
| 1 | 0 | −1 | 0 | 1 | 0 | 1 | 0 | −1 | 0 | −1 | 0 |
| 1 | 0 | −1 | 0 | −1 | 0 | −1 | 0 | 1 | 0 | 1 | 0 |
| 1 | 0 | 1 | 0 | −1 | 0 | 1 | 0 | 1 | 0 | 1 | 0 |
| −1 | 0 | 1 | 0 | 1 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 1 | 0 | 1 | 0 | −1 | 0 | 1 | 0 |
| 1 | 0 | 1 | 0 | −1 | 0 | 1 | 0 | 1 | 0 | 1 | 0 |
| 1 | 0 | −1 | 0 | −1 | 0 | −1 | 0 | 1 | 0 | −1 | 0 |
| −1 | 0 | 1 | 0 | 1 | 0 | −1 | 0 | 1 | 0 | 1 | 0 |
| 1 | 0 | −1 | 0 | −1 | 0 | −1 | 0 | −1 | 0 | 1 | 0 |
| 1 | 0 | 1 | 0 | 1 | 0 | −1 | 0 | 1 | 0 | 1 | 0 |
| 1 | 0 | −1 | 0 | 1 | 0 | −1 | 0 | −1 | 0 | 1 | 0 |
| −1 | 0 | −1 | 0 | −1 | 0 | 1 | 0 | 1 | 0 | −1 | 0 |
| −1 | 0 | −1 | 0 | 1 | 0 | −1 | 0 | −1 | 0 | 1 | 0 |
| −1 | 0 | 1 | 0 | 1 | 0 | −1 | 0 | 1 | 0 | 1 | 0 |
| −1 | 0 | 1 | 0 | −1 | 0 | −1 | 0 | −1 | 0 | 1 | 0 |
| 1 | 0 | −1 | 0 | −1 | 0 | −1 | 0 | 1 | 0 | −1 | 0 |
| −1 | 0 | 1 | 0 | 1 | 0 | −1 | 0 | 1 | 0 | 1 | 0 |
| 1 | 0 | −1 | 0 | −1 | 0 | −1 | 0 | −1 | 0 | 1 | 0 |
| −1 | 0 | 1 | 0 | 1 | 0 | 1 | 0 | −1 | 0 | 1 | 0 |
| 1 | 0 | 1 | 0 | 1 | 0 | −1 | 0 | −1 | 0 | −1 | 0 |
| 1 | 0 | 1 | 0 | 1 | 0 | −1 | 0 | 1 | 0 | 1 | 0 |
| 1 | 0 | 1 | 0 | −1 | 0 | 1 | 0 | 1 | 0 | −1 | 0 |
| 1 | 0 | −1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| 1 | 0 | −1 | 0 | 1 | 0 | 1 | 0 | −1 | 0 | −1 | 0 |
| −1 | 0 | −1 | 0 | −1 | 0 | −1 | 0 | −1 | 0 | 1 | 0 |
| −1 | 0 | 1 | 0 | 1 | 0 | −1 | 0 | 1 | 0 | 1 | 0 |
| 1 | 0 | −1 | 0 | −1 | 0 | 1 | 0 | 1 | 0 | 1 | 0 |
| 1 | 0 | 1 | 0 | 1 | 0 | −1 | 0 | 1 | 0 | −1 | 0 |
| −1 | 0 | 1 | 0 | −1 | 0 | 1 | 0 | 1 | 0 | 1 | 0 |
| −1 | 0 | 1 | 0 | 1 | 0 | 1 | 0 | 1 | 0 | −1 | 0 |
| −1 | 0 | −1 | 0 | 1 | 0 | −1 | 0 | −1 | 0 | 1 | 0 |
| 1 | 0 | −1 | 0 | 1 | 0 | 1 | 0 | 1 | 0 | −1 | 0 |
| −1 | 0 | −1 | 0 | −1 | 0 | 1 | 0 | 1 | 0 | 1 | 0 |
| −1 | 0 | −1 | 0 | −1 | 0 | −1 | 0 | 1 | 0 | −1 | 0 |
| −1 | 0 | −1 | 0 | 1 | 0 | −1 | 0 | 1 | 0 | 1 | 0 |
| 1 | 0 | −1 | 0 | −1 | 0 | 1 | 0 | 1 | 0 | 1 | 0 |
| −1 | 0 | 1 | 0 | 1 | 0 | −1 | 0 | 1 | 0 | −1 | 0 |
| −1 | 0 | −1 | 0 | −1 | 0 | 1 | 0 | −1 | 0 | −1 | 0 |
| −1 | 0 | 1 | 0 | −1 | 0 | 1 | 0 | 1 | 0 | −1 | 0 |
| 1 | 0 | 1 | 0 | −1 | 0 | 1 | 0 | 1 | 0 | −1 | 0 |
| −1 | 0 | 1 | 0 | −1 | 0 | −1 | 0 | −1 | 0 | 1 | 0 |
| 1 | 0 | 1 | 0 | 1 | 0 | −1 | 0 | 1 | 0 | −1 | 0 |
| −1 | 0 | −1 | 0 | 1 | 0 | −1 | 0 | −1 | 0 | −1 | 0 |
| −1 | 0 | 1 | 0 | 1 | 0 | 1 | 0 | −1 | 0 | 1 | 0 |
| 1 | 0 | 1 | 0 | −1 | 0 | −1 | 0 | −1 | 0 | 0 | 0 |
| 0 | 0 | 0 | 0 | −1 | 0 | 1 | 0 | 1 | 0 | −1 | 0 |
| −1 | 0 | 1 | 0 | −1 | 0 | 1 | 0 | 1 | 0 | 1 | 0 |
| −1 | 0 | −1 | 0 | −1 | 0 | −1 | 0 | 1 | 0 | −1 | 0 |
| −1 | 0 | −1 | 0 | 1 | 0 | −1 | 0 | 1 | 0 | 1 | 0 |
| 1 | 0 | 1 | 0 | −1 | 0 | −1 | 0 | −1 | 0 | 1 | 0 |
| −1 | 0 | −1 | 0 | 1 | 0 | 1 | 0 | −1 | 0 | 1 | 0 |
| 1 | 0 | −1 | 0 | 1 | 0 | 1 | 0 | −1 | 0 | 1 | 0 |
| −1 | 0 | −1 | 0 | −1 | 0 | 1 | 0 | −1 | 0 | −1 | 0 |
| −1 | 0 | −1 | 0 | 1 | 0 | −1 | 0 | 1 | 0 | 1 | 0 |
| −1 | 0 | 1 | 0 | 1 | 0 | 1 | 0 | −1 | 0 | −1 | 0 |
| 1 | 0 | 1 | 0 | 1 | 0 | −1 | 0 | 1 | 0 | −1 | 0 |
| −1 | 0 | −1 | 0 | 1 | 0 | −1 | 0 | −1 | 0 | −1 | 0 |
| −1 | 0 | 1 | 0 | 1 | 0 | 1 | 0 | −1 | 0 | −1 | 0 |
| −1 | 0 | −1 | 0 | 1 | 0 | 1 | 0 | 1 | 0 | −1 | 0 |
| 1 | 0 | 1 | 0 | −1 | 0 | −1 | 0 | 1 | 0 | −1 | 0 |
| −1 | 0 | −1 | 0 | 1 | 0 | 1 | 0 | 1 | 0 | 1 | 0 |
| −1 | 0 | 1 | 0 | 1 | 0 | 1 | 0 | −1 | 0 | 1 | 0 |
| −1 | 0 | −1 | 0 | 1 | 0 | −1 | 0 | 1 | 0 | 1 | 0 |
| −1 | 0 | 1 | 0 | 1 | 0 | 1 | 0 | −1 | 0 | −1 | 0 |
| 1 | 0 | 1 | 0 | 1 | 0 | −1 | 0 | 1 | 0 | 1 | 0 |
| −1 | 0 | 1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| −1 | 0 | −1 | 0 | 1 | 0 | −1 | 0 | 1 | 0 | 1 | 0 |
| 1 | 0 | −1 | 0 | 1 | 0 | 1 | 0 | 1 | 0 | 1 | 0 |
| −1 | 0 | 1 | 0 | −1 | 0 | −1 | 0 | 1 | 0 | −1 | 0 |
| −1 | 0 | −1 | 0 | 1 | 0 | 1 | 0 | −1 | 0 | −1 | 0 |
| −1 | 0 | 1 | 0 | 1 | 0 | 1 | 0 | −1 | 0 | −1 | 0 |
| −1 | 0 | −1 | 0 | 1 | 0 | −1 | 0 | −1 | 0 | −1 | 0 |
| 1 | 0 | −1 | 0 | 1 | 0 | 1 | 0 | 1 | 0 | 1 | 0 |
| −1 | 0 | −1 | 0 | −1 | 0 | 1 | 0 | −1 | 0 | −1 | 0 |
| 1 | 0 | 1 | 0 | −1 | 0 | 1 | 0 | 1 | 0 | 1 | 0 |
| 1 | 0 | −1 | 0 | 1 | 0 | 1 | 0 | 1 | 0 | −1 | 0 |

-continued

| | | | | | | | | | | | |
|---|---|---|---|---|---|---|---|---|---|---|---|
| 1 | 0 | −1 | 0 | −1 | 0 | 1 | 0 | −1 | 0 | −1 | 0 |
| 1 | 0 | −1 | 0 | 1 | 0 | 1 | 0 | −1 | 0 | 1 | 0 |
| 1 | 0 | 1 | 0 | −1 | 0 | −1 | 0 | 1 | 0 | 1 | 0 |
| 1 | 0 | −1 | 0 | 1 | 0 | 1 | 0 | −1 | 0 | 1 | 0 |
| −1 | 0 | −1 | 0 | −1 | 0 | 1 | 0 | −1 | 0 | −1 | 0 |
| −1 | 0 | −1 | 0 | 1 | 0 | 1 | 0 | 1 | 0 | 1 | 0 |
| −1 | 0 | −1 | 0 | −1 | 0 | 1 | 0 | −1 | 0 | −1 | 0 |
| 1 | 0 | 1 | 0 | −1 | 0 | 1 | 0 | 1 | 0 | 1 | 0 |
| −1 | 0 | −1 | 0 | −1 | 0 | −1 | 0 | 1 | 0 | −1 | 0 |
| −1 | 0 | −1 | 0 | 1 | 0 | −1 | 0 | −1 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | −1 | 0 | −1 | 0 |
| 1 | 0 | −1 | 0 | −1 | 0 | −1 | 0 | 1 | 0 | −1 | 0 |
| −1 | 0 | −1 | 0 | −1 | 0 | 1 | 0 | 1 | 0 | −1 | 0 |
| −1 | 0 | 1 | 0 | 1 | 0 | −1 | 0 | −1 | 0 | 1 | 0 |
| −1 | 0 | −1 | 0 | −1 | 0 | 1 | 0 | 1 | 0 | 1 | 0 |
| 1 | 0 | −1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| 1 | 0 | −1 | 0 | 1 | 0 | 1 | 0 | 1 | 0 | −1 | 0 |
| −1 | 0 | 1 | 0 | 1 | 0 | 1 | 0 | −1 | 0 | 1 | 0 |
| 1 | 0 | −1 | 0 | 1 | 0 | −1 | 0 | −1 | 0 | 1 | 0 |
| −1 | 0 | −1 | 0 | 1 | 0 | −1 | 0 | 1 | 0 | 1 | 0 |
| 1 | 0 | −1 | 0 | 1 | 0 | 1 | 0 | 1 | 0 | 1 | 0 |
| −1 | 0 | 1 | 0 | 1 | 0 | −1 | 0 | −1 | 0 | 1 | 0 |
| −1 | 0 | −1 | 0 | −1 | 0 | 1 | 0 | 1 | 0 | 1 | 0 |
| 1 | 0 | −1 | 0 | 1 | 0 | −1 | 0 | −1 | 0 | −1 | 0 |
| 1 | 0 | −1 | 0 | −1 | 0 | −1 | 0 | −1 | 0 | 1 | 0 |
| 1 | 0 | 1 | 0 | −1 | 0 | −1 | 0 | −1 | 0 | 1 | 0 |
| 1 | 0 | −1 | 0 | −1 | 0 | −1 | 0 | 1 | 0 | −1 | 0 |
| −1 | 0 | 1 | 0 | −1 | 0 | 1 | 0 | 1 | 0 | 1 | 0 |
| 1 | 0 | −1 | 0 | 1 | 0 | 1 | 0 | 1 | 0 | −1 | 0 |
| 1 | 0 | −1 | 0 | −1 | 0 | 1 | 0 | −1 | 0 | 1 | 0 |
| −1 | 0 | −1 | 0 | −1 | 0 | 1 | 0 | −1 | 0 | −1 | 0 |
| −1 | 0 | 1 | 0 | −1 | 0 | 1 | 0 | 1 | 0 | −1 | 0 |
| 1 | 0 | 1 | 0 | 1 | 0 | −1 | 0 | −1 | 0 | 1 | 0 |
| 1 | 0 | 1 | 0 | −1 | 0 | 1 | 0 | 1 | 0 | −1 | 0 |
| 1 | 0 | −1 | 0 | −1 | 0 | 1 | 0 | −1 | 0 | 1 | 0 |
| 1 | 0 | 1 | 0 | −1 | 0 | 1 | 0 | 1 | 0 | 1 | 0 |
| 1 | 0 | −1 | 0 | −1 | 0 | −1 | 0 | 1 | 0 | −1 | 0 |
| −1 | 0 | 1 | 0 | 1 | 0 | −1 | 0 | 1 | 0 | 1 | 0 |
| 1 | 0 | −1 | 0 | −1 | 0 | −1 | 0 | −1 | 0 | 1 | 0 |
| 1 | 0 | 1 | 0 | −1 | 0 | −1 | 0 | −1 | 0 | −1 | 0 |
| 1 | 0 | −1 | 0 | −1 | 0 | −1 | 0 | 1 | 0 | −1 | 0 |
| 1 | 0 | 1 | 0 | 1 | 0 | −1 | 0 | −1 | 0 | 1 | 0 |
| 1 | 0 | 1 | 0 | −1 | 0 | 1 | 0 | 1 | 0 | −1 | 0 |
| 1 | 0 | −1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| 1 | 0 | −1 | 0 | 1 | 0 | 1 | 0 | −1 | 0 | 1 | 0 |
| 1 | 0 | −1 | 0 | −1 | 0 | 1 | 0 | −1 | 0 | −1 | 0 |
| −1 | 0 | 1 | 0 | 1 | 0 | 1 | 0 | 1 | 0 | −1 | 0 |
| 1 | 0 | −1 | 0 | −1 | 0 | −1 | 0 | 1 | 0 | −1 | 0 |
| −1 | 0 | −1 | 0 | −1 | 0 | 1 | 0 | 1 | 0 | 1 | 0 |
| −1 | 0 | 1 | 0 | 1 | 0 | 1 | 0 | −1 | 0 | −1 | 0 |
| −1 | 0 | 0 | 0 | 0 | 0 | 0 | 0 | −1 | 0 | 1 | 0 |
| 1 | 0 | −1 | 0 | −1 | 0 | 1 | 0 | −1 | 0 | −1 | 0 |
| −1 | 0 | −1 | 0 | 1 | 0 | 1 | 0 | 1 | 0 | 1 | 0 |
| −1 | 0 | 1 | 0 | 1 | 0 | 1 | 0 | −1 | 0 | 1 | 0 |
| −1 | 0 | −1 | 0 | −1 | 0 | −1 | 0 | 1 | 0 | 1 | 0 |
| 1 | 0 | −1 | 0 | 1 | 0 | 1 | 0 | −1 | 0 | −1 | 0 |
| 1 | 0 | −1 | 0 | −1 | 0 | 1 | 0 | −1 | 0 | −1 | 0 |
| 1 | 0 | −1 | 0 | 1 | 0 | 1 | 0 | 1 | 0 | −1 | 0 |
| 1 | 0 | 1 | 0 | 1 | 0 | 1 | 0 | −1 | 0 | 1 | 0 |
| −1 | 0 | −1 | 0 | 1 | 0 | −1 | 0 | −1 | 0 | −1 | 0 |
| 1 | 0 | 1 | 0 | −1 | 0 | −1 | 0 | −1 | 0 | 1 | 0 |
| −1 | 0 | 1 | 0 | 1 | 0 | 1 | 0 | −1 | 0 | 1 | 0 |
| 1 | 0 | 1 | 0 | 1 | 0 | −1 | 0 | −1 | 0 | −1 | 0 |
| 1 | 0 | 1 | 0 | 1 | 0 | 1 | 0 | −1 | 0 | −1 | 0 |
| −1 | 0 | 1 | 0 | −1 | 0 | −1 | 0 | 1 | 0 | 1 | 0 |
| −1 | 0 | 1 | 0 | 1 | 0 | 1 | 0 | −1 | 0 | −1 | 0 |
| −1 | 0 | −1 | 0 | 1 | 0 | −1 | 0 | −1 | 0 | −1 | 0 |
| 1 | 0 | −1 | 0 | 1 | 0 | 1 | 0 | −1 | 0 | 1 | 0 |
| −1 | 0 | −1 | 0 | 1 | 0 | −1 | 0 | −1 | 0 | −1 | 0 |
| 1 | 0 | 1 | 0 | −1 | 0 | −1 | 0 | −1 | 0 | 1 | 0 |
| −1 | 0 | −1 | 0 | 1 | 0 | −1 | 0 | 1 | 0 | 1 | 0 |
| 1 | 0 | −1 | 0 | 1 | 0 | 1 | 0 | 1 | 0 | −1 | 0 |
| −1 | 0 | 1 | 0 | −1 | 0 | −1 | 0 | 1 | 0 | −1 | 0 |
| 1 | 0 | 1 | 0 | 1 | 0 | −1 | 0 | 1 | 0 | 1 | 0 |
| 1 | 0 | 1 | 0 | −1 | 0 | 1 | 0 | −1 | 0 | −1 | 0 |
| 1 | 0 | −1 | 0 | −1 | 0 | −1 | 0 | 1 | 0 | 1 | 0 |

-continued

| | | | | | | | | | | | |
|---|---|---|---|---|---|---|---|---|---|---|---|
| −1 | 0 | −1 | 0 | −1 | 0 | 1 | 0 | 1 | 0 | 1 | 0 |
| −1 | 0 | −1 | 0 | −1 | 0 | −1 | 0 | 1 | 0 | −1 | 0 |
| −1 | 0 | −1 | 0 | −1 | 0 | −1 | 0 | 1 | 0 | 1 | 0 |
| 1 | 0 | 1 | 0 | −1 | 0 | −1 | 0 | −1 | 0 | 1 | 0 |
| −1 | 0 | −1 | 0 | 1 | 0 | 1 | 0 | −1 | 0 | 1 | 0 |
| 1 | 0 | 1 | 0 | 1 | 0 | −1 | 0 | 1 | 0 | 1 | 0 |
| 1 | 0 | −1 | 0 | 1 | 0 | −1 | 0 | −1 | 0 | 1 | 0 |
| −1 | 0 | −1 | 0 | 1 | 0 | −1 | 0 | 1 | 0 | 1 | 0 |
| −1 | 0 | 1 | 0 | 1 | 0 | 1 | 0 | −1 | 0 | −1 | 0 |
| 1 | 0 | 1 | 0 | 1 | 0 | −1 | 0 | 1 | 0 | 1 | 0 |
| −1 | 0 | 1 | 0 | −1 | 0 | −1 | 0 | −1 | 0 | 1 | 0 |
| −1 | 0 | −1 | 0 | −1 | 0 | −1 | 0 | 1 | 0 | −1 | 0 |
| 1 | 0 | 1 | 0 | −1 | 0 | −1 | 0 | −1 | 0 | 1 | 0 |
| −1 | 0 | −1 | 0 | 1 | 0 | 1 | 0 | −1 | 0 | 1 | 0 |
| 1 | 0 | 1 | 0 | −1 | 0 | −1 | 0 | −1 | 0 | −1 | 0 |
| 1 | 0 | −1 | 0 | −1 | 0 | −1 | 0 | 1 | 0 | −1 | 0 |
| −1 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| −1 | 0 | −1 | 0 | 1 | 0 | −1 | 0 | −1 | 0 | −1 | 0 |
| 1 | 0 | −1 | 0 | −1 | 0 | −1 | 0 | −1 | 0 | 1 | 0 |
| 1 | 0 | 1 | 0 | −1 | 0 | 1 | 0 | 1 | 0 | −1 | 0 |
| −1 | 0 | 1 | 0 | −1 | 0 | −1 | 0 | −1 | 0 | 1 | 0 |
| 1 | 0 | 1 | 0 | 1 | 0 | −1 | 0 | −1 | 0 | −1 | 0 |
| −1 | 0 | 1 | 0 | −1 | 0 | −1 | 0 | −1 | 0 | 1 | 0 |
| −1 | 0 | 1 | 0 | 1 | 0 | −1 | 0 | 1 | 0 | 1 | 0 |
| 1 | 0 | −1 | 0 | −1 | 0 | 1 | 0 | 1 | 0 | 1 | 0 |
| −1 | 0 | 1 | 0 | 1 | 0 | −1 | 0 | 1 | 0 | −1 | 0 |
| −1 | 0 | 1 | 0 | −1 | 0 | −1 | 0 | 1 | 0 | −1 | 0 |
| 1 | 0 | 1 | 0 | 1 | 0 | −1 | 0 | 1 | 0 | 1 | 0 |
| 1 | 0 | 1 | 0 | −1 | 0 | 1 | 0 | 1 | 0 | −1 | 0 |
| −1 | 0 | 1 | 0 | −1 | 0 | −1 | 0 | −1 | 0 | 1 | 0 |
| 1 | 0 | 1 | 0 | 1 | 0 | −1 | 0 | 1 | 0 | −1 | 0 |
| −1 | 0 | −1 | 0 | 1 | 0 | −1 | 0 | −1 | 0 | −1 | 0 |
| −1 | 0 | 1 | 0 | 1 | 0 | 1 | 0 | −1 | 0 | −1 | 0 |
| −1 | 0 | 1 | 0 | 1 | 0 | −1 | 0 | −1 | 0 | −1 | 0 |
| 1 | 0 | −1 | 0 | −1 | 0 | 1 | 0 | −1 | 0 | 1 | 0 |
| 1 | 0 | 1 | 0 | 1 | 0 | −1 | 0 | 1 | 0 | 1 | 0 |
| 1 | 0 | −1 | 0 | 1 | 0 | −1 | 0 | −1 | 0 | 1 | 0 |
| −1 | 0 | 1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| 1 | 0 | −1 | 0 | 1 | 0 | 1 | 0 | 1 | 0 | −1 | 0 |
| −1 | 0 | 1 | 0 | 1 | 0 | 1 | 0 | −1 | 0 | 1 | 0 |
| 1 | 0 | −1 | 0 | 1 | 0 | −1 | 0 | −1 | 0 | 1 | 0 |
| −1 | 0 | 1 | 0 | 1 | 0 | 1 | 0 | −1 | 0 | 1 | 0 |
| 1 | 0 | 1 | 0 | 1 | 0 | −1 | 0 | −1 | 0 | −1 | 0 |
| 1 | 0 | −1 | 0 | −1 | 0 | 1 | 0 | 1 | 0 | −1 | 0 |
| 1 | 0 | 1 | 0 | 1 | 0 | −1 | 0 | −1 | 0 | −1 | 0 |
| −1 | 0 | 1 | 0 | 1 | 0 | 1 | 0 | −1 | 0 | −1 | 0 |
| −1 | 0 | −1 | 0 | 1 | 0 | −1 | 0 | −1 | 0 | −1 | 0 |
| 1 | 0 | −1 | 0 | 1 | 0 | 1 | 0 | 1 | 0 | −1 | 0 |
| −1 | 0 | 1 | 0 | 1 | 0 | 1 | 0 | −1 | 0 | 1 | 0 |
| 1 | 0 | −1 | 0 | 1 | 0 | −1 | 0 | −1 | 0 | −1 | 0 |
| −1 | 0 | 1 | 0 | −1 | 0 | −1 | 0 | −1 | 0 | 1 | 0 |
| −1 | 0 | 1 | 0 | 1 | 0 | −1 | 0 | 1 | 0 | 1 | 0 |
| −1 | 0 | 1 | 0 | 1 | 0 | −1 | 0 | −1 | 0 | 1 | 0 |
| −1 | 0 | −1 | 0 | −1 | 0 | 1 | 0 | 1 | 0 | 1 | 0 |
| 1 | 0 | −1 | 0 | 1 | 0 | −1 | 0 | −1 | 0 | −1 | 0 |
| 1 | 0 | −1 | 0 | −1 | 0 | −1 | 0 | −1 | 0 | 1 | 0 |
| 1 | 0 | 1 | 0 | 1 | 0 | −1 | 0 | −1 | 0 | −1 | 0 |
| 1 | 0 | 1 | 0 | 1 | 0 | 0 | 0 | 0 | 0 | 0 | 0 |
| 1 | 0 | −1 | 0 | −1 | 0 | 1 | 0 | 1 | 0 | −1 | 0 |
| 1 | 0 | 1 | 0 | 1 | 0 | 1 | 0 | −1 | 0 | −1 | 0 |
| −1 | 0 | −1 | 0 | 1 | 0 | −1 | 0 | −1 | 0 | −1 | 0 |
| 1 | 0 | −1 | 0 | 1 | 0 | 1 | 0 | 1 | 0 | 1 | 0 |
| −1 | 0 | −1 | 0 | −1 | 0 | 1 | 0 | −1 | 0 | −1 | 0 |
| 1 | 0 | 1 | 0 | −1 | 0 | 1 | 0 | 1 | 0 | −1 | 0 |
| 1 | 0 | 1 | 0 | −1 | 0 | 1 | 0 | −1 | 0 | −1 | 0 |
| −1 | 0 | 1 | 0 | −1 | 0 | −1 | 0 | −1 | 0 | −1 | 0 |
| 1 | 0 | −1 | 0 | 1 | 0 | 1 | 0 | −1 | 0 | 1 | 0 |
| 1 | 0 | 1 | 0 | −1 | 0 | −1 | 0 | 1 | 0 | 1 | 0 |
| 1 | 0 | −1 | 0 | 1 | 0 | −1 | 0 | −1 | 0 | −1 | 0 |
| 1 | 0 | −1 | 0 | −1 | 0 | −1 | 0 | −1 | 0 | 1 | 0 |
| 1 | 0 | 1 | 0 | −1 | 0 | −1 | 0 | −1 | 0 | −1 | 0 |
| 1 | 0 | 1 | 0 | 1 | 0 | −1 | 0 | 1 | 0 | 1 | 0 |
| −1 | 0 | −1 | 0 | 1 | 0 | −1 | 0 | −1 | 0 | −1 | 0 |
| 1 | 0 | 1 | 0 | 1 | 0 | 1 | 0 | −1 | 0 | 1 | 0 |
| 1 | 0 | 1 | 0 | −1 | 0 | 1 | 0 | −1 | 0 | −1 | 0 |
| 1 | 0 | −1 | 0 | 1 | 0 | 1 | 0 | −1 | 0 | 1 | 0 |
| 1 | 0 | 1 | 0 | −1 | 0 | −1 | 0 | 1 | 0 | 1 | 0 |

-continued

| | | | | | | | | | | | |
|---|---|---|---|---|---|---|---|---|---|---|---|
| 1 | 0 | −1 | 0 | 1 | 0 | 1 | 0 | −1 | 0 | 1 | 0 |
| −1 | 0 | −1 | 0 | −1 | 0 | 1 | 0 | −1 | 0 | −1 | 0 |
| −1 | 0 | 1 | 0 | 1 | 0 | −1 | 0 | 1 | 0 | 1 | 0 |
| −1 | 0 | 1 | 0 | −1 | 0 | −1 | 0 | −1 | 0 | 1 | 0 |
| −1 | 0 | −1 | 0 | 1 | 0 | −1 | 0 | 1 | 0 | −1 | 0 |
| 1 | 0 | 1 | 0 | −1 | 0 | 1 | 0 | 1 | 0 | 1 | 0 |
| −1 | 0 | −1 | 0 | 1 | 0 | 1 | 0 | 1 | 0 | −1 | 0 |
| −1 | 0 | −1 | 0 | 1 | 0 | 1 | 0 | 1 | 0 | 1 | 0 |
| −1 | 0 | 1 | 0 | 1 | 0 | 1 | 0 | −1 | 0 | 1 | 0 |
| −1 | 0 | −1 | 0 | −1 | 0 | −1 | 0 | 1 | 0 | 1 | 0 |
| 1 | 0 | −1 | 0 | 1 | 0 | 1 | 0 | −1 | 0 | −1 | 0 |
| 1 | 0 | −1 | 0 | −1 | 0 | −1 | 0 | −1 | 0 | 1 | 0 |
| −1 | 0 | −1 | 0 | −1 | 0 | 1 | 0 | −1 | 0 | 1 | 0 |
| 1 | 0 | −1 | 0 | 1 | 0 | 1 | 0 | −1 | 0 | 1 | 0 |
| −1 | 0 | −1 | 0 | 1 | 0 | −1 | 0 | −1 | 0 | −1 | 0 |
| 1 | 0 | 1 | 0 | −1 | 0 | −1 | 0 | −1 | 0 | 1 | 0 |
| −1 | 0 | −1 | 0 | 1 | 0 | −1 | 0 | 1 | 0 | 1 | 0 |
| 1 | 0 | −1 | 0 | 1 | 0 | 1 | 0 | 1 | 0 | 1 | 0 |
| −1 | 0 | −1 | 0 | −1 | 0 | −1 | 0 | 1 | 0 | 1 | 0 |
| 1 | 0 | −1 | 0 | 1 | 0 | 1 | 0 | −1 | 0 | −1 | 0 |
| 1 | 0 | −1 | 0 | −1 | 0 | −1 | 0 | 1 | 0 | 1 | 0 |
| −1 | 0 | 1 | 0 | −1 | 0 | 1 | 0 | 1 | 0 | 1 | 0 |
| −1 | 0 | 1 | 0 | 1 | 0 | 0 | 0 | 0 | 0 | 0 | 0 |
| 0 | 0 | 0 | 0}; | | | | | | | | |

or

2×EHT_LTF_320 M=

{$0_{12}$, LTF2×80 M_part1, LTF2×80 M_part2, LTF2×80 M_part3, LTF2×80 M_part4, LTF2×80 M_part5, $0_{23}$, (−1)*LTF2×80 M_part1, LTF2×80 M_part2, LTF2×80 M_part3, LTF2×80 M_part4, (−1)*LTF2×80 M_part5, $0_{23}$, LTF2×80 M_part1, LTF2×80 M_part2, LTF2×80 M_part3, LTF2×80 M_part4, (−1)*LTF2×80 M_part5, $0_{23}$, LTF2×80 M_part1, (−1)*LTF2×80 M_part2, (−1)*LTF2×80 M_part3, (−1)*LTF2×80 M_part4, (−1)*LTF2×80 M_part5, $0_{11}$}, wherein:

LTF2×80 M_part1=LTF2×80 M_2(1:242);

LTF2×80 M_part2=LTF2×80 M_2(243:484);

LTF2×80 M_part3=LTF2×80 M_2(485:517);

LTF2×80 M_part4-LTF2×80 M_2(518:759);

LTF2×80 M_part5=LTF2×80 M_2(760:1001); and

LTF2×80 M_2 is a sequence obtained after the 12 leftmost 0s and the 11 rightmost 0s are removed from a sequence 7 in a specific implementation of the specification.

15. The computer-implemented method according to claim 11, wherein in response to the LTF being a 4×LTF sequence in an 80 MHz, the 4×LTF sequence in the 80 MHz is:

| | | | | | | | | | | | | |
|---|---|---|---|---|---|---|---|---|---|---|---|---|
| {0 | 0 | 0 | 0 | 0 | 0 | 0 | 0 | 0 | 0 | 0 | 0 | 0 |
| 1 | 1 | 1 | 1 | 1 | −1 | −1 | 1 | −1 | | | | |
| −1 | 1 | 1 | −1 | 1 | −1 | 1 | −1 | −1 | −1 | −1 | −1 | |
| 1 | 1 | −1 | −1 | −1 | 1 | 1 | −1 | 1 | | | | |
| −1 | 1 | 1 | 1 | 1 | 1 | 1 | −1 | −1 | 1 | −1 | −1 | |
| 1 | 1 | −1 | 1 | −1 | 1 | 1 | 1 | 1 | 1 | 1 | −1 | |
| −1 | 1 | 1 | 1 | −1 | −1 | 1 | −1 | 1 | −1 | −1 | −1 | |
| −1 | −1 | −1 | 1 | 1 | −1 | 1 | 1 | −1 | −1 | 1 | −1 | |
| 1 | −1 | 1 | 1 | 1 | 1 | 1 | −1 | −1 | 1 | 1 | 1 | |
| −1 | −1 | 1 | −1 | 1 | | | | | | | | |
| −1 | 1 | 1 | 1 | 1 | 1 | −1 | −1 | 1 | −1 | −1 | 1 | |
| 1 | −1 | 1 | −1 | 1 | 1 | 1 | 1 | 1 | 1 | −1 | −1 | |
| 1 | 1 | 1 | −1 | −1 | 1 | −1 | 1 | −1 | −1 | 1 | 1 | |
| −1 | 1 | 1 | −1 | 1 | −1 | 1 | | | | | | |
| −1 | −1 | −1 | −1 | −1 | 1 | 1 | −1 | −1 | −1 | 1 | 1 | |
| −1 | 1 | −1 | 1 | 1 | 1 | 1 | 1 | 1 | | | | |
| −1 | −1 | 1 | −1 | −1 | 1 | 1 | −1 | 1 | −1 | 1 | 1 | |
| 1 | 1 | 1 | 1 | −1 | −1 | 1 | 1 | 1 | | | | |
| −1 | −1 | 1 | −1 | 1 | −1 | 1 | 1 | 1 | 1 | 1 | −1 | |
| −1 | 1 | −1 | −1 | 1 | 1 | −1 | 1 | −1 | 1 | −1 | −1 | |
| −1 | −1 | −1 | 1 | 1 | −1 | −1 | −1 | 1 | 1 | −1 | 1 | |

-continued

| | | | | | | | | | | | |
|---|---|---|---|---|---|---|---|---|---|---|---|
| −1 | 1 | −1 | −1 | −1 | −1 | −1 | 1 | 1 | −1 | 1 | 1 |
| −1 | −1 | 1 | −1 | 1 | −1 | −1 | −1 | −1 | −1 | −1 | 1 |
| 1 | −1 | −1 | −1 | 1 | 1 | −1 | 1 | −1 | −1 | −1 | −1 |
| −1 | 1 | 1 | −1 | 1 | 1 | −1 | −1 | 1 | −1 | 1 | −1 |
| 1 | 1 | 1 | 1 | 1 | −1 | −1 | 1 | 1 | 1 | −1 | −1 |
| 1 | −1 | 1 | −1 | −1 | −1 | −1 | −1 | −1 | 1 | 1 | −1 |
| 1 | 1 | −1 | −1 | 1 | −1 | 1 | −1 | −1 | −1 | −1 | −1 |
| −1 | 1 | 1 | −1 | −1 | −1 | 1 | 1 | −1 | 1 | −1 | 1 |
| 1 | 1 | 1 | 1 | 1 | −1 | −1 | 1 | −1 | −1 | 1 | 1 |
| −1 | 1 | −1 | 1 | −1 | −1 | −1 | −1 | −1 | 1 | 1 | −1 |
| −1 | −1 | 1 | 1 | −1 | 1 | −1 | 1 | −1 | −1 | −1 | −1 |
| −1 | 1 | −1 | −1 | 1 | 1 | −1 | | | | | |
| −1 | 1 | −1 | 1 | −1 | −1 | −1 | −1 | −1 | −1 | 1 | 1 |
| −1 | −1 | −1 | 1 | 1 | 1 | 1 | 1 | −1 | | | |
| −1 | 1 | −1 | −1 | 1 | 1 | −1 | 1 | −1 | 1 | −1 | −1 |
| −1 | −1 | −1 | 1 | 1 | −1 | −1 | −1 | 1 | 1 | −1 | 1 |
| −1 | 1 | 1 | 1 | 1 | 1 | 1 | −1 | −1 | 1 | −1 | −1 |
| 1 | 1 | −1 | 1 | −1 | 1 | 1 | 1 | 1 | 1 | 1 | −1 |
| −1 | 1 | 1 | 1 | −1 | −1 | 1 | −1 | 1 | −1 | 1 | 1 |
| 1 | 1 | 1 | −1 | −1 | 1 | −1 | −1 | 1 | 1 | −1 | 1 |
| −1 | 1 | −1 | −1 | −1 | −1 | −1 | 1 | 1 | −1 | −1 | −1 |
| 1 | 1 | −1 | 1 | −1 | 1 | −1 | −1 | −1 | −1 | −1 | 1 |
| 1 | −1 | 1 | 1 | −1 | −1 | 1 | −1 | 1 | −1 | −1 | −1 |
| −1 | | | | | | | | | | | |
| −1 | −1 | 1 | 1 | −1 | −1 | −1 | 1 | 1 | −1 | 1 | −1 |
| 1 | 0 | 0 | 0 | 0 | 0 | 1 | 1 | 1 | 1 | 1 | −1 |
| −1 | 1 | −1 | −1 | 1 | 1 | −1 | 1 | −1 | 1 | −1 | −1 |
| −1 | 1 | −1 | −1 | 1 | 1 | −1 | −1 | | | | |
| −1 | 1 | 1 | −1 | 1 | −1 | 1 | 1 | 1 | 1 | 1 | 1 |
| −1 | −1 | 1 | −1 | −1 | 1 | 1 | −1 | 1 | | | |
| −1 | 1 | 1 | 1 | 1 | 1 | 1 | −1 | −1 | 1 | 1 | 1 |
| −1 | −1 | 1 | −1 | 1 | −1 | −1 | −1 | −1 | | | |
| −1 | −1 | 1 | 1 | −1 | 1 | 1 | −1 | −1 | 1 | −1 | 1 |
| −1 | 1 | 1 | 1 | 1 | 1 | −1 | −1 | 1 | 1 | 1 | −1 |
| −1 | 1 | −1 | 1 | −1 | 1 | 1 | 1 | 1 | 1 | −1 | −1 |
| 1 | −1 | −1 | 1 | 1 | −1 | 1 | | | | | |
| −1 | 1 | 1 | 1 | 1 | 1 | 1 | −1 | −1 | 1 | 1 | 1 |
| −1 | −1 | 1 | −1 | 1 | −1 | −1 | 1 | −1 | | | |
| −1 | 1 | 1 | −1 | 1 | −1 | 1 | −1 | −1 | −1 | −1 | −1 |
| 1 | 1 | −1 | −1 | 1 | 1 | 1 | −1 | 1 | | | |
| −1 | 1 | 1 | 1 | 1 | 1 | 1 | −1 | −1 | 1 | −1 | −1 |
| 1 | 1 | −1 | 1 | −1 | 1 | 1 | 1 | 1 | 1 | 1 | −1 |
| −1 | 1 | 1 | 1 | −1 | −1 | 1 | −1 | 1 | −1 | 1 | 1 |
| 1 | 1 | 1 | −1 | −1 | 1 | −1 | | | | | |
| −1 | 1 | 1 | −1 | 1 | −1 | 1 | −1 | −1 | −1 | −1 | −1 |
| 1 | 1 | −1 | −1 | −1 | 1 | 1 | −1 | 1 | | | |
| −1 | 1 | −1 | −1 | −1 | −1 | −1 | 1 | 1 | −1 | 1 | 1 |
| −1 | −1 | 1 | −1 | 1 | −1 | −1 | −1 | −1 | | | |
| −1 | −1 | 1 | 1 | −1 | −1 | −1 | 1 | 1 | −1 | 1 | −1 |
| 1 | 1 | 1 | 1 | −1 | −1 | 1 | −1 | −1 | 1 | 1 | −1 |
| 1 | −1 | 1 | −1 | −1 | −1 | −1 | −1 | 1 | 1 | −1 | −1 |
| −1 | 1 | 1 | −1 | 1 | −1 | 1 | 1 | 1 | 1 | 1 | 1 |
| −1 | −1 | 1 | −1 | −1 | 1 | 1 | −1 | 1 | −1 | 1 | 1 |
| 1 | 1 | 1 | 1 | −1 | | | | | | | |
| −1 | 1 | 1 | 1 | −1 | −1 | 1 | −1 | 1 | −1 | −1 | −1 |
| −1 | −1 | −1 | 1 | 1 | −1 | 1 | 1 | −1 | | | |
| −1 | 1 | −1 | 1 | −1 | 1 | 1 | 1 | 1 | 1 | −1 | −1 |
| 1 | 1 | 1 | −1 | −1 | 1 | −1 | 1 | −1 | 1 | 1 | 1 |
| 1 | 1 | −1 | −1 | 1 | −1 | −1 | 1 | 1 | −1 | 1 | −1 |
| 1 | 1 | 1 | 1 | 1 | 1 | −1 | | | | | |
| −1 | 1 | 1 | 1 | −1 | −1 | −1 | −1 | −1 | 1 | 1 | −1 |
| 1 | 1 | −1 | −1 | 1 | −1 | 1 | −1 | 1 | 1 | 1 | 1 |
| 1 | −1 | −1 | 1 | 1 | 1 | −1 | −1 | 1 | −1 | 1 | −1 |
| −1 | −1 | −1 | −1 | −1 | 1 | 1 | | | | | |
| −1 | 1 | 1 | −1 | −1 | 1 | −1 | 1 | −1 | −1 | −1 | −1 |
| −1 | −1 | 1 | 1 | −1 | −1 | −1 | 1 | 1 | | | |
| −1 | 1 | −1 | 1 | −1 | −1 | −1 | −1 | −1 | 1 | 1 | −1 |
| 1 | 1 | −1 | −1 | 1 | −1 | 1 | −1 | 1 | 1 | 1 | 1 |
| 1 | −1 | −1 | 1 | 1 | 1 | −1 | −1 | 1 | −1 | 1 | −1 |
| 1 | 1 | 1 | 1 | 1 | −1 | −1 | 1 | −1 | −1 | 1 | 1 |
| −1 | 1 | −1 | 1 | 1 | 1 | 1 | 1 | 1 | −1 | −1 | 1 |
| 1 | 1 | −1 | −1 | 1 | | | | | | | |
| −1 | 1 | −1 | 0 | 0 | 0 | 0 | 0 | 0 | 0 | 0 | 0 |
| 0 | 0}. | | | | | | | | | | |

* * * * *